United States Patent
Kimura et al.

(10) Patent No.: US 12,528,863 B2
(45) Date of Patent: Jan. 20, 2026

(54) CLAUDIN-6 BINDING MOLECULES AND USES THEREOF

(71) Applicant: Chugai Seiyaku Kabushiki Kaisha, Tokyo (JP)

(72) Inventors: Naoki Kimura, Kanagawa (JP); Tatsushi Kodama, Tokyo (JP); Shinya Ishii, Kanagawa (JP); Masaru Muraoka, Shizuoka (JP); Takayuki Kamikawa, Kanagawa (JP)

(73) Assignee: CHUGAI SEIYAKU KABUSHIKI KAISHA, Tokyo (JP)

( * ) Notice: Subject to any disclaimer, the term of this patent is extended or adjusted under 35 U.S.C. 154(b) by 1001 days.

(21) Appl. No.: 17/622,118

(22) PCT Filed: Jul. 10, 2020

(86) PCT No.: PCT/JP2020/026946
§ 371 (c)(1),
(2) Date: Dec. 22, 2021

(87) PCT Pub. No.: WO2021/006328
PCT Pub. Date: Jan. 14, 2021

(65) Prior Publication Data
US 2023/0057904 A1 Feb. 23, 2023

(30) Foreign Application Priority Data
Jul. 10, 2019 (JP) ................. 2019-128727

(51) Int. Cl.
| | |
|---|---|
| *C07K 16/28* | (2006.01) |
| *A61P 35/00* | (2006.01) |
| *C07K 16/00* | (2006.01) |
| *C07K 16/46* | (2006.01) |
| *A61K 39/00* | (2006.01) |

(52) U.S. Cl.
CPC ............ *C07K 16/28* (2013.01); *A61P 35/00* (2018.01); *C07K 16/2809* (2013.01); *A61K 2039/505* (2013.01); *A61K 2039/545* (2013.01); *A61K 2039/572* (2013.01); *C07K 16/00* (2013.01); *C07K 16/46* (2013.01); *C07K 2317/24* (2013.01); *C07K 2317/31* (2013.01); *C07K 2317/522* (2013.01); *C07K 2317/565* (2013.01); *C07K 2317/567* (2013.01); *C07K 2317/622* (2013.01); *C07K 2317/73* (2013.01)

(58) Field of Classification Search
CPC ............ C07K 16/28; C07K 16/2809; C07K 2317/24; C07K 2317/31; C07K 2317/522; C07K 2317/565; C07K 2317/567; C07K 2317/622; C07K 2317/73; C07K 2317/33; C07K 2317/56; C07K 2317/64; C07K 2317/71; C07K 2317/90; C07K 2317/94; A61P 35/00; A61K 2039/505; A61K 2039/545; A61K 2039/572; A61K 39/3955; A61K 47/6849; A61K 2039/507; C12N 5/0686; C12N 15/85; C12N 2510/00; C12N 2800/107

See application file for complete search history.

(56) References Cited

U.S. PATENT DOCUMENTS

| | | |
|---|---|---|
| 988,925 A | 4/1911 | Bentley |
| 5,585,097 A | 12/1996 | Bolt et al. |
| 5,624,821 A | 4/1997 | Winter et al. |
| 5,648,260 A | 7/1997 | Winter et al. |
| 6,025,165 A | 2/2000 | Whitlow et al. |
| 7,183,076 B2 | 2/2007 | Arathoon et al. |
| 7,767,403 B2 | 8/2010 | Frantz et al. |
| 8,008,449 B2 * | 8/2011 | Korman ................. C07K 16/28 530/388.15 |
| 8,101,186 B2 | 1/2012 | Mezo et al. |
| 8,388,955 B2 | 3/2013 | Lazar et al. |
| 8,592,562 B2 | 11/2013 | Kannan et al. |
| 8,735,545 B2 | 5/2014 | Lazar et al. |
| 8,871,912 B2 | 10/2014 | Davis et al. |
| 9,017,676 B2 | 4/2015 | Lindhofer |
| 9,067,986 B2 | 6/2015 | Gurney et al. |
| 9,150,663 B2 | 10/2015 | Labrijn et al. |
| 9,212,230 B2 | 12/2015 | Schuurman et al. |
| 9,228,017 B2 | 1/2016 | Igawa et al. |
| 9,274,119 B2 * | 3/2016 | Aburatani ............. C07K 16/28 |

(Continued)

FOREIGN PATENT DOCUMENTS

| | | |
|---|---|---|
| CA | 2379661 A1 | 9/2003 |
| CN | 1842540 A | 10/2006 |

(Continued)

OTHER PUBLICATIONS

Abuazza, G., et al., "Claudins 6, 9, and 13 are developmentally expressed renal tight junction proteins," Am J Physiol Renal Physiol., 291(6):F1132-F1141 (2006).

Amann, M., et al., "Therapeutic window of an EpCAM/CD3-specific BiTE antibody in mice is determined by a subpopulation of EpCAM-expressing lymphocytes that is absent in humans," Cancer Immunol Immunother., 58:95-109 (2009).

Campoli, M., et al., "Immunotherapy of malignant disease with tumor antigen (TA)-specific monoclonal antibodies: does its therapeutic efficacy require cooperation with TA-specific CTL?" Clin Cancer Res., 16(1):11-20 (2010).

(Continued)

*Primary Examiner* — Chun W Dahle
*Assistant Examiner* — Alec Jon Peters
(74) *Attorney, Agent, or Firm* — Nixon & Vanderhye P.C.

(57) ABSTRACT

The present disclosure provides antigen binding molecules that show binding activity towards Claudin-6 (CLDN6), methods for producing the antigen binding molecules, use of the antigen-binding molecules and immunoconjugates comprising the same in treating and/or preventing cancers, use of the antigen binding molecules in detecting the presence of CLDN6 in biological samples, and use of the antigen binding molecules in diagnosis of various cancers.

12 Claims, 43 Drawing Sheets
Specification includes a Sequence Listing.

(56) References Cited

U.S. PATENT DOCUMENTS

| | | |
|---|---|---|
| 9,527,926 B2 | 12/2016 | Ho et al. |
| 9,562,109 B2 | 2/2017 | Von Kreudenstein et al. |
| 9,637,557 B2 | 5/2017 | Scheer et al. |
| 9,688,762 B2 | 6/2017 | Igawa et al. |
| 9,975,966 B2 | 5/2018 | Nezu et al. |
| 10,011,858 B2 | 7/2018 | Igawa et al. |
| 10,053,513 B2 | 8/2018 | Mccarthy et al. |
| 10,435,458 B2 | 10/2019 | Kuramochi et al. |
| 10,759,870 B2 | 9/2020 | Teranishi et al. |
| 11,001,643 B2 | 5/2021 | Nezu et al. |
| 11,046,784 B2 | 6/2021 | Igawa et al. |
| 11,066,483 B2 | 7/2021 | Nezu et al. |
| 11,787,862 B2 | 10/2023 | Sahin et al. |
| 11,851,476 B2 | 12/2023 | Kuramochi et al. |
| 2003/0078385 A1 | 4/2003 | Arathoon et al. |
| 2004/0002587 A1 | 1/2004 | Watkins et al. |
| 2005/0042216 A1 | 2/2005 | Frantz et al. |
| 2005/0118174 A1 | 6/2005 | Presta |
| 2006/0235208 A1 | 10/2006 | Lazar et al. |
| 2006/0275282 A1 | 12/2006 | Moore et al. |
| 2007/0178092 A1 | 8/2007 | Bolt et al. |
| 2007/0224188 A1 | 9/2007 | Allan et al. |
| 2007/0231329 A1 | 10/2007 | Lazar et al. |
| 2007/0248602 A1 | 10/2007 | Lazar et al. |
| 2007/0254831 A1 | 11/2007 | Mezo et al. |
| 2007/0287170 A1 | 12/2007 | Davis et al. |
| 2008/0317758 A9 | 12/2008 | Presta |
| 2009/0324589 A1 | 12/2009 | Igawa et al. |
| 2010/0015133 A1 | 1/2010 | Igawa et al. |
| 2010/0105874 A1 | 4/2010 | Schuurman et al. |
| 2010/0178298 A1 | 7/2010 | Lindhofer |
| 2010/0221252 A1 | 9/2010 | Bigler et al. |
| 2010/0286374 A1 | 11/2010 | Kannan et al. |
| 2010/0298542 A1 | 11/2010 | Igawa et al. |
| 2011/0021755 A1 | 1/2011 | Lazar et al. |
| 2011/0059469 A1* | 3/2011 | Aburatani ............... C07K 16/28 530/389.7 |
| 2011/0123532 A1 | 5/2011 | Gurney et al. |
| 2011/0236374 A1 | 9/2011 | Shitara et al. |
| 2011/0287009 A1 | 11/2011 | Scheer et al. |
| 2012/0065379 A1 | 3/2012 | Igawa et al. |
| 2012/0149876 A1 | 6/2012 | Von Kreudenstein et al. |
| 2013/0039913 A1 | 2/2013 | Labrijn et al. |
| 2013/0101581 A1 | 4/2013 | Kuramochi et al. |
| 2013/0115208 A1 | 5/2013 | Ho et al. |
| 2014/0112914 A1 | 4/2014 | Nezu et al. |
| 2014/0370020 A1 | 12/2014 | Kuramochi et al. |
| 2015/0337053 A1 | 11/2015 | Mccarthy et al. |
| 2017/0260271 A1* | 9/2017 | Igawa .................... A61P 43/00 |
| 2017/0267783 A1 | 9/2017 | Nezu et al. |
| 2018/0244805 A1 | 8/2018 | Nezu et al. |
| 2019/0309067 A1 | 10/2019 | Sahin et al. |
| 2019/0352421 A1 | 11/2019 | Adams et al. |
| 2020/0087380 A1 | 3/2020 | Kuramochi et al. |
| 2020/0123256 A1 | 4/2020 | Hoshino et al. |
| 2020/0223940 A1 | 7/2020 | Teranishi et al. |
| 2020/0354473 A1 | 11/2020 | Teranishi et al. |
| 2021/0054076 A1 | 2/2021 | Kimura |
| 2022/0041756 A1 | 2/2022 | Nezu et al. |
| 2023/0220066 A1* | 7/2023 | Ishii ................... C07K 16/2809 424/136.1 |
| 2024/0262933 A1 | 8/2024 | Nezu et al. |
| 2024/0294672 A1 | 9/2024 | Nezu et al. |
| 2024/0425589 A1* | 12/2024 | Ishii .................. C07K 16/2878 |

FOREIGN PATENT DOCUMENTS

| | | |
|---|---|---|
| CN | 1842540 B | 7/2012 |
| CN | 105407922 A | 3/2016 |
| EP | 1378520 A1 | 1/2004 |
| EP | 1674111 A1 | 6/2006 |
| EP | 1870459 A1 | 12/2007 |
| EP | 2194006 A1 | 6/2010 |
| EP | 2194066 A1 | 6/2010 |
| EP | 2241578 A1 | 10/2010 |
| EP | 1674111 B1 | 11/2010 |
| EP | 2445936 A1 | 5/2012 |
| EP | 2543730 A1 | 1/2013 |
| EP | 2576621 A1 | 4/2013 |
| EP | 2647707 A1 | 10/2013 |
| EP | 2194006 B1 | 1/2014 |
| EP | 2698431 A1 | 2/2014 |
| EP | 2241578 B1 | 4/2016 |
| EP | 1870459 B1 | 6/2016 |
| EP | 2647707 B1 | 9/2018 |
| EP | 2543730 B1 | 10/2018 |
| EP | 2576621 B1 | 4/2019 |
| EP | 2698431 B1 | 9/2020 |
| JP | 2003524384 A | 8/2003 |
| JP | 2006500009 A | 1/2006 |
| JP | 2006512407 A | 4/2006 |
| JP | 2007525443 A | 9/2007 |
| JP | 2009527499 A | 7/2009 |
| JP | 2010532369 A | 10/2010 |
| JP | 4578467 B2 | 11/2010 |
| JP | 4580340 B2 | 11/2010 |
| JP | 5171948 B2 | 3/2013 |
| JP | 2016500059 A | 1/2016 |
| JP | 2021168648 A | 10/2021 |
| JP | 6971419 B2 | 11/2021 |
| KR | 20080013875 A | 2/2008 |
| KR | 20130130765 A | 12/2013 |
| KR | 101374454 B1 | 3/2014 |
| KR | 101960109 B1 | 3/2019 |
| MX | 2013006100 A | 7/2013 |
| MX | 349057 B | 7/2017 |
| RU | 2003130072 A | 4/2005 |
| RU | 2355705 C2 | 5/2009 |
| WO | WO9627011 A1 | 9/1996 |
| WO | WO9850431 A2 | 11/1998 |
| WO | WO9958572 A1 | 11/1999 |
| WO | WO0018806 A1 | 4/2000 |
| WO | WO0026360 A1 | 5/2000 |
| WO | WO0042072 A2 | 7/2000 |
| WO | WO0190192 A2 | 11/2001 |
| WO | WO02079232 A2 | 10/2002 |
| WO | WO03035835 A2 | 5/2003 |
| WO | WO03088808 A2 | 10/2003 |
| WO | WO2004003019 A2 | 1/2004 |
| WO | WO2004004662 A2 | 1/2004 |
| WO | WO2004029207 A2 | 4/2004 |
| WO | WO2004035607 A2 | 4/2004 |
| WO | WO2004099249 A2 | 11/2004 |
| WO | WO2005063815 A2 | 7/2005 |
| WO | WO2005118635 A2 | 12/2005 |
| WO | WO2006020114 A2 | 2/2006 |
| WO | WO2006105338 A2 | 10/2006 |
| WO | WO2006106905 A1 | 10/2006 |
| WO | WO2007145941 A2 | 12/2007 |
| WO | WO2007147901 A1 | 12/2007 |
| WO | WO2008090960 A1 | 7/2008 |
| WO | WO2009041613 A1 | 4/2009 |
| WO | WO2009053368 A1 | 4/2009 |
| WO | WO2009080252 A1 | 7/2009 |
| WO | WO2009080253 A1 | 7/2009 |
| WO | WO2009087978 A1 | 7/2009 |
| WO | WO2009089004 A1 | 7/2009 |
| WO | WO2009120922 A2 | 10/2009 |
| WO | WO2009134776 A2 | 11/2009 |
| WO | WO2010034441 A1 | 4/2010 |
| WO | WO2010085682 A2 | 7/2010 |
| WO | WO2010102251 A2 | 9/2010 |
| WO | WO2010120561 A1 | 10/2010 |
| WO | WO2010151792 A1 | 12/2010 |
| WO | WO2011057788 A1 | 5/2011 |
| WO | WO2011108714 A1 | 9/2011 |
| WO | WO2011147986 A1 | 12/2011 |
| WO | WO2012003956 A1 | 1/2012 |
| WO | WO2012073985 A1 | 6/2012 |
| WO | WO2012156018 A1 | 11/2012 |
| WO | WO2013026833 A1 | 2/2013 |
| WO | WO2014075697 A1 | 5/2014 |
| WO | WO2014075788 A1 | 5/2014 |

(56) References Cited

FOREIGN PATENT DOCUMENTS

| WO | WO2015014376 A1 | 2/2015 |
|---|---|---|
| WO | WO2015069794 A2 | 5/2015 |
| WO | WO2018054484 A1 | 3/2018 |
| WO | WO2018054973 A1 | 3/2018 |
| WO | WO2019111871 A1 | 6/2019 |
| WO | WO2019135404 A1 | 7/2019 |
| WO | WO2020067399 A1 | 4/2020 |
| WO | WO2020067419 A1 | 4/2020 |
| WO | WO2020168059 A1 | 8/2020 |
| WO | WO2020191344 A1 | 9/2020 |
| WO | WO2021006328 A1 | 1/2021 |
| WO | WO2021200939 A1 | 10/2021 |
| WO | WO2022096700 A1 | 5/2022 |
| WO | WO2022183502 A1 | 9/2022 |
| WO | WO2022187275 A1 | 9/2022 |
| WO | WO2022192403 A1 | 9/2022 |
| WO | WO2023054421 A1 | 4/2023 |

OTHER PUBLICATIONS

Dreier, T., et al., "Extremely Potent, Rapid and Costimulation-Independent Cytotoxic T-Cell Response Against Lymphoma Cells Catalyzed by a Single-Chain Bispecific Antibody," Int J Cancer, 100:690-697 (2002).
Furuse, M. and Tsukita, S., "Claudins in occluding junctions of humans and flies," Trends in Cell Biology, 16(4):181-188 (2006).
Garber, K., "Bispecific antibodies rise again," Nat Rev Drug Discov., 13:799-801 (2014).
Hashizume, A., et al., "Expression Patterns of Claudin Family of Tight Junction Membrane Proteins in Developing Mouse Submandibular Gland," Dev Dyn., 231:425-431 (2004).
Mack, M., et al., "A small bispecific antibody construct expressed as a functional single-chain molecule with high tumor cell cytotoxicity," Proc Natl Acad Sci., 92:7021-7025 (1995).
Mezzanzanica, D., et al., "Human Ovarian Carcinoma Lysis by Cytotoxic T Cells Targeted by Bispecific Monoclonal Antibodies: Analysis of the Antibody Components," Int J Cancer, 41:609-615 (1988).
Micke, P., et al., "Aberrantly activated claudin 6 and 18.2 as potential therapy targets in non-small-cell lung cancer," Int J Cancer, 135:2206-2214 (2014).
Morita, K., et al., "Claudin multigene family encoding four-transmembrane domain protein components of tight junction strands," Proc Natl Acad Sci., 96:511-516 (1999).
Rahner, C., et al., "Heterogeneity in Expression and Subcellular Localization of Claudins 2, 3, 4, and 5 in the Rat Liver, Pancreas, and Gut," Gastroenterology, 120:411-422 (2001).
Reinhard, K., et al., "An RNA vaccine drives expansion and efficacy of claudin-CAR-T cells against solid tumors," Science, 367(6476):446-453 (2020).
Rendon-Huerta, E., et al., "Distribution and Expression Pattern of Claudins 6, 7, and 9 in Diffuse- and Intestinal-Type Gastric Adenocarcinomas," J Gastrointest Canc., 41:52-59 (2010).
Schlereth, B., et al., "T-cell activation and B-cell depletion in chimpanzees treated with a bispecific anti-CD19/anti-CD3 single-chain antibody construct," Cancer Immunol Immunother., 55:503-514 (2006).
Sebastian, M., et al., "Treatment of non-small cell lung cancer patients with the trifunctional monoclonal antibody catumaxomab (anti-EpCAM × anti-CD3): a phase I study," Cancer Immunol Immunother., 56:1637-1644 (2007).
Stadler, C. R., et al., "Characterization of the first-in-class T-cell-engaging bispecific single-chain antibody for targeted immunotherapy of solid tumors expressing the oncofetal protein claudin 6," Oncoimmunology, 5(3):e1091555 (2016), 12 pages.
Stadler, C. R., et al., "Elimination of large tumors in mice by mRNA-encoded biospecific antibodies," Nat Med., 23(7):815-817 (2017).
Staerz, U. D., et al., "Hybrid antibodies can target sites for attack by T cells," Nature 314:628-631 (1985).
Staerz, U. D., et al., "Hybrid hybridoma producing a bispecific monoclonal antibody that can focus effector T-cell activity," Proc Natl Acad Sci., 83:1453-1457 (1986).
Ushiku, T., et al., "Distinct expression pattern of claudin-6, a primitive phenotypic tight junction molecule, in germ cell tumours and visceral carcinomas," Histopathology, 61:1043-1056 (2012).
Wilcox, E. R., et al., "Mutations in the Gene Encoding Tight Junction Claudin-14 Cause Autosomal Recessive Deafness DFNB29," Cell, 104:165-172 (2001).
Wolf, E., et al., "BiTEs: bispecific antibody constructs with unique anti-tumor activity," Drug Discov Today, 10(18):1237-1244 (2005).
U.S. Appl. No. 15/310,162, 371 (c) date Nov. 10, 2016, Igawa et al.
U.S. Appl. No. 17/913,899, filed Sep. 23, 2022, Ishii et al.
U.S. Appl. No. 18/590,651, filed Feb. 28, 2024, Nezu et al.
U.S. Appl. No. 18/611,460, filed Mar. 20, 2024, Nezu et al.
U.S. Appl. No. 18/696,616, filed Mar. 28, 2024, Ishii et al.
Brinkmann, U., and Kontermann, R. E., "The making of bispecific antibodies," MAbs, 9(2):182-212 (2017).
Liu, Y., et al., "Expressions of tight junctions protein CLDN6 in ovarian cancer, liver cancer and meningioma tissues and significances," Journal of Jilin University (Medicine Edition), 36(4):698-702 (2010), with English abstract.
U.S. Appl. No. 17/913,899, filed Sep. 23, 2022, Ishii et al., related application.
U.S. Appl. No. 18/590,651, filed Feb. 28, 2024, Nezu et al., related application.
U.S. Appl. No. 18/611,460, filed Mar. 20, 2024, Nezu et al., related application.
U.S. Appl. No. 18/696,616, filed Mar. 28, 2024, Ishii et al., related application.
U.S. Appl. No. 08/478,825, filed Jun. 7, 1995, Winter et al.
U.S. Appl. No. 08/479,752, filed Jun. 7, 1995, Winter et al.
U.S. Appl. No. 09/166,750, filed Oct. 5, 1998, Whitlow et al.
U.S. Appl. No. 10/143,437, filed May 10, 2002, Arathoon et al.
U.S. Appl. No. 10/370,749, filed Feb. 20, 2003, Watkins et al.
U.S. Appl. No. 10/953,264, filed Sep. 29, 2004, Frantz et al.
U.S. Appl. No. 10/982,470, filed Nov. 5, 2004, Presta.
U.S. Appl. No. 11/332,619, filed Jan. 12, 2006, Moore et al.
U.S. Appl. No. 11/396,495, filed Mar. 31, 2006, Lazar et al.
U.S. Appl. No. 11/520,121, filed Sep. 13, 2006, Leonard et al.
U.S. Appl. No. 11/572,634, filed Jan. 25, 2007, Allan et al.
U.S. Appl. No. 11/636,655, filed Dec. 11, 2006, Bolt et al.
U.S. Appl. No. 11/676,148, filed Feb. 16, 2007, Mezo et al.
U.S. Appl. No. 11/728,048, filed Mar. 23, 2007, Davis et al.
U.S. Appl. No. 11/764,001, filed Jun. 15, 2007, Lazar et al.
U.S. Appl. No. 11/765,353, filed Jun. 19, 2007, Lazar et al.
U.S. Appl. No. 11/910,128, filed Oct. 7, 2008, Igawa et al.
U.S. Appl. No. 12/224,010, filed Mar. 31, 2010, Lindhofer.
U.S. Appl. No. 12/295,039, filed Jan. 20, 2009, Igawa et al.
U.S. Appl. No. 12/524,215, filed Jul. 23, 2009, Shitara et al.
U.S. Appl. No. 12/593,759, filed Jan. 6, 2010, Schuurman et al.
U.S. Appl. No. 12/665,009, filed May 19, 2010, Bigler et al.
U.S. Appl. No. 12/680,082, filed Jun. 25, 2010, Igawa et al.
U.S. Appl. No. 12/768,650, filed Apr. 27, 2010, Gurney et al.
U.S. Appl. No. 12/811,207, filed Jun. 29, 2010, Kannan et al.
U.S. Appl. No. 12/896,610, filed Oct. 1, 2010, Lazar et al.
U.S. Appl. No. 13/092,708, filed Apr. 22, 2011, Scheer et al.
U.S. Appl. No. 13/257,112, filed Nov. 22, 2011, Igawa et al.
U.S. Appl. No. 13/289,934, filed Nov. 4, 2011, Kreudenstein et al.
U.S. Appl. No. 13/990,088, filed Dec. 19, 2013, Nezu et al.
U.S. Appl. No. 13/582,073, filed Dec. 20, 2012, Shizuoka et al.
U.S. Appl. No. 13/642,253, filed Oct. 24, 2012, Labrijn et al.
U.S. Appl. No. 13/697,683, filed Jan. 17, 2013, Ho et al.
U.S. Appl. No. 14/351,654, filed Apr. 14, 2014, Kuramochi et al.
U.S. Appl. No. 14/818,864, filed Aug. 5, 2015, Mccarthy et al.
U.S. Appl. No. 15/467,654, filed Mar. 23, 2017, Nezu et al.
U.S. Appl. No. 15/963,221, filed Apr. 26, 2018, Nezu et al.
U.S. Appl. No. 16/099,341, filed Nov. 6, 2018, Teranishi et al.
U.S. Appl. No. 16/412,701, filed May 15, 2019, Adams et al.
U.S. Appl. No. 16/605,556, filed Oct. 16, 2019, Hoshino et al.
U.S. Appl. No. 16/692,676, filed Nov. 22, 2019, Kuramochi et al.

(56) References Cited

OTHER PUBLICATIONS

U.S. Appl. No. 16/936,575, filed Jul. 23, 2020, Teranishi et al.
U.S. Appl. No. 16/959,288, filed Jun. 30, 2020, Kimura et al.
U.S. Appl. No. 17/367,909, filed Jul. 6, 2021, Nezu et al.
Additional Experimental Data Submitted for EP Application No. 09700588.8, the experimental data originally filed by the Patentee during prosecution on Jan. 10, 2014, submitted in EP2241578 opposition on Sep. 8, 2017, 7 pages.
Additional in Vivo Experimental Data Now Provided by the Patentee (Summary of additional in vivo data submitted Sep. 8, 2017 in Response by Patentee to Opposition in EP2241578, 4 pages).
Adra, N., et al., "A phase II study assessing the safety and efficacy of ASP1650 in male patients with relapsed refractory germ cell tumors," Invest New Drugs, 40:1087-1094 (2022).
Alarcon, B., et al., "The CD3-γ and CD3-δ subunits of the T cell antigen receptor can be expressed within distinct functional TCR/CD3 complexes," EMBO J., 10(4):903-912 (1991).
Alignment of Seq ID No. 30 of D8 with the CLDN6 Sequence of Seq ID No. 46 of the Patent, submitted in EP2241578 opposition on Jan. 20, 2017, 1 page.
An, Z., et al., "IgG2m4, an engineered antibody isotype with reduced Fc function," mAbs, 1(6):572-579 (2009).
Annex 1 filed by Opponent I: Experimental Report-antibody containing the 6 CDRs of antibody AE3-20, submitted in EP2241578 opposition on Jan. 20, 2017, 12 pages.
Annex 2 filed by Opponent II: Experimental Report-MAB4219, submitted in EP2241578 opposition on Jan. 20, 2017, 7 pages.
Annex 3 Filed by Opponent II: Experimental Report-MAB3656, submitted in EP2241578 opposition on Jan. 20, 2017, 6 pages.
Annex 4 filed by Opponent II: Experimental Report-Expression of CLDN4, CLDN6 and CLDN9 by cell lines, submitted in EP2241578 opposition on Jan. 20, 2017, 4 pages.
Antibody-dependent cellular cytotoxicity (ADCC), Retrieved from the Internet: [http://www.imgt.org/IMGTeducation/IMGTlexique/A/ADCC_and_CDC.html], dated Dec. 3, 2020.
Arabzadeh, A., et al., "Changes in the distribution pattern of Claudin tight junction proteins during the progression of mouse skin tumorigenesis," BMC Cancer, 7:196 (2007).
Armour, K.L., et al., "Recombinant Human IgG molecules lacking Fcγ receptor I binding and monocyte triggering activities," Eur J Immunol., 29(8):2613-2624 (1999).
Asano, R., et al., "Highly Effective Recombinant Format of a Humanized IgG-like Bispecific Antibody for Cancer Immunotherapy with Retargeting of Lymphocytes to Tumor Cells," J Biol Chem., 282(38):27659-27665 (2007).
Aschermann, S., et al., "The Other Side of Immunoglobulin G: Suppressor of Inflammation," Clin Exp Immunol., 160(2):161-167 (2010).
Baeuerle, P.A., et al., "BiTE: Teaching Antibodies to Engage T-cells for Cancer Therapy," Curr Opin Mol Ther., 11(1):22-30 (2009).
Bains, W., "Biotechnology from A to Z," Second Edition, 216-219 (1998).
Bains, W., "Biotechnology from A to Z," Second Edition 221-223 (1998).
Bargou, R., et al., "Tumor Regression in Cancer Patients by Very Low Doses of a T Cell-engaging Antibody," Science, 321(5891):974-977 (2008).
Beckman, R.A., et al., "Antibody Constructs in Cancer Therapy: Protein Engineering Strategies to Improve Exposure in Solid Tumors," Cancer, 109(2):170-179 (2007).
Bello, I.O., et al., "Expression of claudins 1, 4, 5, and 7 and occludin, and relationship with prognosis in squamous cell carcinoma of the tongue," Human Pathology, 39(8):1212-1220 (2008).
Bi, Y., et al., "Treatment of hepatocellular carcinoma with a GPC3-targeted bispecific T cell engager," Oncotarget, 8(32): 52866-52876 (2017).
Bodelon, G., et al., "Immunoglobulin Domains in *Escherichia coli* and Other Enterobacteria: From Pathogenesis to Applications in Antibody Technologies," FEMS Microbiol Rev., 37(2):204-250, (2013).

Bokemeyer, C., et al., "Catumaxomab—trifunctional Anti-EpCAM antibody Used to Treat Malignant Ascites," Expert Opin Biol Ther., 10(8):1259-1269 (2010).
Bolt, S., et al., "The generation of a humanized, non-mitogenic CD3 monoclonal antibody which retains in vitro immunosuppressive properties," Eur J Immunol., 23(2):403-411 (1993).
Brennan, F.R., et al., "Safety and Immunotoxicity Assessment of Immunomodulatory Monoclonal Antibodies," mAbs, 2(3):233-255 (2010).
Brezski, R.J., et al., "The Origins, Specificity, and Potential Biological Relevance of Human Anti-IgG Hinge Autoantibodies," The Scientific World Journal, 11:1153-1167 (2011).
Brischwein, K., et al., " MT110: a Novel Bispecific Single-chain Antibody Construct with High Efficacy in Eradicating Established Tumors," Mol Immunol., 43(8):1129-1143 (2006).
Bugelski, P.J., et al., "Monoclonal Antibody-induced Cytokine-release Syndrome," Expert Rev Clin Immunol., 5(5):499-521 (2009).
Carpenter, P.A., et al., "Non-Fc Receptor-binding Humanized Anti-CD3 Antibodies Induce Apoptosis of Activated Human T Cells," J Immunol., 165(11):6205-6213, (2000).
Carter, P., et al., "Bispecific Human IgG by Design," J Immunol Methods, 248(1-2):7-15 (2001).
Carter, P.J., et al., "Potent Antibody Therapeutics by Design," Nat Rev Immunol., 6(5):343-357 (2006).
Casset, F., et al., "A peptide mimetic of an anti-CD4 monoclonal antibody by rational design," Biochem Biophys Res Commun., 307(1):198-205 (2003).
Cespedes, M.V., et al., "Mouse models in oncogenesis and cancer therapy," Clin Transl Oncol. 8(5):318-329 (2006).
Chandramohan, V., et al., "Antibody, T-cell and Dendritic Cell Immunotherapy for Malignant Brain Tumors," Future Oncol., 9(7):977-990, (2013).
Chelius, D., et al., "Structural and Functional Characterization of the Trifunctional Antibody Catumaxomab," mAbs, 2(3):309-319 (2010).
Chen, Y., et al., "Selection and Analysis of an Optimized Anti-VEGF Antibody: Crystal Structure of an Affinity-Matured Fab in Complex with Antigen," J Mol Biol., 293(4):865-881 (1999).
Chernajovsky., et al., "Histrical Development of Monoclonal Antibody Therapeutics," Therapeutic Antibodies, 181, 7 pages (2008).
Dall'acqua, W.F., et al., "Increasing the Affinity of a Human IgG1 for the Neonatal Fc Receptor: Biological Consequences," J Immunol., 169(9):5171-5180 (2002).
Dall'acqua, W.F., et al., "Modulation of the Effector Functions of a Human IgG1 Through Engineering of Its Hinge Region," J Immunol. 177(2):1129-1138 (2006).
Das, D., et al., "Producing Bispecific and Bifunctional Antibodies," Meth Mol Med., 109:329-346 (2005).
De Gast, G.C., et al., "Cd8 T Cell Activation After Intravenous Administration of Cd3×Cd19 Bispecific Antibody in Patients with Non-hodgkin Lymphoma," Cancer Immunol Immunother., 40(6):390-396 (1995).
De Pascalis, R., et al., "Grafting of Abbreviated Complementarity-Determining Regions Containing Specificity-Determining Residues Essential for Ligand Contact to Engineer a Less Immunogenic Humanized Monoclonal Antibody," J Immunol., 169(6):3076-3084 (2002).
Declaration of Hirofumi Sakumoto dated Dec. 24, 2014, filed during prosecution of U.S. Appl. No. 12/735,359, submitted in EP2241578 opposition on Jan. 20, 2017, 7 pages.
Demanet, C., et al., "Treatment of Murine B Cell Lymphoma with Bispecific Monoclonal Antibodies," J Immunol., 147(3):1091-1097 (1991).
Dennis, C., "Cancer: Off by a Whisker," Nature, 442(7104):739-741 (2006).
Dillon, T.M., et al., "Structural and Functional Characterization of Disulfide Isoforms of the Human IgG2 Subclass," J Biol Chem., 283(23):16206-16215 (2008).
E-mail Correspondence with Allele Biotechnology & Pharmaceuticals Inc., submitted in EP2241578 opposition on Jan. 20, 2017, 2 pages.
EPO Opposition Preliminary Decision in Opposition of EP 2647707, May 13, 2020, 23 pages.

(56) References Cited

OTHER PUBLICATIONS

Faber, M. S., et al., "Abstract 1860: Bispecific claudin-6 × CD3 antibodies in a 2+1 format demonstrate selectivity and activity on human ovarian cancer cells," Cancer Res., 81 (13_Supplement):1860 (2021).
Fischer, N., et al., "Bispecific Antibodies: Molecules That Enable Novel Therapeutic Strategies," Pathobiology, 74(1):3-14 (2007).
Foote, J., et al., "Antibody Framework Residues Affecting the Conformation of the Hypervariable Loops," J Mol Biol., 224:487-499 (1992).
Friend, P.J., et al., "Phase I Study of an Engineered Aglycosylated Humanized CD3 Antibody in Renal Transplant Rejection," Transplantation, 68(11):1632-1637 (1999).
Fujimori, K., et al., "A Modeling Analysis of Monoclonal Antibody Percolation Through Tumors: A Binding-Site Barrier," J Nuclear Med., 31(7):1191-1198 (1990).
Graca, L., editor, "The Immune Synapse as a Novel Target for Therapy," 59-61 (2008).
Greenbaum, D., et al., "Comparing Protein Abundance and mRNA Expression Levels on a Genomic Scale," Genome Biol., 4(9):117 (2003).
Grisshammer, R., "Understanding Recombinant Expression of Membrane Proteins," Curr Opin Biotechnol., 17(4):337-340 (2006).
Gunasekaran, K., et al., "Enhancing Antibody Fc Heterodimer Formation Through Electrostatic Steering Effects: Applications to Bispecific Molecules and Monovalent IgG," J Biol Chem., 285(25):19637-19646 (2010).
Haagen, I.A., et al., "Evaluation of Fc Gamma Receptor Mediated T-cell Activation by Two Purified CD3×CD19 Bispecific Monoclonal Antibodies with Hybrid Fc Domains," Ther Immunol., 1(5):279-287 (1994).
Haagen, I.A., et al., "Interaction of Human Monocyte Fc Gamma Receptors with Rat IgG2b. A New Indicator for the Fc Gamma Riia (R-H131) Polymorphism," J Immunol., 154(4):1852-1860 (1995).
Haanen, J. Bag, et al., "Abstract CT002: BNT211: A Phase I trial to evaluate safety and efficacy of CLDN6 CAR-T cells and CARVac-mediated in vivo expansion in patients with CLDN6-positive advanced solid tumors," Cancer Res., 82 (12_Supplement):CT002 (2022).
Hammond, S.A., et al., " Selective Targeting and Potent Control of Tumor Growth Using an Epha2/cd3-bispecific Single-chain Antibody Construct," Cancer Res., 15;67(8):3927-3935 (2007).
Harada, A., et al., "In Vitro Toxicological Support to Establish Specification Limit for Anti-CD3 Monospecific Impurity in a Bispecific T Cell Engager Drug, ERY974," Toxicology in Vitro: An International Journal Published in Association with BIBRA, 66:104841 (2020).
Hessell, A.J., et al., "Fc Receptor but Not Complement Binding Is Important in Antibody Protection Against HIV," Nature, 449(7158):101-104 (2007).
Hezareh, M., et al., "Effector Function Activities of a Panel of Mutants of a Broadly Neutralizing Antibody Against Human Immunodeficiency Virus Type 1," J Virology, 75(24):12161-12168, (2001).
Hinton, P.R., et al., "An Engineered Human IgG1 Antibody with Longer Serum Half-life," J Immunol., 176(1):346-356 (2006).
Holm, P., et al., "Functional Mapping and Single Chain Construction of the Anti-cytokeratin 8 Monoclonal Antibody TS1," Mol Immunol., 44(6):1075-1084 (2007).
Hoseini, S.S., et al., "Immunotherapy of Hepatocellular Carcinoma Using Chimeric Antigen Receptors and Bispecific Antibodies," Cancer Letters, 399:44-52 (2017).
Immunoglobin G-Review (https://www.invivogen.com/review-antibody-generation2011) (Year:2011).
Ishiguro, T., et al., "An Anti-glypican 3/CD3 Bispecific T Cell-redirecting Antibody for Treatment of Solid Tumors," Sci Transl Med., 9(410):eaal4291 (2017).
Iwata Y., et al., "Daily Ascending Dosing in Cynomolgus Monkeys to Mitigate Cytokine Release Syndrome Induced by Ery22, Surrogate for T-cell Redirecting Bispecific Antibody Ery974 for Cancer Immunotherapy," Toxicology and Applied Pharmacology, 379:114657 (2019).
Janeway, C.A., et al., "Immunobiology," 5th Edition, 734 (2002).
Kasthuri, R.S., et al., "Role of Tissue Factor in Cancer," J Clin Oncol., 27(29):4834-4838 (2009).
Kaufman, E.N., et al., "Effect of Bivalent Interaction Upon Apparent Antibody Affinity: Experimental Confirmation of Theory Using Fluorescence Photobleaching and Implications for Antibody Binding Assays," Cancer Res., 52(15):4157-4167 (1992).
Kim, E.G., et al., "Strategies and Advancement in Antibody-drug Conjugate Optimization for Targeted Cancer Therapeutics," Biomolecules & Therapeutics, 23(6):493-509 (2015).
Kim, T.H., et al., "Down-regulation of Claudin-2 in Breast Carcinomas Is Associated with Advanced Disease," Histopathology, 53(1):48-55 (2008).
King, D.J., et al., Applications and Engineering of Monoclonal Antibodies, Bioscience, 146-147 (2005).
Kitajiri, S., et al., "Expression Patterns of Claudins, Tight Junction Adhesion Molecules, in the Inner Ear," Hearing Res., 187(1-2):25-34 (2004).
Klein, C., et al., "Progress in Overcoming the Chain Association Issue in Bispecific Heterodimeric IgG Antibodies," mAbs, 4(6):653-663 (2012).
Kohls, M.D., et al., "Mab-Zap: A Tool for Evaluating Antibody Efficacy for Use in an Immunotoxin," BioTechniques, 28(1):162-165 (2000).
Kominsky, S.L., et al., "Claudins: Emerging Targets for Cancer Therapy," Exp Rev Mol Med., 8(18):1-11 (2006).
Kong, F.-E., et al., "Targeting tumor lineage plasticity in hepatocellular carcinoma using an anti-CLDN6 antibody-drug conjugate," Sci Transl Med., 13:eabb6282 (2021).
Kontermann, R.E., et al., "Recombinant Bispecific Antibodies for Cancer Therapy," Acta Pharmacologica Sinica, 26(1):1-9 (2005).
Kontermann, R.E., et al., "Strategies to Extend Plasma Half-lives of Recombinant Antibodies," BioDrugs, 23(2):93-109 (2009).
Kraft, S., et al., "Fc Epsilon Ri-mediated Activation of Transcription Factors in Antigen-presenting Cells," International Archives of Allergy and Immunology, 125(1):9-15 (2001).
Krause, G., et al., "Structure and Function of Claudins," Biochimica Et Biophysica Acta, 1778(3):631-645 (2008).
Krauss, J., et al., "Impact of Antibody Framework Residue Vh-71 on the Stability of a Humanised Anti-MUC1 scFv and Derived Immunoenzyme," British Journal of Cancer, 90:1863-1870 (2004).
Kufer, P., et al., "A Revival of Bispecific Antibodies," Trends Biotechnol., 22(5):238-244 (2004).
Kumagai, et al., "Humanized Bispecific Antibodies that Recognize Lymphocytes and Cancer Cells," Drug Delivery System, 23(5):518-525 (2008).
Kumar, S., et al., "Molecular Cloning and Expression of the Fabs of Human Autoantibodies in *Escherichia coli*," J Biol Chem., 275(45):35129-35136 (2000).
Kusano, A., et al., "Immunocytochemical Study on Internalization of Anti-carbohydrate Monoclonal Antibodies," Anticancer Res., 13(6A):2207-2212 (1993).
Lazar, G.A. and Chamberlain, A., Little, M., editor, "Recombinant Antibodies for Immunotherapy," Affirmed Therapeutics, 133-134 (2009).
Lazar, G.A., et al., "Engineered Antibody Fc Variants with Enhanced Effector Function," PNAS, 103(11):4005-4010 (2006).
Lejeune, M., et al., "Bispecific, T-Cell-Recruiting Antibodies in B-Cell Malignancies," Front Immunol., 11:762 (2020).
Li, B., et al., "Construction and Characterization of a Humanized Anti-human Cd3 Monoclonal Antibody 12f6 With Effective Immunoregulation Functions," Immunol., 116(4):487-498 (2005).
Li, J., et al., "Abstract 5558: Discovery of a novel Claudin 6×4-1BB bispecific antibody with potent anti-tumor activity through conditional 4-1BB activation," Cancer Res., 82 (12_Supplement):5558 (2022).
Linderhofer, H., et al., R.E. Kontermann, editor, "Bispecific Antibodies," 296-298 (2011).
Link, B.K., et al., "Anti-CD3-based Bispecific Antibody Designed for Therapy of Human B-cell Malignancy Can Induce T-cell Activation by Antigen-dependent and Antigen-independent Mechanisms," Int J Cancer, 77(2):251-256 (1998).

(56) References Cited

OTHER PUBLICATIONS

Lutterbuese, et al., "Potent tumor killing and inhibition of tumor growth by CEA/CD3-bispecific single chain antibodies that are resistant to inhibition by soluble CEA," Proc Am Assoc Cancer Res., 98, abstract 4106 (2007).
Lutterbuese, R., et al., "Conversion of Cetuximab and Trastuzumab into T cell-engaging BiTE antibodies creates novel drug candidates with superior anti-tumor activity," Proc Am Assoc Cancer Res., 99, abstract 2402 (2008).
Maccallum, R.M., et al., "Antibody-antigen Interactions: Contact Analysis and Binding Site Topography," J Mol Biol., 262(5):732-745 (1996).
Mackensen, A., "LBA38—BNT211-01: A phase I trial to evaluate safety and efficacy of CLDN6 CAR T cells and CLDN6-encoding mRNA vaccine-mediated in vivo expansion in patients with CLDN6-positive advanced solid tumours," Annals of Oncology, 33 (suppl_7):S808-S869 (2022).
Marmé, A., et al., "Intraperitoneal Bispecific Antibody (Hea125xokt3) Therapy Inhibits Malignant Ascites Production in Advanced Ovarian Carcinoma," Int J Cancer, 101(2):183-189 (2002).
Matsuzaki, J., et al., "Identification of Claudin 6-specific HLA class I- and HLA class II-restricted T cell receptors for cellular immunotherapy in ovarian cancer," OncoImmunol., 11(1):e2020983 (2022).
Matzku, S. and Stahel, R.A., editors, "Antibodies in Diagnosis and Therapy: Technologies, Mechanisms and Clinical Data," 7 (1999).
Mcdermott, M.S., et al., "Abstract 342: Development and characterization of a novel anti-CLDN6 antibody drug conjugate for the treatment of CLDN6 positive cancers," Cancer Res., 82 (12_Supplement):342 (2022).
Mcearchern, J.A., et al., "Engineered Anti-CD70 Antibody with Multiple Effector Functions Exhibits in Vitro and in Vivo Antitumor Activities," Blood, 109(3):1185-1192 (2007).
Merchant, A.M., et al., "An Efficient Route to Human Bispecific IgG," Nat Biotechnol., 16(7):677-681 (1998).
Michlig, S., et al., "Claudin-Based Permeability Barriers in Taste Buds," J Comp Neurol., 502(6):1003-1011 (2007).
Milstein, C., et al., "Hybrid Hybridomas and Their Use in Immunohistochemistry," Nature, 305(5934):537-540 (1983).
Molhoj, M., et al., "CD19-/CD3-bispecific Antibody of the Bite Class is Far Superior to Tandem Diabody with Respect to Redirected Tumor Cell Lysis," Mol Immunol., 44(8):1935-1943 (2007).
Morita, K., et al., "Endothelial Claudin: Claudin-5/TMVCF Constitutes Tight Junction Strands in Endothelial Cells," J Cell Biol., 147(1):185-194 (1999).
Morris, G.E., et al., "Epitope Mapping of Protein Antigens by Competition ELISA," The Protein Protocols Handbook, 595-600 (1996).
Mueller, J.P., et al., "Humanized Porcine Vcam-specific Monoclonal Antibodies with Chimeric Igg2/g4 Constant Regions Block Human Leukocyte Binding to Porcine Endothelial Cells," Mol Immunol., 34(6):441-452 (1997).
Nakano, K., et al., "Anti-glypican 3 Antibodies Cause ADCC Against Human Hepatocellular Carcinoma Cells," Biochem Biophys Res Commun., 378(2):279-284 (2009).
Nakano, Y., et al., "A Claudin-9-based Ion Permeability Barrier Is Essential for Hearing," PLoS Genet., 5(8):e1000610 (2009).
Nap, M., et al., "Specificity and Affinity of Monoclonal Antibodies Against Carcinoembryonic Antigen," Cancer Res., 52(8):2329-2339 (1992).
Natsume, A., et al., "Improving Effector Functions of Antibodies for Cancer Treatment: Enhancing ADCC and CDC," Drug Des Devel Ther., 3:7-16 (2009).
Nelson, D.L. and Cox, M.M., "Principles of Biochemistry," Fifth Edition, Lehninger, Editor, 171 (2008).
Nimmerjahn, F., et al., "Divergent Immunoglobulin G Subclass Activity Through Selective Fc Receptor Binding," Science, 310(5753):1510-1512 (2005).
Nimmerjahn, F., et al., "Fcgamma Receptors as Regulators of Immune Responses," Nat Rev Immunol., 8(1):34-47 (2008).

Nimmerjahn, F. and Ravetch, J.V., "Fcγ Receptors: Old Friends and New Family Members," Immunity, 24(1):19-28 (2006).
Nitta, T., et al., "Bispecific F (ab')2 Monomer Prepared with Anti-CD3 and Anti-tumor Monoclonal Antibodies is Most Potent in Induction of Cytolysis of Human T Cells," Eur J Immunol., 19(8):1437-1441 (1989).
Offner, S., et al., "Epithelial Tight Junction Proteins as Potential Antibody Targets for Pancarcinoma Therapy," Cancer Immunol Immunother., 54(5):431-445 (2005).
Oganesyan, V., et al., "Structural Characterization of a Human Fc Fragment Engineered for Lack of Effector Functions," Acta Cryst., D64(Pt 6):700-704 (2008).
Ong, G.L. and Mattes, M.J., "Re-evaluation of the Concept of Functional Affinity as Applied to Bivalent Antibody Binding to Cell Surface Antigens," Mol Immunol., 30(16):1455-1462 (1993).
Osanai, M., et al., "Epigenetic Silencing of Claudin-6 Promotes Anchorage-independent Growth of Breast Carcinoma Cells," Cancer Sci., 98(10):1557-1562 (2007).
Parren, P.W., et al., "Induction of T-cell Proliferation by Recombinant Mouse and Chimeric Mouse/human Anti-CD3 Monoclonal Antibodies," Res Immunol., 142(9):749-763 (1991).
Pham, E., et al., "Abstract 5202: AMG 794, a Claudin 6-targeted half-life extended (HLE) bispecific T cell engager (BITE®) molecule for non-small cell lung cancer and epithelial ovarian cancer," Cancer Res., 82 (12_Supplement):5202 (2022).
Pilbrough, W., et al., "Intraclonal Protein Expression Heterogeneity in Recombinant CHO Cells," PLoS One, 4(12):e8432 (2009).
Popkov, M., et al., "Human/mouse Cross-reactive Anti-VEGF Receptor 2 Recombinant Antibodies Selected from an Immune B9 Allotype Rabbit Antibody Library," J Immunol Meth., 288(1-2):149-164 (2004).
Presta, L. G., "Molecular Engineering and Design of Therapeutic Antibodies," Curr Opin Immunol., 20(4):460-470 (2008).
Product Information for CLDN6 Antibody of D36, submitted in EP2241578 opposition on Jan. 20, 2017, 1 page.
Product Specification., "Monoclonal Anti-human Claudin-6 Antibody," R&D Systems, Inc catalog No. MAB3656; Aug. 17, 2006, submitted in EP2241578 opposition on Jan. 20, 2017, 1 page.
Product Specification: "Monoclonal Anti-human Claudin-6 Antibody". R&D Systems, Inc. catalog No. MAB3656 Dec. 27, 2016, submitted in EP2241578 opposition on Jan. 20, 2017, 1 page.
Product Specification: "Monoclonal Anti-human Claudin-4 Antibody". R&D Systems, Inc. catalog No. MAB4219, submitted in EP2241578 opposition on Jan. 20, 2017, 1 page.
Product Specification., "Monoclonal Anti-human Claudin-4 Antibody," R&D Systems, Inc, Catalog No. MAB4219, Dec. 27, 2016, submitted in EP2241578 opposition on Jan. 20, 2017, 1 page.
Quan, C., et al., "Identification of Genes Preferentially Expressed in Mammary Epithelial Cells of Copenhagen Rat Using Subtractive Hybridization and Microarrays," Carcinogenesis, 24(10):1593-1599 (2003).
Rathanaswami, P., et al., "High-affinity Binding Measurements of Antibodies to Cell-surface-expressed Antigens," Analytical Biochemistry, 373(1):52-60 (2008).
Ravetch, J.V. and Kinet, J.-P., "Fc Receptors," Ann Rev Immunol., 9:457-492 (1991).
R&D Systems, New Products, Jun. 2007, pp. 1-12, in particular description of MAB4219 on p. 6, submitted in EP2241578 opposition on Jan. 20, 2017, 12 pages.
Rendon, E.P., et al., "Expression and subcellular redistribution of claudins 6, 7 and 9 in human gastric adenocarcinoma," FASEB J., 21(6):A753 Abstract (2007).
Representative abstracts showing long-term administration of a variety of anti-cancer antibodies in the prior art, submitted in Opposition of EP2647707 on Dec. 23, 2020.
Ridgway, J.B., et al., "Knobs-into-holes' Engineering of Antibody CH3 Domains for Heavy Chain Heterodimerization," Protein Eng., 9(7):617-621 (1996).
Roitt, I., et al., "Immunology," Second Edition, Gower Medical Publishing, New York, 5.8, 5.9 (1989).
Roitt, I., et al., "Immunology," Moscow, Mir, 110-111, 151 (2000), with English translation, Immunology, 62-68 (2006).

(56) References Cited

OTHER PUBLICATIONS

Rother, R.P., et al., "Discovery and Development of the Complement Inhibitor Eculizumab for the Treatment of Paroxysmal Nocturnal Hemoglobinuria," Nat Biotechnol., 25(11):1256-1264 (2007).
Routledge, E.G., et al., "A Humanized Monovalent CD3 Antibody Which Can Activate Homologous Complement," Eur J Immunol., 21(11):2717-2725 (1991).
Rucker, J., et al., "Abstract 2892: Development of claudin 6 bispecific antibodies for treatment of ovarian cancer," Cancer Res., 82(12 Supplement): Abstract 2892 (2022).
Rudnick, S., et al., "Affinity and avidity in antibody-based tumor targeting," Cancer Biother Radiopharmaceut., 24(2):155-161 (2009).
Ruf, P., et al., "Induction of a Long-lasting Antitumor Immunity by a Trifunctional Bispecific Antibody," Blood, 98(8):2526-2534 (2001).
Runcie, K., et al., "Bi-Specific and Tri-Specific Antibodies—The Next Big Thing in Solid Tumor Therapeutics," Mol Med., 24(1):50 (2018).
Salfeld, J.G., et al., "Isotype Selection in Antibody Engineering," Nat Biotechnol., 25(12):1369-1372 (2007).
Salnikov, A.V., et al., "Targeting of Cancer Stem Cell Marker EpCAM by Bispecific Antibody EpCAMxCD3 Inhibits Pancreatic Carcinoma," J Cell Mol Med., 13(9B):4023-4033 (2009).
Sato, K., et al., "Reshaping a Human Antibody to Inhibit the Interleukin 6-dependent Tumor Cell Growth," Cancer Res., 53(4):851-856 (1993).
Satohisa, S., et al., "Behavior of Tight-junction, Adherens-junction and Cell Polarity Proteins During HNF-4α-induced Epithelial Polarization," Exp Cell Res., 310(1):66-78 (2005).
Saunders, K.O., et al., "Conceptual Approaches to Modulating Antibody Effector Functions and Circulation Half-Life," Front Immunol., 10:1296 (2019).
Schneider, M.A., et al., "In Vitro and in Vivo Properties of a Dimeric Bispecific Single-chain Antibody Igg-fusion Protein for Depletion of CCR2+ Target Cells in Mice," Eur J Immunol., 35(3):987-995 (2005).
Segal, D.M., et al., "Bispecific Antibodies in Cancer Therapy," Curr Opin Immunol., 11:558-562 (1999).
Segal, D.M., et al., "Production of Bispecific Antibodies," Curr Protocols Immunol., 14(1):2.13.1-2.13.16 (1995).
Seimetz, D., et al., "Development and Approval of the Trifunctional Antibody Catumaxomab (anti-EpCAM × anti-CD3) as a Targeted Cancer Immunotherapy," Cancer Treat Rev., 36(6):458-467 (2010).
Shields, R.L., et al., "High Resolution Mapping of the Binding Site on Human IgG1 for FcγRI, FcγRIII, FcγRIII, and FcRn and Design of IgG1 Variants with Improved Binding to the FcγR," J Biol Chem., 276(9):6591-6604 (2001).
Shiraiwa, H., et al., "Engineering a Bispecific Antibody with a Common Light Chain: Identification and Optimization of an Anti-CD3 Epsilon and Anti-GPC3 Bispecific Antibody, ERY974," Methods, 154:10-20 (2019).
Singer, M. and Berg, P., "Genes and Genomes," Moscow, Mir, 63 (1998).
Smith-Gill, S.J., et al., "Contributions of immunoglobulin heavy and light chains to antibody specificity for lysozyme and two haptens," J Immunol., 139(12):4135-4144 (1987).
Song, M.K., et al., "Light Chain of Natural Antibody Plays a Dominant Role in Protein Antigen Binding," Biochem Biophys Res Commun., 268(2):390-394 (2000).
Stadler, C.R., et al., "Elimination of Large Tumors in Mice by mRNA-encoded Bispecific Antibodies," Nat Med., 23(7):815-817 (2017).
Strauss, G., et al., "Without Prior Stimulation, Tumor-associated Lymphocytes from Malignant Effusions Lyse Autologous Tumor Cells in the Presence of Bispecific Antibody HEA125xOKT3," Clin Cancer Res., 5(1):171-180 (1999).
Strohl, W.R., et al., "Optimization of Fc-mediated Effector Functions of Monoclonal Antibodies," Curr Opin Biotechnol., 20(6):685-691 (2009).
Strohlein, M.A., et al., "Induction of Anti-tumor Immunity by Trifunctional Antibodies in Patients with Peritoneal Carcinomatosis," J Exp Clin Cancer Res., 28(1):18 (2009).
Suzuki, "Research and Development of Antibody Pharmaceuticals," NIBS Letter, 56(4):45-51 (2010).
Szoor A., et al., "T Cell-Activating Mesenchymal Stem Cells as a Biotherapeutic for HCC," Mol Ther Oncolytics, 6:69-79 (2017).
Talmadge, J.E., et al., "Murine models to evaluate novel and conventional therapeutic strategies for cancer," Am J Pathol., 170(3):793-804 (2007).
Teerinen, T., et al., "Structure-based Stability Engineering of the Mouse IgG1 Fab Fragment by Modifying Constant Domains," J Mol Biol., 361(4):687-697 (2006).
Thakur, A., et al., "Cancer Therapy with Bispecific Antibodies: Clinical Experience," Curr Opin Mol Ther., 12(3):340-349 (2010).
Thomas, A.K., et al., "A Cell-based Artificial Antigen-presenting Cell Coated with Anti-CD3 and CD28 Antibodies Enables Rapid Expansion and Long-term Growth of CD4 T Lymphocytes," Clin Immunol., 105(3):259-272 (2002).
Thurber, G.M., et al., "Antibody Tumor Penetration: Transport Opposed by Systemic and Antigen-mediated Clearance," Adv Drug Del Rev., 60(12):1421-1434 (2008).
Tokes, A.M., et al., "Claudin-1, -3 and -4 proteins and mRNA expression in benign and malignant breast lesions: a research study," Breast Cancer Research, 7(2):R296-R305 (2005).
Vajdos, F.F., et al., "Comprehensive Functional Maps of the Antigen-binding Site of an Anti-ErbB2 Antibody Obtained with Shotgun Scanning Mutagenesis," J Mol Biol., 320(2):415-428 (2002).
Van Loghem, E.V., et al., "Staphylococcal Protein A and Human IgG Subclasses and Allotypes," Scand J Immunol., 15(3):275-278 (1982).
Vare, P. and Soini, Y., "Twist is Inversely Associated with Claudins in Germ Cell Tumors of the Testis," APMIS, 118(9):640-647 (2010).
Vitt, et al., Medicine, "Biologic Therapy of Cancer," Biological Methods for the Treatment of Cancerous Diseases, 539-544 (2002). Transl. from English/ Ed. V/T Moscow.
Voskoglou-Nomikos, T., et al., "Clinical Predictive Value of the in Vitro Cell Line, Human Xenograft, and Mouse Allograft Preclinical Cancer Models," Clin Cancer Res., 9(11):4227-4239 (2003).
Waaijer, S.J., et al., "Preclinical PET Imaging of Bispecific Antibody ERY974 Targeting CD3 and Glypican 3 Reveals That Tumor Uptake Correlates to T Cell Infiltrate," J Immunother Cancer, 8(1):e000548 (2020).
Wang, X.B., et al., "A New Recombinant Single Chain Trispecific Antibody Recruits T Lymphocytes to Kill CEA (Carcinoma Embryonic Antigen) Positive Tumor Cells In Vitro Efficiently," J Biochem., 135(4):555-565 (2004).
Ward, E.S., et al., "Binding Activities of a Repertoire of Single Immunoglobulin Variable Domains Secreted from *Escherichia coli*," Nature, 341(6242):544-546 (1989).
Wei, H., et al., "Structural Basis of a Novel Heterodimeric Fc for Bispecific Antibody Production," Oncotarget, 8(31):51037-51049 (2017).
Weiner, G.J., et al., "The Role of T cell Activation in Anti-CD3 × Antitumor Bispecific Antibody Therapy," J Immunol., 152(5):2385-2392 (1994).
Wines, B.D., et al., "The IgG Fc Contains Distinct Fc Receptor (FcR) Binding Sites: The Leukocyte Receptors FcγRI and FcγRIIa Bind to a Region in the Fc Distinct from that Recognized by Neonatal FcR and Protein A," J Immunol., 164(10):5313-5318 (2000).
Wing, M.G., et al., "Mechanism of First-Dose Cytokine-Release Syndrome by Campath 1-H: Involvement of CD16 (FcγRIII) and CDIIa/CD18 (LFA-1) on NK Cells," J Clin Invest., 98(12):2819-2826 (1996).
Winter, G. and Harris, W.J., "Humanized Antibodies," Immunology Today, 14(6):243-246 (1993).
Wu, H., et al., "Humanization of a Murine Monoclonal Antibody by Simultaneous Optimization of Framework and CDR Residues," J Mol Biol., 294(1):151-162 (1999).

(56) References Cited

OTHER PUBLICATIONS

Xu, D., et al., "In Vitro Characterization of Five Humanized OKT3 Effector Function Variant Antibodies," Cell Immunol., 200(1):16-26 (2000).
Yu, R., et al., "Abstract 3432: A novel anti-CLDN6-CD137 bispecific antibody (NBL-028) for treating Claudin 6 positive solid tumors," Cancer Res., 82(12 Supplement): Abstract 3432 (2022).
Yu, L., et al., "A Novel Targeted Gpc3/cd3 Bispecific Antibody for the Treatment Hepatocellular Carcinoma," Cancer Biol Ther., 21(7):597-603 (2020).
Yu, L., et al., "T Cell-redirecting Bispecific Antibodies in Cancer Immunotherapy: Recent Advances," J Cancer Res Clin Oncol., 145(4):941-956 (2019).
Zeidler, R., et al., "Simultaneous Activation of T Cells and Accessory Cells by a New Class of Intact Bispecific Antibody Results in Efficient Tumor Cell Killing," J Immunol., 163(3):1246-1252 (1999).
Zeidler, R., et al., "The Fc-region of a New Class of Intact Bispecific Antibody Mediates Activation of Accessory Cells and NK Cells and Induces Direct Phagocytosis of Tumour Cells," Br J Cancer, 83(2):261-266 (2000).
Zhang, C., et al., "Identification of Claudin-6 as a Molecular Biomarker in Pan-Cancer Through Multiple Omics Integrative Analysis," Front Cell Dev Biol., 9:726656 (2021).
Zhao, X., et al., "Targeting CD37-positive Lymphoid Malignancies with a Novel Engineered Small Modular Immunopharmaceutical," Blood, 110(7):2569-2577 (2007).
Zheng, A., et al., "Claudin-6 and Claudin-9 Function as Additional Coreceptors for Hepatitis C Virus," J Virol., 81(22):12465-12471 (2007).
Zink, C., editor, "Automatic rhythmicity," Pschyrembel Klinisches Wörterbuch, 256$^{th}$ revised edition, p. 158 (1990).

\* cited by examiner

Fig. 3
■ a. Tumor volume change in HuH-7 T cell injection model (5mg/kg)
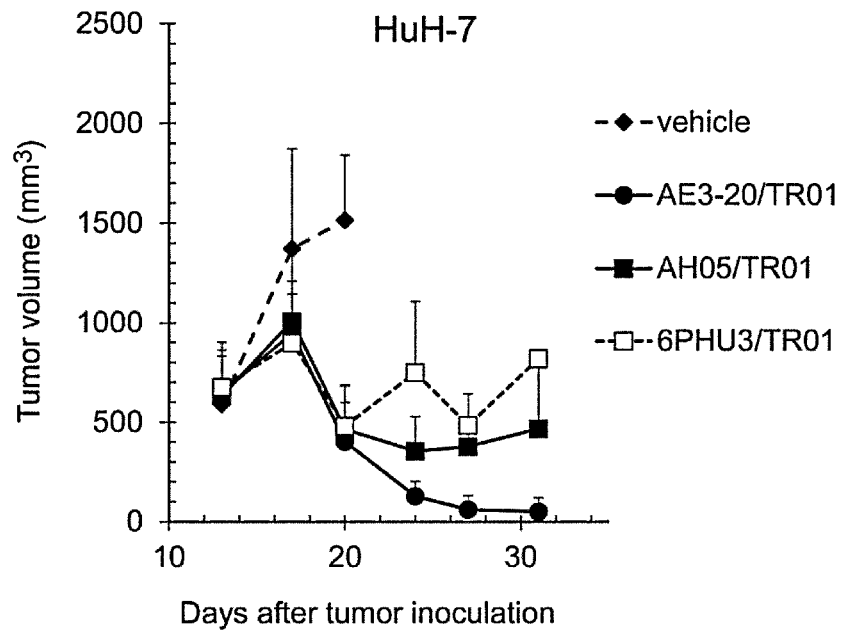
■ b. Tumor volume change in OV-90 T cell injection model (5mg/kg)
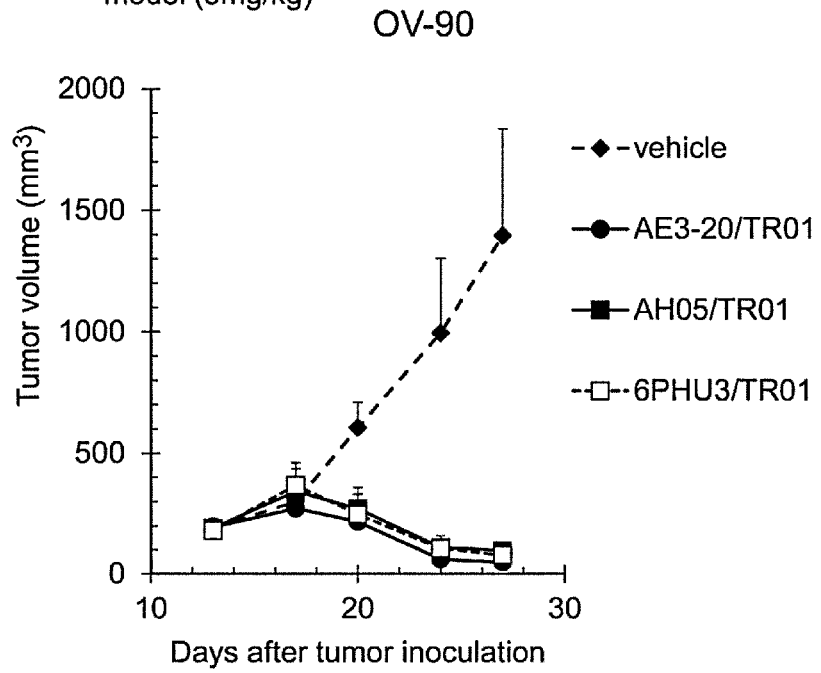

Fig. 4
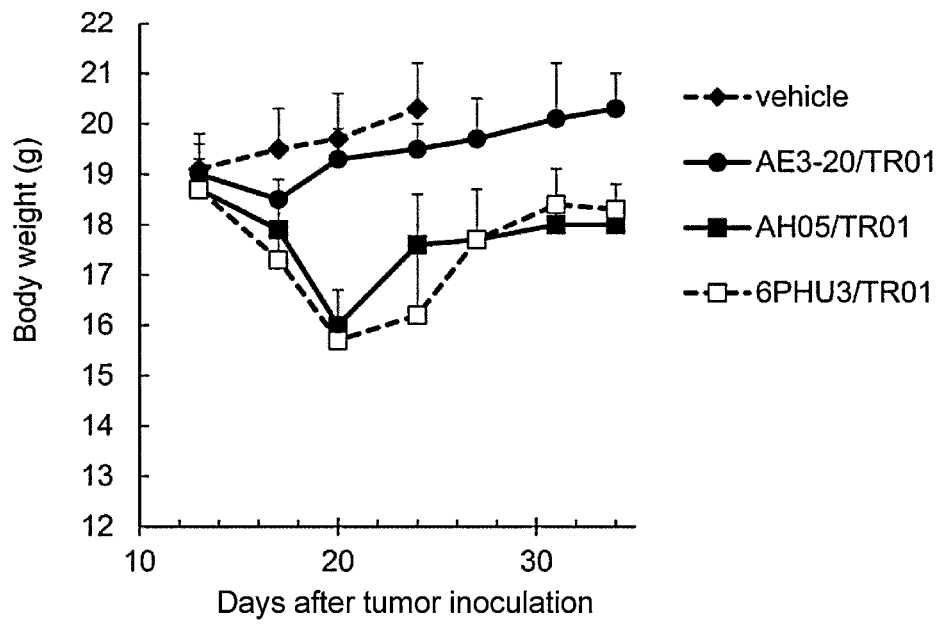
a. Body weight change in HuH7 T cell injection model (5mg/kg)
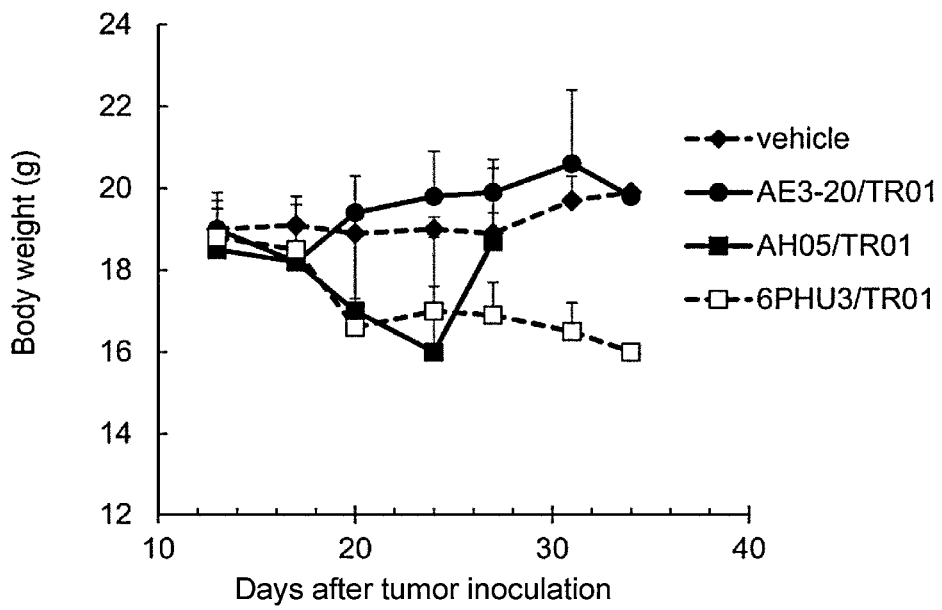
b. Body weight change in OV90 T cell injection model (5mg/kg)

Fig. 7
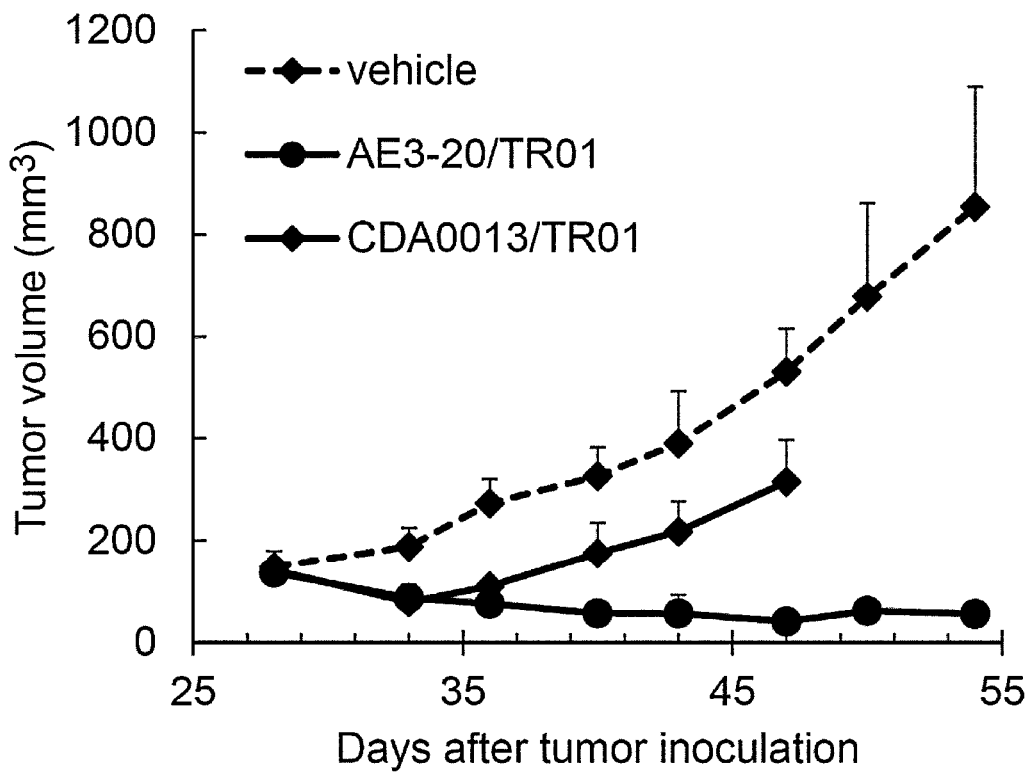
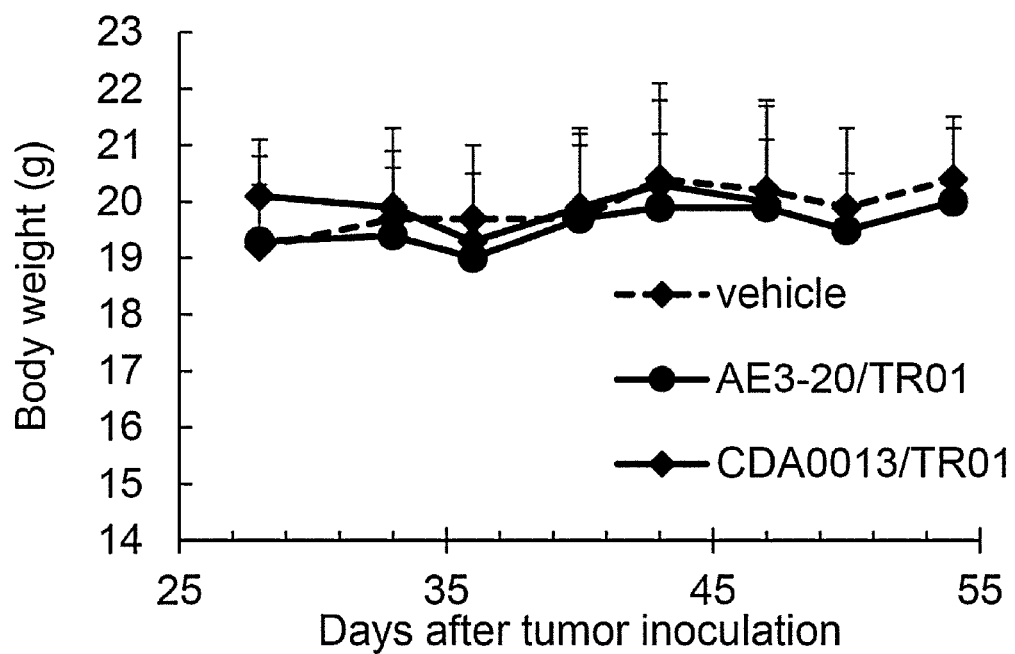

Fig. 11
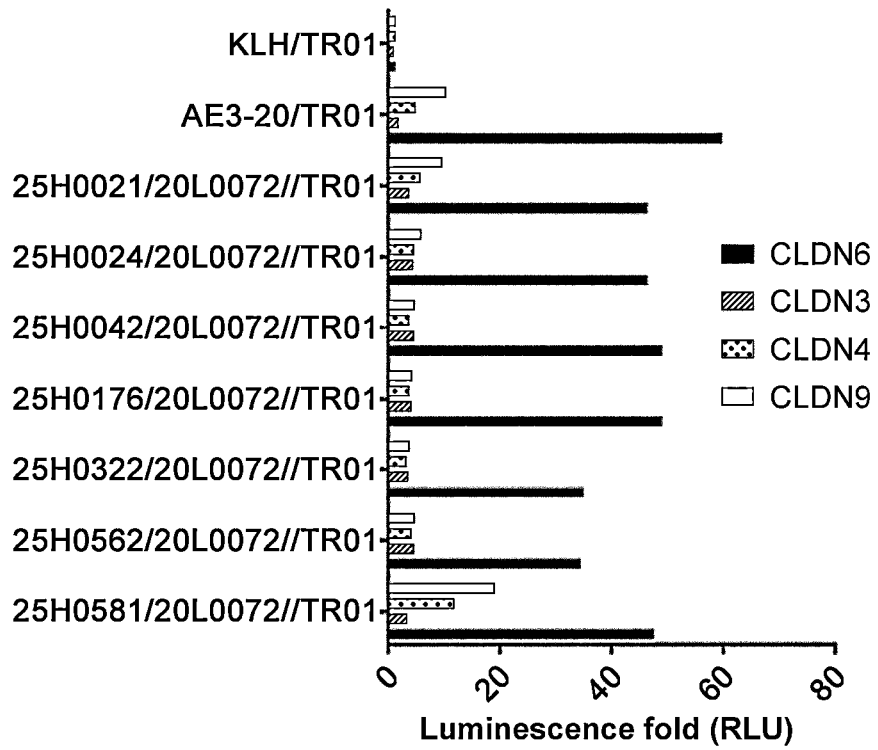
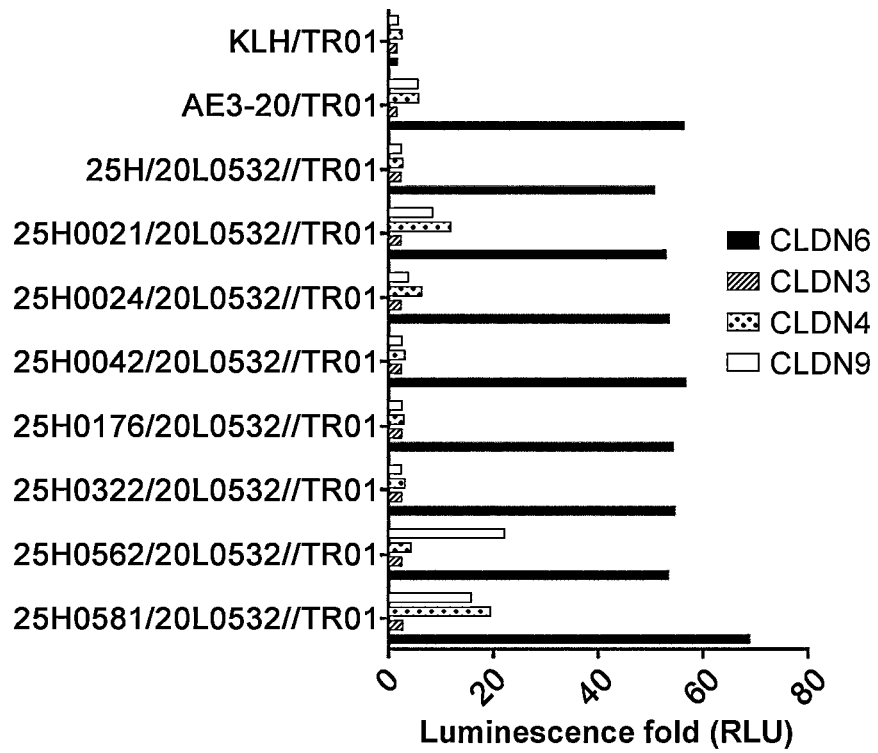

Fig. 18
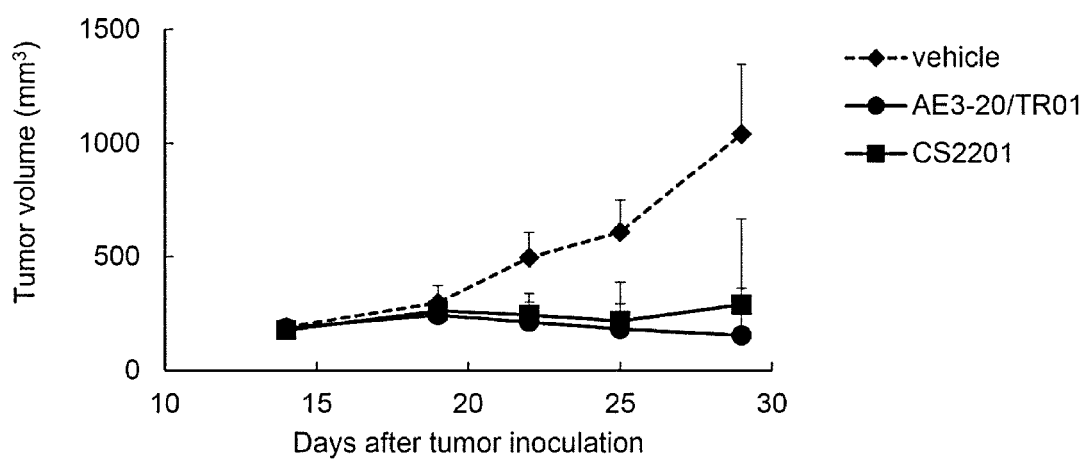
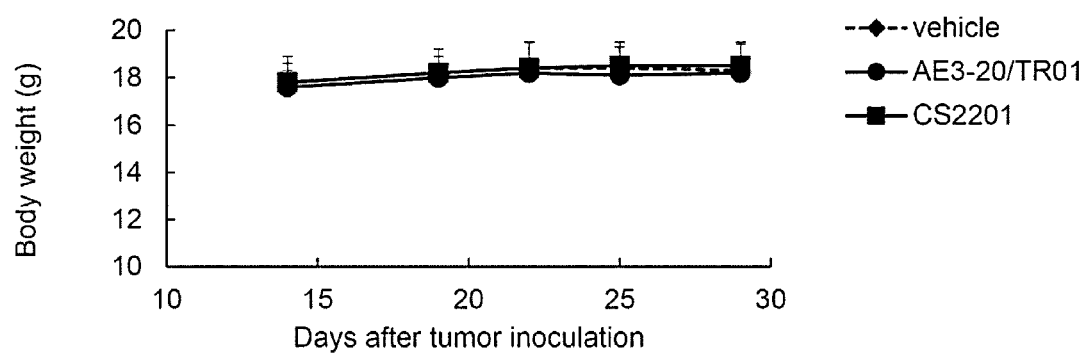

Fig. 21A
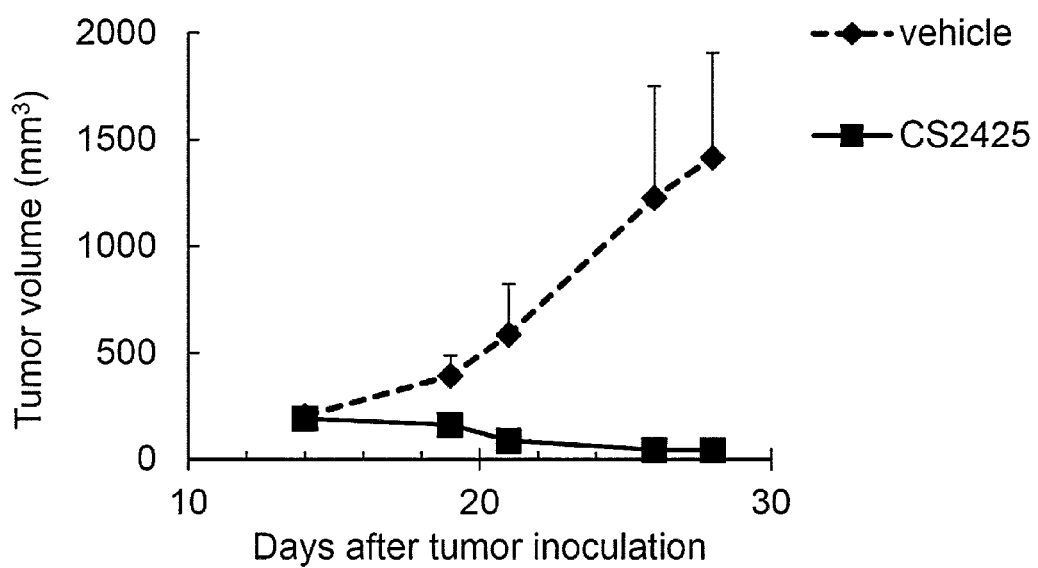
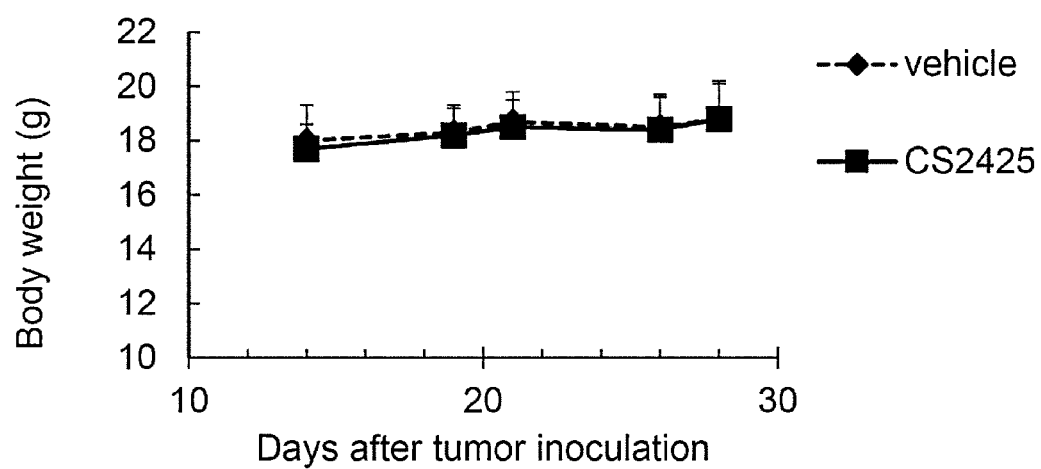

Fig. 21B
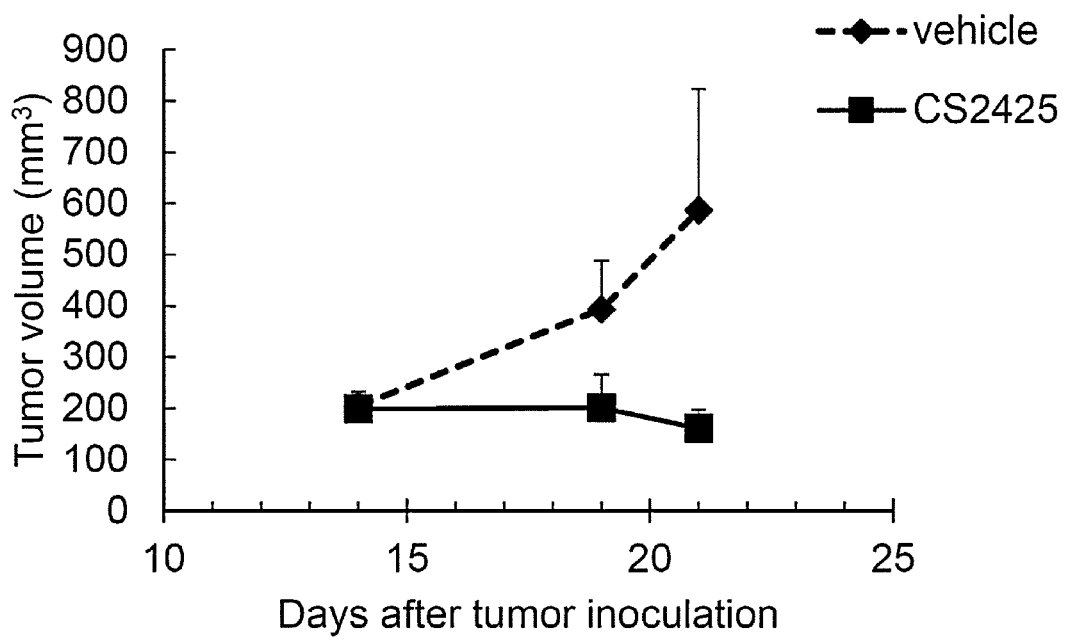
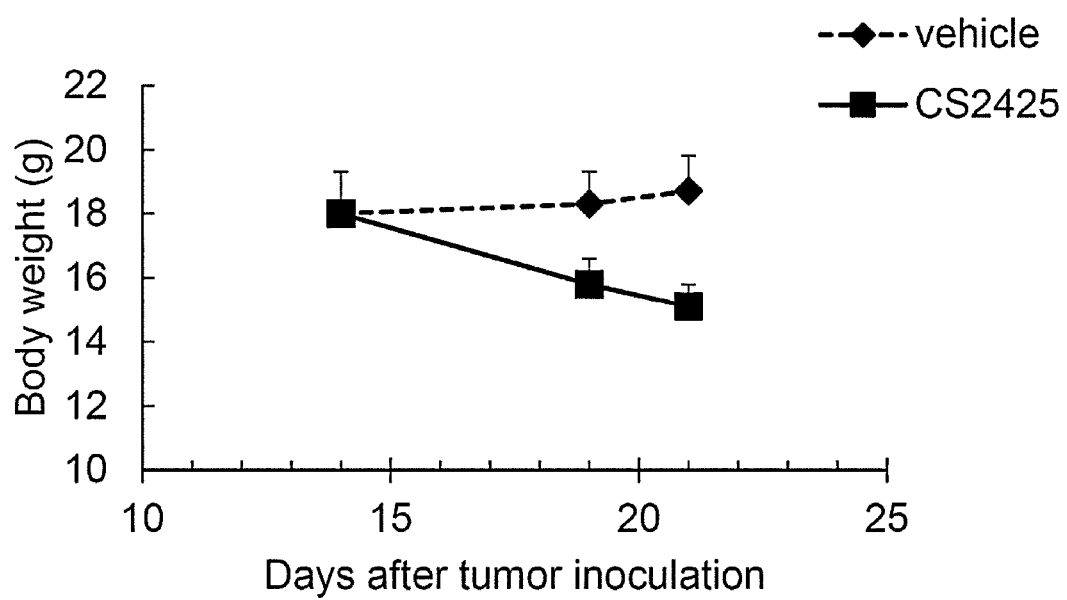

Fig. 34
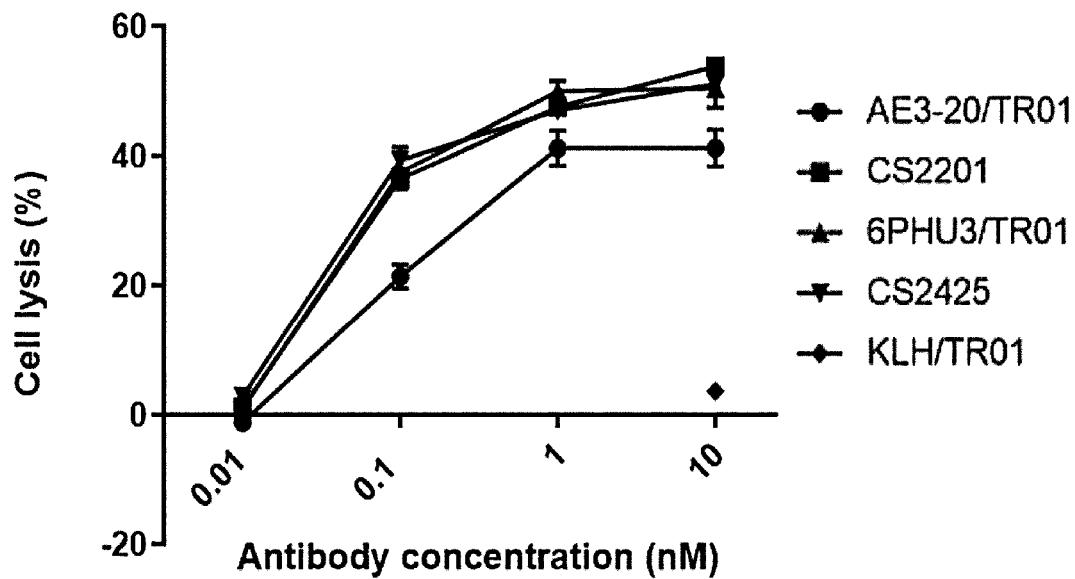
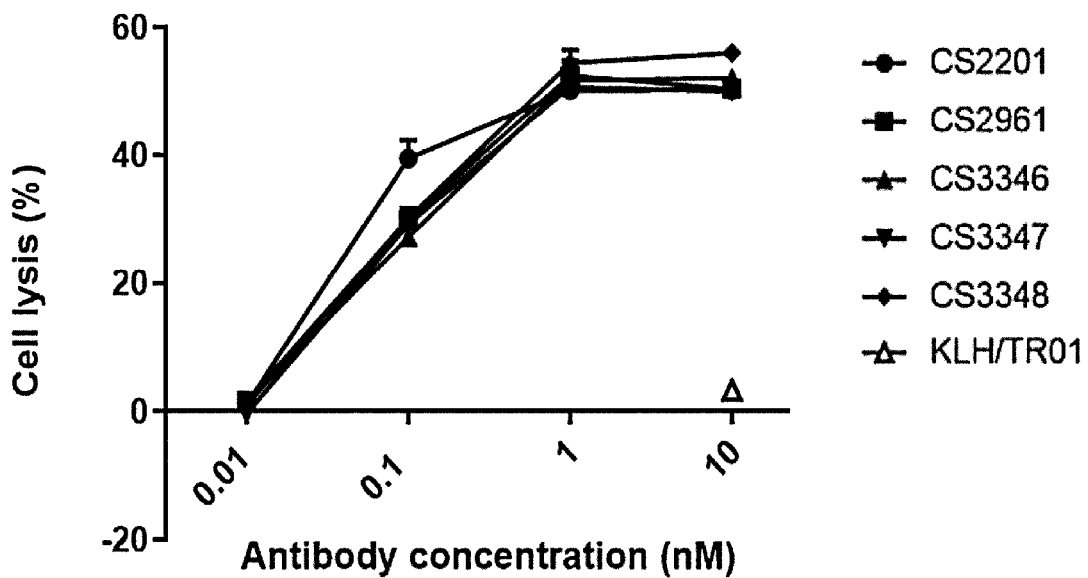

Fig. 39

```
                        Extracellular domain 1
hCLDN6   1 MASAGMQILGVVLTLLGWVNGLVSCALPMWKVTAFIGNSIVVAQVVNEGLMMSCVVQSTGQMQCKVYDSLLALPQDLQAARALCVIAVLV    90
hCLDN9   1 MASTGLELLGYGLTLLGWVNGLVSCALPLWKVTAFLGNSIVVAQVVNEGLWMSCVVQSTGMQCKVYDSLLALPQDLQARALCVVALL     90 hCLDN6  91 ALFGILVATVGAQCTTCVEEKDSKARLVIIGGRVFLISGVLTLIPVCWTAHAIIRDFYNPLVAEAQKRELGASLYLGWAASGLLLLGGGL  180
hCLDN9  91 ALGGLLVAIIGAQCTTCVEDEGAKARIVLTSGIVLLLISCILTLIPVCWTAHAIIQDFYNPLVAEALKRELGASLYLGWAAAILMLGGGL   180
                        Extracellular domain 2 hCLDN6 181 LCCTCPGGSQGPSHYMARYSTSAPAISRGPSEYPTKNYV*                                                    221
hCLDN9 181 LCCTCPPSHEERPHGPRLGYSIPSRSGASGLDKRDYV*                                                     218
```

CLAUDIN-6 BINDING MOLECULES AND USES THEREOF

CROSS-REFERENCE TO RELATED APPLICATIONS

This application is a U.S. National Phase of PCT Application No. PCT/JP2020/026946, filed Jul. 10, 2020, which claims the benefit of Japanese Patent Application No. 2019-128727, filed Jul. 10, 2019, each of which is incorporated herein by reference in its entirety.

REFERENCE TO SEQUENCE LISTING SUBMITTED ELECTRONICALLY

The content of the electronically submitted sequence listing (Name: 6663_0193 Sequence_Listing.txt; Size: 193 KB; and Date of Creation: Dec. 20, 2021) filed with the application is incorporated herein by reference in its entirety.

TECHNICAL FIELD

The present disclosure relates to Claudin 6 binding molecules, including antigen-binding molecules and antibodies, uses thereof, and such.

BACKGROUND ART

Antibodies are drawing attention as pharmaceuticals since they are highly stable in plasma and have few side effects. Among multiple therapeutic antibodies, some types of antibodies require effector cells to exert an anti-tumor response. Antibody dependent cell-mediated cytotoxicity (ADCC) is a cytotoxicity exhibited by effector cells against antibody-bound cells via binding of the Fc region of the antibody to Fc receptors present on NK cells and macrophages. To date, multiple therapeutic antibodies that can induce ADCC to exert anti-tumor efficacy have been developed as pharmaceuticals for treating cancer (NPL 1).

In addition to the antibodies that adopt ADCC by recruiting NK cells or macrophages as effector cells, T cell-recruiting antibodies (TR antibodies) that adopt cytotoxicity by recruiting T cells as effector cells have been known since the 1980s (NPL 2 to 4). A TR antibody is a bispecific antibody that recognizes and binds to any one of the subunits forming a T-cell receptor complex on T-cells, in particular the CD3 epsilon chain, and an antigen on cancer cells. Several TR antibodies are currently being developed. Catumaxomab, which is a TR antibody against EpCAM, has been approved in the EU for the treatment of malignant ascites. Furthermore, a type of TR antibody called "bispecific T-cell engager (BiTE)" has been recently found to exhibit a strong anti-tumor activity (NPL 5 and 6). Blinatumomab, which is a BiTE molecule against CD19, received FDA approval first in 2014. Blinatumomab has been proved to exhibit a much stronger cytotoxic activity against CD19/CD20-positive cancer cells in vitro compared with Rituximab, which induces antibody-dependent cell-mediated cytotoxicity (ADCC) and complement-dependent cytotoxicity (CDC) (NPL 7).

However, it is known that a trifunctional antibody binds to both a T-cell and a cell such as an NK cell or macrophage at the same time in a cancer antigen-independent manner, and as a result receptors expressed on the cells are cross-linked, and expression of various cytokines is induced in an antigen-independent manner Systemic administration of a trifunctional antibody is thought to cause cytokine storm-like side effects as a result of such induction of cytokine expression. In fact, it has been reported that, in the phase I clinical trial, a very low dose of 5 micro g/body was the maximum tolerance dose for systemic administration of catumaxomab to patients with non-small cell lung cancer, and that administration of a higher dose causes various severe side effects (NPL 8). When administered at such a low dose, catumaxomab can never reach the effective blood level. That is, the expected anti-tumor effect cannot be achieved by administrating catumaxomab at such a low dose.

Meanwhile, unlike catumaxomab, a bispecific $sc(Fv)_2$ format molecule (BiTE) which has no Fc gamma receptor-binding site, and therefore it does not cross-link the receptors expressed on T-cells and cells such as NK cells and macrophages in a cancer antigen-independent manner. However, since bispecific $sc(Fv)_2$ is a modified low-molecular-weight antibody molecule without an Fc region, the problem is that its blood half-life after administration to a patient is significantly shorter than IgG-type antibodies conventionally used as therapeutic antibodies. In fact, the blood half-life of bispecific $sc(Fv)_2$ administered in vivo has been reported to be about several hours (NPL 9 and 10). Blinatumomab, a $sc(Fv)_2$ molecule that binds to CD19 and CD3, has been approved for treatment of acute lymphoblastic leukemia. The serum half-life of blinatumomab has been revealed to be less than 2 hours in patients (NPL 21). In the clinical trials of blinatumomab, it was administered by continuous intravenous infusion using a minipump. This administration method is not only extremely inconvenient for patients but also has the potential risk of medical accidents due to device malfunction or the like. Thus, it cannot be said that such an administration method is desirable.

Claudin family is the family of cell membrane proteins of approximately 23 kD in molecular weight which have four transmembrane domains and constitute tight junctions. The Claudin family includes 24 members in humans and mice, and each member of the Claudin family is known to exhibit a very unique expression pattern depending on each epithelial cell type (NPL 11 to 14). In the sheet of epithelial cells, a mechanism works to prevent substances from leaking (diffusing) in the intercellular spaces, and cell-cell adhesion systems called tight junctions have been shown to really play a central role as a "barrier" in the mechanism to prevent leakage.

A tight junction molecule Claudin 6 (CLDN6), a member of Claudin family proteins, shows transcriptionally silent expression in normal adult tissues (NPL 15 and 16), while showing up-regulation in several kind of cancers such as ovarian cancer, NSCLC, and gastric cancers (NPL 17 to 19).

Regarding anti-CLDN6 antibodies, monospecific antibodies against CLDN6 have been reported to have ADCC activity or internalization activity against CLDN6 positive cancer lines (PTL 1 to 5). So far, CLDN6 targeting T cell-redirecting bispecific antibodies, named as 6PHU3, has been engineered using bispecific $sc(Fv)_2$ format with anti-CD3/anti-CLDN6 specificities (PTL 6 to 7). In preclinical evaluation, 6PHU3 has been reported to show a potent killing of cancer cells in vitro and in vivo (NPL 20).

CITATION LIST

Patent Literature

[PTL 1] WO2009/087978
[PTL 2] WO2011/057788
[PTL 3] WO2012/003956
[PTL 4] WO2012/156018
[PTL 5] WO2015/069794
[PTL 6] WO2014/075697
[PTL 7] WO2014/075788

Non Patent Literature

[NPL 1] Clin Cancer Res. 2010 Jan. 1; 16(1):11-20.
[NPL 2] Nature. 1985 Apr. 18-24; 314(6012):628-31.
[NPL 3] Int J Cancer. 1988 Apr. 15; 41(4):609-15.
[NPL 4] Proc Natl Acad Sci USA. 1986 March; 83(5):1453-7.
[NPL 5] Proc Natl Acad Sci USA. 1995 Jul. 18; 92(15): 7021-5.
[NPL 6] Drug Discov Today. 2005 Sep. 15; 10(18):1237-44.
[NPL 7] Int J Cancer. 2002 Aug. 20; 100(6):690-7.
[NPL 8] Cancer Immunol Immunother (2007) 56 (10), 1637-44
[NPL 9] Cancer Immunol Immunother. (2006) 55 (5), 503-14
[NPL 10] Cancer Immunol Immunother. (2009) 58 (1), 95-109
[NPL 11] Furuse and Tsukita, TRENDS in Cell Biology 2006, 16: 181
[NPL 12] Wilcox, et al., Cell 2001, 104: 165
[NPL 13] Rahner, et al., GASTROENTEROLOGY 2001, 120: 411
[NPL 14] Morita, et al., Proc. Natl. Acad. Sci. USA 1999, 96: 511
[NPL 15] Dev Dyn. 2004 October; 231(2):425-31.
[NPL 16] Am J Physiol Renal Physiol. 2006 December; 291(6):F1132-41.
[NPL 17] Int J Cancer. 2014 Nov. 1; 135(9):2206-14.
[NPL 18] Histopathology. 2012 December; 61(6):1043-56.
[NPL 19] J Gastrointest Cancer. 2010 March; 41(1):52-9.
[NPL 20] Oncoimmunology. 2015 Oct. 29; 5(3):e1091555.
[NPL 21] Nat Rev Drug Discov. 2014 November; 13(11): 799-801.

SUMMARY OF INVENTION

Technical Problem

As mentioned above, bispecific sc(Fv)$_2$ is a modified low-molecular-weight antibody molecule without an Fc region and shows significantly shorter blood half-life compared with IgG-type antibodies, which would cause inconvenience for their use as a therapeutic drug. In the case of bispecific sc(Fv)$_2$ that binds to CLDN6, named 6PHU3, it has been reported that plasma protein levels of 6PHU3 dropped sharply within 6 hours and cytotoxic activity was barely detectable after 24 hours (Nat Med. 2017 July; 23(7):815-817.). Furthermore, the format of sc(Fv)$_2$ faces manufacturing challenges including poor stability during long-term storage.

In one aspect, objective of the present disclosure is to provide antigen-binding molecules (including antibodies) that shows binding activity towards CLDN6 and T cell receptor complex that enable cancer treatment by having T cells close to CLDN6-expressing cells and using the cytotoxicity of T cells against CLDN6-expressing cancer cells, especially antigen-binding molecules with high stability and long serum half-life. Provision of methods for producing the antigen-binding molecules, and pharmaceutical composition comprising such an antigen-binding molecule as an active ingredient are also objectives of the present disclosure.

In another aspect, objective of the present disclosure is to provide antigen-binding molecules that shows binding activity towards CLDN6 that enable cancer treatment by targeting CLDN6-expressing cells, methods for producing the antigen-binding molecules, and pharmaceutical composition comprising such an antigen-binding molecule, or immunoconjugate comprising such an antigen-binding molecule, as an active ingredient. Use of the antigen-binding molecule in detecting the presence of CLDN6 in biological sample, and use of the antigen-binding molecule in diagnosis of various cancers, are also provided in the present disclosure.

The present disclosure also provides pharmaceutical compositions for use in treating or preventing various cancers, which comprise one of the above-mentioned antigen-binding molecules, or immunoconjugate, as an active ingredient, and therapeutic methods using the pharmaceutical compositions.

Solution to Problem

The inventors found that antigen-binding molecules that comprise specific heavy chain variable region (VH) together with specific light chain variable region (VL) which shows binding activity towards CLDN6, and a second VH together with a second VL which shows binding activity towards T-cell receptor complex can damage cells expressing CLDN6, and exert a superior cytotoxic/antitumor activity. The antigen-binding molecules comprising specific sequences also show superior stability, safety and manufacturability. The present disclosure provides the antigen-binding molecules and pharmaceutical compositions that can treat various cancers, especially those associated with CLDN6 such as CLDN6-positive tumors, by comprising the antigen-binding molecule as an active ingredient.

The inventors also found that antigen-binding molecules that comprise specific VH together with specific VL show binding activity towards CLDN6 and superior specificity towards human CLDN6, as a result the antigen-binding molecules and immunoconjugates thereof can be used for targeting cells expressing CLDN6, detecting the presence of CLDN6 in biological sample, and diagnosis of various cancers.

More specifically, the present disclosure provides the following:

[1] An isolated antibody that comprises:
  a first heavy chain variable region comprising HVR-H1, HVR-H2 and HVR-H3 amino acid sequences of SEQ ID NOs: 113, 117, and 118, respectively;
  a first light chain variable region comprising HVR-L1, HVR-L2 and HVR-L3 amino acid sequences of SEQ ID NOs: 119, 120, and 121, respectively;
  a second heavy chain variable region comprising HVR-H1, HVR-H2 and HVR-H3 amino acid sequences of SEQ ID NOs: 122, 123, and 124, respectively; and
  a second light chain variable region comprising HVR-L1, HVR-L2 and HVR-L3 amino acid sequences of SEQ ID NOs: 114, 115, and 116, respectively.

[2] An isolated antibody that comprises:
  a first heavy chain variable region comprising an amino acid sequence selected from SEQ ID NOs: 85, 1, 33 and 84; and a first light chain variable region comprising an amino acid sequence selected from SEQ ID NOs: 87, 2, 43, 86 and 88;
a second heavy chain variable region comprising an amino acid sequence selected from SEQ ID NOs: 60 and 70; and a second light chain variable region comprising an amino acid sequence selected from SEQ ID NOs: 61 and 71.

[3] The antibody of [1] or [2], wherein the first heavy chain variable region is linked to a first CH1 domain shown in SEQ ID NO: 95, the first light chain variable region is linked to a first CL domain shown in SEQ ID NO: 63, the second heavy chain variable region is linked to a second CH1 domain shown in SEQ ID NO: 97, and the second light chain variable region is linked to a second CL domain shown in SEQ ID NO: 62.

[4] The antibody of any one of [1] to [3], wherein the antibody further comprises any one of the Fc region combinations selected from:
(1) a first Fc region shown in SEQ ID NO: 72 and a second Fc region shown in SEQ ID NO: 73;
(2) a first Fc region shown in SEQ ID NO: 74 and a second Fc region shown in SEQ ID NO: 75;
(3) a first Fc region shown in SEQ ID NO: 76 and a second Fc region shown in SEQ ID NO: 77; and
(4) a first Fc region shown in SEQ ID NO: 78 and a second Fc region shown in SEQ ID NO: 79.

[5] The antibody of [4], wherein the first Fc region is in the same polypeptide chain with the first heavy chain variable region, and the second Fc region is in the same polypeptide chain with the second heavy chain variable region.

[6] The antibody of any one of [1] to [5], wherein the first heavy chain variable region and the first light chain variable region form a first antigen-binding site, and the second heavy chain variable region and the second light chain variable region form a second antigen-binding site.

[7] An isolated antibody that comprises:
a first heavy chain comprising an amino acid sequence selected from SEQ ID NOs: 104, 105, 106, and 107 and a first light chain comprising an amino acid sequence shown in SEQ ID NO: 112;
a second heavy chain comprising an amino acid sequence selected from SEQ ID NOs: 108, 109, 110, and 111 and a second light chain comprising an amino acid sequence shown in SEQ ID NO: 98.

[8] The antibody of [7], wherein the variable regions of the first heavy chain and the first light chain form a first antigen-binding site, and the variable regions of the second heavy chain and the second light chain form a second antigen-binding site.

[9] The antibody of [6] or [8], wherein the first antigen-binding site has binding activity towards CLDN6.

[10] The antibody of any one of [6], [8] and [9], wherein the first antigen-binding site has binding activity towards human CLDN6.

[11] The antibody of any one of [6] and [8] to [10], wherein the first antigen-binding site has binding activity towards human CLDN6 as defined in SEQ ID NO: 125 or 126.

[12] The antibody of any one of [6] and [8] to [11], wherein the first antigen-binding site does not substantially bind to human CLDN9.

[13] The antibody of any one of [6] and [8] to [12], wherein the first antigen-binding site does not substantially bind to human CLDN4.

[14] The antibody of any one of [6] and [8] to [13], wherein the first antigen-binding site does not substantially bind to human CLDN3.

[15] The antibody of any one of [6] and [8] to [14], wherein the first antigen-binding site does not substantially bind to a CLDN6 mutant as defined in SEQ ID NO: 134.

[16] The antibody of any one of [6] and [8] to [15], wherein the second antigen-binding site has binding activity towards CD3.

[17] The antibody of any one of [6] and [8] to [16], wherein the second antigen-binding site has binding activity towards CD3 epsilon chain.

[18] The antibody of any one of [6] and [8] to [17], wherein the second antigen-binding site has binding activity towards human CD3 as defined in SEQ ID NO: 142.

[19] An isolated nucleic acid encoding the antibody of any one of [1] to [18].

[20] A host cell comprising the nucleic acid of [19].

[21] A method of producing an antibody comprising culturing the host cell of [20] so that the antibody is produced.

[22] The method of [21], further comprising recovering the antibody from the culture of the host cell.

[23] A pharmaceutical composition comprising the antibody of any one of [1] to [18], and a pharmaceutically acceptable carrier.

[24] The pharmaceutical composition of [23], which induces T-cell-dependent cytotoxicity.

[25] The composition of [23] or [24], which is a pharmaceutical composition used for treatment and/or prevention of cancer.

[26] The composition of any one of [23] to [25], which is a pharmaceutical composition used for treatment and/or prevention of ovarian cancer, non-small cell lung cancer, gastric cancer, or liver cancer.

[27] Use of the antibody of any one of [1] to [18] in the manufacture of a medicament.

[28] Use of the antibody of any one of [1] to [18] in the manufacture of a medicament for treatment and/or prevention of cancer.

[29] Use of the antibody of any one of [1] to [18] in the manufacture of a medicament for treatment and/or prevention of ovarian cancer, non-small cell lung cancer, gastric cancer, or liver cancer.

[30] A method of treating an individual having cancer comprising administering to the individual an effective amount of the antibody of any one of [1] to [18].

[31] A method of treating an individual having ovarian cancer, non-small cell lung cancer, gastric cancer, or liver cancer comprising administering to the individual an effective amount of the antibody of any one of [1] to [18].

[32] A kit for use in the treatment and/or prevention of cancer, which comprises at least the antibody of any one of [1] to [18], and instructions for use.

[33] A kit for use in the treatment and/or prevention of ovarian cancer, non-small cell lung cancer, gastric cancer, or liver cancer, which comprises at least the antibody of any one of [1] to [18], and instructions for use.

Furthermore, the present disclosure also provides the following:

[34] An antigen-binding molecule comprising:
(a) a heavy chain variable region comprising any one of the HVR combinations selected from:

(a1) HVR-H1, HVR-H2, and HVR-H3 amino acid sequences shown in SEQ ID NOs: 113, 117, and 118, respectively; and
(a2) HVR-H1, HVR-H2, and HVR-H3 same with those of any one of the heavy chain variable regions shown in SEQ ID NOs: 91, 34, 35, 36, 37, 38, 39, 40, 44, 45, 47, 48, 49, 50, 55, 56, 64, 65, 83, 84, 57 and 85; and
(b) a light chain variable region comprising any one of the HVR combinations selected from:
(b1) HVR-L1, HVR-L2, and HVR-L3 amino acid sequences shown in SEQ ID NOs: 119, 120, and 121, respectively; and
(b2) HVR-L1, HVR-L2, and HVR-L3 same with those of any one of the light chain variable regions shown in SEQ ID NOs: 92, 41, 42, 43, 46, 51, 52, 53, 54, 82, 86, 88 and 58.

[35] The antigen-binding molecule of [34], wherein the heavy chain variable region and light chain variable region comprise mouse, rabbit, humanized or human frameworks.

[36] An antigen-binding molecule comprising a heavy chain variable region comprising an amino acid sequence selected from SEQ ID NOs: 85, 1, 33, 84, 91, 34, 35, 36, 37, 38, 39, 40, 44, 45, 47, 48, 49, 50, 55, 56, 64, 65, 83 and 57, and a light chain variable region comprising an amino acid sequence selected from SEQ ID NOs: 87, 2, 43, 86, 88, 92, 41, 42, 46, 51, 52, 53, 54, 82 and 58.

[37] The antigen-binding molecule of any one of [34] to [36], wherein the heavy chain variable region and the light chain variable region form an antigen-binding site.

[38] The antigen-binding molecule of [37], wherein the antigen-binding site has binding activity towards CLDN6.

[39] The antigen-binding molecule of [37] or [38], wherein the antigen-binding site has binding activity towards human CLDN6 as defined in SEQ ID NO: 125 or 126.

[40] The antigen-binding molecule of any one of [37] to [39], wherein the antigen-binding site does not substantially bind to human CLDN9.

[41] The antigen-binding molecule of any one of [37] to [40], wherein the antigen-binding site does not substantially bind to human CLDN4.

[42] The antigen-binding molecule of any one of [37] to [41], wherein the antigen-binding site does not substantially bind to human CLDN3.

[43] The antigen-binding molecule of any one of [37] to [42], wherein the antigen-binding site does not substantially bind to a CLDN6 mutant as defined in SEQ ID NO: 134.

[44] The antigen-binding molecule of any one of [34] to [43] wherein the antigen-binding molecule further comprises an antibody Fc region.

[45] The antigen-binding molecule of [44], wherein the Fc region is an Fc region with at least one amino acid mutation at any of the Fc region constituting amino acids of SEQ ID NOs: 143 to 146 (IgG1 to IgG4).

[46] The antigen-binding molecule of [44] or [45], wherein the Fc region is an Fc region to which sugar-chain is attached, and the percentage of fucose-deficient sugar-chain-attached to the Fc region is higher than that to a native IgG Fc region, or the percentage of bisecting N-acetylglucosamine added to the Fc region is higher than that to a native IgG Fc region.

[47] The antigen-binding molecule of any one of [34] to [46], wherein the antigen-binding molecule has cytotoxic activity.

[48] The antigen-binding molecule of [47], wherein the cytotoxic activity is ADCC or CDC.

[49] The antigen-binding molecule of any one of [34] to [46], wherein the antigen-binding molecule has internalizing activity.

[50] The antigen-binding molecule of any one of [34] to [49] which is conjugated with a cytotoxic agent.

[51] An immunoconjugate comprising the antigen-binding molecule of any one of [34] to [50] and a cytotoxic agent.

[52] A pharmaceutical composition comprising the antigen-binding molecule of any one of [34] to [50] or the immunoconjugate of [51], and a pharmaceutically acceptable carrier.

[53] The composition of [52], which is a pharmaceutical composition used for treatment and/or prevention of cancer.

[54] The composition of [52] or [53], which is a pharmaceutical composition used for treatment and/or prevention of ovarian cancer, non-small cell lung cancer, gastric cancer, or liver cancer.

[55] Use of the antigen-binding molecule of any one of [34] to [50] or the immunoconjugate of [51] in the manufacture of a medicament.

[56] Use of the antigen-binding molecule of any one of [34] to [50] or the immunoconjugate of [51] in the manufacture of a medicament for treatment and/or prevention of cancer.

[57] Use of the antigen-binding molecule of any one of [34] to [50] or the immunoconjugate of [51] in the manufacture of a medicament for treatment and/or prevention of ovarian cancer, non-small cell lung cancer, gastric cancer, or liver cancer.

[58] A method of treating an individual having cancer comprising administering to the individual an effective amount of the antigen-binding molecule of any one of [34] to [50] or the immunoconjugate of [51].

[59] A method of treating an individual having ovarian cancer, non-small cell lung cancer, gastric cancer, or liver cancer comprising administering to the individual an effective amount of the antigen-binding molecule of any one of [34] to [50] or the immunoconjugate of [51].

[60] A kit for use in the treatment and/or prevention of cancer, which comprises at least the antigen-binding molecule of any one of [34] to [50] or the immunoconjugate of [51], and instructions for use.

[61] A kit for use in the treatment and/or prevention of ovarian cancer, non-small cell lung cancer, gastric cancer, or liver cancer, which comprises at least the antigen-binding molecule of any one of [34] to [50] or the immunoconjugate of [51], and instructions for use.

[62] A method of detecting the presence of CLDN6 in a biological sample, which comprises contacting the biological sample with the antigen-binding molecule of any one of [34] to [41].

[63] The method of [62], wherein the biological sample is contacted with the antigen-binding molecule under conditions permissive for binding of the antigen-binding molecule to CLDN6, and detecting whether a complex is formed between the antigen-binding molecule and CLDN6.

[64] A method of diagnosing whether a subject have cancer or not, which comprises contacting a biological sample from the subject with the antigen-binding molecule of any one of [34] to [41].
[65] The method of [64], wherein the biological sample is contacted with the antigen-binding molecule under conditions permissive for binding of the antigen-binding molecule to CLDN6, and detecting whether a complex is formed between the antigen-binding molecule and CLDN6.
[66] The method of [64] or [65], wherein the cancer is ovarian cancer, non-small cell lung cancer, gastric cancer, or liver cancer.
[67] An isolated nucleic acid encoding the antigen-binding molecule of any one of [34] to [41].
[68] A host cell comprising the nucleic acid of [67].
[69] A method of producing an antigen-binding molecule comprising culturing the host cell of [68] so that the antigen-binding molecule is produced.
[70] The method of [69], further comprising recovering the antigen-binding molecule from the culture of the host cell.

Furthermore, the present disclosure also provides the following:
[71] An antigen-binding molecule that comprises:
a first antigen-binding site that has binding activity towards CLDN6, and
a second antigen-binding site that has binding activity towards T-cell receptor complex,
wherein the first antigen-binding site is formed by
(a) a heavy chain variable region comprising any one of the HVR combinations selected from:
(a1) HVR-H1, HVR-H2, and HVR-H3 amino acid sequences shown in SEQ ID NOs: 113, 117, and 118, respectively; and
(a2) HVR-H1, HVR-H2, and HVR-H3 same with those of any one of the heavy chain variable regions shown in SEQ ID NOs: 91, 34, 35, 36, 37, 38, 39, 40, 44, 45, 47, 48, 49, 50, 55, 56, 64, 65, 83, 84, 57 and 85;
and
(b) a light chain variable region comprising any one of the HVR combinations selected from:
(b1) HVR-L1, HVR-L2, and HVR-L3 amino acid sequences shown in SEQ ID NOs: 119, 120, and 121, respectively; and
(b2) HVR-L1, HVR-L2, and HVR-L3 same with those of any one of the light chain variable regions shown in SEQ ID NOs: 92, 41, 42, 43, 46, 51, 52, 53, 54, 82, 86, 88 and 58.
[72] The antigen-binding molecule of [71], wherein the heavy chain variable region and the light chain variable region that form the first antigen-binding site further comprise mouse, rabbit, humanized or human frameworks.
[73] An antigen-binding molecule that comprises:
a first antigen-binding site that has binding activity towards CLDN6, and
a second antigen-binding site that has binding activity towards T-cell receptor complex,
wherein the first antigen-binding site comprises a heavy chain variable region comprising an amino acid sequence selected from SEQ ID NOs: 85, 1, 33, 84, 91, 34, 35, 36, 37, 38, 39, 40, 44, 45, 47, 48, 49, 50, 55, 56, 64, 65, 83 and 57 and a light chain variable region comprising an amino acid sequence selected from SEQ ID NOs: 87, 2, 43, 86, 88, 92, 41, 42, 46, 51, 52, 53, 54, 82 and 58.
[74] The antigen-binding molecule of any one of [71] to [73], wherein the first antigen-binding site has binding activity towards human CLDN6.
[75] The antigen-binding molecule of any one of [71] to [74], wherein the first antigen-binding site has binding activity towards human CLDN6 as defined in SEQ ID NO: 125 or 126.
[76] The antigen-binding molecule of any one of [71] to [75], wherein the first antigen-binding site does not substantially bind to human CLDN9.
[77] The antigen-binding molecule of any one of [71] to [76], wherein the first antigen-binding site does not substantially bind to human CLDN4.
[78] The antigen-binding molecule of any one of [71] to [77], wherein the first antigen-binding site does not substantially bind to human CLDN3.
[79] The antigen-binding molecule of any one of [71] to [78], wherein the first antigen-binding site does not substantially bind to a CLDN6 mutant as defined in SEQ ID NO: 134.
[80] The antigen-binding molecule of any one of [71] to [73], wherein the first antigen-binding site is included in a single-chain Fv (scFv), Fv or Fab.
[81] The antigen-binding molecule of any one of [71] to [80], wherein the second antigen-binding site has binding activity towards CD3.
[82] The antigen-binding molecule of any one of [71] to [80], wherein the second antigen-binding site has binding activity towards CD3 epsilon chain.
[83] The antigen-binding molecule of any one of [71] to [80], wherein the second antigen-binding site has binding activity towards T-cell receptor.
[84] The antigen-binding molecule of any one of [71] to [82], wherein the second antigen-binding site is formed by a heavy chain variable region comprising HVR-H1, HVR-H2 and HVR-H3 amino acid sequences of SEQ ID NOs: 122, 123, and 124, respectively; and a light chain variable region comprising HVR-L1, HVR-L2 and HVR-L3 amino acid sequences of SEQ ID NOs: 114, 115, and 116, respectively.
[85] The antigen-binding molecule of [84], wherein the heavy chain variable region and light chain variable region comprise mouse, rabbit, humanized or human frameworks.
[86] The antigen-binding molecule of any one of [71] to [82], wherein the second antigen-binding site is formed by a heavy chain variable region comprising an amino acid sequence selected from SEQ ID NOs: 60 and 70 and a light chain variable region comprising an amino acid sequence selected from SEQ ID NOs: 61 and 71.
[87] The antigen-binding molecule of any one of [71] to [86], wherein the second antigen-binding site is included in a single-chain Fv (scFv), Fv or Fab.
[88] The antigen-binding molecule of any one of [71] to [87], wherein the antigen-binding molecule further comprises an antibody Fc region.
[89] The antigen-binding molecule of [88], wherein the Fc region is an Fc region with reduced binding activity towards an Fc gamma receptor.
[90] The antigen-binding molecule of [88] or [89], wherein the Fc region is an Fc region with at least one amino acid mutation at any of the Fc region constituting amino acids of SEQ ID NOs: 143 to 146 (IgG1 to IgG4).
[91] The antigen-binding molecule of any one of [88] to [90], wherein the Fc region is an Fc region with mutation of at least one amino acid selected from the following amino acid positions specified by EU numbering:

position 220, position 226, position 229, position 231, position 232, position 233, position 234, position 235, position 236, position 237, position 238, position 239, position 240, position 264, position 265, position 266, position 267, position 269, position 270, position 295, position 296, position 297, position 298, position 299, position 300, position 325, position 327, position 328, position 329, position 330, position 331, and position 332.

[92] The antigen-binding molecule of any one of [88] to [91], wherein the Fc region is an Fc region comprising at least one amino acid selected from the following amino acids specified by EU numbering:

Arg at amino acid position 234, Ala or Arg at amino acid position 235, Lys at amino acid position 239, and Ala at amino acid position 297.

[93] The antigen-binding molecule of any one of [88] to [92], wherein the heavy chain variable domain that forms the first antigen-binding site is linked to the Fc region via a first CH1 domain, the light chain variable domain that forms the first antigen-binding site is linked to a first CL domain; and the heavy chain variable domain that forms the second antigen-binding site is linked to the Fc region via a second CH1 domain, the light chain variable domain that forms the second antigen-binding site is linked to a second CL domain.

[94] The antigen-binding molecule of [93], wherein the electric charges of the CH1 and CL domains are controlled so that the heavy chain variable region that forms the first antigen-binding domain assembles with the light chain variable region that forms the first antigen-binding domain, and/or the heavy chain variable region that forms the second antigen-binding domain assembles with the light chain variable region that forms the second antigen-binding domain.

[95] The antigen-binding molecule of any one of [71] to [94], wherein the antigen-binding molecule has cytotoxic activity.

[96] The antigen-binding molecule of [95], wherein the cytotoxic activity is T-cell-dependent cytotoxic activity.

[97] An isolated polynucleotide encoding the antigen-binding molecule of any one of [71] to [96].

[98] A host cell comprising the polynucleotide of [97].

[99] A method of producing an antibody comprising culturing the host cell of [98] so that the antigen-binding molecule is produced.

[100] The method of [99], further comprising recovering the antigen-binding molecule from the culture of the host cell.

[101] A pharmaceutical composition comprising the antigen-binding molecule of any one of [71] to [96], and a pharmaceutically acceptable carrier.

[102] The pharmaceutical composition of [101], which induces T-cell-dependent cytotoxicity.

[103] The composition of [101] or [102], which is a pharmaceutical composition used for treatment and/or prevention of cancer.

[104] The composition of any one of [101] to [103], which is a pharmaceutical composition used for treatment and/or prevention of ovarian cancer, non-small cell lung cancer, gastric cancer, or liver cancer.

[105] Use of the antigen-binding molecule of any one of [71] to [96] in the manufacture of a medicament.

[106] Use of the antigen-binding molecule of any one of [71] to [96] in the manufacture of a medicament for treatment and/or prevention of cancer.

[107] Use of the antigen-binding molecule of any one of [71] to [96] in the manufacture of a medicament for treatment and/or prevention of ovarian cancer, non-small cell lung cancer, gastric cancer, or liver cancer.

[108] A method of treating an individual having cancer comprising administering to the individual an effective amount of the antigen-binding molecule of any one of [71] to [96].

[109] A method of treating an individual having ovarian cancer, non-small cell lung cancer, gastric cancer, or liver cancer comprising administering to the individual an effective amount of the antigen-binding molecule of any one of [71] to [96].

[110] A kit for use in the treatment and/or prevention of cancer, which comprises at least the antigen-binding molecule of any one of [71] to [96], and instructions for use.

[111] A kit for use in the treatment and/or prevention of ovarian cancer, non-small cell lung cancer, gastric cancer, or liver cancer, which comprises at least the antigen-binding molecule of any one of [71] to [96], and instructions for use.

Advantageous Effects of the Invention

The present disclosure provides multispecific antigen-binding molecules that enable cancer treatment by having T-cells close to CLDN6-expressing cells and using the cytotoxicity of T-cells against the CLDN6-expressing cancer cells, methods for producing the multispecific antigen-binding molecules, and pharmaceutical compositions containing such a multispecific antigen-binding molecule as an active ingredient for inducing cellular cytotoxicity. Multispecific antigen-binding molecules of the present disclosure have strong anti-tumor activity, inducing cellular cytotoxicity, and can target and damage CLDN6-expressing cells, thus enable treatment and prevention of various cancers. Furthermore, the antigen-binding molecules comprise specific sequences also have superior specificity towards CLDN6, long half-life in blood, as well as improved safety properties, stability and manufacturability.

The present disclosure also provides antigen-binding molecules that shows superior specificity towards CLDN6, which enable accurate detection of the CLDN6 presence in biological sample, and diagnosis of various cancers. Cancer treatment by targeting CLDN6-expressing cells are also enabled.

BRIEF DESCRIPTION OF DRAWINGS

FIG. 2-1. Binding specificity of anti-CLDN6/CD3 bispecific antibodies (AE3-20/TR01. AH05/TR01, CDA0013/

TR01 and 6PHU3/TR01) to human and mouse Claudin family proteins. Relative binding activity of anti-CLDN6/CD3 bispecific antibodies was examined by flow cytometer in a concentration of 10 micro g/ml. The vertical axis indicates the MFI values of an antibody binding to Free-Style™ 293-F transfectants, which are transiently expressing human or mouse CLDN3, CLDN4, CLDN6, and CLDN9. KLH/TR01 was used as a negative control. Commercially available human CLDN6 antibody (MAB3656), human CLDN3 antibody (MAB4620), and human CLDN4 antibody (MAB4219) were tested as a control.

Figure 1:
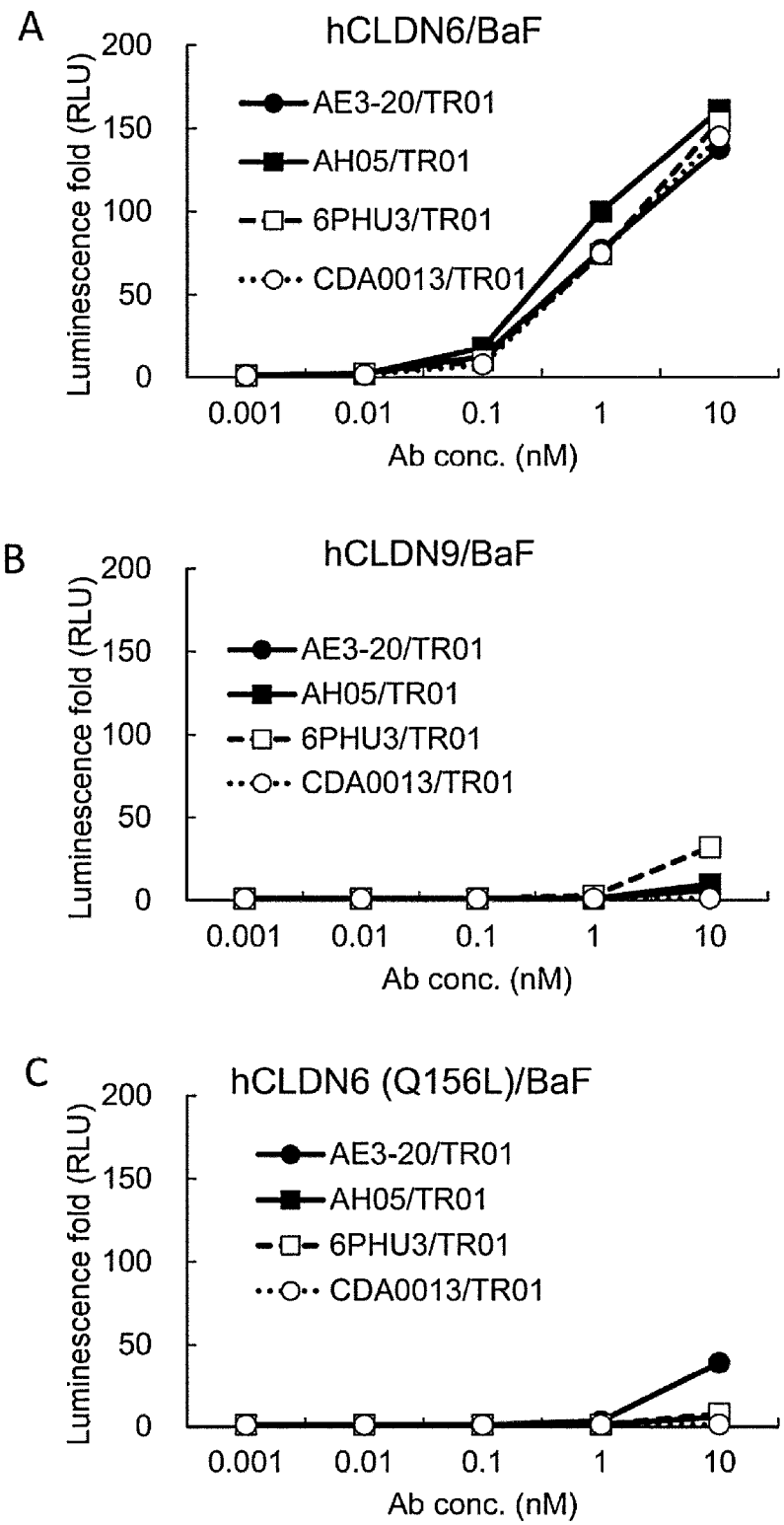
FIG. 1. T cell activation activity of anti-CLDN6/CD3 bispecific antibodies (AE3-20/TR01, AH05/TR01, CDA0013/TR01 and 6PHU3/TR01). T cell activation activity of each antibody was examined in the presence of hCLDN6/BaF (A), hCLDN9/BaF (B), and hCLDN6 (Q156L)/BaF (C). The vertical axis indicates the luminescence fold of antibody containing well compared to that of the well without antibody and the horizontal axis indicates the concentration of the anti-CLDN6/CD3 bispecific antibodies.
Figures 1, 2:
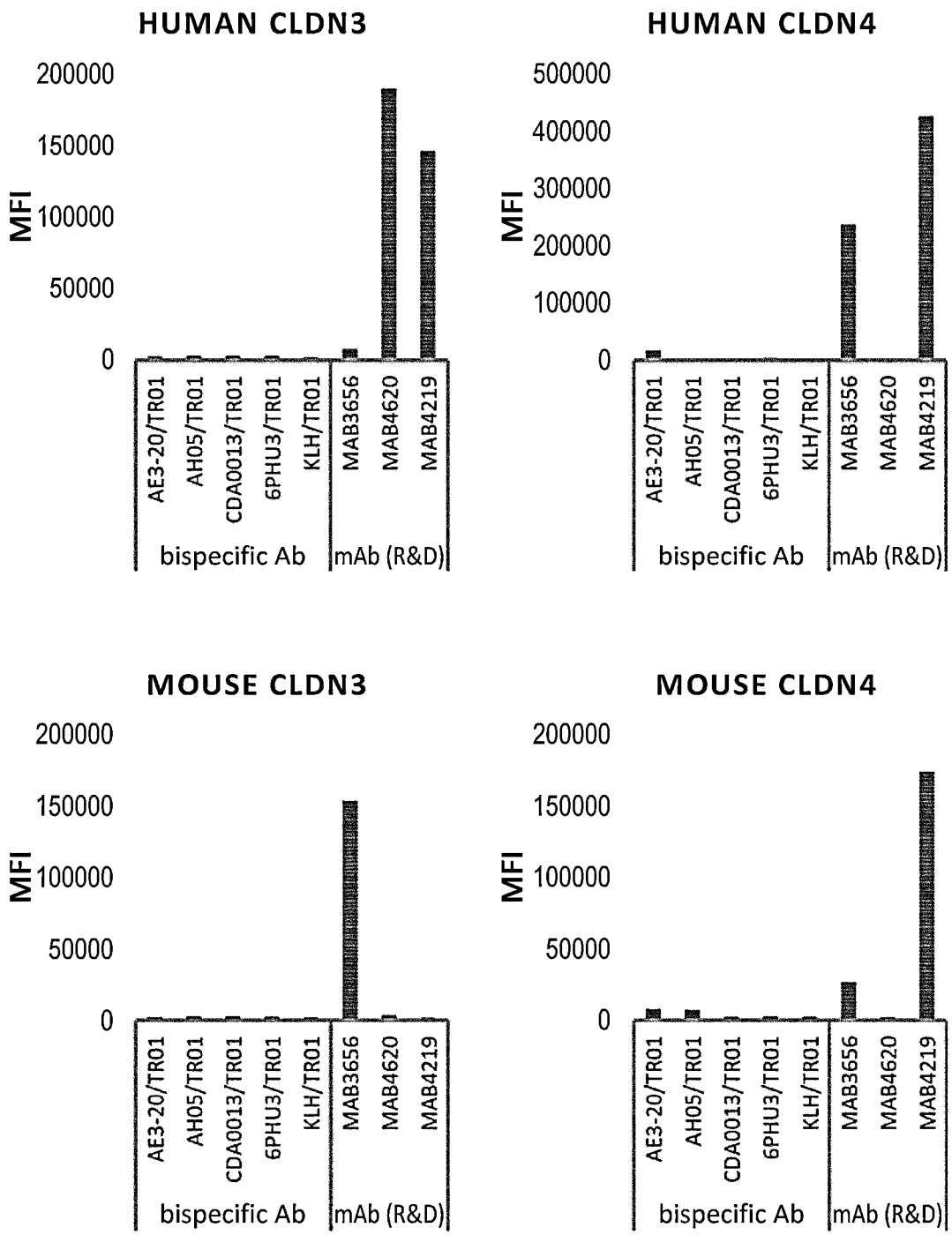
Figure 2:
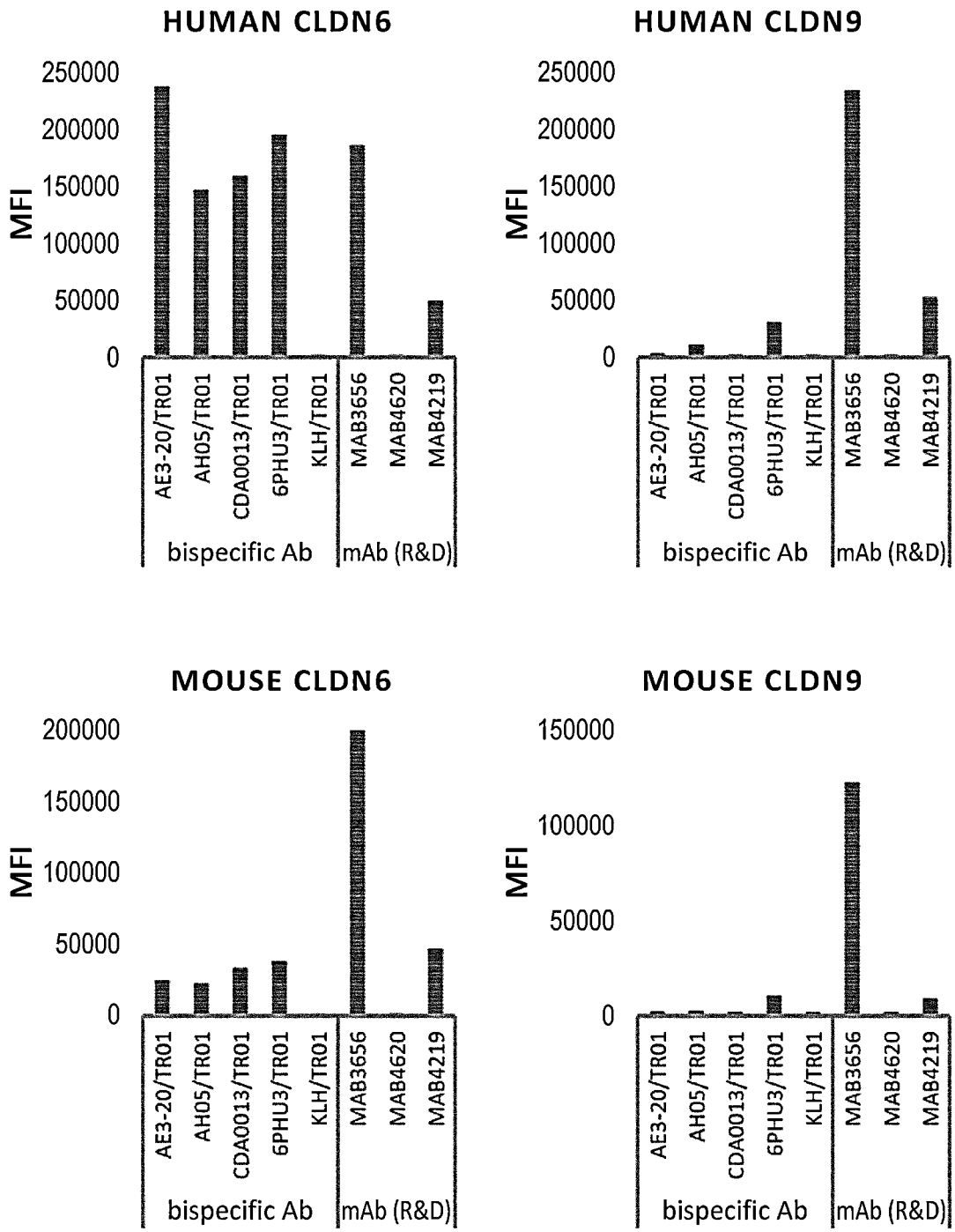

FIG. 2-2 Continuation of FIG. 2-1.

FIG. 3. In vivo anti-tumor efficacy of anti-CLDN6/CD3 bispecific antibodies (AE3-20/TR01, AH05/TR01, and 6PHU3/TR01). FIG. 3a shows the tumor volume change of HuH-7 T cell injection model, and FIG. 3b shows the tumor volume change of OV-90 T cell injection model. In this study, each group (n=5) were administered 5 mg/kg of antibodies or vehicle intravenously on day 14 after tumor inoculation.

FIG. 4. The body weight change of mice treated with 5 mg/kg of anti-CLDN6/CD3 bispecific antibodies (AE3-20/TR01, AH05/TR01, and 6PHU3/TR01) as described in FIG. 3. The body weight change of HuH-7 bearing T cell injection model (a) and OV-90 bearing T cell injection model (b) are shown respectively. The vertical axis indicates body weight and the horizontal axis indicates days after tumor inoculation.

Figure 5:
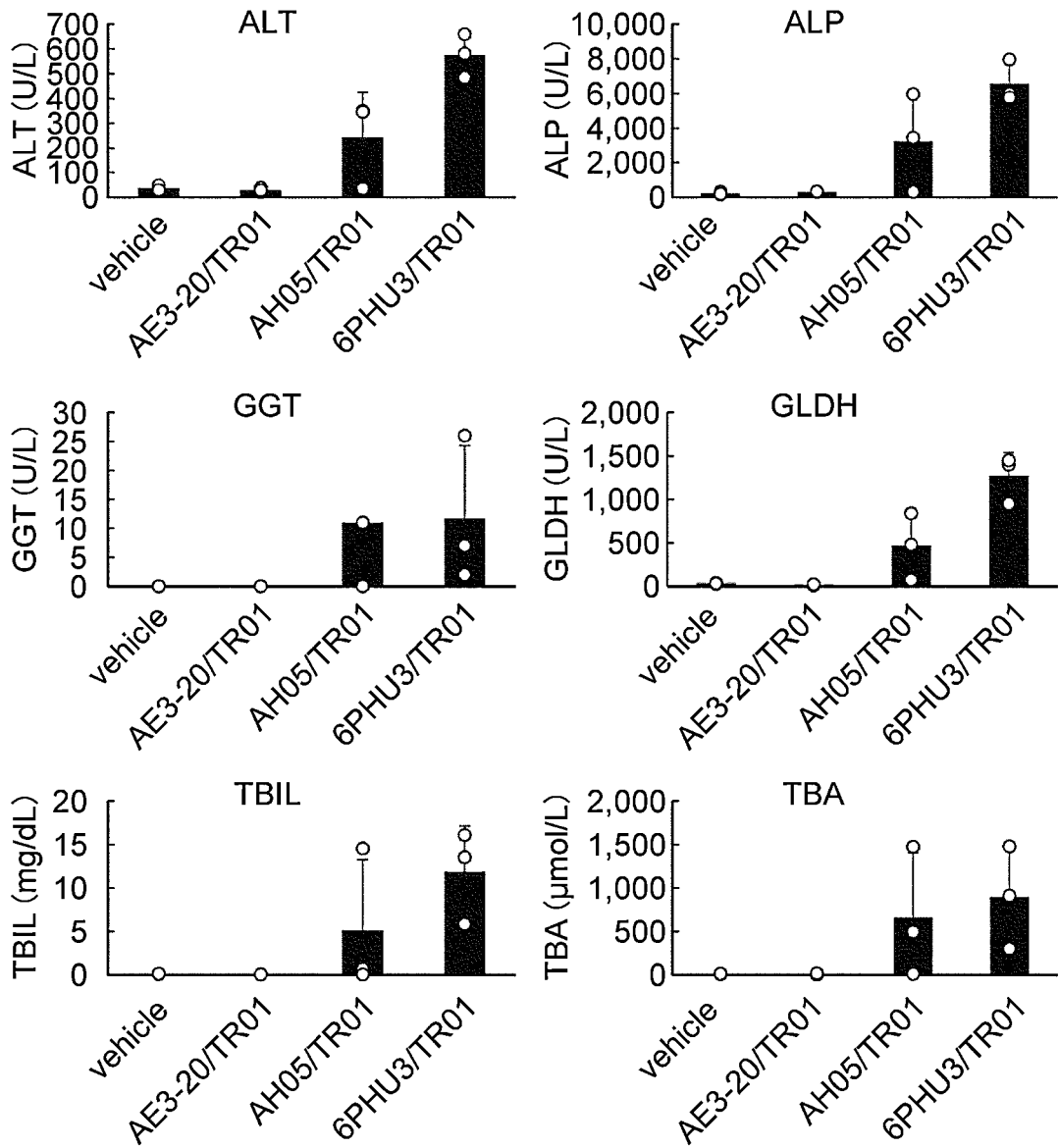

FIG. 5. Plasma ALT, GGT, TBIL, ALP, GLDH, and TBA levels in OV-90 T cell injection model after administration of 5 mg/kg of anti-CLDN6/CD3 bispecific antibodies (AE3-20/TR01, AH05/TR01, and 6PHU3/TR01) or vehicle as described in FIG. 3. The vertical axis indicates concentration of ALT (Alanine aminotransferase), ALP (alkaline phosphatase), GGT (gamma-glutamyl transpeptidase), GLDH (glutamate dehydrogenase), TBIL (total bilirubin) and TBA (total bile acid), respectively.

Figure 6:
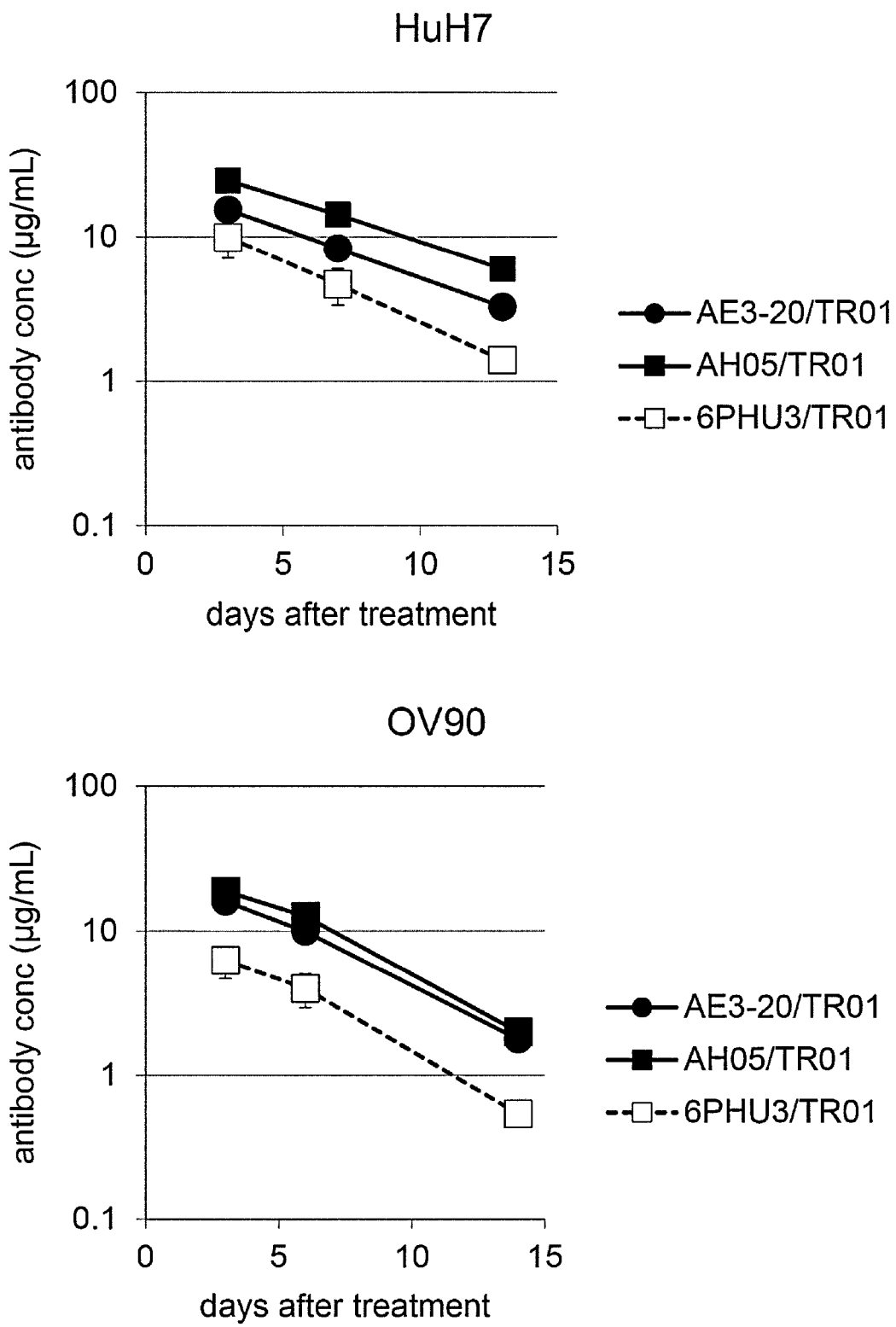

FIG. 6. The temporal change of the antibody concentration in mouse treated with 5 mg/kg of anti-CLDN6/CD3 bispecific antibodies (AE3-20/TR01, AH05/TR01, and 6PHU3/TR01) as described in FIG. 3. Plasma concentration of antibody in HuH-7 T cell injection model (upper) and OV-90 T cell injection model (lower) are shown respectively. The vertical axis indicates the antibody concentration (micro g/mL) in the mouse plasma and the horizontal axis indicates days after treatment.

FIG. 7. In vivo anti-tumor efficacy and the body weight change of the anti-CLDN6/CD3 bispecific antibodies in OVCAR-3 T cell injection model. Mouse were treated with 5 mg/kg of AE3-20/TR01, CDA0013/TR01, or vehicle intravenously on day 29 after tumor transplantation. The tumor volume (upper) and the body weight (lower) were examined after treatment.

Figure 8:
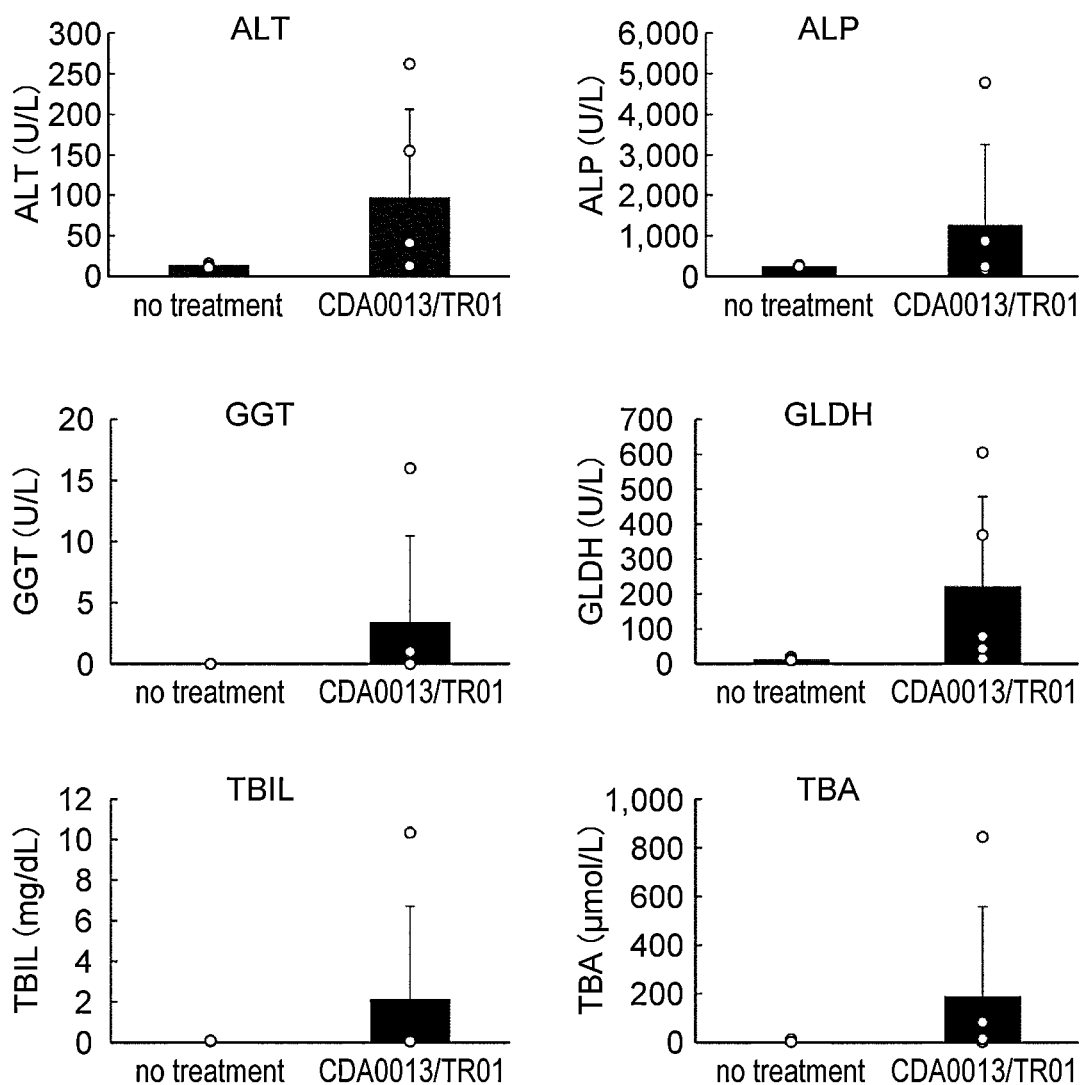

FIG. 8. Plasma ALT, GGT, TBIL, ALP, GLDH, and TBA levels after treatment of 5 mg/kg of CDA0013/TR01 in OVCAR-3 T cell injection model as described in FIG. 7. The vertical axis indicates concentration of ALT, GGT, TBIL, ALP, GLDH, and TBA respectively, after administration of CDA0013/TR01 or no treatment.

Figure 9:
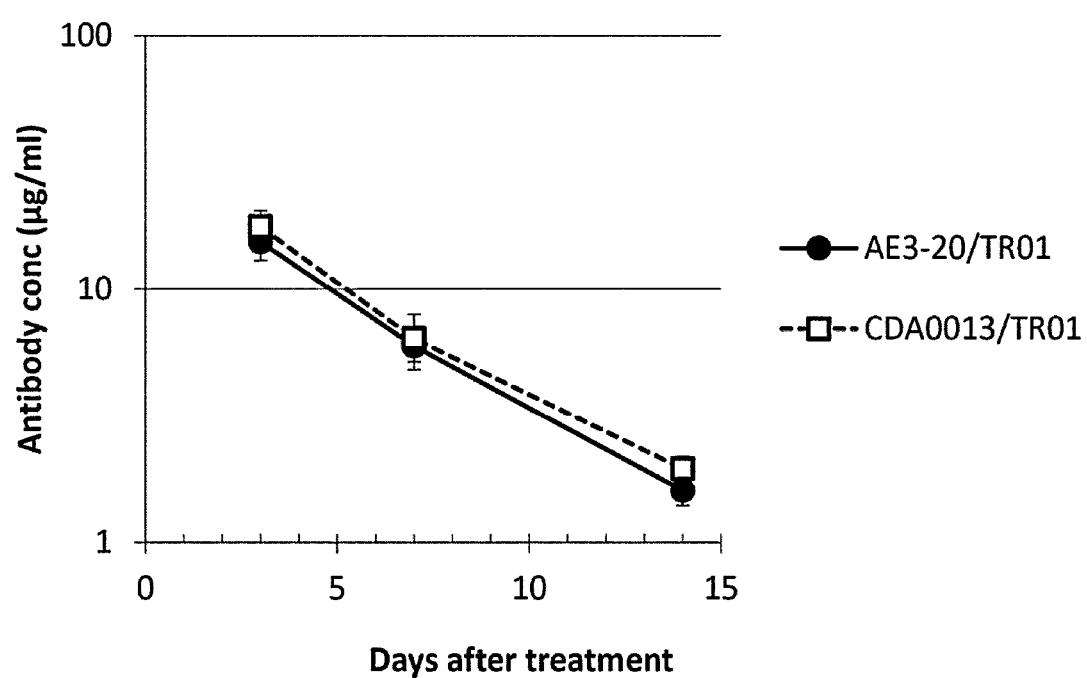

FIG. 9. The temporal change of the concentration of AE3-20/TR01 and CDA0013/TR01 in OVCAR-3 T cell injection model as described in FIG. 7. The vertical axis indicates the antibody concentration (micro g/mL) in the mouse plasma and the horizontal axis indicates days after treatment.

Figure 10:
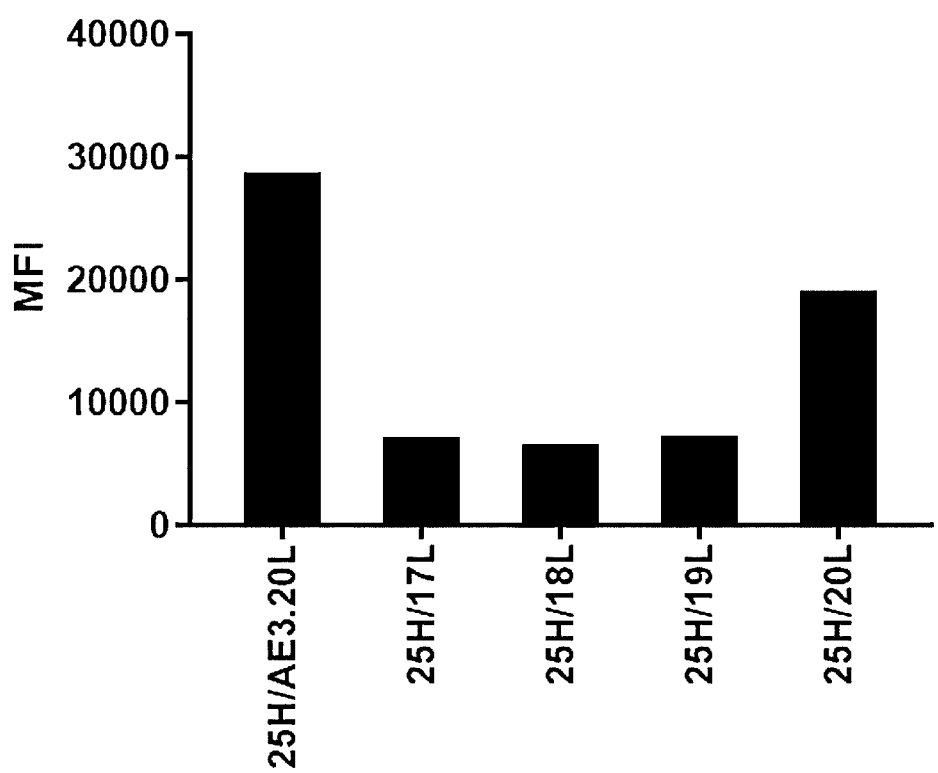

FIG. 10. Binding activities of various anti-CLDN6/CD3 bispecific antibodies to hCLDN6/BaF. The vertical axis indicates the MFI values of antibody to hCLDN6/BaF, in a linear manner, taken as binding activity.

FIG. 11. T cell activation activity of various anti-CLDN6/CD3 bispecific antibodies in the presence of hCLDN6/BaF, hCLDN3/BaF, hCLDN4/BaF, or hCLDN9/BaF. The horizontal axis indicates the luminescence fold of antibody containing well compared with that of the well without antibody. KLH/TR01 was used as a negative control. The bars are shown in the following order from the bottom: CLDN6, CLDN3, CLDN4, and CLDN9.

Figure 12:
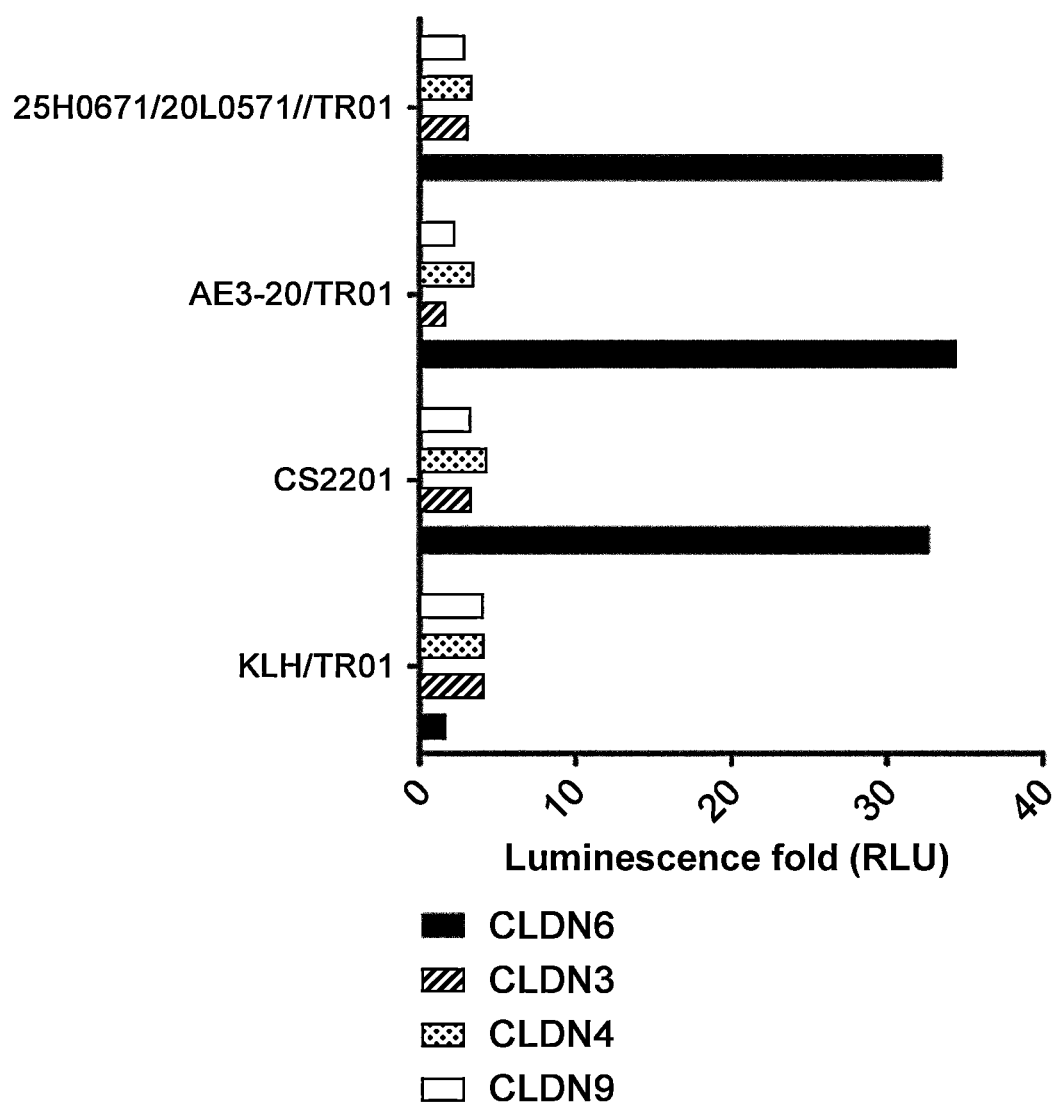

FIG. 12. Continuation of FIG. 11.

Figure 13:
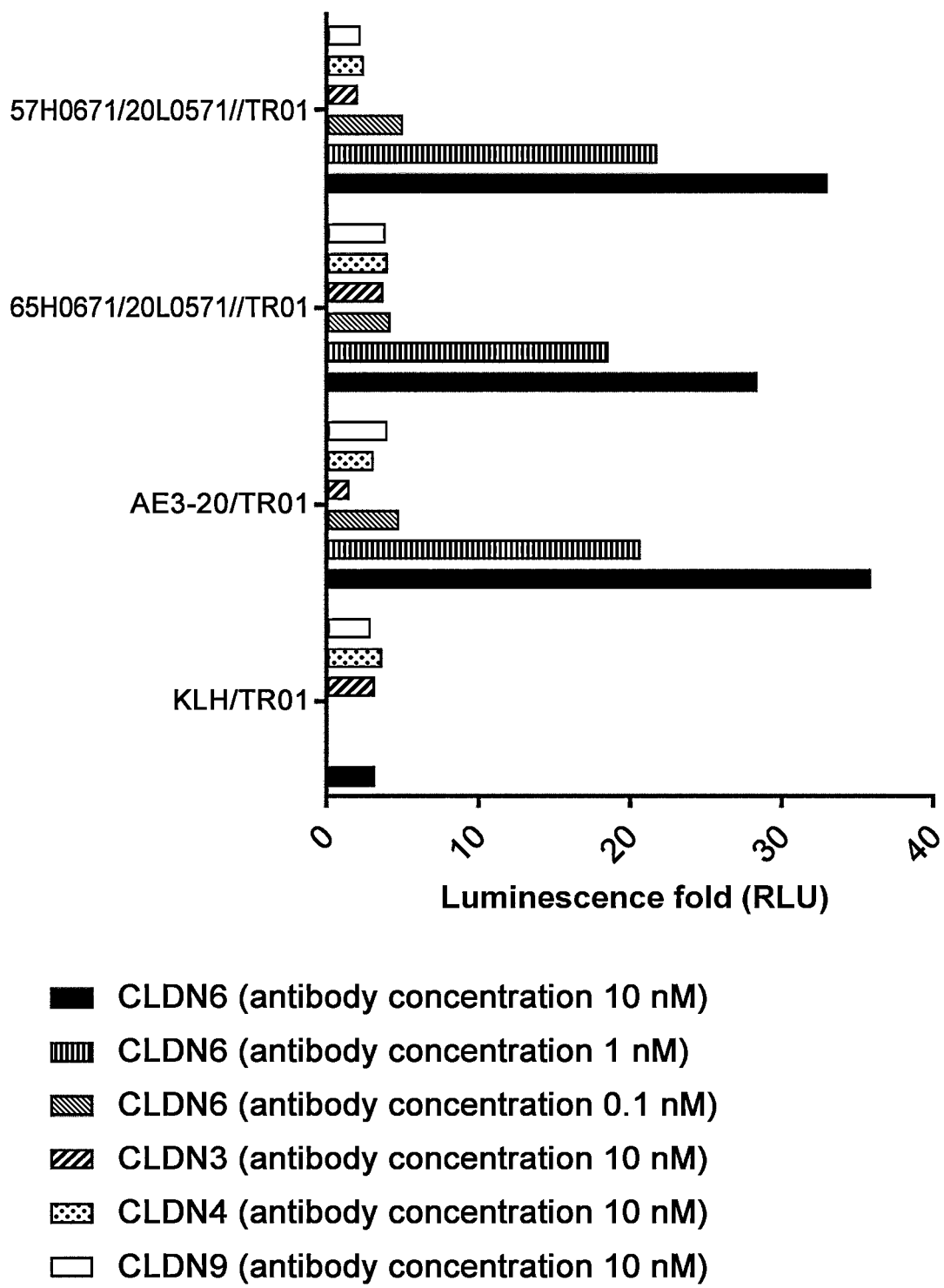

FIG. 13. T cell activation activity of various anti-CLDN6/CD3 bispecific antibodies in the presence of hCLDN6/BaF, hCLDN3/BaF, hCLDN4/BaF, or hCLDN9/BaF. The horizontal axis indicates the luminescence fold of antibody containing well compared with that of the well without antibody. 1 nM and 0.1 nM of KLH/TR01 were not tested in the presence of hCLDN6/BaF. KLH/TR01 was used as a negative control. The bars are shown in the following order from the bottom: CLDN6 (antibody concentration 10 nM), CLDN6 (antibody concentration 1 nM), CLDN6 (antibody concentration 0.1 nM), CLDN3 (antibody concentration 10 nM), CLDN4 (antibody concentration 10 nM), and CLDN9 (antibody concentration 10 nM).

Figure 14:
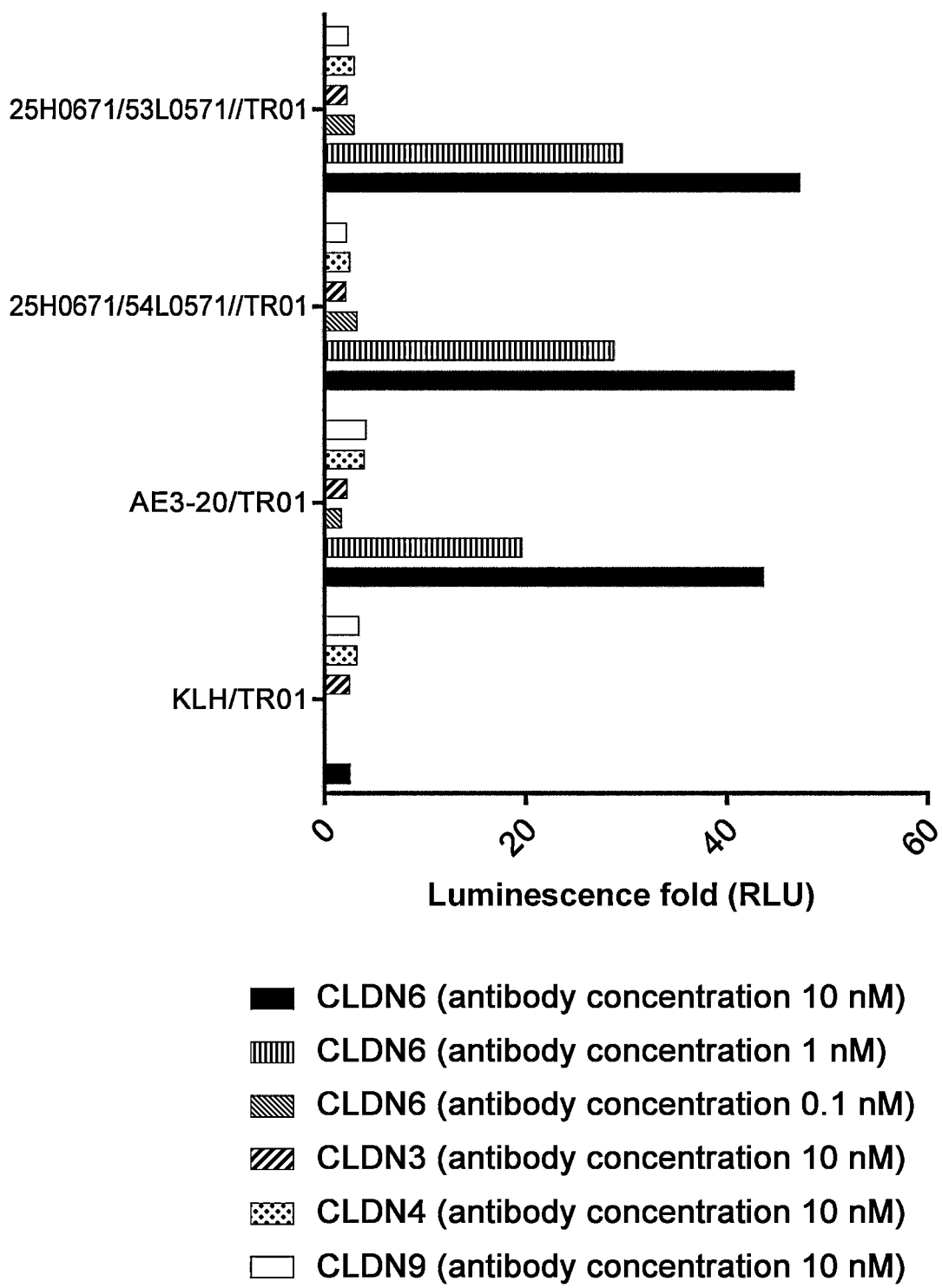

FIG. 14. T cell activation activity of various anti-CLDN6/CD3 bispecific antibodies in the presence of hCLDN6/BaF, hCLDN3/BaF, hCLDN4/BaF, or hCLDN9/BaF. The horizontal axis indicates the luminescence fold of antibody containing well compared with that of the well without antibody. 1 nM and 0.1 nM of KLH/TR01 were not tested in the presence of hCLDN6/BaF. KLH/TR01 was used as a negative control. The bars are shown in the following order from the bottom: CLDN6 (antibody concentration 10 nM), CLDN6 (antibody concentration 1 nM), CLDN6 (antibody concentration 0.1 nM), CLDN3 (antibody concentration 10 nM), CLDN4 (antibody concentration 10 nM), and CLDN9 (antibody concentration 10 nM).

Figure 15:
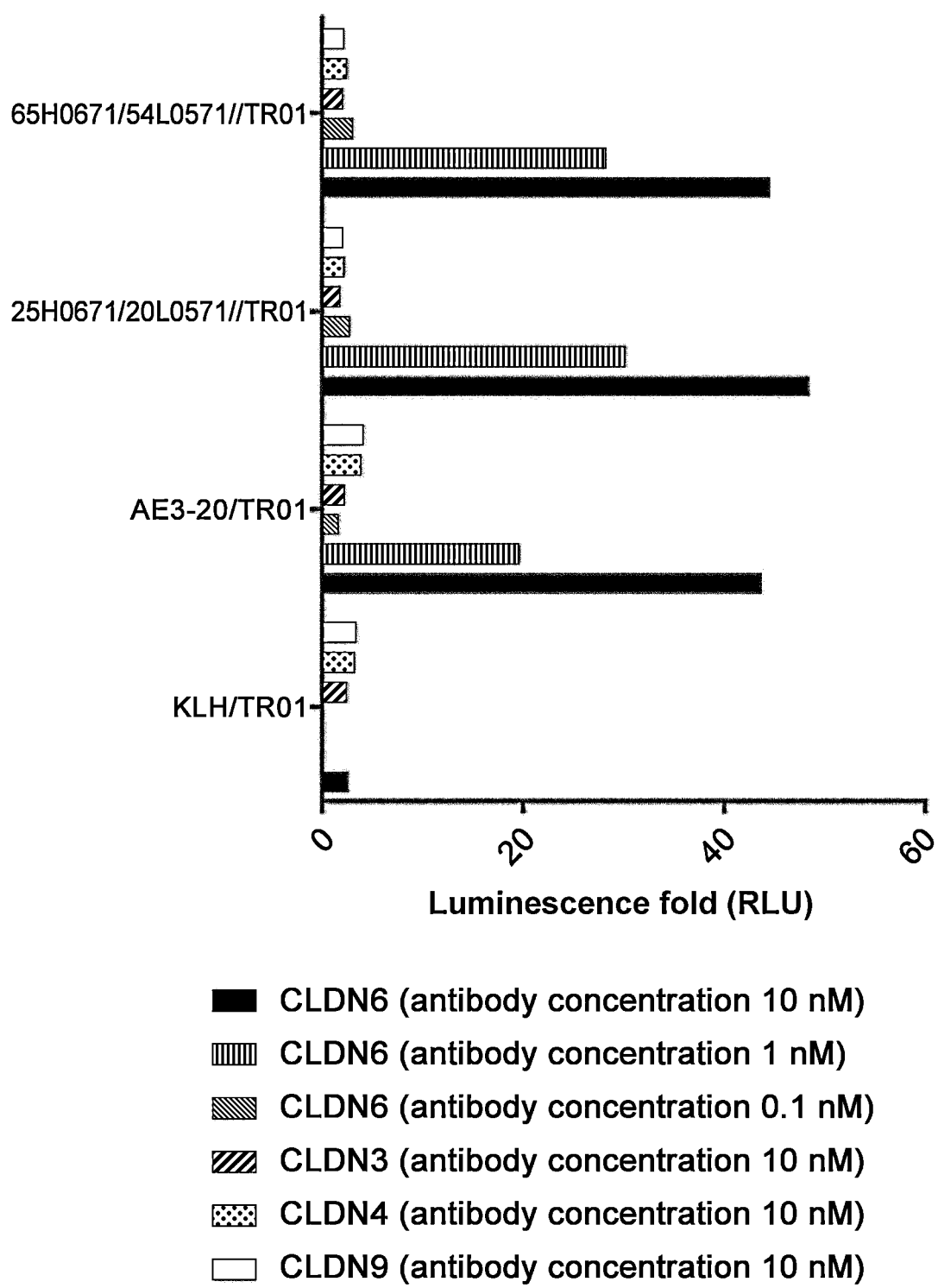

FIG. 15. T cell activation activity of various anti-CLDN6/CD3 bispecific antibodies in the presence of hCLDN6/BaF, hCLDN3/BaF, hCLDN4/BaF, or hCLDN9/BaF. The horizontal axis indicates the luminescence fold of antibody containing well compared with that of the well without antibody. 1 nM and 0.1 nM of KLH/TR01 were not tested in the presence of hCLDN6/BaF. KLH/TR01 was used as a negative control. The bars are shown in the following order from the bottom: CLDN6 (antibody concentration 10 nM), CLDN6 (antibody concentration 1 nM), CLDN6 (antibody concentration 0.1 nM), CLDN3 (antibody concentration 10 nM), CLDN4 (antibody concentration 10 nM), and CLDN9 (antibody concentration 10 nM).

Figure 16:
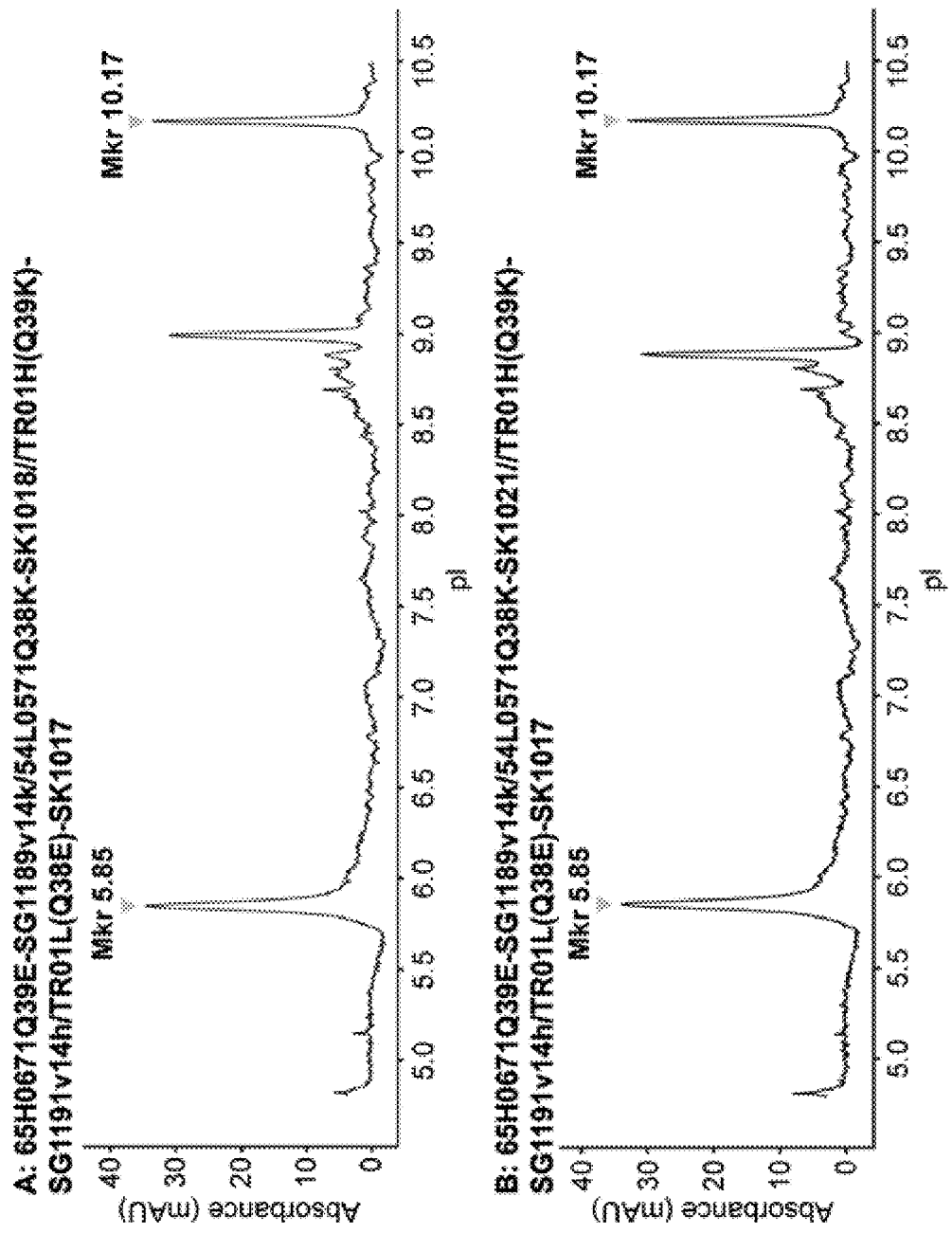

FIG. 16. Charge heterogeneity of 65H0671Q39E-SG1189v14k/54L0571Q38K-SK1018//TR01H(Q39K)-SG1191v14h/TR01L(Q38E)-SK1017 (A) and 65H0671Q39E-SG1189v14k/54L0571Q38K-SK1021//TR01H(Q39K)-SG1191v14h/TR01L(Q38E)-SK1017 (B). The charge heterogeneity and the pI values were evaluated using the Maurice (ProteinSimple) with UV absorbance at 280 nm. The associated software Compass for iCE (2.0.10) was used for data analysis.

Figure 17:
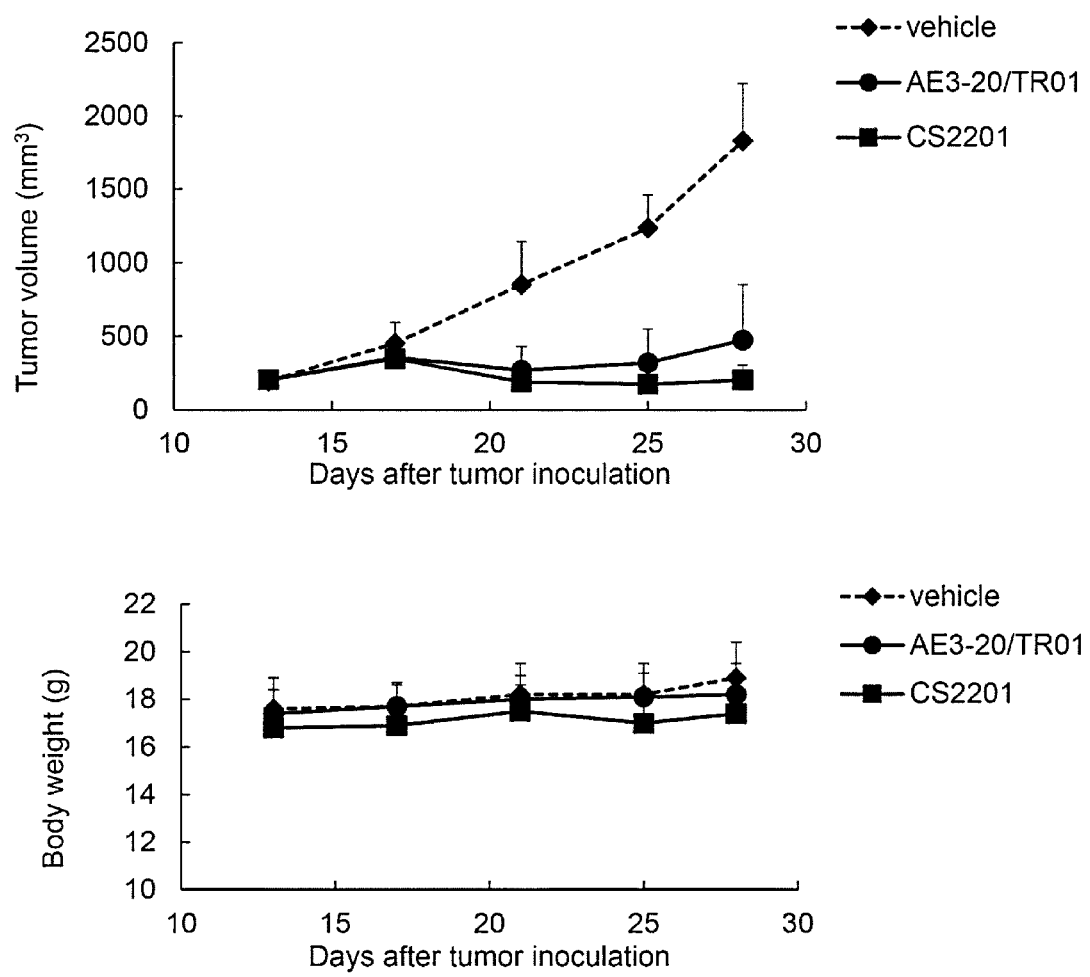

FIG. 17. In vivo anti-tumor efficacy of the anti-CLDN6/CD3 bispecific antibodies AE3-20/TR01 and CS2201 in OV-90 T cell injection model. A single dose of each anti-CLDN6/CD3 bispecific antibody at 0.1 mg/kg on day 14 after tumor inoculation was administered intravenously. The tumor volume changes (upper) and body weight (lower) are shown respectively.

FIG. 18. In vivo anti-tumor efficacy of the anti-CLDN6/CD3 bispecific antibodies AE3-20/TR01 and CS2201 in OV-90 T cell injection model. A single dose of each anti-CLDN6/CD3 bispecific antibody at 5 mg/kg on day 15 after tumor inoculation was administered intravenously. The tumor volume changes (upper) and body weight (lower) are shown respectively.

Figure 19:
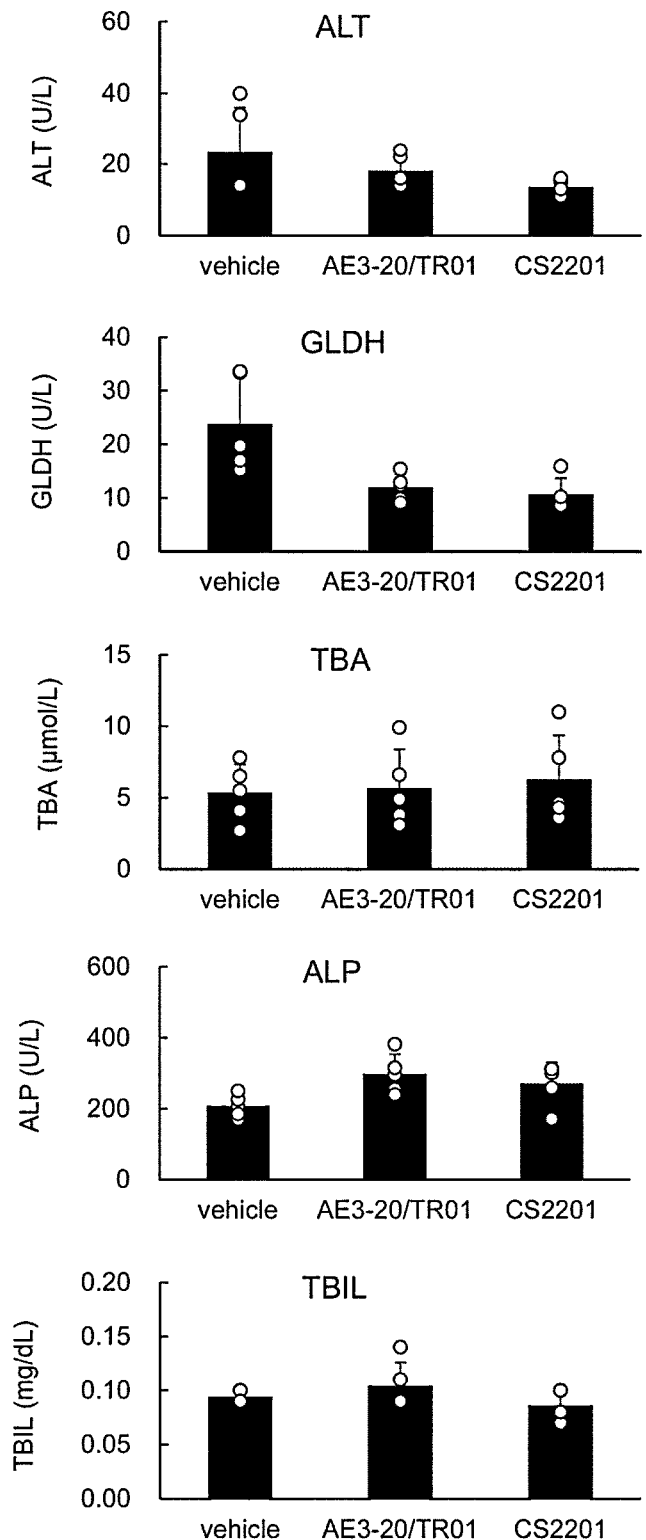

FIG. 19. Plasma ALT, GLDH, TBA, ALP, and TBIL levels after treatment of 5 mg/kg of AE3-20/TR01 or CS2201 in OV-90 T cell injection model as described in FIGS. 17 and 18. The vertical axis indicates concentration of ALT, GLDH, TBA, ALP, and TBIL after administration of AE3-20/TR01, CS2201, and vehicle.

Figure 20:
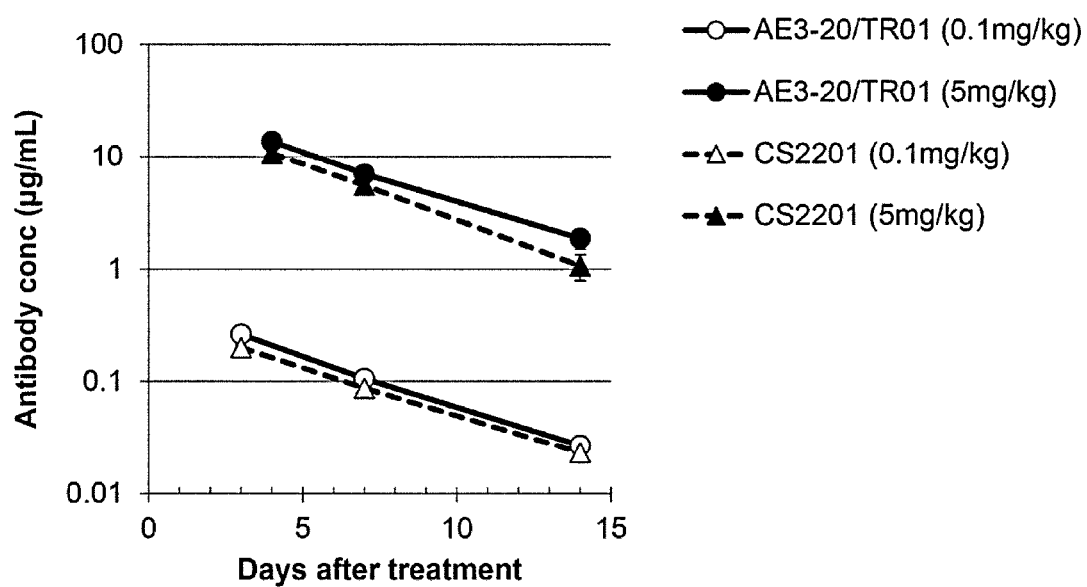

FIG. 20. The temporal change of the concentration of AE3-20/TR01 and CS2201 in OV-90 T cell injection model as described in FIGS. 17 and 18. The vertical axis indicates the antibody concentration (micro g/mL) in the mouse plasma and the horizontal axis indicates days after treatment.

FIG. 21A. In vivo anti-tumor efficacy of the anti-CLDN6/CD3 bispecific antibody CS2425 in OV-90 T cell injection model. A single dose of 0.1 mg/kg of CS2425 was administered intravenously on day 15 after the tumor inoculation. The tumor volume changes (upper) and body weight changes (lower) are shown respectively.

FIG. 21B. In vivo anti-tumor efficacy of the anti-CLDN6/CD3 bispecific antibody CS2425 in OV-90 T cell injection model. A single dose of 5 mg/kg of CS2425 was administered intravenously on day 15 after the tumor inoculation. The tumor volume changes (upper) and body weight changes (lower) are shown respectively.

Figure 22:
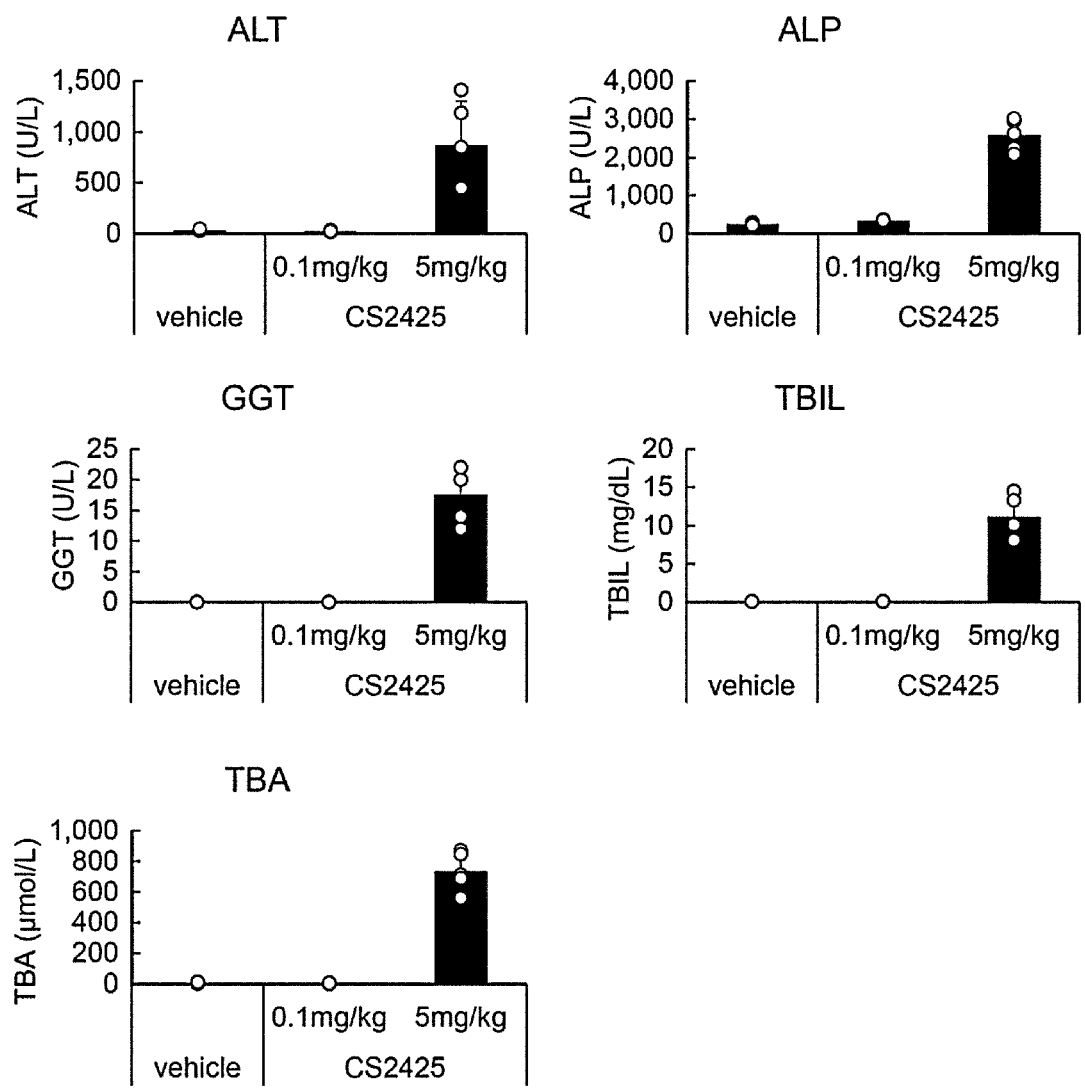

FIG. 22. Plasma ALT, GGT, TBA, ALP, and TBIL levels after treatment of CS2425 in OV-90 T cell injection model as described in FIGS. 21A and 21B. The vertical axis indicates concentration of ALT, GGT, TBA, ALP, and TBIL after administration of 0.1 mg/kg and 5 mg/kg of CS2425, or vehicle.

Figure 23:
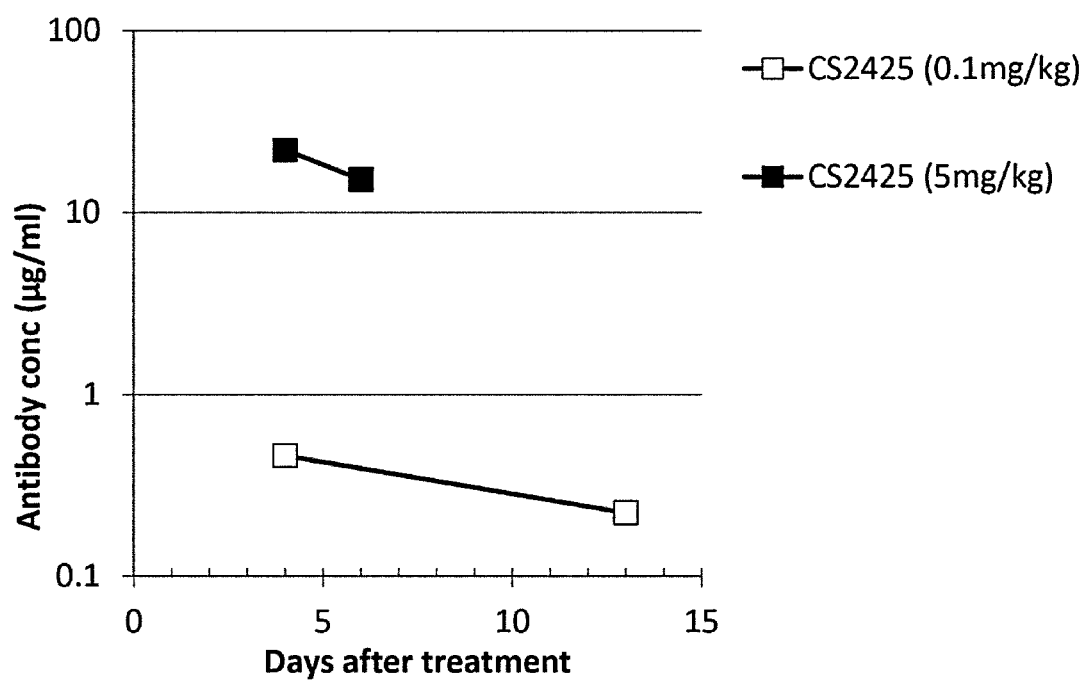

FIG. 23. The temporal change of the concentration of CS2425 in OV-90 T cell injection model as described in FIGS. 21A and 21B. The vertical axis indicates the antibody concentration (micro g/mL) in the mouse plasma and the horizontal axis indicates days after treatment.

Figure 24:
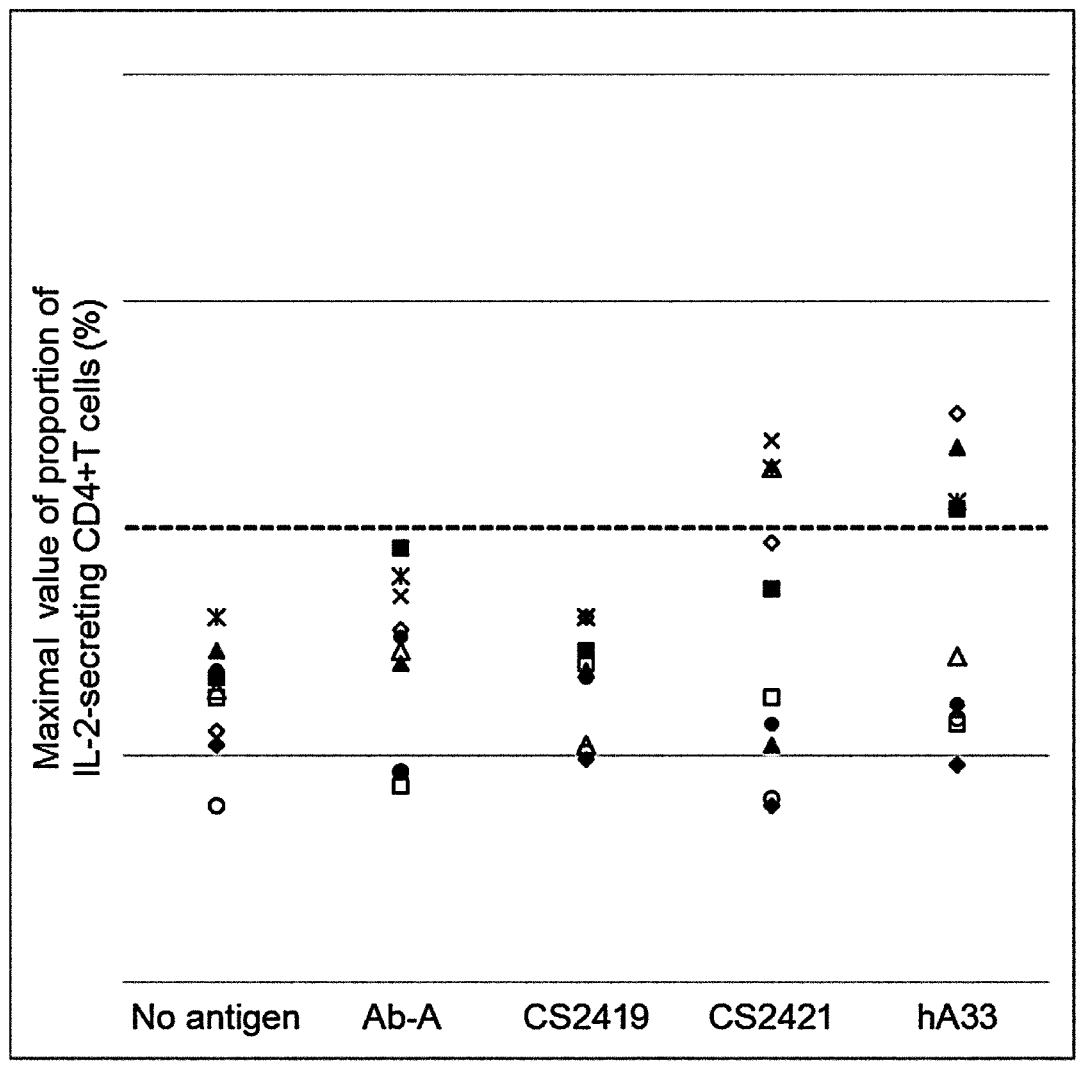

FIG. 24. A chart showing the maximum value of the proportion of IL-2-secreting CD4+ T cells in CD8-CD25low PBMCs cultured for 67 hours in the presence of each of the test substances including negative control and positive control. The data shows the maximum values of the proportions of IL-2-secreting CD4+ T cells for the respective donors from whom the used PBMCs are derived. No antigen shows the result from the study control when culturing was performed in the absence of a test substance. The dotted line shows positive threshold.

Figure 25:
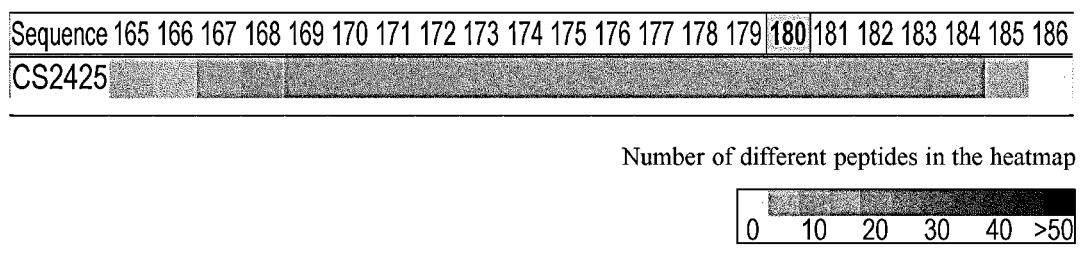

FIG. 25. A chart showing heatmaps of the number of the peptides per amino acid position identified for a part of the light chain of CS2425 by MAPPs. The number of the identified peptides per amino acid position for the region are shown in heatmaps in which the cell colors represent the number of identified peptides (see key). Peptide-MHC II complexes were obtained from CS2425-pulsed DCs differentiated from monocytes.

Figure 26:
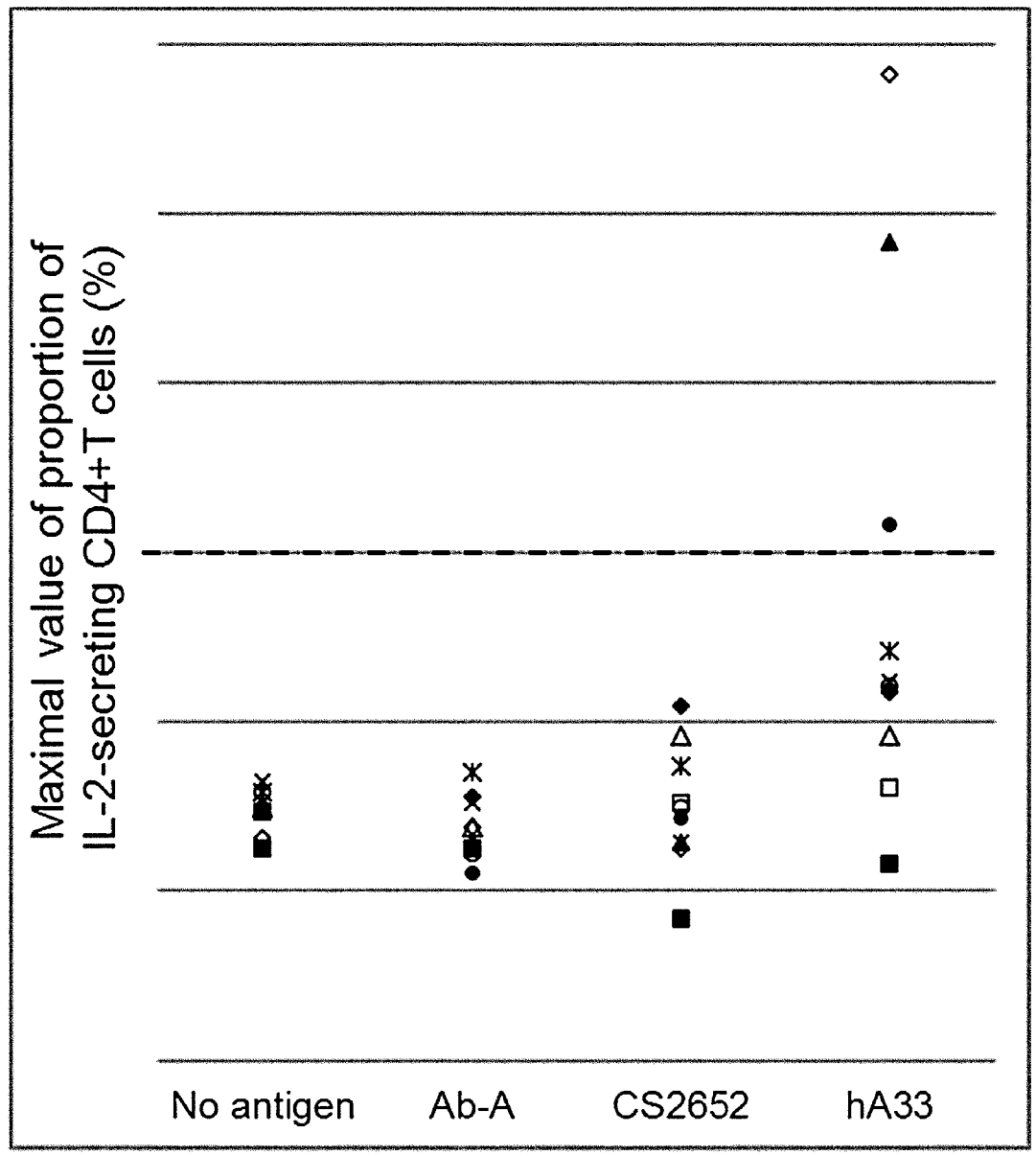

FIG. 26. A chart showing the maximum value of the proportion of IL-2-secreting CD4+ T cells in CD8-CD25low PBMCs cultured for 67 hours in the presence of each of the test substances including negative control and positive control. The data shows the maximum values of the proportions of IL-2-secreting CD4+ T cells for the respective donors from whom the used PBMCs are derived. No antigen shows the result from the study control when culturing was performed in the absence of a test substance. The dotted line shows positive threshold.

Figure 27:
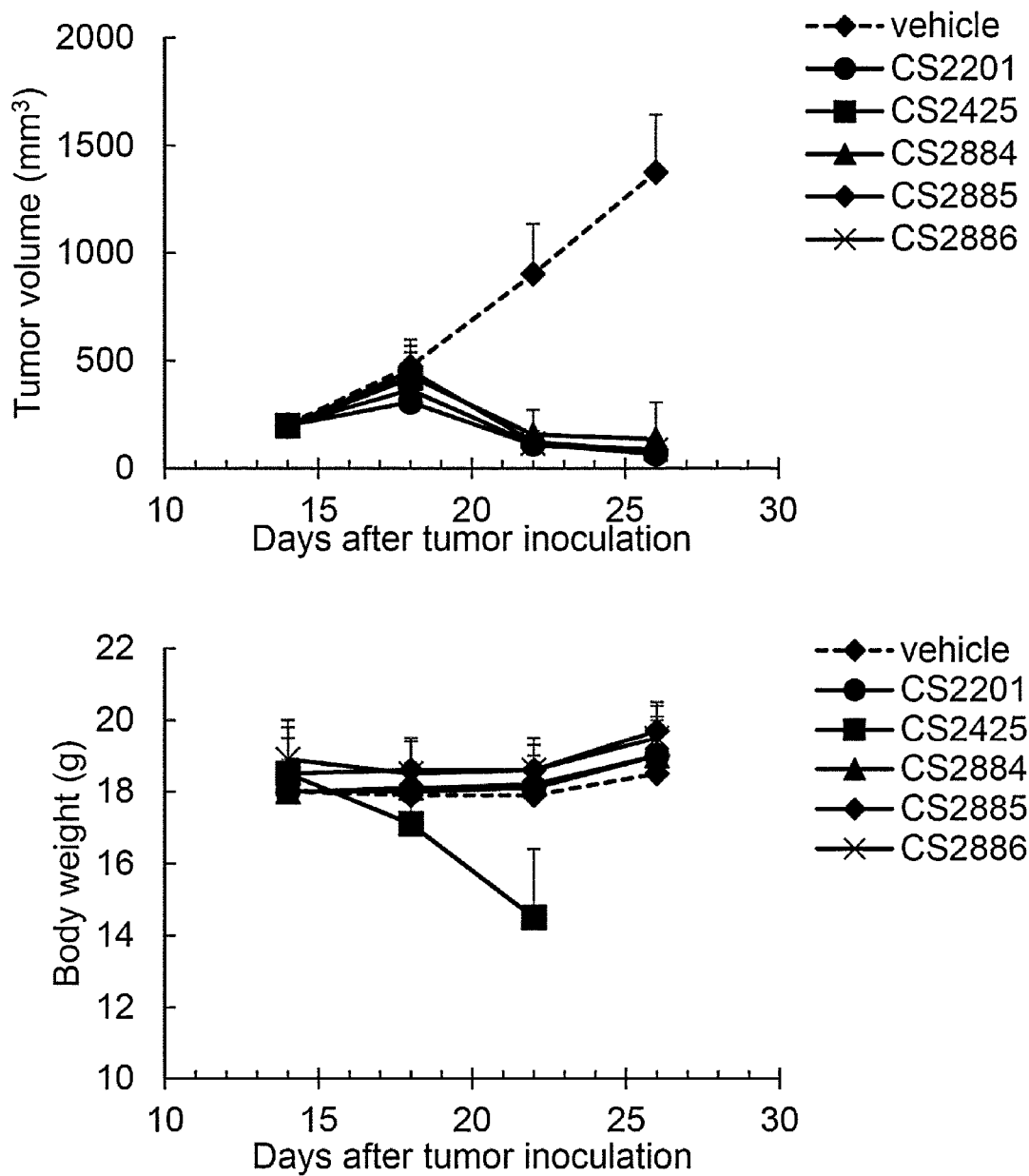

FIG. 27. In vivo anti-tumor efficacy in mice treated with the anti-CLDN6/CD3 bispecific antibodies CS2201, CS2425, CS2884, CS2885, and CS2886 in OV-90 T cell injection model. A single dose of 5 mg/kg of each anti-CLDN6/CD3 bispecific antibody was administered intravenously on day 15 after the tumor inoculation. The tumor volume (upper) and body weight (lower) were examined in mice after single administration of 5 mg/kg of each antibodies.

Figure 28:
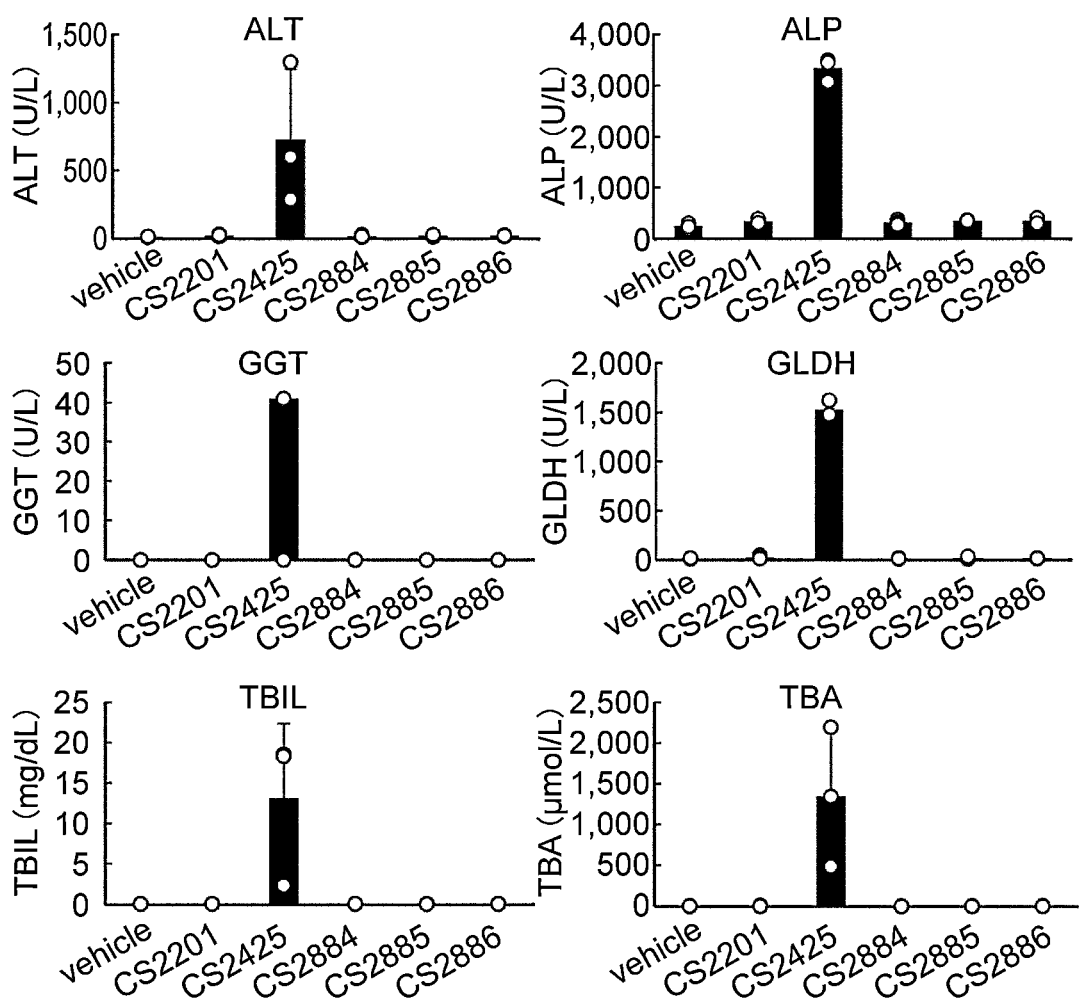

FIG. 28. Plasma level of liver injury markers in mice treated with the anti-CLDN6/CD3 bispecific antibodies CS2201, CS2425, CS2884, CS2885, and CS2886 in OV-90 T cell injection model as shown in FIG. 27. Plasma ALT, GGT, TBIL, ALP, GLDH, and TBA levels were evaluated in mice after treatment of each anti-CLDN6/CD3 bispecific antibodies. The vertical axis indicates concentration of ALT, GGT, TBIL, ALP, GLDH, and TBA in mouse plasma after administration of 5 mg/kg of each anti-CLDN6/CD3 bispecific antibody or vehicle.

Figure 29:
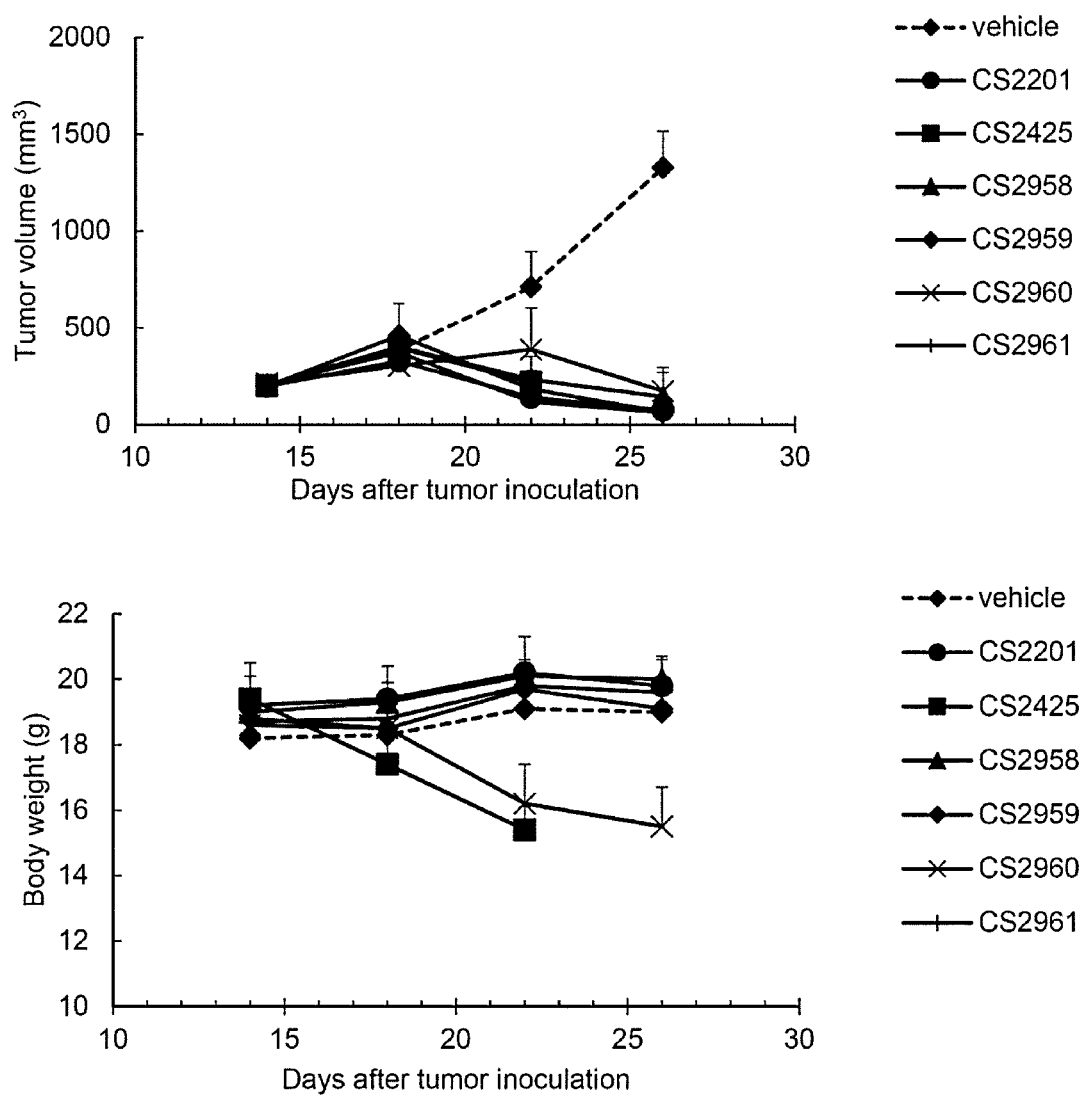

FIG. 29. In vivo anti-tumor efficacy in mice treated with the anti-CLDN6/CD3 bispecific antibodies CS2201, CS2425, CS2958, CS2959, CS2960, and CS2961 in OV-90 T cell injection model. A single dose of 5 mg/kg of each anti-CLDN6/CD3 bispecific antibody was administered intravenously on day 15 after the tumor inoculation. The tumor volume (upper) and body weight (lower) were examined in mice after single administration of 5 mg/kg of each antibody.

Figure 30:
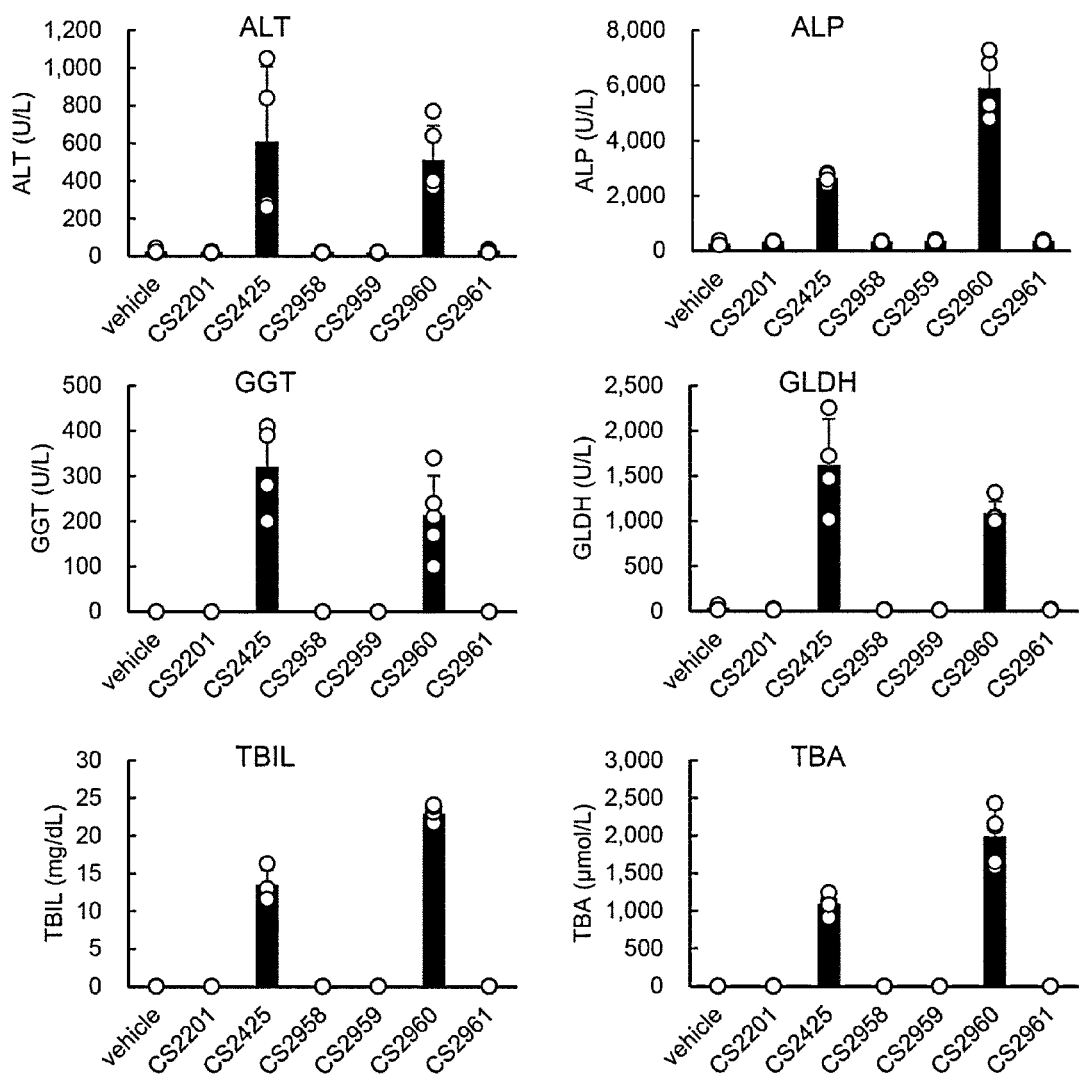

FIG. 30. Plasma level of liver injury markers in mice treated with the anti-CLDN6/CD3 bispecific antibodies CS2201, CS2425, CS2958, CS2959, CS2960, and CS2961 in OV-90 T cell injection model as shown in FIG. 29. Plasma ALT, GGT, TBIL, ALP, GLDH, and TBA levels were evaluated in mice after treatment of each anti-CLDN6/CD3 bispecific antibodies. The vertical axis indicates concentration of ALT, GGT, TBIL, ALP, GLDH, and TBA in mouse plasma after administration of 5 mg/kg of each anti-CLDN6/CD3 bispecific antibody or vehicle.

Figure 31:
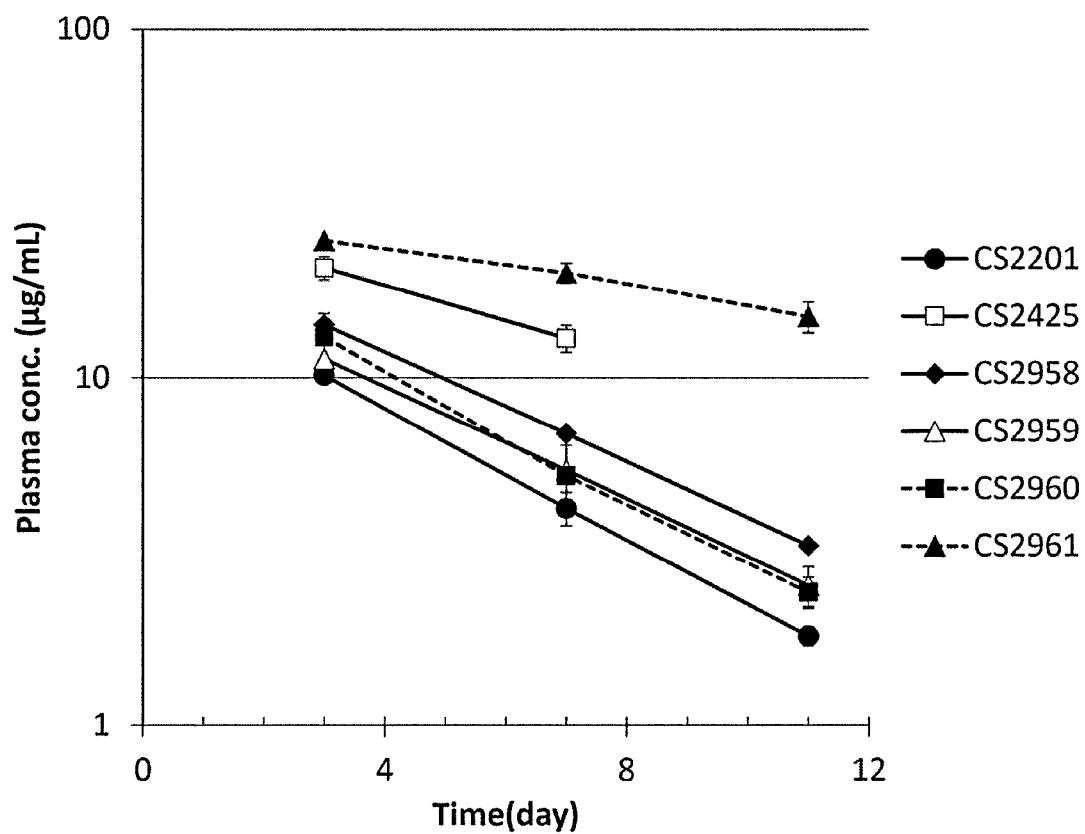

FIG. 31. The temporal change of the concentration of the anti-CLDN6/CD3 bispecific antibodies CS2201, CS2425, CS2958, CS2959, CS2960, and CS2961 in OV-90 T cell injection model as described in FIG. 29. The vertical axis indicates the antibody concentration (micro g/mL) in the mouse plasma and the horizontal axis indicates days after treatment.

Figure 32:
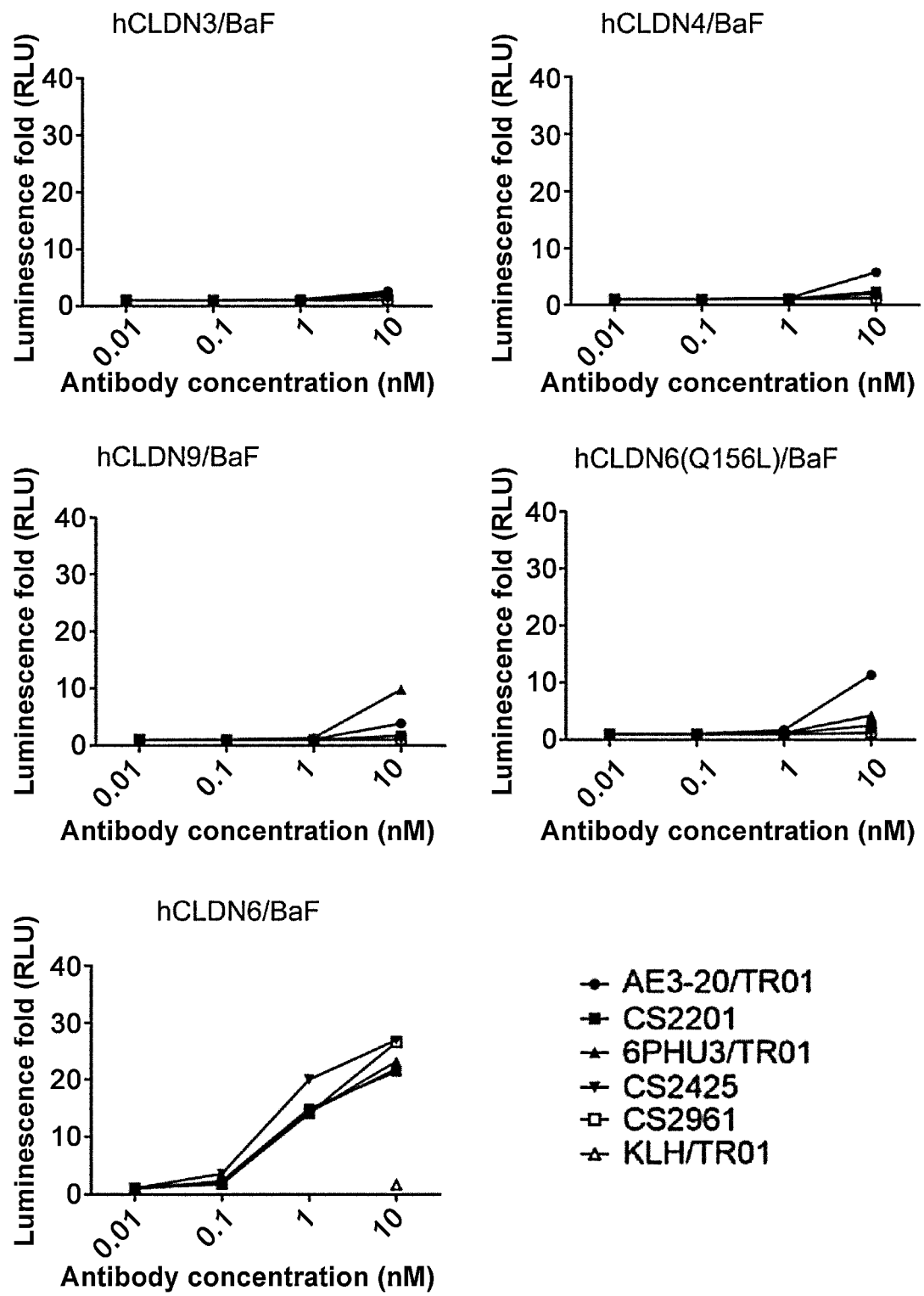

FIG. 32. T cell activation activity of various concentrations of anti-CLDN6/CD3 bispecific antibodies (AE3-20/TR01, CS2201, 6PHU3/TR01, CS2425 and CS2961) in the presence of hCLDN6/BaF, hCLDN3/BaF, hCLDN4/BaF, hCLDN9/BaF, or hCLDN6(Q156L)/BaF determined by T Cell Activation Bioassay using GloResponse™ NFAT-luc2 Jurkat cells. The vertical axis indicates the luminescence fold of antibody containing well compared with well without antibody. KLH/TR01 was used as a negative control.

Figure 33:
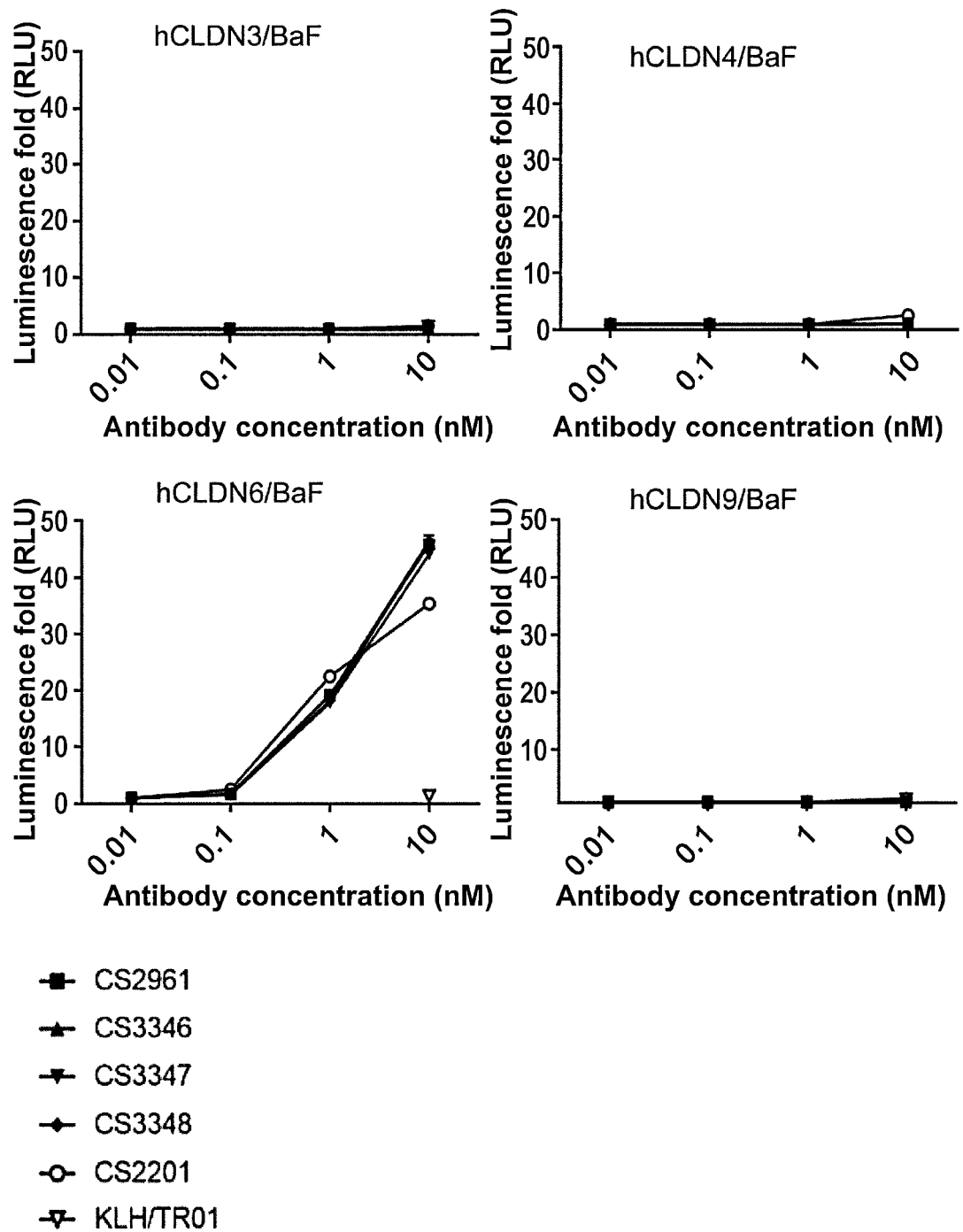

FIG. 33. T cell activation activity of various concentrations of anti-CLDN6/CD3 bispecific antibodies (CS2201, CS2961, CS3346, CS3347, and CS3348) in the presence of hCLDN6/BaF, hCLDN3/BaF, hCLDN4/BaF or hCLDN9/BaF determined by T Cell Activation Bioassay using GloResponse™ NFAT-luc2 Jurkat cells. The vertical axis indicates the luminescence fold of antibody containing well compared with well without antibody. KLH/TR01 was used as a negative control.

FIG. 34. T-cell-dependent cell cytotoxicity of anti-CLDN6/CD3 bispecific antibodies (AE3-20/TR01, CS2201, 6PHU3/TR01, CS2425, CS2961, CS3346, CS3347, and CS3348) against OVCAR3 ovarian cancer cell line expressing CLDN6 determined by LDH assay. The vertical axis indicates the percentage of cell lysis and the horizontal axis indicates the concentration of anti-CLDN6/CD3 bispecific antibodies. KLH/TR01 was used as a negative control.

Figures 1, 35:
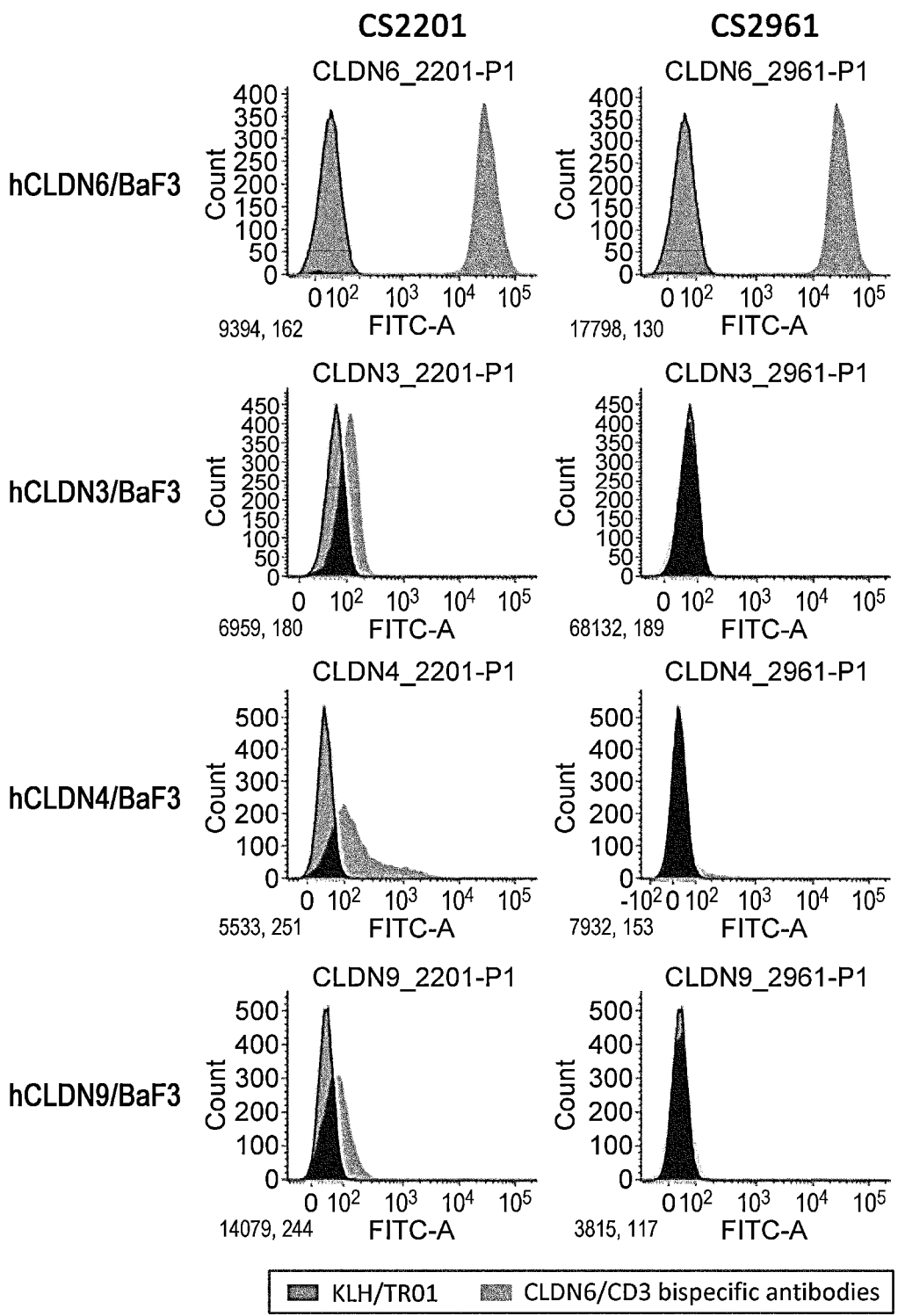
Figures 2, 35:
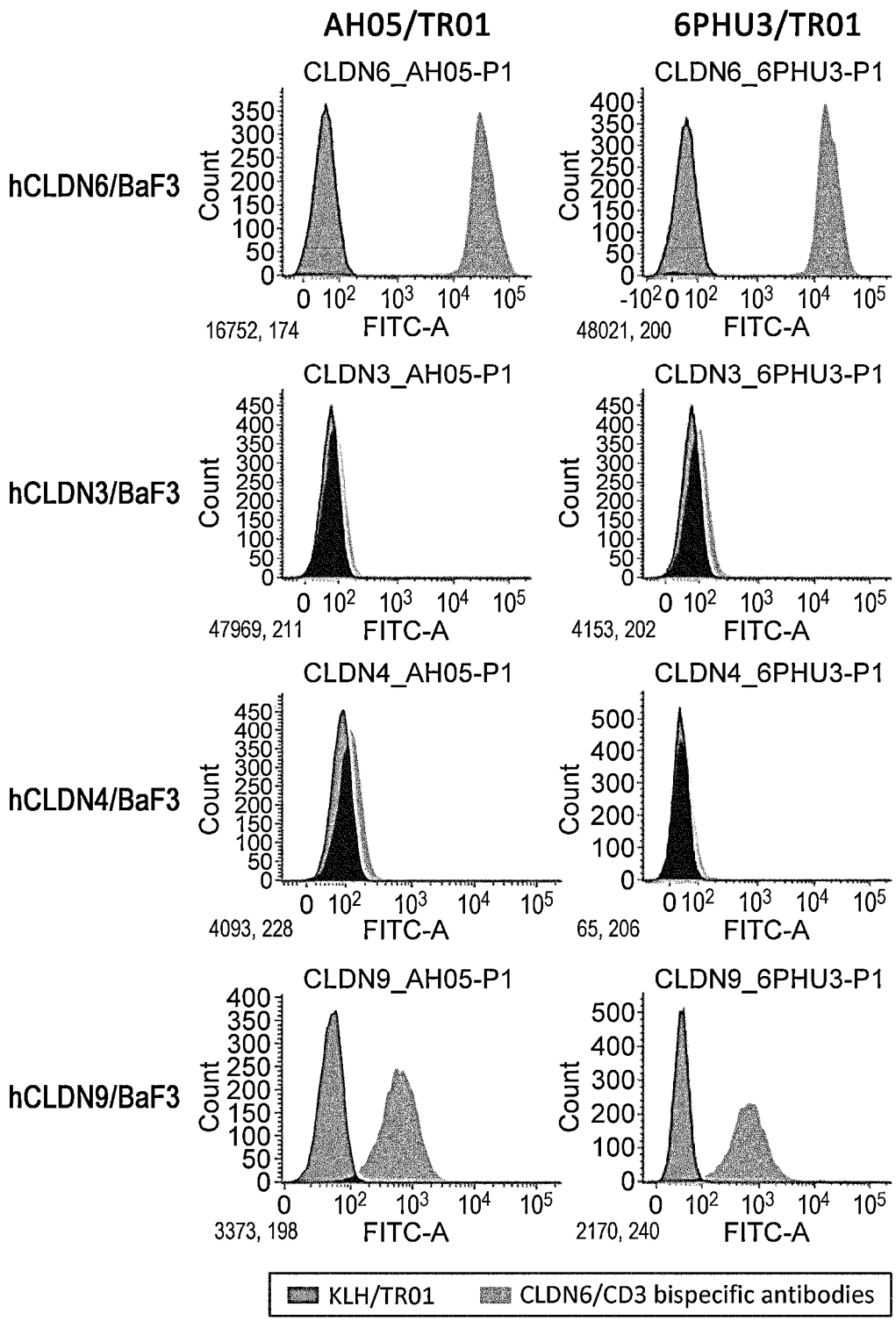

FIG. 35-1. Binding activity of anti-CLDN6/CD3 bispecific antibodies (CS2201, CS2961, AH05/TR01, and 6PHU3/TR01) to human CLDN family proteins (CLDN3, CLDN4, CLDN6, and CLDN9). Binding activity of anti-CLDN6/CD3 bispecific antibodies to BaF3 transfectants (hCLDN6/BaF, hCLDN3/BaF, hCLDN4/BaF, and hCLDN9/BaF) was examined by flow cytometer in a concentration of 15 micro g/ml, and plotted as histogram. KLH/TR01 was used as a negative control. The specificity of CS2961 to human CLDN6 was highest among the tested antibodies.

FIG. 35-2. Continuation of FIG. 35-1.

Figure 36:
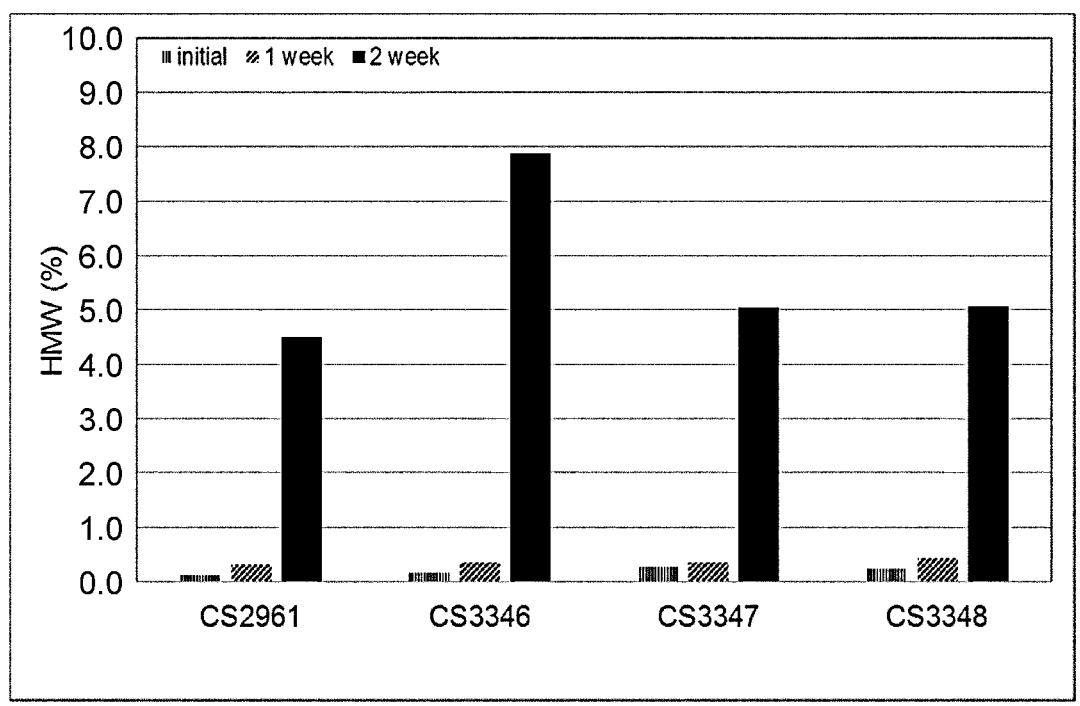

FIG. 36. HMW species formation of anti-CLDN6/CD3 bispecific antibodies after storage at 40 degrees C. The vertical axis indicates percentage of HMW species in total peak area of each sample.

Figure 37:
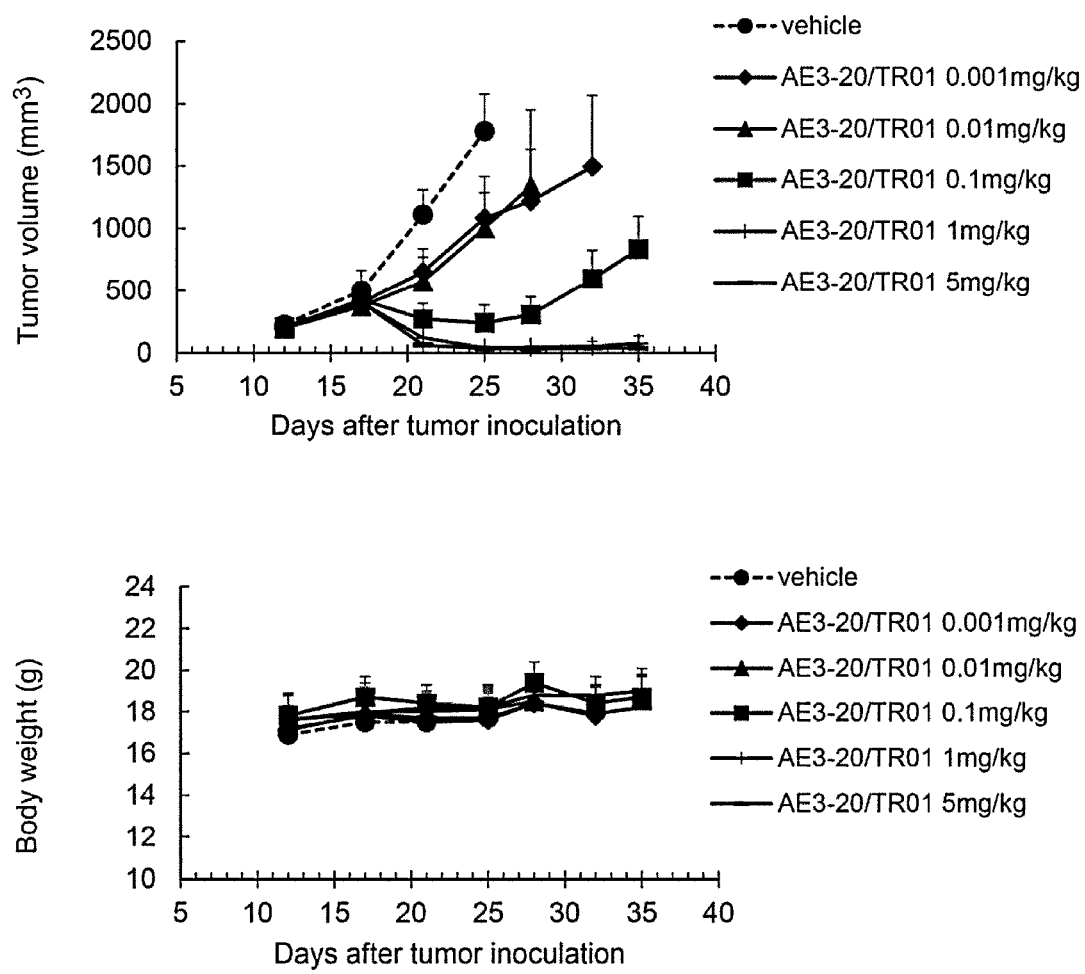

FIG. 37. In vivo dose-dependent anti-tumor efficacy of the anti-CLDN6/CD3 bispecific antibody in OV-90 T cell injection model. A single dose ranging from 0.001 to 5 mg/kg of AE3-20/TR01 was administered intravenously 14 days after the tumor inoculation. The tumor volume changes (upper) and body weight changes (lower) are shown respectively.

Figure 38:
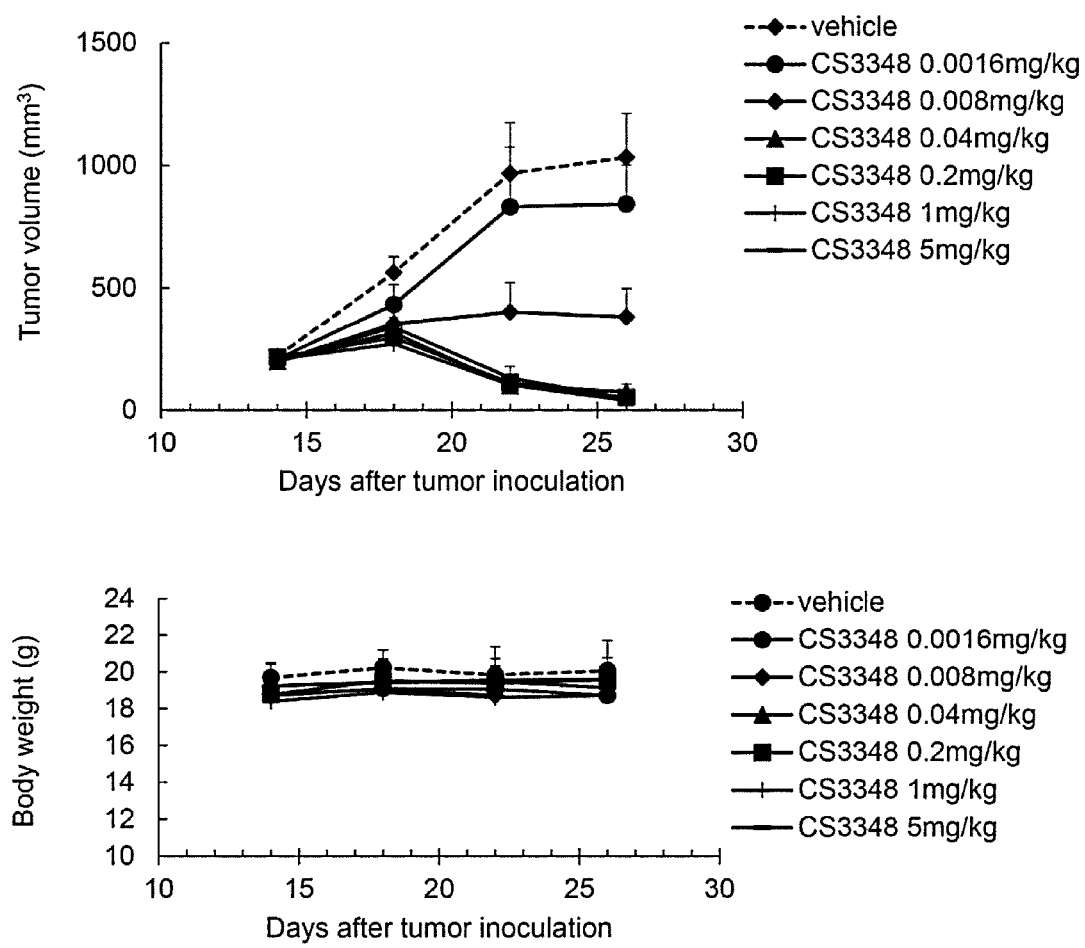

FIG. 38. In vivo dose-dependent anti-tumor efficacy of the anti-CLDN6/CD3 bispecific antibody in OV-90 T cell injection model. A single dose ranging from 0.0016 to 5 mg/kg of CS3348 was administered intravenously 15 days after the tumor inoculation. The tumor volume changes (upper) and body weight changes (lower) are shown respectively.

FIG. 39. Amino acid sequence alignment of human CLDN9 and human CLDN6. Human CLDN9 and human CLDN6 comprises almost the same sequence in extracellular domain 1, except the N-terminus residue (Met/Leu at position 29). Two amino acids in extracellular domain 2 are different in human CLDN9 and human CLDN6 (Arg/Leu at position 145 and Gln/Leu at position 156).

Figure 40:
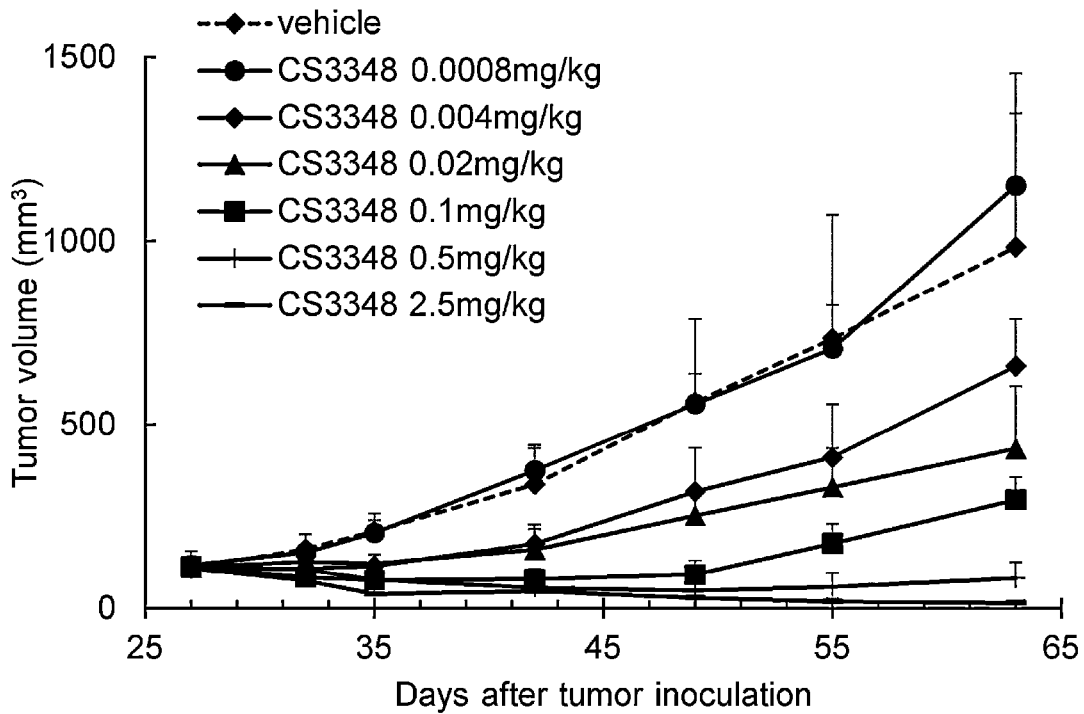

FIG. 40. Anti-tumor efficacy of the anti-CLDN6/CD3 bispecific antibody CS3348 in OVCAR-3 bearing T cell injection model (TK220001)

Figure 41:
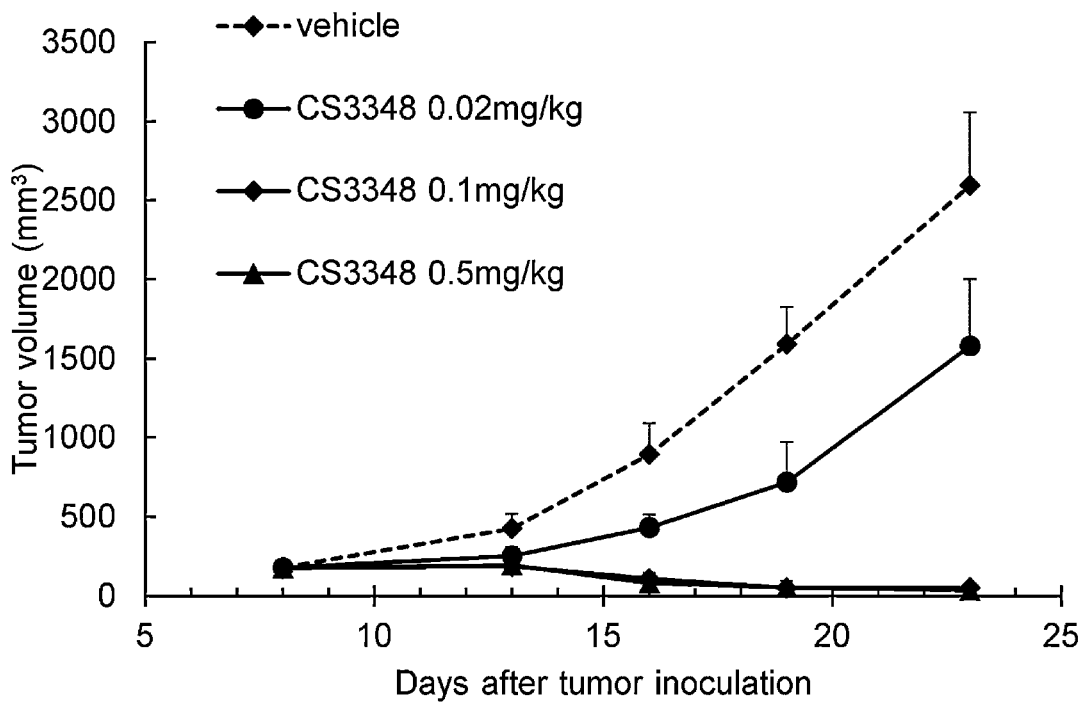

FIG. 41. Anti-tumor efficacy of the anti-CLDN6/CD3 bispecific antibody CS3348 in NCI-H1435 bearing T cell injection model (TK219005)

Figure 42:
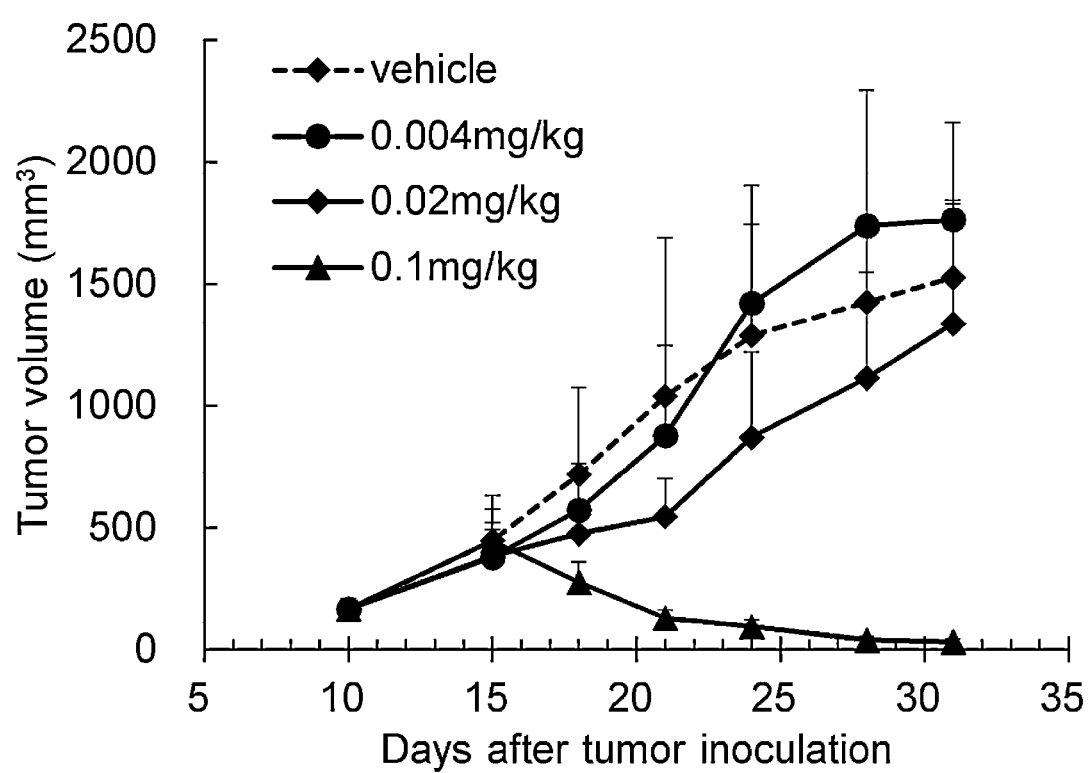

FIG. 42. Anti-tumor efficacy of the anti-CLDN6/CD3 bispecific antibody CS3348 in NUGC-3 bearing T cell injection model (TK220003)

DESCRIPTION OF EMBODIMENTS

The techniques and procedures described or referenced herein are generally well understood and commonly employed using conventional methodology by those skilled in the art, such as, for example, the widely utilized methodologies described in Sambrook et al., Molecular Cloning: A Laboratory Manual 3d edition (2001) Cold Spring Harbor Laboratory Press, Cold Spring Harbor, N.Y.; Current Protocols in Molecular Biology (F. M. Ausubel, et al. eds., (2003)); the series Methods in Enzymology (Academic Press, Inc.): PCR 2: A Practical Approach (M. J. MacPherson, B. D. Hames and G. R. Taylor eds. (1995)), Harlow and Lane, eds. (1988) Antibodies, A Laboratory Manual, and Animal Cell Culture (R. I. Freshney, ed. (1987)); Oligonucleotide Synthesis (M. J. Gait, ed., 1984); Methods in Molecular Biology, Humana Press; Cell Biology: A Laboratory Notebook (J. E. Cellis, ed., 1998) Academic Press; Animal Cell Culture (R. I. Freshney), ed., 1987); Introduction to Cell and Tissue Culture (J. P. Mather and P. E. Roberts, 1998) Plenum Press; Cell and Tissue Culture: Laboratory Procedures (A. Doyle, J. B. Griffiths, and D. G. Newell, eds., 1993-8) J. Wiley and Sons; Handbook of Experimental Immunology (D. M. Weir and C. C. Blackwell, eds.); Gene Transfer Vectors for Mammalian Cells (J. M. Miller and M. P. Calos, eds., 1987); PCR: The Polymerase Chain Reaction, (Mullis et al., eds., 1994); Current Protocols in Immunology (J. E. Coligan et al., eds., 1991); Short Protocols in Molecular Biology (Wiley and Sons, 1999); Immunobiology (C. A. Janeway and P. Travers, 1997); Antibodies (P. Finch, 1997); Antibodies: A Practical Approach (D. Catty., ed., IRL Press, 1988-1989); Monoclonal Antibodies: A Practical Approach (P. Shepherd and C. Dean, eds., Oxford University Press, 2000); Using Antibodies: A Laboratory Manual (E. Harlow and D. Lane (Cold Spring Harbor Laboratory Press, 1999); The Antibodies (M. Zanetti and J. D. Capra, eds., Harwood Academic Publishers, 1995); and Cancer: Principles and Practice of Oncology (V. T. DeVita et al., eds., J.B. Lippincott Company, 1993).

The definitions and detailed description below are provided to facilitate understanding of the present disclosure illustrated herein.

Definitions

Amino Acids

Herein, amino acids are described by one- or three-letter codes or both, for example, Ala/A, Leu/L, Arg/R, Lys/K, Asn/N, Met/M, Asp/D, Phe/F, Cys/C, Pro/P, Gln/Q, Ser/S, Glu/E, Thr/T, Gly/G, Trp/W, His/H, Tyr/Y, Ile/I, or Val/V.

Alteration of Amino Acids

For amino acid alteration (also described as "amino acid substitution" within this description) in the amino acid sequence of an antigen-binding molecule, known methods such as site-directed mutagenesis methods (Kunkel et al. (Proc. Natl. Acad. Sci. USA (1985) 82, 488-492)) and overlap extension PCR may be appropriately employed. Furthermore, several known methods may also be employed as amino acid alteration methods for substitution to non-natural amino acids (Annu Rev. Biophys. Biomol. Struct. (2006) 35, 225-249; and Proc. Natl. Acad. Sci. U.S.A. (2003) 100 (11), 6353-6357). For example, it is suitable to use a cell-free translation system (Clover Direct (Protein Express)) containing a tRNA which has a non-natural amino acid bound to a complementary amber suppressor tRNA of one of the stop codons, the UAG codon (amber codon).

In the present specification, the meaning of the term "and/or" when describing the site of amino acid alteration includes every combination where "and" and "or" are suitably combined. Specifically, for example, "the amino acids at positions 33, 55, and/or 96 are substituted" includes the following variation of amino acid alterations: amino acid(s) at (a) position 33, (b) position 55, (c) position 96, (d) positions 33 and 55, (e) positions 33 and 96, (f) positions 55 and 96, and (g) positions 33, 55, and 96.

Furthermore, herein, as an expression showing alteration of amino acids, an expression that shows before and after a number indicating a specific position, one-letter or three-letter codes for amino acids before and after alteration, respectively, may be used appropriately. For example, the alteration N100bL or Asn100bLeu used when substituting an amino acid contained in an antibody variable region indicates substitution of Asn at position 100b (according to Kabat numbering) with Leu. That is, the number shows the amino acid position according to Kabat numbering, the one-letter or three-letter amino-acid code written before the number shows the amino acid before substitution, and the one-letter or three-letter amino-acid code written after the number shows the amino acid after substitution. Similarly the alteration P238D or Pro238Asp used when substituting an amino acid of the Fc region contained in an antibody constant region indicates substitution of Pro at position 238 (according to EU numbering) with Asp. That is, the number shows the amino acid position according to EU numbering, the one-letter or three-letter amino-acid code written before the number shows the amino acid before substitution, and the one-letter or three-letter amino-acid code written after the number shows the amino acid after substitution.

Antigen-Binding Molecule

The term "antigen-binding molecule", as used herein, refers to any molecule that comprises an antigen-binding site or any molecule that has binding activity to an antigen, and may further refers to molecules such as a peptide or protein having a length of about five amino acids or more. The peptide and protein are not limited to those derived from a living organism, and for example, they may be a polypeptide produced from an artificially designed sequence. They may also be any of a naturally-occurring polypeptide, synthetic polypeptide, recombinant polypeptide, and such. Scaffold molecules comprising known stable conformational structure such as alpha/beta barrel as scaffold, and in which part of the molecule is made into antigen-binding site, is also one embodiment of the antigen binding molecule described herein.

Claudin-6 (CLDN6) and Other Claudin Family Proteins

The term "CLDN6", as used herein, refers to any native Claudin-6 from any vertebrate source, including mammals such as primates (e.g. humans) and rodents (e.g., mice and rats), unless otherwise indicated. The amino acid sequence of human CLDN6 (hCLDN6) is shown in SEQ ID NO: 125 or 126, and the amino acid sequence of mouse CLDN6 (mCLDN6) is shown in SEQ ID NO: 130.

There are many other proteins within Claudin family other than CLDN6, such as CLDN3, CLDN4, and CLDN9. The amino acid sequences of human CLDN3 (hCLDN3), human CLDN4 (hCLDN4) and human CLDN9 (hCLDN9) are shown in SEQ ID NOs: 128, 129 and 127, respectively. The amino acid sequences of mouse CLDN3 (mCLDN3), mouse CLDN4 (mCLDN4) and mouse CLDN9 (mCLDN9) are shown in SEQ ID NOs: 132, 133 and 131, respectively.

Binding Activity Towards CLDN6

The binding activity towards CLDN6 described herein refers to a specific binding activity towards the CLDN6 protein described herein, or the whole or a portion of a partial peptide of the CLDN6 protein.

In certain embodiments, binding activity towards CLDN6 is the binding activity towards the first extracellular domain of CLDN6 (amino acids 29-81 of SEQ ID NO: 125 or 126) or the second extracellular domain of CLDN6 (amino acids 138-159 of SEQ ID NO: 125 or 126). In certain embodiments, binding activity towards CLDN6 is the binding activity towards human CLDN6 expressed on the surface of eukaryotic cells. In certain embodiments, binding activity towards CLDN6 is the binding activity towards the CLDN6 protein expressed on the surface of cancer cells.

Binding Activity Towards T Cell Receptor Complex

The binding activity towards T cell receptor complex as used herein refers to the binding activity towards the whole or a portion of a partial peptide of a T cell receptor complex. The T cell receptor complex may be a T cell receptor itself, or an adaptor molecule constituting a T cell receptor complex along with a T cell receptor. CD3 is suitable as an adaptor molecule.

The binding activity towards T cell receptor as used herein refers to the binding activity towards the whole or a portion of a partial peptide of a T cell receptor. The portion of a T cell receptor may be a variable region of the T cell receptor or a constant region of the T cell receptor; however, an epitope present in the constant region is preferred. Examples of the constant region sequence include the T cell receptor alpha chain of RefSeq Accession No. CAA26636.1 (SEQ ID NO: 135), the T cell receptor beta chain of RefSeq Accession No. C25777 (SEQ ID NO: 136), the T cell receptor gamma 1 chain of RefSeq Accession No. A26659 (SEQ ID NO: 137), the T cell receptor gamma 2 chain of RefSeq Accession No. AAB63312.1 (SEQ ID NO: 138), and the T cell receptor delta chain of RefSeq Accession No. AAA61033.1 (SEQ ID NO: 139).

The binding activity towards CD3 as used herein refers to the binding activity towards to the whole or a portion of a partial peptide of CD3. The portion of CD3 may be any epitope exists in the gamma-chain, delta-chain, or epsilon-chain sequence that constitutes human CD3. Regarding the structure of the gamma chain, delta chain, or epsilon chain constituting CD3, their polynucleotide sequences are disclosed in RefSeq Accession NOs. NM_000073.2, NM_000732.4 and NM_000733.3, and their polypeptide sequences are shown in SEQ ID NOs: 140 (NP_000064.1), 141 (NP_000723.1), and 142 (NP_000724.1), wherein the RefSeq accession numbers are shown in parentheses.

Affinity

"Affinity" refers to the strength of the sum total of noncovalent interactions between a single binding site of a molecule (e.g., an antigen-binding molecule or antibody) and its binding partner (e.g., an antigen). Unless indicated otherwise, as used herein, "binding affinity" refers to intrinsic binding affinity which reflects a 1:1 interaction between members of a binding pair (e.g., antigen-binding molecule and antigen, or antibody and antigen). The affinity of a molecule X for its partner Y can generally be represented by the dissociation constant (Kd). Affinity can be measured by common methods known in the art, including those as described herein. Specific illustrative and exemplary embodiments for measuring binding affinity are described in the following.

Methods to Determine Affinity

In certain embodiments, the antigen-binding molecule or antibody provided herein has a dissociation constant (Kd) of 1 micro M or less, 120 nM or less, 100 nM or less, 80 nM or less, 70 nM or less, 50 nM or less, 40 nM or less, 30 nM or less, 20 nM or less, 10 nM or less, 2 nM or less, 1 nM or less, 0.1 nM or less, 0.01 nM or less, or 0.001 nM or less (e.g., 10-8 M or less, 10-8 M to 10-13 M, 10-9 M to 10-13 M) for its antigen. In certain embodiments, the Kd value of the antibody/antigen-binding molecule for CLDN6 falls within the range of 1-40, 1-50, 1-70, 1-80, 30-50, 30-70, 30-80, 40-70, 40-80, or 60-80 nM.

In one embodiment, Kd is measured by a radiolabeled antigen-binding assay (RIA). In one embodiment, an RIA is performed with the Fab version of an antibody of interest and its antigen. For example, solution binding affinity of Fabs for antigen is measured by equilibrating Fab with a minimal concentration of (125I)-labeled antigen in the presence of a titration series of unlabeled antigen, then capturing bound antigen with an anti-Fab antibody-coated plate (see, e.g., Chen et al., J. Mol. Biol. 293:865-881(1999)). To establish conditions for the assay, MICROTITER (registered trademark) multi-well plates (Thermo Scientific) are coated overnight with 5 micro g/ml of a capturing anti-Fab antibody (Cappel Labs) in 50 mM sodium carbonate (pH 9.6), and subsequently blocked with 2% (w/v) bovine serum albumin in PBS for two to five hours at room temperature (approximately 23 degrees C.). In a non-adsorbent plate (Nunc #269620), 100 pM or 26 pM [125I]-antigen are mixed with serial dilutions of a Fab of interest (e.g., consistent with assessment of the anti-VEGF antibody, Fab-12, in Presta et al., Cancer Res. 57:4593-4599 (1997)). The Fab of interest is then incubated overnight; however, the incubation may continue for a longer period (e.g., about 65 hours) to ensure that equilibrium is reached. Thereafter, the mixtures are transferred to the capture plate for incubation at room temperature (e.g., for one hour). The solution is then removed and the plate washed eight times with 0.1% polysorbate 20 (TWEEN-20 (registered trademark)) in PBS. When the plates have dried, 150 micro 1/well of scintillant (MICROSCINT-20 ™; Packard) is added, and the plates are counted on a TOPCOUNT™ gamma counter (Packard) for ten minutes. Concentrations of each Fab that give less than or equal to 20% of maximal binding are chosen for use in competitive binding assays.

According to another embodiment, Kd is measured using a BIACORE (registered trademark) surface plasmon resonance assay. For example, an assay using a BIACORE (registered trademark)-2000 or a BIACORE (registered trademark)-3000 (BIAcore, Inc., Piscataway, NJ) is performed at 25 degrees C. with immobilized antigen CM5 chips at ~10 response units (RU). In one embodiment, carboxymethylated dextran biosensor chips (CM5, BIACORE, Inc.) are activated with N-ethyl-N'-(3-dimethylaminopropyl)-carbodiimide hydrochloride (EDC) and N-hydroxysuccinimide (NHS) according to the supplier's instructions. Antigen is diluted with 10 mM sodium acetate, pH 4.8, to 5 micro g/ml (~0.2 micro M) before injection at a flow rate of 5 micro 1/minute to achieve approximately 10 response units (RU) of coupled protein. Following the injection of antigen, 1 M ethanolamine is injected to block unreacted groups. For kinetics measurements, two-fold serial dilutions of Fab (0.78 nM to 500 nM) are injected in PBS with 0.05% polysorbate 20 (TWEEN-20™) surfactant (PBST) at 25 degrees C. at a flow rate of approximately 25 micro 1/min Association rates (kon) and dissociation rates (koff) are calculated using a simple one-to-one Langmuir binding model (BIACORE (registered trademark) Evaluation Software version 3.2) by simultaneously fitting the association and dissociation sensorgrams. The equilibrium dissociation constant (Kd) is calculated as the ratio koff/kon. See, e.g., Chen et al., J. Mol. Biol. 293:865-881 (1999). If the on-rate exceeds 106 M-1 s-1 by the surface plasmon resonance assay above, then the on-rate can be determined by using a fluorescent quenching technique that measures the increase or decrease in fluorescence emission intensity (excitation=295 nm; emission=340 nm, 16 nm band-pass) at 25 degrees C. of a 20 nM anti-antigen antibody (Fab form) in PBS, pH 7.2, in the presence of increasing concentrations of antigen as measured in a spectrometer, such as a stop-flow equipped spectrophotometer (Aviv Instruments) or a 8000-series SLM-AMINCO™ spectrophotometer (ThermoSpectronic) with a stirred cuvette.

According to the methods for measuring the affinity of the antigen-binding molecule or the antibody described above, persons skilled in art can carry out affinity measurement for other antigen-binding molecules or antibodies, towards various kind of antigens.

Antibody

The term "antibody" herein is used in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity.

Class of Antibody

The "class" of an antibody refers to the type of constant domain or constant region possessed by its heavy chain. There are five major classes of antibodies: IgA, IgD, IgE, IgG, and IgM, and several of these may be further divided into subclasses (isotypes), e.g., IgG1, IgG2, IgG3, IgG4, IgA1, and IgA2. The heavy chain constant domains that correspond to the different classes of immunoglobulins are called alpha, delta, epsilon, gamma, and mu, respectively.

Unless otherwise indicated, amino acid residues in the light chain constant region are numbered herein according to Kabat et al., and numbering of amino acid residues in the heavy chain constant region is according to the EU numbering system, also called the EU index, as described in Kabat et al., Sequences of Proteins of Immunological Interest, 5th Ed. Public Health Service, National Institutes of Health, Bethesda, MD, 1991.

Framework

"Framework" or "FR" refers to variable domain residues other than hypervariable region (HVR) residues. The FR of a variable domain generally consists of four FR domains: FR1, FR2, FR3, and FR4. Accordingly, the HVR and FR sequences generally appear in the following sequence in VH (or VL): FR1-H1(L1)-FR2-H2(L2)-FR3-H3(L3)-FR4.

Human Consensus Framework

A "human consensus framework" is a framework which represents the most commonly occurring amino acid residues in a selection of human immunoglobulin VL or VH framework sequences. Generally, the selection of human immunoglobulin VL or VH sequences is from a subgroup of variable domain sequences. Generally, the subgroup of sequences is a subgroup as in Kabat et al., Sequences of Proteins of Immunological Interest, Fifth Edition, NIH Publication 91-3242, Bethesda MD (1991), vols. 1-3. In one embodiment, for the VL, the subgroup is subgroup kappa I as in Kabat et al., supra. In one embodiment, for the VH, the subgroup is subgroup III as in Kabat et al., supra.

HVR

The term "hypervariable region" or "HVR" as used herein refers to each of the regions of an antibody variable domain which are hypervariable in sequence ("complementarity determining regions" or "CDRs") and/or form structurally defined loops ("hypervariable loops") and/or contain the antigen-contacting residues ("antigen contacts"). Generally, antibodies comprise six HVRs: three in the VH (H1, H2, H3), and three in the VL (L1, L2, L3). Exemplary HVRs herein include:

(a) hypervariable loops occurring at amino acid residues 26-32 (L1), 50-52 (L2), 91-96 (L3), 26-32 (H1), 53-55 (H2), and 96-101 (H3) (Chothia and Lesk, J. Mol. Biol. 196:901-917 (1987));

(b) CDRs occurring at amino acid residues 24-34 (L1), 50-56 (L2), 89-97 (L3), 31-35b (H1), 50-65 (H2), and 95-102 (H3) (Kabat et al., Sequences of Proteins of Immunological Interest, 5th Ed. Public Health Service, National Institutes of Health, Bethesda, MD (1991));

(c) antigen contacts occurring at amino acid residues 27c-36 (L1), 46-55 (L2), 89-96 (L3), 30-35b (H1), 47-58 (H2), and 93-101 (H3) (MacCallum et al. J. Mol. Biol. 262: 732-745 (1996)); and (d) combinations of (a), (b), and/or (c), including HVR amino acid residues 46-56 (L2), 47-56 (L2), 48-56 (L2), 49-56 (L2), 26-35 (H1), 26-35b (H1), 49-65 (H2), 93-102 (H3), and 94-102 (H3).

Unless otherwise indicated, HVR residues and other residues in the variable domain (e.g., FR residues) are numbered herein according to Kabat et al., supra.

HVR-H1, HVR-H2, HVR-H3, HVR-L1, HVR-L2, and HVR-L3 are also mentioned as "H-CDR1", "H-CDR2", "H-CDR3", "L-CDR1", "L-CDR2", and "L-CDR3", respectively.

Variable Region

The term "variable region" or "variable domain" refers to the domain of an antibody heavy or light chain that is involved in binding the antibody to antigen. The variable domains of the heavy chain and light chain (VH and VL, respectively) of a native antibody generally have similar structures, with each domain comprising four conserved framework regions (FRs) and three hypervariable regions (HVRs). (See, e.g., Kindt et al. Kuby Immunology, 6$^{th}$ ed., W.H. Freeman and Co., page 91 (2007).) A single VH or VL domain may be sufficient to confer antigen-binding specificity. Furthermore, antibodies that bind a particular antigen may be isolated using a VH or VL domain from an antibody that binds the antigen to screen a library of complementary VL or VH domains, respectively. See, e.g., Portolano et al., J. Immunol. 150:880-887 (1993); Clarkson et al., Nature 352:624-628 (1991).

Chimeric Antibody

The term "chimeric" antibody refers to an antibody in which a portion of the heavy and/or light chain is derived from a particular source or species, while the remainder of the heavy and/or light chain is derived from a different source or species. Similarly, the term "chimeric antibody variable domain" refers to an antibody variable region in which a portion of the heavy and/or light chain variable region is derived from a particular source or species, while the remainder of the heavy and/or light chain variable region is derived from a different source or species.

Humanized Antibody

A "humanized" antibody refers to a chimeric antibody comprising amino acid residues from non-human HVRs and amino acid residues from human FRs. In certain embodiments, a humanized antibody will comprise substantially all of at least one, and typically two, variable domains, in which all or substantially all of the HVRs (e.g., CDRs) correspond to those of a non-human antibody, and all or substantially all of the FRs correspond to those of a human antibody. A humanized antibody optionally may comprise at least a portion of an antibody constant region derived from a human antibody. A "humanized form" of an antibody, e.g., a non-human antibody, refers to an antibody that has undergone humanization. A "humanized antibody variable region" refers to the variable region of a humanized antibody.

Human Antibody

A "human antibody" is one which possesses an amino acid sequence which corresponds to that of an antibody produced by a human or a human cell or derived from a non-human source that utilizes human antibody repertoires or other human antibody-encoding sequences. This definition of a human antibody specifically excludes a humanized antibody comprising non-human antigen-binding residues. A "human antibody variable region" refers to the variable region of a human antibody.

Polynucleotide (Nucleic Acid)

"Polynucleotide" or "nucleic acid" as used interchangeably herein, refers to polymers of nucleotides of any length, and include DNA and RNA. The nucleotides can be deoxyribonucleotides, ribonucleotides, modified nucleotides or bases, and/or their analogs, or any substrate that can be incorporated into a polymer by DNA or RNA polymerase or by a synthetic reaction. A polynucleotide may comprise modified nucleotides, such as methylated nucleotides and their analogs. A sequence of nucleotides may be interrupted by non-nucleotide components. A polynucleotide may comprise modification(s) made after synthesis, such as conjugation to a label. Other types of modifications include, for example, "caps," substitution of one or more of the naturally occurring nucleotides with an analog, internucleotide modifications such as, for example, those with uncharged linkages (e.g., methyl phosphonates, phosphotriesters, phosphoramidates, carbamates, etc.) and with charged linkages (e.g., phosphorothioates, phosphorodithioates, etc.), those containing pendant moieties, such as, for example, proteins (e.g., nucleases, toxins, antibodies, signal peptides, poly-L-lysine, etc.), those with intercalators (e.g., acridine, psoralen, etc.), those containing chelators (e.g., metals, radioactive metals, boron, oxidative metals, etc.), those containing alkylators, those with modified linkages (e.g., alpha anomeric nucleic acids, etc.), as well as unmodified forms of the polynucleotides(s). Further, any of the hydroxyl groups ordinarily present in the sugars may be replaced, for example, by phosphonate groups, phosphate groups, protected by standard protecting groups, or activated to prepare additional linkages to additional nucleotides, or may be conjugated to solid or semi-solid supports. The 5' and 3' terminal OH can be phosphorylated or substituted with amines or organic capping group moieties of from 1 to 20 carbon atoms. Other hydroxyls may also be derivatized to standard protecting groups. Polynucleotides can also contain analogous forms of ribose or deoxyribose sugars that are generally known in the art, including, for example, 2'-O-methyl-, 2'-O-allyl-, 2'-fluoro- or 2'-azido-ribose, carbocyclic sugar analogs, alpha-anomeric sugars, epimeric sugars such as arabinose, xyloses or lyxoses, pyranose sugars, furanose sugars, sedoheptuloses, acyclic analogs, and basic nucleoside analogs such as methyl riboside. One or more phosphodiester linkages may be replaced by alternative linking groups. These alternative linking groups include, but are not limited to, embodiments wherein phosphate is replaced by P(O)S ("thioate"), P(S)S ("dithioate"), (O)NR2 ("amidate"), P(O)R, P(O)OR, CO, or CH2 ("formacetal"), in which each R or R' is independently H or substituted or unsubstituted alkyl (1-20 C) optionally containing an ether (—O—) linkage, aryl, alkenyl, cycloalkyl, cycloalkenyl or araldyl. Not all linkages in a polynucleotide need be identical. The preceding description applies to all polynucleotides referred to herein, including RNA and DNA.

Isolated (Nucleic Acid)

An "isolated" nucleic acid molecule is one which has been separated from a component of its natural environment. An isolated nucleic acid molecule further includes a nucleic acid molecule contained in cells that ordinarily contain the nucleic acid molecule, but the nucleic acid molecule is present extrachromosomally or at a chromosomal location that is different from its natural chromosomal location.

Vector

The term "vector," as used herein, refers to a nucleic acid molecule capable of propagating another nucleic acid to which it is linked. The term includes the vector as a self-replicating nucleic acid structure as well as the vector incorporated into the genome of a host cell into which it has been introduced. Certain vectors are capable of directing the expression of nucleic acids to which they are operatively linked. Such vectors are referred to herein as "expression vectors." Vectors could be introduced into host cells using virus or electroporation. However, introduction of vectors is not limited to in vitro method. For example, vectors could also be introduced into a subject using in vivo method directly.

Host Cell

The terms "host cell," "host cell line," and "host cell culture" are used interchangeably and refer to cells into which exogenous nucleic acid has been introduced, including the progeny of such cells. Host cells include "transformants" and "transformed cells," which include the primary transformed cell and progeny derived therefrom without regard to the number of passages. Progeny may not be completely identical in nucleic acid content to a parent cell, but may contain mutations. Mutant progeny that have the same function or biological activity as screened or selected for in the originally transformed cell are included herein.

Specificity

"Specific" means that a molecule that binds specifically to one or more binding partners does not show any significant binding to molecules other than the partners. Furthermore, "specific" is also used when an antigen-binding site is specific to a particular epitope of multiple epitopes contained in an antigen. If an antigen-binding molecule binds specifically to an antigen, it is also described as "the antigen-binding molecule has/shows specificity to/towards the antigen". When an epitope bound by an antigen-binding site is contained in multiple different antigens, an antigen-binding molecule containing the antigen-binding site can bind to various antigens that have the epitope.

Antibody Fragment

An "antibody fragment" refers to a molecule other than an intact antibody that comprises a portion of an intact antibody that binds the antigen to which the intact antibody binds. Examples of antibody fragments include but are not limited to Fv, Fab, Fab', Fab'-SH, F(ab')2; diabodies; linear antibodies; single-chain antibody molecules (e.g. scFv); and multispecific antibodies formed from antibody fragments.

The terms "full length antibody," "intact antibody," and "whole antibody" are used herein interchangeably to refer to an antibody having a structure substantially similar to a native antibody structure or having heavy chains that contain an Fc region as defined herein.

Variable Fragment (Fv)

Herein, the term "variable fragment (Fv)" refers to the minimum unit of an antibody-derived antigen-binding site that is composed of a pair of the antibody light chain variable region (VL) and antibody heavy chain variable region (VH). In 1988, Skerra and Pluckthun found that homogeneous and active antibodies can be prepared from the E. coli periplasm fraction by inserting an antibody gene downstream of a bacterial signal sequence and inducing expression of the gene in E. coli (Science (1988) 240(4855), 1038-1041). In the Fv prepared from the periplasm fraction, VH associates with VL in a manner so as to bind to an antigen.

scFv, Single-Chain Antibody, and Sc(Fv)2

Herein, the terms "scFv", "single-chain antibody", and "sc(Fv)2" all refer to an antibody fragment of a single polypeptide chain that contains variable regions derived from the heavy and light chains, but not the constant region. In general, a single-chain antibody also contains a polypeptide linker between the VH and VL domains, which enables formation of a desired structure that is thought to allow antigen-binding. The single-chain antibody is discussed in detail by Pluckthun in "The Pharmacology of Monoclonal Antibodies, Vol. 113, Rosenburg and Moore, eds., Springer-Verlag, New York, 269-315 (1994)". See also International Patent Publication WO 1988/001649; U.S. Pat. Nos. 4,946,778 and 5,260,203. In a particular embodiment, the single-chain antibody can be bispecific and/or humanized.

scFv is an single chain low molecule weight antibody in which VH and VL forming Fv are linked together by a peptide linker (Proc. Natl. Acad. Sci. U.S.A. (1988) 85(16), 5879-5883). VH and VL can be retained in close proximity by the peptide linker.

sc(Fv)2 is a single chain antibody in which four variable regions of two VL and two VH are linked by linkers such as peptide linkers to form a single chain (J Immunol. Methods (1999) 231(1-2), 177-189). The two VH and two VL may be derived from different monoclonal antibodies. Such sc(Fv)2 preferably includes, for example, a bispecific sc(Fv)2 that recognizes two epitopes present in a single antigen as disclosed in the Journal of Immunology (1994) 152(11), 5368-5374. sc(Fv)2 can be produced by methods known to those skilled in the art. For example, sc(Fv)2 can be produced by linking scFv by a linker such as a peptide linker.

Herein, an sc(Fv)$_2$ includes two VH units and two VL units which are arranged in the order of VH, VL, VH, and VL ([VH]-linker-[VL]-linker-[VH]-linker-[VL]) beginning from the N terminus of a single-chain polypeptide. The order of the two VH units and two VL units is not limited to the above form, and they may be arranged in any order. Examples of the form are listed below. [VL]-linker-[VH]-linker-[VH]-linker-[VL]   [VH]-linker-[VL]-linker-[VL]-linker-[VH]   [VH]-linker-[VH]-linker-[VL]-linker-[VL]   [VL]-linker-[VL]-linker-[VH]-linker-[VH]   [VL]-linker-[VH]-linker-[VL]-linker-[VH] [0065] The molecular form of sc(Fv)$_2$ is also described in detail in WO 2006/132352. According to these descriptions, those skilled in the art can appropriately prepare desired sc(Fv)2 to produce the polypeptide complexes disclosed herein.

Furthermore, the antigen-binding molecules or antibodies of the present disclosure may be conjugated with a carrier polymer such as PEG or an organic compound such as an anticancer agent. Alternatively, a sugar chain addition sequence is preferably inserted into the antigen-binding molecules or antibodies such that the sugar chain produces a desired effect.

The linkers to be used for linking the variable regions of an antibody comprise arbitrary peptide linkers that can be introduced by genetic engineering, synthetic linkers, and linkers disclosed in, for example, Protein Engineering, 9(3), 299-305, 1996. However, peptide linkers are preferred in the present disclosure. The length of the peptide linkers is not particularly limited, and can be suitably selected by those skilled in the art according to the purpose. The length is preferably five amino acids or more (without particular limitation, the upper limit is generally 30 amino acids or less, preferably 20 amino acids or less), and particularly preferably 15 amino acids. When sc(Fv)2 contains three peptide linkers, their length may be all the same or different.

For example, such peptide linkers include:

```
Ser

Gly Ser

Gly Gly Ser

Ser Gly Gly
                                    (SEQ ID NO: 147)
Gly Gly Gly Ser (SEQ ID NO: 148)
Ser Gly Gly Gly (SEQ ID NO: 149)
Gly Gly Gly Gly Ser (SEQ ID NO: 150)
Ser Gly Gly Gly Gly (SEQ ID NO: 151)
Gly Gly Gly Gly Gly Ser (SEQ ID NO: 152)
Ser Gly Gly Gly Gly Gly (SEQ ID NO: 153)
Gly Gly Gly Gly Gly Gly Ser (SEQ ID NO: 154)
Ser Gly Gly Gly Gly Gly Gly (Gly Gly Gly Gly Ser (SEQ ID NO: 149))n (Ser Gly Gly Gly Gly (SEQ ID NO: 150))n
``` where n is an integer of 1 or larger. The length or sequences of peptide linkers can be selected accordingly by those skilled in the art depending on the purpose.

Synthetic linkers (chemical crosslinking agents) are routinely used to crosslink peptides, and examples include:
N-hydroxy succinimide (NHS),
disuccinimidyl suberate (DSS),
bis(sulfosuccinimidyl) suberate (BS3),
dithiobis(succinimidyl propionate) (DSP),
dithiobis(sulfosuccinimidyl propionate) (DTSSP),
ethylene glycol bis(succinimidyl succinate) (EGS),
ethylene glycol bis(sulfosuccinimidyl succinate) (sulfo-EGS),
disuccinimidyl tartrate (DST), disulfosuccinimidyl tartrate (sulfo-DST),
bis[2-(succinimidoxycarbonyloxy)ethyl] sulfone (BSOCOES), and
bis[2-(sulfosuccinimidoxycarbonyloxy)ethyl] sulfone (sulfo-BSOCOES). These crosslinking agents are commercially available.

In general, three linkers are required to link four antibody variable regions together. The linkers to be used may be of the same type or different types.

Fab, F(ab')2, and Fab'

"Fab" consists of a single light chain, and a CH1 domain and variable region from a single heavy chain. The heavy chain of Fab molecule cannot form disulfide bonds with another heavy chain molecule.

"F(ab')2" or "Fab" is produced by treating an immunoglobulin (monoclonal antibody) with a protease such as pepsin and papain, and refers to an antibody fragment generated by digesting an immunoglobulin (monoclonal antibody) near the disulfide bonds present between the hinge regions in each of the two H chains. For example, papain cleaves IgG upstream of the disulfide bonds present between the hinge regions in each of the two H chains to generate two homologous antibody fragments, in which an L chain comprising VL (L-chain variable region) and CL (L-chain constant region) is linked to an H-chain fragment comprising VH (H-chain variable region) and CH gamma 1 (gamma 1 region in an H-chain constant region) via a disulfide bond at their C-terminal regions. Each of these two homologous antibody fragments is called Fab'.

"F(ab')$_2$" consists of two light chains and two heavy chains comprising the constant region of a CH1 domain and a portion of CH2 domains so that disulfide bonds are formed between the two heavy chains. The F(ab')$_2$ disclosed herein can be preferably produced as follows. A whole monoclonal antibody or such comprising a desired antigen-binding site is partially digested with a protease such as pepsin; and Fc fragments are removed by adsorption onto a Protein A column. The protease is not particularly limited, as long as it can cleave the whole antibody in a selective manner to produce F(ab')$_2$ under an appropriate setup enzyme reaction condition such as pH. Such proteases include, for example, pepsin and ficin.

Fc Region

The term "Fc region" or "Fc domain" herein is used to define a C-terminal region of an immunoglobulin heavy chain that contains at least a portion of the constant region. The term includes native sequence Fc regions and variant Fc regions. In one embodiment, a human IgG heavy chain Fc region extends from Cys226, or from Pro230, to the carboxyl-terminus of the heavy chain. However, the C-terminal lysine (Lys447) or glycine-lysine (residues 446-447) of the Fc region may or may not be present. Unless otherwise specified herein, numbering of amino acid residues in the Fc region or constant region is according to the EU numbering system, also called the EU index, as described in Kabat et al., Sequences of Proteins of Immunological Interest, 5th Ed. Public Health Service, National Institutes of Health, Bethesda, MD, 1991.

Fc Receptor

The term "Fc receptor" or "FcR" refers to a receptor that binds to the Fc region of an antibody. In some embodiments, an FcR is a native human FcR. In some embodiments, an FcR is one which binds an IgG antibody (a gamma receptor) and includes receptors of the Fc gamma RI, Fc gamma RII, and Fc gamma RIB subclasses, including allelic variants and alternatively spliced forms of those receptors. Fc gamma RII receptors include Fc gamma RIIA (an "activating receptor") and Fc gamma RIIB (an "inhibiting receptor"), which have similar amino acid sequences that differ primarily in the cytoplasmic domains thereof. Activating receptor Fc gamma RIIA contains an immunoreceptor tyrosine-based activation motif (ITAM) in its cytoplasmic domain. Inhibiting receptor Fc gamma RIIB contains an immunoreceptor tyrosine-based inhibition motif (ITIM) in its cytoplasmic domain. (see, e.g., Daeron, Annu. Rev. Immunol. 15:203-234 (1997)). FcRs are reviewed, for example, in Ravetch and Kinet, Annu. Rev. Immunol 9:457-92 (1991); Capel et al., Immunomethods 4:25-34 (1994); and de Haas et al., J. Lab. Clin. Med. 126:330-41 (1995). Other FcRs, including those to be identified in the future, are encompassed by the term "FcR" herein.

The term "Fc receptor" or "FcR" also includes the neonatal receptor, FcRn, which is responsible for the transfer of maternal IgGs to the fetus (Guyer et al., J. Immunol. 117:587 (1976) and Kim et al., J. Immunol. 24:249 (1994)) and regulation of homeostasis of immunoglobulins. Methods of measuring binding to FcRn are known (see, e.g., Ghetie and Ward., Immunol. Today 18(12):592-598 (1997); Ghetie et al., Nature Biotechnology, 15(7):637-640 (1997); Hinton et al., J. Biol. Chem. 279(8):6213-6216 (2004); WO 2004/92219 (Hinton et al.).

Binding to human FcRn in vivo and plasma half life of human FcRn high affinity binding polypeptides can be assayed, e.g., in transgenic mice or transfected human cell lines expressing human FcRn, or in primates to which the polypeptides with a variant Fc region are administered. WO 2000/42072 (Presta) describes antibody variants with increased or decreased binding to FcRs. See also, e.g., Shields et al. J. Biol. Chem. 9(2):6591-6604 (2001).

Fc Gamma Receptor

Fc gamma receptor refers to a receptor capable of binding to the Fc domain of monoclonal IgG1, IgG2, IgG3, or IgG4 antibodies, and includes all members belonging to the family of proteins substantially encoded by an Fc gamma receptor gene. In human, the family includes Fc gamma RI (CD64) including isoforms Fc gamma RIa, Fc gamma RIb and Fc gamma RIc; Fc gamma RII (CD32) including isoforms Fc gamma RIIa (including allotype H131 and R131), Fc gamma RIIb (including Fc gamma RIIb-1 and Fc gamma RIIb-2), and Fc gamma RIIc; and Fc gamma RIII (CD16) including isoform Fc gamma RIIIa (including allotype V158 and F158) and Fc gamma RIIIb (including allotype Fc gamma RIIIb-NA1 and Fc gamma RIIIb-NA2); as well as all unidentified human Fc gamma receptors, Fc gamma receptor isoforms, and allotypes thereof. However, Fc gamma receptor is not limited to these examples. Without being limited thereto, Fc gamma receptor includes those derived from humans, mice, rats, rabbits, and monkeys. Fc gamma receptor may be derived from any organisms. Mouse Fc gamma receptor includes, without being limited to, Fc gamma RI (CD64), Fc gamma RII (CD32), Fc gamma RIII (CD16), and Fc gamma RIII-2 (CD16-2), as well as all unidentified mouse Fc gamma receptors, Fc gamma receptor isoforms, and allotypes thereof. Such preferred Fc gamma receptors include, for example, human Fc gamma RI (CD64), Fc gamma RIIA (CD32), Fc gamma RIIB (CD32), Fc gamma RIIIA (CD16), and/or Fc gamma RIIIB (CD16). The polynucleotide sequence and amino acid sequence of Fc gamma RI are shown in RefSeq accession number NM_000566.3 and RefSeq accession number NP_000557.1, respectively; the polynucleotide sequence and amino acid sequence of Fc gamma RIIA are shown in RefSeq accession number BC020823.1 and RefSeq accession number AAH20823.1, respectively; the polynucleotide sequence and amino acid sequence of Fc gamma RIIB are shown in RefSeq accession number BC146678.1 and RefSeq accession number AAI46679.1, respectively; the polynucleotide sequence and amino acid sequence of Fc gamma RIIIA are shown in RefSeq accession number BC033678.1 and RefSeq accession number AAH33678.1, respectively; and the polynucleotide sequence and amino acid sequence of Fc gamma RIIIB are shown in RefSeq accession number BC128562.1 and RefSeq accession number AAI28563.1, respectively. Whether an Fc gamma receptor has binding activity to the Fc domain of a monoclonal IgG1, IgG2, IgG3, or IgG4 antibody can be assessed by ALPHA screen (Amplified Luminescent Proximity Homogeneous Assay), surface plasmon resonance (SPR)-based BIACORE method, and others (Proc. Natl. Acad. Sci. USA (2006) 103(11), 4005-4010), in addition to the above-described FACS and ELISA formats.

Meanwhile, "Fc ligand" or "effector ligand" refers to a molecule and preferably a polypeptide that binds to an antibody Fc domain, forming an Fc/Fc ligand complex. The molecule may be derived from any organisms. The binding of an Fc ligand to Fc preferably induces one or more effector functions. Such Fc ligands include, but are not limited to, Fc receptors, Fc gamma receptor, Fc alpha receptor, Fc beta receptor, FcRn, C1q, and C3, mannan-binding lectin, mannose receptor, Staphylococcus Protein A, Staphylococcus Protein G, and viral Fc gamma receptors. The Fc ligands also include Fc receptor homologs (FcRH) (Davis et al., (2002) Immunological Reviews 190, 123-136), which are a family of Fc receptors homologous to Fc gamma receptor. The Fc ligands also include unidentified molecules that bind to Fc.

Fc Gamma Receptor-Binding Activity

The impaired binding activity of Fc domain to any of the Fc gamma receptors Fc gamma RI, Fc gamma RIIA, Fc gamma RIM, Fc gamma RIIIA, and/or Fc gamma RIIIB can be assessed by using the above-described FACS and ELISA formats as well as ALPHA screen (Amplified Luminescent Proximity Homogeneous Assay) and surface plasmon resonance (SPR)-based BIACORE method (Proc. Natl. Acad. Sci. USA (2006) 103(11), 4005-4010).

ALPHA screen is performed by the ALPHA technology based on the principle described below using two types of beads: donor and acceptor beads. A luminescent signal is detected only when molecules linked to the donor beads interact biologically with molecules linked to the acceptor beads and when the two beads are located in close proximity Excited by laser beam, the photosensitizer in a donor bead converts oxygen around the bead into excited singlet oxygen. When the singlet oxygen diffuses around the donor beads and reaches the acceptor beads located in close proximity, a chemiluminescent reaction within the acceptor beads is induced. This reaction ultimately results in light emission. If molecules linked to the donor beads do not interact with molecules linked to the acceptor beads, the singlet oxygen produced by donor beads do not reach the acceptor beads and chemiluminescent reaction does not occur.

For example, a biotin-labeled antigen-binding molecule or antibody is immobilized to the donor beads and glutathione S-transferase (GST)-tagged Fc gamma receptor is immobilized to the acceptor beads. In the absence of an antigen-binding molecule or antibody comprising a competitive mutant Fc domain, Fc gamma receptor interacts with an antigen-binding molecule or antibody comprising a wild-type Fc domain, inducing a signal of 520 to 620 nm as a result. The antigen-binding molecule or antibody having a non-tagged mutant Fc domain competes with the antigen-binding molecule or antibody comprising a wild-type Fc domain for the interaction with Fc gamma receptor. The relative binding affinity can be determined by quantifying the reduction of fluorescence as a result of competition. Methods for biotinylating the antigen-binding molecules or antibodies such as antibodies using Sulfo-NHS-biotin or the like are known. Appropriate methods for adding the GST tag to an Fc gamma receptor include methods that involve fusing polypeptides encoding Fc gamma receptor and GST in-frame, expressing the fused gene using cells introduced with a vector carrying the gene, and then purifying using a glutathione column. The induced signal can be preferably analyzed, for example, by fitting to a one-site competition model based on nonlinear regression analysis using software such as GRAPHPAD PRISM (GraphPad; San Diego).

One of the substances for observing their interaction is immobilized as a ligand onto the gold thin layer of a sensor chip. When light is shed on the rear surface of the sensor chip so that total reflection occurs at the interface between the gold thin layer and glass, the intensity of reflected light is partially reduced at a certain site (SPR signal). The other substance for observing their interaction is injected as an analyte onto the surface of the sensor chip. The mass of immobilized ligand molecule increases when the analyte binds to the ligand. This alters the refraction index of solvent on the surface of the sensor chip. The change in refraction index causes a positional shift of SPR signal (conversely, the dissociation shifts the signal back to the original position). In the Biacore system, the amount of shift described above (i.e., the change of mass on the sensor chip surface) is plotted on the vertical axis, and thus the change of mass over time is shown as measured data (sensorgram). Kinetic parameters (association rate constant (ka) and dissociation rate constant (kd)) are determined from the curve of sensorgram, and affinity (KD) is determined from the ratio between these two constants. Inhibition assay is preferably used in the BIACORE methods. Examples of such inhibition assay are described in Proc. Natl. Acad. Sci. USA (2006) 103(11), 4005-4010.

Fc Region with a Reduced Fc Gamma Receptor-Binding Activity

Herein, "a reduced Fc gamma receptor-binding activity" means, for example, that based on the above-described analysis method the competitive activity of a test antigen-binding molecule or antibody is 50% or less, preferably 45% or less, 40% or less, 35% or less, 30% or less, 20% or less, or 15% or less, and particularly preferably 10% or less, 9% or less, 8% or less, 7% or less, 6% or less, 5% or less, 4% or less, 3% or less, 2% or less, or 1% or less than the competitive activity of a control antigen-binding molecule or antibody.

Antigen-binding molecules or antibodies comprising the Fc domain of a monoclonal IgG1, IgG2, IgG3, or IgG4 antibody can be appropriately used as control antigen-binding molecules or antibodies. The Fc domain structures are shown in SEQ ID NOs: 143 (A is added to the N terminus of RefSeq accession number AAC82527.1), 144 (A is added to the N terminus of RefSeq accession number AAB59393.1), 145 (A is added to the N terminus of RefSeq accession number CAA27268.1), and 146 (A is added to the N terminus of RefSeq accession number AAB59394.1). Furthermore, when an antigen-binding molecule or antibody comprising an Fc domain mutant of an antibody of a particular isotype is used as a test substance, the effect of the mutation of the mutant on the Fc gamma receptor-binding activity is assessed using as a control an antigen-binding molecule or antibody comprising an Fc domain of the same isotype. As described above, antigen-binding molecules or antibodies comprising an Fc domain mutant whose Fc gamma receptor-binding activity has been judged to be reduced are appropriately prepared.

Such known mutants include, for example, mutants having a deletion of amino acids 231A-238S (EU numbering) (WO 2009/011941), as well as mutants C226S, C229S, P238S, (C220S) (J. Rheumatol (2007) 34, 11); C226S and C229S (Hum. Antibod. Hybridomas (1990) 1(1), 47-54); C226S, C229S, E233P, L234V, and L235A (Blood (2007) 109, 1185-1192).

Specifically, the preferred antigen-binding molecules or antibodies include those comprising an Fc domain with a mutation (such as substitution) of at least one amino acid selected from the following amino acid positions: 220, 226, 229, 231, 232, 233, 234, 235, 236, 237, 238, 239, 240, 264, 265, 266, 267, 269, 270, 295, 296, 297, 298, 299, 300, 325, 327, 328, 329, 330, 331, or 332 (EU numbering), in the amino acids forming the Fc domain of an antibody of a particular isotype. The isotype of antibody from which the Fc domain originates is not particularly limited, and it is possible to use an appropriate Fc domain derived from a monoclonal IgG1, IgG2, IgG3, or IgG4 antibody. It is preferable to use Fc domains derived from IgG1 antibodies.

The preferred antigen-binding molecules or antibodies include, for example, those comprising an Fc domain which has any one of the substitutions shown below, whose positions are specified according to EU numbering (each number represents the position of an amino acid residue in the EU numbering; and the one-letter amino acid symbol before the number represents the amino acid residue before substitution, while the one-letter amino acid symbol after the number represents the amino acid residue after the substitution) in the amino acids forming the Fc domain of IgG1 antibody:

(a) L234F, L235E, P331S;
(b) C226S, C229S, P238S;
(c) C226S, C229S; or
(d) C226S, C229S, E233P, L234V, L235A;

as well as those having an Fc domain which has a deletion of the amino acid sequence at positions 231 to 238.

Furthermore, the preferred antigen-binding molecules or antibodies also include those comprising an Fc domain that has any one of the substitutions shown below, whose positions are specified according to EU numbering in the amino acids forming the Fc domain of an IgG2 antibody:

(e) H268Q, V309L, A330S, and P331S;
(f) V234A;
(g) G237A;
(h) V234A and G237A;
(i) A235E and G237A; or
(j) V234A, A235E, and G237A.

Each number represents the position of an amino acid residue in EU numbering; and the one-letter amino acid symbol before the number represents the amino acid residue before substitution, while the one-letter amino acid symbol after the number represents the amino acid residue after the substitution.

Furthermore, the preferred antigen-binding molecules or antibodies also include those comprising an Fc domain that has any one of the substitutions shown below, whose positions are specified according to EU numbering in the amino acids forming the Fc domain of an IgG3 antibody:

(k) F241A;
(l) D265A; or
(m) V264A. Each number represents the position of an amino acid residue in EU numbering; and the one-letter amino acid symbol before the number represents the amino acid residue before substitution, while the one-letter amino acid symbol after the number represents the amino acid residue after the substitution.

Furthermore, the preferred antigen-binding molecules or antibodies also include those comprising an Fc domain that has any one of the substitutions shown below, whose positions are specified according to EU numbering in the amino acids forming the Fc domain of an IgG4 antibody:

(n) L235A, G237A, and E318A;
(o) L235E; or
(p) F234A and L235A. Each number represents the position of an amino acid residue in EU numbering; and the one-letter amino acid symbol before the number represents the amino acid residue before substitution, while the one-letter amino acid symbol after the number represents the amino acid residue after the substitution.

The other preferred antigen-binding molecules or antibodies include, for example, those comprising an Fc domain in which any amino acid at position 233, 234, 235, 236, 237, 327, 330, or 331 (EU numbering) in the amino acids forming the Fc domain of an IgG1 antibody is substituted with an amino acid of the corresponding position in EU numbering in the corresponding IgG2 or IgG4.

The preferred antigen-binding molecules or antibodies also include, for example, those comprising an Fc domain in which any one or more of the amino acids at positions 234, 235, and 297 (EU numbering) in the amino acids forming the Fc domain of an IgG1 antibody is substituted with other amino acids. The type of amino acid after substitution is not particularly limited; however, the antigen-binding molecules or antibodies comprising an Fc domain in which any one or more of the amino acids at positions 234, 235, and 297 are substituted with alanine are particularly preferred.

The preferred antigen-binding molecules or antibodies also include, for example, those comprising an Fc domain in which an amino acid at position 265 (EU numbering) in the amino acids forming the Fc domain of an IgG1 antibody is substituted with another amino acid. The type of amino acid after substitution is not particularly limited; however, antigen-binding molecules or antibodies comprising an Fc domain in which an amino acid at position 265 is substituted with alanine are particularly preferred.

Antibody-Dependent Cell-Mediated Cytotoxicity

"Antibody-dependent cell-mediated cytotoxicity" or "ADCC" refers to a form of cytotoxicity in which secreted Ig bound onto Fc receptors (FcRs) present on certain cytotoxic cells (e.g. NK cells, neutrophils, and macrophages) enable these cytotoxic effector cells to bind specifically to an antigen-bearing target cell and subsequently kill the target cell with cytotoxins. The primary cells for mediating ADCC, NK cells, express Fc gamma RIII only, whereas monocytes express Fc gamma RI, Fc gamma RII, and Fc gamma RIII. FcR expression on hematopoietic cells is summarized in Table 3 on page 464 of Ravetch and Kinet, Annu. Rev. Immunol 9:457-92 (1991). To assess ADCC activity of a molecule of interest, an in vitro ADCC assay, such as that described in U.S. Pat. No. 5,500,362 or 5,821,337 or U.S. Pat. No. 6,737,056 (Presta), may be performed. Useful effector cells for such assays include PBMC and NK cells. Alternatively, or additionally, ADCC activity of the molecule of interest may be assessed in vivo, e.g., in an animal model such as that disclosed in Clynes et al. PNAS (USA) 95:652-656 (1998).

Complement Dependent Cytotoxicity

"Complement dependent cytotoxicity" or "CDC" refers to the lysis of a target cell in the presence of complement. Activation of the classical complement pathway is initiated by the binding of the first component of the complement system (C1q) to antibodies (of the appropriate subclass), which are bound to their cognate antigen. To assess complement activation, a CDC assay, e.g., as described in Gazzano-Santoro et al., J. Immunol. Methods 202:163 (1996), may be performed. Polypeptide variants with altered Fc region amino acid sequences (polypeptides with a variant Fc region) and increased or decreased C1q binding capability are described, e.g., in U.S. Pat. No. 6,194,551 B1 and WO 1999/51642. See also, e.g., Idusogie et al. J. Immunol. 164: 4178-4184 (2000).

T Cell Dependent Cellular Cytotoxicity

"T cell dependent cellular cytotoxicity" or "TDCC" refers to a form of cytotoxicity in which an antigen-binding molecule binds to both an antigen expressed on the target cell, and another antigen expressed on T cell, that redirect T cell near to the target cell, as cytotoxicity against the target cell is induced due to the T cell. The method to assess T cell dependent cellular cytotoxicity, an in vitro TDCC assay, is also described in the "Measurement of T cell dependent cellular cytotoxicity" section of this description.

Isoelectric Point (pI)

Unless otherwise specified and unless there are inconsistencies in the context, it is understood that the isoelectric point (pI) may be either a theoretical or an experimentally determined isoelectric point, and it is also referred to as "pI". The pI value can be determined experimentally, for example, by isoelectric focusing electrophoresis. Meanwhile, the theoretical pI value can be calculated using gene and amino acid sequence analysis software (Genetyx, etc.).

Cancer

The terms "cancer" and "cancerous" refer to or describe the physiological condition in mammals that is typically characterized by unregulated cell growth/proliferation. Examples of cancer include, but are not limited to, carcinoma, lymphoma (e.g., Hodgkin's and non-Hodgkin's lymphoma), blastoma, sarcoma, and leukemia. More particular examples of such cancers include squamous cell cancer, small-cell lung cancer, non-small cell lung cancer, adenocarcinoma of the lung, squamous carcinoma of the lung, cancer of the peritoneum, hepatocellular cancer, gastrointestinal cancer, pancreatic cancer, glioma, cervical cancer, ovarian cancer, liver cancer, bladder cancer, hepatoma, breast cancer, colon cancer, colorectal cancer, endometrial or uterine carcinoma, salivary gland carcinoma, kidney cancer, liver cancer, prostate cancer, vulval cancer, thyroid cancer, hepatic carcinoma, leukemia and other lymphoproliferative disorders, and various types of head and neck cancer.

Tumor

The term "tumor" refers to all neoplastic cell growth and proliferation, whether malignant or benign, and all precancerous and cancerous cells and tissues. The terms "cancer," "cancerous," "cell proliferative disorder," "proliferative disorder" and "tumor" are not mutually exclusive as referred to herein.

Ovarian Cancer

"Ovarian cancer" refers to a heterogeneous group of malignant tumors derived from the ovary. Approximately 90% of malignant ovarian tumors are epithelial in origin; the remainder are germ cell and stromal tumors. Epithelial ovarian tumors are classified into the following histological subtypes: serous adenocarcinomas (constituting about 50% of epithelial ovarian tumors); endometrioid adenocarcinomas (~20%); mucinous adenocarcinomas (~10%); clear cell carcinomas (~5-10%); Brenner (transitional cell) tumors (relatively uncommon). The prognosis for ovarian cancer, which is the sixth most common cancer in women, is usually poor, with five year survival rates ranging from 5-30%. For reviews of ovarian cancer, see Fox et al. (2002) "Pathology of epithelial ovarian cancer," in Ovarian Cancer ch. 9 (Jacobs et al., eds., Oxford University Press, New York); Morin et al. (2001) "Ovarian Cancer," in Encyclopedic Reference of Cancer, pp. 654-656 (Schwab, ed., Springer-Verlag, New York). The present disclosure contemplates methods of diagnosing or treating any of the epithelial ovarian tumor subtypes described above, and in particular, the serous adenocarcinoma subtype.

Gastric Cancer

The term "gastric cancer", or "gastric tumor", or "stomach tumor", or "stomach cancer" refers to any tumor or cancer of the stomach, including, e.g., adenocarcinomas (such as diffuse type and intestinal type), and less prevalent forms such as lymphomas, leiomyosarcomas, and squamous cell carcinomas.

Pharmaceutical Formulation

The term "pharmaceutical formulation" or "pharmaceutical composition" refers to a preparation which is in such form as to permit the biological activity of an active ingredient contained therein to be effective, and which contains no additional components which are unacceptably toxic to a subject to which the formulation would be administered.

Pharmaceutically Acceptable Carrier

A "pharmaceutically acceptable carrier" refers to an ingredient in a pharmaceutical formulation, other than an active ingredient, which is nontoxic to a subject. A pharmaceutically acceptable carrier includes, but is not limited to, a buffer, excipient, stabilizer, or preservative.

Treatment

As used herein, "treatment" (and grammatical variations thereof such as "treat" or "treating") refers to clinical intervention in an attempt to alter the natural course of the individual being treated, and can be performed either for prophylaxis or during the course of clinical pathology. Desirable effects of treatment include, but are not limited to, preventing occurrence or recurrence of disease, alleviation of symptoms, diminishment of any direct or indirect pathological consequences of the disease, preventing metastasis, decreasing the rate of disease progression, amelioration or palliation of the disease state, and remission or improved prognosis. In some embodiments, antigen-binding molecules or antibodies of the present disclosure are used to delay development of a disease or to slow the progression of a disease.

Package Insert

The term "package insert" is used to refer to instructions customarily included in commercial packages of therapeutic products, that contain information about the indications, usage, dosage, administration, combination therapy, contraindications and/or warnings concerning the use of such therapeutic products.

Antibody of the Disclosure

In one aspect, the disclosure provides an isolated antibody that comprises: a first heavy chain variable region comprising HVR-H1, HVR-H2 and HVR-H3 amino acid sequences of SEQ ID NOs: 113, 117, and 118, respectively; a first light chain variable region comprising HVR-L1, HVR-L2 and HVR-L3 amino acid sequences of SEQ ID NOs: 119, 120, and 121, respectively; a second heavy chain variable region comprising HVR-H1, HVR-H2 and HVR-H3 amino acid sequences of SEQ ID NOs: 122, 123, and 124, respectively; and a second light chain variable region comprising HVR-L1, HVR-L2 and HVR-L3 amino acid sequences of SEQ ID NOs: 114, 115, and 116, respectively.

In one aspect, the disclosure provides an isolated antibody that comprises: a first heavy chain variable region comprising amino acid sequence selected from SEQ ID NOs: 85, 1, 33 and 84; and a first light chain variable region comprising amino acid sequence selected from SEQ ID NOs: 87, 2, 43, 86 and 88; a second heavy chain variable region comprising amino acid sequence selected from SEQ ID NOs: 60 and 70; and a second light chain variable region comprising amino acid sequence selected from SEQ ID NOs: 61 and 71.

In certain embodiments, the first heavy chain variable region is linked to a first CH1 domain shown in SEQ ID NO: 95, the first light chain variable region is linked to a first CL domain shown in SEQ ID NO: 63, the second heavy chain variable region is linked to a second CH1 domain shown in SEQ ID NO: 97, and the second light chain variable region is linked to a second CL domain shown in SEQ ID NO: 62.

In certain embodiments, the antibody further comprises any one of the Fc region combinations selected from:

(1) a first Fc region shown in SEQ ID NO: 72 and a second Fc region shown in SEQ ID NO: 73;

(2) a first Fc region shown in SEQ ID NO: 74 and a second Fc region shown in SEQ ID NO: 75;

(3) a first Fc region shown in SEQ ID NO: 76 and a second Fc region shown in SEQ ID NO: 77; and (4) a first Fc region shown in SEQ ID NO: 78 and a second Fc region shown in SEQ ID NO: 79.

The first Fc region could be in the same polypeptide chain with the first heavy chain variable region, and the second Fc region could be in the same polypeptide chain with the second heavy chain variable region. In certain embodiments, the C-terminal lysine (Lys447) or glycine-lysine (residues 446-447) of the Fc region may not be present.

In certain embodiments, the first heavy chain variable region and the first light chain variable region form a first antigen-binding site, and the second heavy chain variable region and the second light chain variable region form a second antigen-binding site.

In one aspect, the disclosure provides an isolated antibody that comprises: a first heavy chain comprising amino acid sequence selected from SEQ ID NOs: 104, 105, 106, and 107 and a first light chain comprising amino acid sequence shown in SEQ ID NO: 112; a second heavy chain comprising amino acid sequence selected from SEQ ID NOs: 108, 109, 110, and 111 and a second light chain comprising amino acid sequence shown in SEQ ID NO: 98. In certain embodiments, the C-terminal lysine (Lys447) or glycine-lysine (residues 446-447) of the heavy chain may not be present.

The variable regions of the first heavy chain and the first light chain form a first antigen-binding site, and the variable regions of the second heavy chain and the second light chain form a second antigen-binding site.

In certain embodiments, the first antigen-binding site has binding activity towards CLDN6. In certain embodiments, the first antigen-binding site has binding activity towards human CLDN6. In certain embodiments, the first antigen-binding site has binding activity towards human CLDN6 as defined in SEQ ID NO: 125 or 126. In certain embodiments, the first antigen-binding site does not substantially bind to human CLDN9. In certain embodiments, the first antigen-binding site does not substantially bind to human CLDN4. In certain embodiments, the first antigen-binding site does not substantially bind to human CLDN3. In certain embodiments, the first antigen-binding site does not substantially bind to a CLDN6 mutant as defined in SEQ ID NO: 134.

In certain embodiments, the second antigen-binding site has binding activity towards CD3. In certain embodiments, the second antigen-binding site has binding activity towards CD3 epsilon chain. In certain embodiments, the second antigen-binding site has binding activity towards human CD3 as defined in SEQ ID NO: 142.

Antigen-Binding Molecule of the Disclosure

In one aspect, the disclosure provides an antigen-binding molecule that comprises a heavy chain variable region comprising:

(a1) HVR-H1, HVR-H2, and HVR-H3 amino acid sequences shown in SEQ ID NOs: 113, 117, and 118, respectively; or (a2) HVR-H1, HVR-H2, and HVR-H3 same with those of any one of the heavy chain variable regions shown in SEQ ID NOs: 91, 34, 35, 36, 37, 38, 39, 40, 44, 45, 47, 48, 49, 50, 55, 56, 64, 65, 83, 84, 57 and 85.

In one aspect, the disclosure provides an antigen-binding molecule that comprises a light chain variable region comprising
- (b1) HVR-L1, HVR-L2, and HVR-L3 amino acid sequences shown in SEQ ID NOs: 119, 120, and 121, respectively; or
- (b2) HVR-L1, HVR-L2, and HVR-L3 same with those of any one of the light chain variable regions shown in SEQ ID NOs: 92, 41, 42, 43, 46, 51, 52, 53, 54, 82, 86, 88 and 58.

In one aspect, the disclosure provides an antigen-binding molecule that comprises a heavy chain variable region and a light chain variable region, wherein:
the heavy chain variable region comprising any one of the HVR combinations selected from:
- (a1) HVR-H1, HVR-H2, and HVR-H3 amino acid sequences shown in SEQ ID NOs: 113, 117, and 118, respectively; and
- (a2) HVR-H1, HVR-H2, and HVR-H3 same with those of any one of the heavy chain variable regions shown in SEQ ID NOs: 91, 34, 35, 36, 37, 38, 39, 40, 44, 45, 47, 48, 49, 50, 55, 56, 64, 65, 83, 84, 57 and 85;
and the light chain variable region comprising any one of the HVR combinations selected from:
- (b1) HVR-L1, HVR-L2, and HVR-L3 amino acid sequences shown in SEQ ID NOs: 119, 120, and 121, respectively; and
- (b2) HVR-L1, HVR-L2, and HVR-L3 same with those of any one of the light chain variable regions shown in SEQ ID NOs: 92, 41, 42, 43, 46, 51, 52, 53, 54, 82, 86, 88 and 58.

In certain embodiments, the heavy chain variable region and light chain variable region of the antigen-binding molecule comprise mouse, rabbit, humanized or human frameworks.

In one aspect, the disclosure provides an antigen-binding molecule that comprises a heavy chain variable region comprising amino acid sequence selected from SEQ ID NOs: 85, 1, 33, 84, 91, 34, 35, 36, 37, 38, 39, 40, 44, 45, 47, 48, 49, 50, 55, 56, 64, 65, 83 and 57, and a light chain variable region comprising amino acid sequence selected from SEQ ID NOs: 87, 2, 43, 86, 88, 92, 41, 42, 46, 51, 52, 53, 54, 82 and 58.

One heavy chain variable region and one light chain variable region of the antigen-binding molecule form an antigen-binding site, which has binding activity towards CLDN6. In certain embodiments, the antigen-binding molecule of the disclosure has binding activity towards human CLDN6 as defined in SEQ ID NO: 125 or 126.

In certain embodiments, the antigen-binding molecule of the disclosure does not substantially bind to human CLDN9. In certain embodiments, the antigen-binding molecule of the disclosure does not substantially bind to human CLDN4. In certain embodiments, the antigen-binding molecule of the disclosure does not substantially bind to human CLDN3. In certain embodiments, the antigen-binding molecule of the disclosure does not substantially bind to a CLDN6 mutant as defined in SEQ ID NO: 134.

Antigen-binding molecule of the disclosure is able to be used in combination with various known medical use technologies. In certain embodiments, the antigen-binding molecules of the disclosure could be used to make chimeric antigen binding receptor (CAR) and T-cell comprising chimeric antigen binding receptor (CAR-T). As an example of the method for making CAR, CLDN6-binding site of the antigen-binding molecules of the disclosure is linked with the extracellular domain of T cell receptor (TCR), and the costimulatory signaling domain such as CD28 is linked to the intracellular domain of the TCR. As an example of the method for making CAR-T, CAR is introduced into effector cells such as T cell using gene modification technology.

In one aspect, the disclosure provides a chimeric antigen binding receptor that comprises a heavy chain variable region comprising:
- (a1) HVR-H1, HVR-H2, and HVR-H3 amino acid sequences shown in SEQ ID NOs: 113, 117, and 118, respectively; or
- (a2) HVR-H1, HVR-H2, and HVR-H3 same with those of any one of the heavy chain variable regions shown in SEQ ID NOs: 91, 34, 35, 36, 37, 38, 39, 40, 44, 45, 47, 48, 49, 50, 55, 56, 64, 65, 83, 84, 57 and 85.

In one aspect, the disclosure provides a chimeric antigen binding receptor that comprises a light chain variable region comprising
- (b1) HVR-L1, HVR-L2, and HVR-L3 amino acid sequences shown in SEQ ID NOs: 119, 120, and 121, respectively; or
- (b2) HVR-L1, HVR-L2, and HVR-L3 same with those of any one of the light chain variable regions shown in SEQ ID NOs: 92, 41, 42, 43, 46, 51, 52, 53, 54, 82, 86, 88 and 58.

In one aspect, the disclosure provides a chimeric antigen binding receptor that comprises a heavy chain variable region and a light chain variable region, wherein: the heavy chain variable region comprising any one of the HVR combinations selected from:
- (a1) HVR-H1, HVR-H2, and HVR-H3 amino acid sequences shown in SEQ ID NOs: 113, 117, and 118, respectively; and
- (a2) HVR-H1, HVR-H2, and HVR-H3 same with those of any one of the heavy chain variable regions shown in SEQ ID NOs: 91, 34, 35, 36, 37, 38, 39, 40, 44, 45, 47, 48, 49, 50, 55, 56, 64, 65, 83, 84, 57 and 85;
and the light chain variable region comprising any one of the HVR combinations selected from:
- (b1) HVR-L1, HVR-L2, and HVR-L3 amino acid sequences shown in SEQ ID NOs: 119, 120, and 121, respectively; and
- (b2) HVR-L1, HVR-L2, and HVR-L3 same with those of any one of the light chain variable regions shown in SEQ ID NOs: 92, 41, 42, 43, 46, 51, 52, 53, 54, 82, 86, 88 and 58.

In one aspect, the disclosure provides a chimeric antigen binding receptor that comprises a heavy chain variable region comprising amino acid sequence selected from SEQ ID NOs: 85, 1, 33, 84, 91, 34, 35, 36, 37, 38, 39, 40, 44, 45, 47, 48, 49, 50, 55, 56, 64, 65, 83 and 57, and a light chain variable region comprising amino acid sequence selected from SEQ ID NOs: 87, 2, 43, 86, 88, 92, 41, 42, 46, 51, 52, 53, 54, 82 and 58.

In certain embodiments, the antigen-binding molecule of the disclosure is an antigen-binding molecule that comprises a plurality of antigen-binding sites.

In certain embodiments, the antigen-binding molecule of the disclosure comprises a first antigen-binding site that has binding activity towards CLDN6, and a second antigen-binding site that has binding activity towards T-cell receptor complex, wherein the first antigen-binding site comprises:
- (a) a heavy chain variable region comprising any one of the HVR combinations selected from:
  - (a1) HVR-H1, HVR-H2, and HVR-H3 amino acid sequences shown in SEQ ID NOs: 113, 117, and 118, respectively; and (a2) HVR-H1, HVR-H2, and HVR-H3 same with those of any one of the heavy chain variable regions shown in SEQ ID NOs: 91, 34, 35, 36, 37, 38, 39, 40, 44, 45, 47, 48, 49, 50, 55, 56, 64, 65, 83, 84, 57 and 85; and
(b) a light chain variable region comprising any one of the HVR combinations selected from:
(b1) HVR-L1, HVR-L2, and HVR-L3 amino acid sequences shown in SEQ ID NOs: 119, 120, and 121, respectively; and
(b2) HVR-L1, HVR-L2, and HVR-L3 same with those of any one of the light chain variable regions shown in SEQ ID NOs: 92, 41, 42, 43, 46, 51, 52, 53, 54, 82, 86, 88 and 58.

In certain embodiments, the heavy chain variable region and the light chain variable region that forms the first antigen-binding site of the antigen-binding molecule of the disclosure further comprises mouse, rabbit, humanized or human frameworks.

In certain embodiments, the antigen-binding molecule of the disclosure comprises a first antigen-binding site that has binding activity towards CLDN6, and a second antigen-binding site that has binding activity towards T-cell receptor complex, wherein the first antigen-binding site comprises a heavy chain variable region comprising amino acid sequence selected from SEQ ID NOs: 85, 1, 33, 84, 91, 34, 35, 36, 37, 38, 39, 40, 44, 45, 47, 48, 49, 50, 55, 56, 64, 65, 83 and 57 and a light chain variable region comprising amino acid sequence selected from SEQ ID NOs: 87, 2, 43, 86, 88, 92, 41, 42, 46, 51, 52, 53, 54, 82 and 58.

In certain embodiments, the first antigen-binding site of the antigen-binding molecule of the disclosure has binding activity towards human CLDN6. In certain embodiments, the first antigen-binding site of the antigen-binding molecule of the disclosure has binding activity towards human CLDN6 as defined in SEQ ID NO: 125 or 126. In certain embodiments, the first antigen-binding site of the antigen-binding molecule of the disclosure does not substantially bind to human CLDN9. In certain embodiments, the first antigen-binding site of the antigen-binding molecule of the disclosure does not substantially bind to human CLDN4. In certain embodiments, the first antigen-binding site of the antigen-binding molecule of the disclosure does not substantially bind to human CLDN3. In certain embodiments, the first antigen-binding site of the antigen-binding molecule of the disclosure does not substantially bind to a CLDN6 mutant as defined in SEQ ID NO: 134.

In certain embodiments, the first antigen-binding site of the antigen-binding molecule of the disclosure is included in a single-chain Fv (scFv), Fv or Fab.

In certain embodiments, the second antigen-binding site of the antigen-binding molecule of the disclosure has binding activity towards CD3. In certain embodiments, the second antigen-binding site of the antigen-binding molecule of the disclosure has binding activity towards CD3 epsilon chain. In certain embodiments, the second antigen-binding site of the antigen-binding molecule of the disclosure has binding activity towards T-cell receptor.

In certain embodiment, the second antigen-binding site of the antigen-binding molecule of the disclosure is formed by a heavy chain variable region comprising HVR-H1, HVR-H2 and HVR-H3 amino acid sequences of SEQ ID NOs: 122, 123, and 124, respectively; and a light chain variable region comprising HVR-L1, HVR-L2 and HVR-L3 amino acid sequences of SEQ ID NOs: 114, 115, and 116, respectively. In certain embodiment, the heavy chain variable region and the light chain variable region that form the second antigen-binding site of the antigen-binding molecule of the disclosure comprise mouse, rabbit, humanized or human frameworks.

In certain embodiment, the second antigen-binding site of the antigen-binding molecule of the disclosure is formed by a heavy chain variable region comprising amino acid sequence selected from SEQ ID NOs: 60 and 70 and a light chain variable region comprising amino acid sequence selected from SEQ ID NOs: 61 and 71.

In certain embodiments, the second antigen-binding site of the antigen-binding molecule of the disclosure is included in a single-chain Fv (scFv), Fv or Fab.

In certain embodiments, the antigen-binding molecule of the disclosure further comprises an antibody Fc region. In certain embodiments, the Fc region comprised in the antigen-binding molecule of the disclosure is an Fc region constituting amino acids of SEQ ID NOs: 143, 144, 145, or 146 (IgG1 to IgG4). In certain embodiments, the Fc region comprised in the antigen-binding molecule of the disclosure is an Fc region with at least one amino acid mutation at any of the Fc region constituting amino acids of SEQ ID NOs: 143 to 146 (IgG1 to IgG4). In certain embodiments, the Fc region comprised in the antigen-binding molecule of the disclosure is an Fc region to which sugar-chain is attached, and the percentage of fucose-deficient sugar-chain-attached to the Fc region is higher than that to a native IgG Fc region, or the percentage of bisecting N-acetylglucosamine added to the Fc region is higher than that to a native IgG Fc region.

In certain embodiments, especially in some embodiments that the antigen-binding molecule comprises a first antigen-binding site that has binding activity towards CLDN6 and a second antigen-binding site that has binding activity towards T-cell receptor complex, the Fc region comprised in the antigen-binding molecule is an Fc region with reduced binding activity towards an Fc gamma receptor.

In certain embodiments, the Fc region comprised in the antigen-binding molecule is an Fc region with mutation of at least one amino acid selected from the following amino acid positions specified by EU numbering: position 220, position 226, position 229, position 231, position 232, position 233, position 234, position 235, position 236, position 237, position 238, position 239, position 240, position 264, position 265, position 266, position 267, position 269, position 270, position 295, position 296, position 297, position 298, position 299, position 300, position 325, position 327, position 328, position 329, position 330, position 331, and position 332.

In certain embodiments, the Fc region comprised in the antigen-binding molecule is an Fc region comprising at least one amino acid selected from the following amino acids specified by EU numbering: Arg at amino acid position 234, Ala or Arg at amino acid position 235, Lys at amino acid position 239, and Ala at amino acid position 297.

In certain embodiments, the heavy chain variable domain that forms the first antigen-binding site is linked to the Fc region via a first CH1 domain, the light chain variable domain that forms the first antigen-binding site is linked to a first CL domain; and the heavy chain variable domain that forms the second antigen-binding site is linked to the Fc region via a second CH1 domain, the light chain variable domain that forms the second antigen-binding site is linked to a second CL domain. In certain embodiments, the electric charges of the CH1 and CL domains aforementioned are controlled so that the heavy chain variable region that forms the first antigen-binding domain assembles with the light chain variable region that forms the first antigen-binding domain, and/or the heavy chain variable region that forms the second antigen-binding domain assembles with the light chain variable region that forms the second antigen-binding domain.

In certain embodiments, the antigen-binding molecule of the disclosure has cytotoxic activity. In certain embodiments, the cytotoxic activity of the antigen-binding molecule of the disclosure is ADCC or CDC. In certain embodiments, the cytotoxic activity of the antigen-binding molecule of the disclosure is T-cell-dependent cytotoxic activity.

In certain embodiments, the antigen-binding molecule of the disclosure has internalizing activity. In certain embodiments, the antigen-binding molecule of the disclosure is conjugated with a cytotoxic agent.

The present disclosure also provides immunoconjugates comprising an CLDN6 binding molecule, especially anti-CLDN6 antibody herein conjugated to one or more cytotoxic agents, such as chemotherapeutic agents or drugs, growth inhibitory agents, toxins (e.g., protein toxins, enzymatically active toxins of bacterial, fungal, plant, or animal origin, or fragments thereof), or radioactive isotopes.

In one embodiment, an immunoconjugate is an antibody-drug conjugate (ADC) in which an antibody is conjugated to one or more drugs, including but not limited to a maytansinoid (see U.S. Pat. Nos. 5,208,020, 5,416,064 and European Patent EP 0 425 235 B1); an auristatin such as monomethylauristatin drug moieties DE and DF (MMAE and MMAF) (see U.S. Pat. Nos. 5,635,483 and 5,780,588, and 7,498,298); a dolastatin; a calicheamicin or derivative thereof (see U.S. Pat. Nos. 5,712,374, 5,714,586, 5,739,116, 5,767,285, 5,770,701, 5,770,710, 5,773,001, and 5,877,296; Hinman et al., Cancer Res. 53:3336-3342 (1993); and Lode et al., Cancer Res. 58:2925-2928 (1998)); an anthracycline such as daunomycin or doxorubicin (see Kratz et al., Current Med. Chem. 13:477-523 (2006); Jeffrey et al., Bioorganic & Med. Chem. Letters 16:358-362 (2006); Torgov et al., Bioconj. Chem. 16:717-721 (2005); Nagy et al., Proc. Natl. Acad. Sci. USA 97:829-834 (2000); Dubowchik et al., Bioorg. & Med. Chem. Letters 12:1529-1532 (2002); King et al., J. Med. Chem. 45:4336-4343 (2002); and U.S. Pat. No. 6,630,579); methotrexate; vindesine; a taxane such as docetaxel, paclitaxel, larotaxel, tesetaxel, and ortataxel; a trichothecene; and CC1065.

In another embodiment, an immunoconjugate comprises an antibody as described herein conjugated to an enzymatically active toxin or fragment thereof, including but not limited to diphtheria A chain, nonbinding active fragments of diphtheria toxin, exotoxin A chain (from *Pseudomonas aeruginosa*), ricin A chain, abrin A chain, modeccin A chain, alpha-sarcin, *Aleurites fordii* proteins, dianthin proteins, *Phytolacca americana* proteins (PAPI, PAPII, and PAP-S), *Momordica charantia* inhibitor, curcin, crotin, *Saponaria officinalis* inhibitor, gelonin, mitogellin, restrictocin, phenomycin, enomycin, and the tricothecenes.

In another embodiment, an immunoconjugate comprises an antibody as described herein conjugated to a radioactive atom to form a radioconjugate. A variety of radioactive isotopes are available for the production of radioconjugates. Examples include $^{211}$At, $^{131}$I, $^{125}$I, $^{90}$Y, $^{186}$Re, $^{188}$Re, $^{153}$Sm, $^{212}$Bi, $^{32}$P, $^{212}$Pb and radioactive isotopes of Lu. When the radioconjugate is used for detection, it may comprise a radioactive atom for scintigraphic studies, for example Tc-99m or $^{123}$I, or a spin label for nuclear magnetic resonance (NMR) imaging (also known as magnetic resonance imaging, MRI), such as iodine-123 again, iodine-131, indium-111, fluorine-19, carbon-13, nitrogen-15, oxygen-17, gadolinium, manganese or iron.

Conjugates of an antibody and cytotoxic agent may be made using a variety of bifunctional protein coupling agents such as N-succinimidyl-3-(2-pyridyldithio) propionate (SPDP), succinimidyl-4-(N-maleimidomethyl) cyclohexane-1-carboxylate (SMCC), iminothiolane (IT), bifunctional derivatives of imidoesters (such as dimethyl adipimidate HCl), active esters (such as disuccinimidyl suberate), aldehydes (such as glutaraldehyde), bis-azido compounds (such as bis (p-azidobenzoyl) hexanediamine), bis-diazonium derivatives (such as bis-(p-diazoniumbenzoyl)-ethylenediamine), diisocyanates (such as toluene 2,6-diisocyanate), and bis-active fluorine compounds (such as 1,5-difluoro-2,4-dinitrobenzene). For example, a ricin immunotoxin can be prepared as described in Vitetta et al., Science 238:1098 (1987). Carbon-14-labeled 1-isothiocyanatobenzyl-3-methyldiethylene triaminepentaacetic acid (MX-DTPA) is an exemplary chelating agent for conjugation of radionuclide to the antibody. See WO94/11026. The linker may be a "cleavable linker" facilitating release of a cytotoxic drug in the cell. For example, an acid-labile linker, peptidase-sensitive linker, photolabile linker, dimethyl linker or disulfide-containing linker (Chari et al., Cancer Res. 52:127-131 (1992); U.S. Pat. No. 5,208,020) may be used.

The immunoconjugates or ADCs herein expressly contemplate, but are not limited to such conjugates prepared with cross-linker reagents including, but not limited to, BMPS, EMCS, GMBS, HBVS, LC-SMCC, MBS, MPBH, SBAP, SIA, SIAB, SMCC, SMPB, SMPH, sulfo-EMCS, sulfo-GMBS, sulfo-KMUS, sulfo-MBS, sulfo-SIAB, sulfo-SMCC, and sulfo-SMPB, and SVSB (succinimidyl-(4-vinylsulfone)benzoate) which are commercially available (e.g., from Pierce Biotechnology, Inc., Rockford, IL, U.S.A.).

In one aspect, the disclosure provides nucleic acid encoding an antibody or antigen-binding molecule described herein. In a further embodiment, one or more vectors (e.g., expression vectors) comprising such nucleic acid are provided. In a further embodiment, a host cell comprising such nucleic acid is provided.

In certain embodiments, nucleic acid encoding an antibody or antigen-binding molecule of the disclosure is able to be incorporated in vectors that are able to be administered to a subject directly. It is also possible to administer cells which are genetically modified to express and secret an antibody or antigen-binding molecule of the disclosure to a subject, allowing continuous in vivo secretion of an antibody or antigen-binding molecule of the disclosure.

The disclosure also provides a method of producing an antibody or antigen-binding molecule described herein. In further embodiment, the method of producing an antibody or antigen-binding molecule described herein comprises culturing a host cell comprising nucleic acid that encodes the antigen or antigen-binding molecule. In further embodiments, the method of producing an antibody or antigen-binding molecule described herein comprises culturing a host cell comprising nucleic acid that encodes the antigen or antigen-binding molecule, and recovering the antibody or antigen-binding molecule from the culture of the hose cell.

Methods and Assay

Recombinant Methods and Compositions

Antibodies and antigen-binding molecules may be produced using recombinant methods and compositions, e.g., as described in U.S. Pat. No. 4,816,567. In one embodiment, isolated nucleic acid encoding an antibody as described herein is provided. Such nucleic acid may encode an amino acid sequence comprising the VL and/or an amino acid sequence comprising the VH of the antibody (e.g., the light and/or heavy chains of the antibody). In a further embodiment, one or more vectors (e.g., expression vectors) comprising such nucleic acid are provided. In a further embodiment, a host cell comprising such nucleic acid is provided. In one such embodiment, a host cell comprises (e.g., has been transformed with): (1) a vector comprising a nucleic acid that encodes an amino acid sequence comprising the VL of the antibody and an amino acid sequence comprising the VH of the antibody, or (2) a first vector comprising a nucleic acid that encodes an amino acid sequence comprising the VL of the antibody and a second vector comprising a nucleic acid that encodes an amino acid sequence comprising the VH of the antibody. In one embodiment, the host cell is eukaryotic, e.g. a Chinese Hamster Ovary (CHO) cell or lymphoid cell (e.g., Y0, NS0, Sp2/0 cell). In one embodiment, a method of making an anti-CLDN6 antibody is provided, wherein the method comprises culturing a host cell comprising a nucleic acid encoding the antibody, as provided above, under conditions suitable for expression of the antibody, and optionally recovering the antibody from the host cell (or host cell culture medium).

For recombinant production of an antibody described herein, nucleic acid encoding an antibody, e.g., as described above, is isolated and inserted into one or more vectors for further cloning and/or expression in a host cell. Such nucleic acid may be readily isolated and sequenced using conventional procedures (e.g., by using oligonucleotide probes that are capable of binding specifically to genes encoding the heavy and light chains of the antibody).

Suitable host cells for cloning or expression of antibody-encoding vectors include prokaryotic or eukaryotic cells described herein. For example, antibodies may be produced in bacteria, in particular when glycosylation and Fc effector function are not needed. For expression of antibody fragments and polypeptides in bacteria, see, e.g., U.S. Pat. Nos. 5,648,237, 5,789,199, and 5,840,523. (See also Charlton, Methods in Molecular Biology, Vol. 248 (B. K. C. Lo, ed., Humana Press, Totowa, NJ, 2003), pp. 245-254, describing expression of antibody fragments in *E. coli*.) After expression, the antibody may be isolated from the bacterial cell paste in a soluble fraction and can be further purified.

In addition to prokaryotes, eukaryotic microbes such as filamentous fungi or yeast are suitable cloning or expression hosts for antibody-encoding vectors, including fungi and yeast strains whose glycosylation pathways have been "humanized," resulting in the production of an antibody with a partially or fully human glycosylation pattern. See Gerngross, Nat. Biotech. 22:1409-1414 (2004), and Li et al., Nat. Biotech. 24:210-215 (2006).

Suitable host cells for the expression of glycosylated antibody are also derived from multicellular organisms (invertebrates and vertebrates). Examples of invertebrate cells include plant and insect cells. Numerous baculoviral strains have been identified which may be used in conjunction with insect cells, particularly for transfection of *Spodoptera frugiperda* cells.

Plant cell cultures can also be utilized as hosts. See, e.g., U.S. Pat. Nos. 5,959,177, 6,040,498, 6,420,548, 7,125,978, and 6,417,429 (describing PLANTIBODIES™ technology for producing antibodies in transgenic plants).

Vertebrate cells may also be used as hosts. For example, mammalian cell lines that are adapted to grow in suspension may be useful. Other examples of useful mammalian host cell lines are monkey kidney CV1 line transformed by SV40 (COS-7); human embryonic kidney line (293 or 293 cells as described, e.g., in Graham et al., J. Gen Virol. 36:59 (1977)); baby hamster kidney cells (BHK); mouse sertoli cells (TM4 cells as described, e.g., in Mather, Biol. Reprod. 23:243-251 (1980)); monkey kidney cells (CV1); African green monkey kidney cells (VERO-76); human cervical carcinoma cells (HELA); canine kidney cells (MDCK); buffalo rat liver cells (BRL 3A); human lung cells (W138); human liver cells (Hep G2); mouse mammary tumor (MMT 060562); TRI cells, as described, e.g., in Mather et al., Annals N.Y. Acad. Sci. 383:44-68 (1982); MRC 5 cells; and FS4 cells. Other useful mammalian host cell lines include Chinese hamster ovary (CHO) cells, including DHFR- CHO cells (Urlaub et al., Proc. Natl. Acad. Sci. USA 77:4216 (1980)); and myeloma cell lines such as Y0, NS0 and Sp2/0. For a review of certain mammalian host cell lines suitable for antibody production, see, e.g., Yazaki and Wu, Methods in Molecular Biology, Vol. 248 (B. K. C. Lo, ed., Humana Press, Totowa, NJ), pp. 255-268 (2003).

Recombinant production of an antigen-binding molecule described herein could be done with methods similar to those described above, by using a host cell comprises (e.g., has been transformed with) one or plural vectors comprising nucleic acid that encodes an amino acid sequence comprising the whole antigen-binding molecule or part of the antigen-binding molecule.

Production and Purification of Bispecific Antibodies

"Multispecific antigen-binding molecules" refers to antigen-binding molecules that bind specifically to more than one antigen. In certain embodiment, multispecific antigen-binding molecules described herein comprise two or more antigen-binding sites, and different antigen-binding sites are able to bind specifically to different antigens.

In certain embodiments, the antigen-binding molecule of the disclosure is bispecific IgG antibody. IgG-type bispecific antibodies can be secreted from a hybrid hybridoma (quadroma) produced by fusing two types of hybridomas that produce IgG antibodies (Milstein et al., Nature (1983) 305, 537-540).

Furthermore, IgG-type bispecific antibodies are secreted by introducing the genes of L chains and H chains constituting the two types of IgGs of interest, i.e., a total of four genes, into cells, and co-expressing them. However, the number of combinations of H and L chains of IgG that can be produced by these methods is theoretically ten combinations. Accordingly, it is difficult to purify an IgG comprising the desired combination of H and L chains from ten types of IgGs. Furthermore, theoretically, the amount of secretion of the IgG having the desired combination will decrease remarkably, and therefore large-scale culturing will be necessary, and production costs will increase further.

Therefore, techniques for promoting the association among H chains and between L and H chains having the desired combinations can be applied to the multispecific antigen-binding molecules of the present invention.

For example, techniques for suppressing undesired H-chain association by introducing electrostatic repulsion at the interface of the second constant region or the third constant region of the antibody H chain (CH2 or CH3) can be applied to bispecific antibody association (WO2006/106905).

In the technique of suppressing unintended H-chain association by introducing electrostatic repulsion at the interface of CH2 or CH3, examples of amino acid residues in contact at the interface of the other constant region of the H chain include regions corresponding to the residues at EU numbering positions 356, 439, 357, 370, 399, and 409 in the CH3 region.

More specifically, examples include an antibody comprising two types of H-chain CH3 regions, in which one to three pairs of amino acid residues in the first H-chain CH3 region, selected from the pairs of amino acid residues indicated in (1) to (3) below, carry the same type of charge: (1) amino acid residues comprised in the H chain CH3 region at EU numbering positions 356 and 439; (2) amino acid residues comprised in the H-chain CH3 region at EU numbering positions 357 and 370; and (3) amino acid residues comprised in the H-chain CH3 region at EU numbering positions 399 and 409.

Furthermore, the antibody may be an antibody in which pairs of the amino acid residues in the second H-chain CH3 region which is different from the first H-chain CH3 region mentioned above, are selected from the aforementioned pairs of amino acid residues of (1) to (3), wherein the one to three pairs of amino acid residues that correspond to the aforementioned pairs of amino acid residues of (1) to (3) carrying the same type of charges in the first H-chain CH3 region mentioned above carry opposite charges from the corresponding amino acid residues in the first H-chain CH3 region mentioned above.

Each of the amino acid residues indicated in (1) to (3) above come close to each other during association. Those skilled in the art can find out positions that correspond to the above-mentioned amino acid residues of (1) to (3) in a desired H-chain CH3 region or H-chain constant region by homology modeling and such using commercially available software, and amino acid residues of these positions can be appropriately subjected to modification.

In the antibodies mentioned above, "charged amino acid residues" are preferably selected, for example, from amino acid residues included in either one of the following groups:

(a) glutamic acid (E) and aspartic acid (D); and
(b) lysine (K), arginine (R), and histidine (H).

In the above-mentioned antibodies, the phrase "carrying the same charge" means, for example, that all of the two or more amino acid residues are selected from the amino acid residues included in either one of groups (a) and (b) mentioned above. The phrase "carrying opposite charges" means, for example, that when at least one of the amino acid residues among two or more amino acid residues is selected from the amino acid residues included in either one of groups (a) and (b) mentioned above, the remaining amino acid residues are selected from the amino acid residues included in the other group.

In a preferred embodiment, the antibodies mentioned above may have their first H-chain CH3 region and second H-chain CH3 region crosslinked by disulfide bonds.

In the present invention, amino acid residues subjected to modification are not limited to the above-mentioned amino acid residues of the antibody variable regions or the antibody constant regions. Those skilled in the art can identify the amino acid residues that form an interface in mutant polypeptides or heteromultimers by homology modeling and such using commercially available software; and amino acid residues of these positions can then be subjected to modification so as to regulate the association.

Other known techniques can also be used for the association of bispecific antibodies of the present invention. Fc region-containing polypeptides comprising different amino acids can be efficiently associated with each other by substituting an amino acid side chain present in one of the H-chain Fc regions of the antibody with a larger side chain (knob), and substituting an amino acid side chain present in the corresponding Fc region of the other H chain with a smaller side chain (hole) to allow placement of the knob within the hole (WO1996/027011; Ridgway J B et al., Protein Engineering (1996) 9, 617-621; Merchant A. M. et al. Nature Biotechnology (1998) 16, 677-681; and US20130336973).

In addition, other known techniques can also be used for formation of bispecific antibodies of the present invention. Association of polypeptides having different sequences can be induced efficiently by complementary association of CH3 using a strand-exchange engineered domain CH3 produced by changing part of one of the H-chain CH3s of an antibody to a corresponding IgA-derived sequence and introducing a corresponding IgA-derived sequence into the complementary portion of the other H-chain CH3 (Protein Engineering Design & Selection, 23; 195-202, 2010). This known technique can also be used to efficiently form bispecific antibodies of interest.

In addition, technologies for antibody production using association of antibody CH1 and CL and association of VH and VL as described in WO 2011/028952, WO2014/018572, and Nat Biotechnol. 2014 February; 32(2):191-8; technologies for producing bispecific antibodies using separately prepared monoclonal antibodies in combination (Fab Arm Exchange) as described in WO2008/119353 and WO2011/131746; technologies for regulating association between antibody heavy-chain CH3s as described in WO2012/058768 and WO2013/063702; technologies for producing bispecific antibodies composed of two types of light chains and one type of heavy chain as described in WO2012/023053; technologies for producing bispecific antibodies using two bacterial cell strains that individually express one of the chains of an antibody comprising a single H chain and a single L chain as described by Christoph et al. (Nature Biotechnology Vol. 31, p 753-758 (2013)); and such may be used for the formation of bispecific antibodies.

Alternatively, even when a bispecific antibody of interest cannot be formed efficiently, a bispecific antibody of the present invention can be obtained by separating and purifying the bispecific antibody of interest from the produced antibodies. For example, a method for enabling purification of two types of homomeric forms and the heteromeric antibody of interest by ion-exchange chromatography by imparting a difference in isoelectric points by introducing amino acid substitutions into the variable regions of the two types of H chains has been reported (WO2007114325). To date, as a method for purifying heteromeric antibodies, methods using Protein A to purify a heterodimeric antibody comprising a mouse IgG2a H chain that binds to Protein A and a rat IgG2b H chain that does not bind to Protein A have been reported (WO98050431 and WO95033844). Furthermore, a heterodimeric antibody can be purified efficiently on its own by using H chains comprising substitution of amino acid residues at EU numbering positions 435 and 436, which is the IgG-Protein A binding site, with Tyr, His, or such which are amino acids that yield a different Protein A affinity, or using H chains with a different protein A affinity, to change the interaction of each of the H chains with Protein A, and then using a Protein A column.

Furthermore, an Fc region whose Fc region C-terminal heterogeneity has been improved can be appropriately used as an Fc region of the present invention. More specifically, the present invention provides Fc regions produced by deleting glycine at position 446 and lysine at position 447 as specified by EU numbering from the amino acid sequences of two polypeptides constituting an Fc region derived from IgG1, IgG2, IgG3, or IgG4.

Measurement of T Cell Dependent Cellular Cytotoxicity

In the embodiment that the antigen-binding molecule binds to both CLDN6 and T cell receptor complex, the methods described below are preferably used as a method for assessing or determining T cell dependent cellular cytotoxicity (TDCC) caused by contacting an antigen-binding molecule of the present disclosure with CLDN6-expressing cells to which the antigen-binding site in the antigen-binding molecules of the present disclosure binds. The methods for assessing or determining the cytotoxic activity in vitro include methods for determining the activity of cytotoxic T-cells or the like. Whether an antigen-binding molecule of the present disclosure has the activity of inducing T-cell mediated cellular cytotoxicity can be determined by known methods (see, for example, Current protocols in Immunology, Chapter 7. Immunologic studies in humans, Editor, John E, Coligan et al., John Wiley & Sons, Inc., (1993)). In the cytotoxicity assay, an antigen-binding molecule which is able to bind to an antigen different from CLDN6 and which is not expressed in the cells, and T-cell receptor complex, is used as a control antigen-binding molecule. The control antigen-binding molecule is assayed in the same manner. Then, the activity is assessed by testing whether an antigen-binding molecule of the present disclosure exhibits a stronger cytotoxic activity than that of a control antigen-binding molecule.

Meanwhile, the in vivo anti-tumor efficacy is assessed or determined, for example, by the following procedure. Cells expressing the antigen to which the antigen-binding site in an antigen-binding molecule of the present disclosure binds are transplanted intracutaneously or subcutaneously to a nonhuman animal subject. Then, from the day of transplantation or thereafter, a test antigen-binding molecule is administered into vein or peritoneal cavity every day or at intervals of several days. The tumor size is measured over time. Difference in the change of tumor size can be defined as the cytotoxic activity. As in an in vitro assay, a control antigen-binding molecule is administered. The antigen-binding molecule of the present disclosure can be judged to have cytotoxic activity when the tumor size is smaller in the group administered with the antigen-binding molecule of the present disclosure than in the group administered with the control antigen-binding molecule.

An MTT method and measurement of isotope-labeled thymidine uptake into cells are preferably used to assess or determine the effect of contact with an antigen-binding molecule of the present disclosure to suppress the growth of cells expressing an antigen to which the antigen-binding site in the antigen-binding molecule binds. Meanwhile, the same methods described above for assessing or determining the in vivo cytotoxic activity can be used preferably to assess or determine the activity of suppressing cell growth in vivo.

The TDCC of an antibody or antigen-binding molecule of the disclosure can be evaluated by any suitable method known in the art. For example, TDCC can be measured by lactate dehydrogenase (LDH) release assay. In this assay, target cells (e.g. CLDN6-expressing cells) are incubated with T cells (e.g. PBMCs) in the presence of a test antibody or antigen-binding molecule, and the activity of LDH that has been released from target cells killed by T cells is measured using a suitable reagent. Typically, the cytotoxic activity is calculated as a percentage of the LDH activity resulting from the incubation with the antibody or antigen-binding molecule relative to the LDH activity resulting from 100% killing of target cells (e.g. lysed by treatment with Triton-X). If the cytotoxic activity calculated as mentioned above is higher, the test antibody or antigen-binding molecule is determined to have higher TDCC.

Additionally or alternatively, for example, TDCC can also be measured by real-time cell growth inhibition assay. In this assay, target cells (e.g. CLDN6-expressing cells) are incubated with T cells (e.g. PBMCs) in the presence of a test antibody or antigen-binding molecule on a 96-well plate, and the growth of the target cells is monitored by methods known in the art, for example, by using a suitable analyzing instrument (e.g. xCELLigence Real-Time Cell Analyzer). The rate of cell growth inhibition (CGI: %) is determined from the cell index value according to the formulation given as CGI (%)=100−(CIAb×100/CINoAb). "CIAb" represents the cell index value of wells with the antibody or antigen-binding molecule on a specific experimental time and "CINoAb" represents the average cell index value of wells without the antibody or antigen-binding molecule. If the CGI rate of the antibody or antigen-binding molecule is high, i.e., has a significantly positive value, it can be said that the antibody or antigen-binding molecule has TDCC activity.

In one aspect, an antibody or antigen-binding molecule of the disclosure has T cell activation activity. T cell activation can be assayed by methods known in the art, such as a method using an engineered T cell line that expresses a reporter gene (e.g. luciferase) in response to its activation (e.g. Jurkat/NFAT-RE Reporter Cell Line (T Cell Activation Bioassay, Promega)). In this method, target cells (e.g. CLDN6-expressing cells) are cultured with T cells in the presence of a test antibody or antigen-binding molecule, and then the level or activity of the expression product of the reporter gene is measured by appropriate methods as an index of T cell activation. When the reporter gene is a luciferase gene, luminescence arising from reaction between luciferase and its substrate may be measured as an index of T cell activation. If T cell activation measured as described above is higher, the test antibody or antigen-binding molecule is determined to have higher T cell activation activity.

Methods and Compositions for Diagnostics and Detection

In certain embodiments, any of the antigen-binding molecules or antibodies provided herein is useful for detecting the presence of CLDN6 in a biological sample. The term "detecting" as used herein encompasses quantitative or qualitative detection. In certain embodiments, a biological sample comprises a cell or tissue, such as cancer tissues.

In one embodiment, an antigen-binding molecule or antibody for use in a method of diagnosis or detection is provided. In a further aspect, a method of detecting the presence of CLDN6 in a biological sample is provided. In certain embodiments, the method comprises contacting the biological sample with an antigen-binding molecule or antibody as described herein under conditions permissive for binding of the antigen-binding molecule or antibody to CLDN6, and detecting whether a complex is formed between the antigen-binding molecule or antibody and CLDN6. Such method may be an in vitro or in vivo method. In one embodiment, an antigen-binding molecule or antibody is used to select subjects eligible for therapy with antigen-binding molecules or antibodies as described herein, e.g. where CLDN6 is a biomarker for selection of patients.

Exemplary disorders that may be diagnosed using an antibody of the invention include cancer, especially ovarian tumor, non-small cell lung cancer, gastric cancer, and liver cancer.

In certain embodiments, labeled antigen-binding molecules or antibodies described herein are provided. Labels include, but are not limited to, labels or moieties that are detected directly (such as fluorescent, chromophoric, electron-dense, chemiluminescent, and radioactive labels), as well as moieties, such as enzymes or ligands, that are detected indirectly, e.g., through an enzymatic reaction or molecular interaction. Exemplary labels include, but are not limited to, the radioisotopes 32P, 14C, 125I, 3H, and 131I, fluorophores such as rare earth chelates or fluorescein and its derivatives, rhodamine and its derivatives, dansyl, umbelliferone, luciferases, e.g., firefly luciferase and bacterial luciferase (U.S. Pat. No. 4,737,456), luciferin, 2,3-dihydrophthalazinediones, horseradish peroxidase (HRP), alkaline phosphatase, beta-galactosidase, glucoamylase, lysozyme, saccharide oxidases, e.g., glucose oxidase, galactose oxidase, and glucose-6-phosphate dehydrogenase, heterocyclic oxidases such as uricase and xanthine oxidase, those coupled with an enzyme that employs hydrogen peroxide to oxidize a dye precursor such as HRP, lactoperoxidase, or microperoxidase, biotin/avidin, spin labels, bacteriophage labels, stable free radicals, and the like.

Pharmaceutical Composition

In one aspect, the present disclosure provides a pharmaceutical composition comprising the antigen-binding molecule or antibody of the disclosure. In certain embodiments, the pharmaceutical composition of the disclosure induces T-cell-dependent cytotoxicity, in another word, the pharmaceutical composition of the disclosure is a therapeutic agent for inducing cellular cytotoxicity. In certain embodiments, the pharmaceutical composition of the disclosure is a pharmaceutical composition used for treatment and/or prevention of cancer. In certain embodiments, the pharmaceutical composition of the disclosure is a pharmaceutical composition used for treatment and/or prevention of ovarian cancer, non-small cell lung cancer, gastric cancer, or liver cancer. In certain embodiments, the pharmaceutical composition of the disclosure is cell growth-suppressing agent. In certain embodiments, the pharmaceutical composition of the disclosure is anticancer agent.

A pharmaceutical composition of the present disclosure, a therapeutic agent for inducing cellular cytotoxicity, a cell growth-suppressing agent, or an anticancer agent of the present disclosure may be formulated with different types of antigen-binding molecules or antibodies, if needed. For example, the cytotoxic action against cells expressing an antigen can be enhanced by a cocktail of multiple antigen-binding molecules or antibodies of the disclosure.

Pharmaceutical compositions of an antigen-binding molecule or antibody as described herein are prepared by mixing such antigen-binding molecule or antibody having the desired degree of purity with one or more optional pharmaceutically acceptable carriers (Remington's Pharmaceutical Sciences 16th edition, Osol, A. Ed. (1980)), in the form of lyophilized formulations or aqueous solutions. Pharmaceutically acceptable carriers are generally nontoxic to recipients at the dosages and concentrations employed, and include, but are not limited to: buffers such as phosphate, citrate, and other organic acids; antioxidants including ascorbic acid and methionine; preservatives (such as octadecyldimethylbenzyl ammonium chloride; hexamethonium chloride; benzalkonium chloride; benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g. Zn-protein complexes); and/or non-ionic surfactants such as polyethylene glycol (PEG). Exemplary pharmaceutically acceptable carriers herein further include interstitial drug dispersion agents such as soluble neutral-active hyaluronidase glycoproteins (sHASEGP), for example, human soluble PH-20 hyaluronidase glycoproteins, such as rHuPH20 (HYLENEX (registered trademark), Baxter International, Inc.). Certain exemplary sHASEGPs and methods of use, including rHuPH20, are described in US Patent Publication Nos. 2005/0260186 and 2006/0104968. In one aspect, a sHASEGP is combined with one or more additional glycosaminoglycanases such as chondroitinases.

Exemplary lyophilized antibody formulations are described in U.S. Pat. No. 6,267,958. Aqueous antibody formulations include those described in U.S. Pat. No. 6,171, 586 and WO2006/044908, the latter formulations including a histidine-acetate buffer.

The formulation herein may also contain more than one active ingredient as necessary for the particular indication being treated, preferably those with complementary activities that do not adversely affect each other. Such active ingredients are suitably present in combination in amounts that are effective for the purpose intended.

If necessary, the antigen-binding molecules or antibodies of the present disclosure may be encapsulated in microcapsules (microcapsules made from hydroxymethylcellulose, gelatin, poly[methylmethacrylate], and the like), and made into components of colloidal drug delivery systems (liposomes, albumin microspheres, microemulsions, nano-particles, and nano-capsules) (for example, see "Remington's Pharmaceutical Science 16th edition", Oslo Ed. (1980)). Moreover, methods for preparing agents as sustained-release agents are known, and these can be applied to the antigen-binding molecules of the present disclosure (J. Biomed. Mater. Res. (1981) 15, 267-277; Chemtech. (1982) 12, 98-105; U.S. Pat. No. 3,773,719; European Patent Application (EP) Nos. EP58481 and EP133988; Biopolymers (1983) 22, 547-556).

The pharmaceutical compositions, cell growth-suppressing agents, or anticancer agents of the present disclosure may be administered either orally or parenterally to patients. Parental administration is preferred. Specifically, such administration methods include injection, nasal administration, transpulmonary administration, and percutaneous administration. Injections include, for example, intravenous injections, intramuscular injections, intraperitoneal injections, and subcutaneous injections. For example, pharmaceutical compositions, therapeutic agents for inducing cellular cytotoxicity, cell growth-suppressing agents, or anticancer agents of the present disclosure can be administered locally or systemically by injection. Furthermore, appropriate administration methods can be selected according to the patient's age and symptoms. The administered dose can be selected, for example, from the range of 0.0001 mg to 1,000 mg per kg of body weight for each administration. Alternatively, the dose can be selected, for example, from the range of 0.001 mg/body to 100,000 mg/body per patient. However, the dose of a pharmaceutical composition of the present disclosure is not limited to these doses.

Preferably, a pharmaceutical composition of the present disclosure comprises an antigen-binding molecule or antibody as described herein. In one aspect, the composition is a pharmaceutical composition for use in inducing cellular cytotoxicity. In another aspect, the composition is a pharmaceutical composition for use in treating or preventing cancer. Preferably, the cancer is colorectal cancer or gastric cancer. The pharmaceutical composition of the present disclosure can be used for treating or preventing cancer. Thus, the present disclosure provides a method for treating or preventing cancer, in which the antigen-binding molecule or antibody as described herein is administered to a patient in need thereof The present disclosure also provides methods for damaging cells expressing CLDN6 or for suppressing the cell growth by contacting the cells expressing CLDN6 with an antigen-binding molecule of the present disclosure that binds to CLDN6. Monoclonal antibodies that bind to CLDN6 are described above as an antigen-binding molecule of the present disclosure, which is included in the therapeutic agents for inducing cellular cytotoxicity, cell growth-suppressing agents, and anticancer agents of the present disclosure. Cells to which an antigen-binding molecule of the present disclosure binds are not particularly limited, as long as they express CLDN6. Specifically, in the present disclosure, the preferred cancer antigen-expressing cells include ovary cancer cells, prostate cancer cells, breast cancer cells, uterine cancer cells, liver cancer cells, lung cancer cells, pancreatic cancer cells, stomach cancer cells, urinary bladder cancer cells, and colon cancer cells.

In the present disclosure, "contact" can be carried out, for example, by adding an antigen-binding molecule of the present disclosure to culture media of cells expressing CLDN6 cultured in vitro. In this case, an antigen-binding molecule to be added can be used in an appropriate form, such as a solution or solid prepared by lyophilization or the like. When the antigen-binding molecule of the present disclosure is added as an aqueous solution, the solution may be a pure aqueous solution containing the antigen-binding molecule alone or a solution containing, for example, an above-described surfactant, excipient, coloring agent, flavoring agent, preservative, stabilizer, buffering agent, suspending agent, isotonizing agent, binder, disintegrator, lubricant, fluidity accelerator, and corrigent. The added concentration is not particularly limited; however, the final concentration in a culture medium is preferably in a range of 1 pg/ml to 1 g/ml, more preferably 1 ng/ml to 1 mg/ml, and still more preferably 1 micro g/ml to 1 mg/ml.

In another embodiment of the present disclosure, "contact" can also be carried out by administration to nonhuman animals transplanted with CLDN6-expressing cells in vivo or to animals having cancer cells expressing CLDN6 endogenously. The administration method may be oral or parenteral. Parenteral administration is particularly preferred. Specifically, the parenteral administration method includes injection, nasal administration, pulmonary administration, and percutaneous administration. Injections include, for example, intravenous injections, intramuscular injections, intraperitoneal injections, and subcutaneous injections. For example, pharmaceutical compositions, therapeutic agents for inducing cellular cytotoxicity, cell growth-suppressing agents, or anticancer agents of the present disclosure can be administered locally or systemically by injection. Furthermore, an appropriate administration method can be selected according to the age and symptoms of an animal subject. When the antigen-binding molecule is administered as an aqueous solution, the solution may be a pure aqueous solution containing the antigen-binding molecule alone or a solution containing, for example, an above-described surfactant, excipient, coloring agent, flavoring agent, preservative, stabilizer, buffering agent, suspending agent, isotonizing agent, binder, disintegrator, lubricant, fluidity accelerator, and corrigent. The administered dose can be selected, for example, from the range of 0.0001 to 1,000 mg per kg of body weight for each administration. Alternatively, the dose can be selected, for example, from the range of 0.001 to 100,000 mg/body for each patient. However, the dose of an antigen-binding molecule of the present disclosure is not limited to these examples.

The present disclosure also provides kits for use in a method of the present disclosure, which contain an antigen-binding molecule of the present disclosure or an antigen-binding molecule produced by a method of the present disclosure. The kits may be packaged with an additional pharmaceutically acceptable carrier or medium, or instruction manual describing how to use the kits, etc.

In another aspect of the invention, an article of manufacture containing materials useful for the treatment, prevention and/or diagnosis of the disorders described above is provided. The article of manufacture comprises a container and a label on or a package insert associated with the container. Suitable containers include, for example, bottles, vials, syringes, IV solution bags, etc. The containers may be formed from a variety of materials such as glass or plastic. The container holds a composition which is by itself or combined with another composition effective for treating, preventing and/or diagnosing the condition and may have a sterile access port (for example the container may be an intravenous solution bag or a vial having a stopper pierceable by a hypodermic injection needle). At least one active ingredient in the composition is an antibody of the invention. The label or package insert indicates that the composition is used for treating the condition of choice. Moreover, the article of manufacture may comprise (a) a first container with a composition contained therein, wherein the composition comprises an antibody of the invention; and (b) a second container with a composition contained therein, wherein the composition comprises a further cytotoxic or otherwise therapeutic agent. The article of manufacture in this embodiment of the invention may further comprise a package insert indicating that the compositions can be used to treat a particular condition. Alternatively, or additionally, the article of manufacture may further comprise a second (or third) container comprising a pharmaceutically-acceptable buffer, such as bacteriostatic water for injection (BWFI), phosphate-buffered saline, Ringer's solution and dextrose solution. It may further include other materials desirable from a commercial and user standpoint, including other buffers, diluents, filters, needles, and syringes.

It is understood that any of the above articles of manufacture may include an immunoconjugate of the invention in place of or in addition to an antigen-binding molecule or antibody.

All documents cited herein are incorporated herein by reference.

EXAMPLES

The following are examples of methods and compositions of the present disclosure. It is understood that various other embodiments may be practiced, given the general description provided above.

Example 1. Stability of sc(Fv)2 Molecule

Regarding the stability of blinatumomab, blinatumomab was purified at 3.8 mg/mL in 20 mM His, 150 mM NaCl, pH6.0 in-house. High molecular weight (HMW) species ratio was determined to be 6.4% by SEC analysis. For the purpose of physicochemical tests, it was dialyzed against PBS, pH7.4 and the concentration was adjusted to 1 mg/mL. After the dialysis, HMW ratio was turned to 42.6%. Generally, the HMW ratio of IgG antibodies do not change during a dialysis. Therefore, Blinatumomab has an aggregation tendency in solution and it was thought to be less stable compared to IgG antibodies. SEC analysis was conducted using SWXL G2000 column (TOSOH) with 50 mM sodium phosphate, 300 mM NaCl, pH7.0 as a running buffer. Detection was done by UV detector (280 nm). Chromatograms were analyzed using Empower 3 software (Waters).

Example 2. Selection of T Cell Redirecting Antibody which Binds Claudin-6 (CLDN6)

Example 2-1. Generation of Anti-CLDN6 T Cell-Redirecting Antibodies

To overcome the limitation of sc(Fv)$_2$ format, we generated T cell redirecting bispecific antibodies targeting CLDN6 (anti-CLDN6/CD3 bispecific antibodies) in IgG format, which enable the antibody to gain a better stability and a longer serum half-life.

The variable regions of three anti-CLDN6 antibodies (AE3-20, AH05, CDA0013), the CLDN6-binding variable regions of 6PHU3, and the variable regions of one anti-CD3 antibody (TR01) were used to generate anti-CLDN6/CD3 bispecific antibodies. CDA0013 was obtained from B cells of rabbits which were immunized with CLDN6 expression vector.

The abovementioned variable regions were used to generate anti-CLDN6/CD3 bispecific antibodies using Fab arm exchange technique reported by Igawa et al. (WO 2016159213). The variable regions comprised in the anti-CLDN6/CD3 antibodies arm are shown in Table 1, and the generated bispecific antibodies contain a silent Fc with attenuated affinity for the Fc gamma receptor. Four anti-CLDN6/CD3 bispecific antibodies, AE3-20/TR01, AH05/TR01, CDA0013/TR01, and 6PHU3/TR01 were generated (Table 1).

TABLE 1

Generated anti-CLDN6/CD3 bispecific antibodies.

| Antibody Name | SEQ ID NO of | | | |
| --- | --- | --- | --- | --- |
| | CLDN6-binding heavy chain variable region (VH) | CLDN6-binding light chain variable region (VL) | CD3-binding heavy chain variable region (VH) | CD3-binding light chain variable region (VL) |
| AE3-20/TR01 | 1 | 2 | 70 | 71 |
| AH05/TR01 | 89 | 90 | | |
| CDA0013/TR01 | 91 | 92 | | |
| 6PHU3/TR01 | 93 | 94 | | |

Example 2-2. T Cell Activation Activity of the Anti-CLDN6/CD3 Bispecific Antibodies Using Jurkat Reporter Gene Assay T cell activation activity of the anti-CLDN6/CD3 bispecific antibodies generated in Example 2-1, in the presence of hCLDN6/BaF, hCLDN9/BaF or hCLDN6(Q156L)/BaF was examined by the method described in Reference Example 3. T cell activation activity of each antibody under the concentration of 0.001, 0.01, 0.1, 1, and 10 nM, respectively was determined.

The results (FIG. 1A, FIG. 1B) showed that all the anti-CLDN6/CD3 bispecific antibodies induced strong T cell activation in presence of hCLDN6/BaF. In the presence of hCLDN9/BaF, slight T cell activation was observed in 6PHU3/TR01 while no activation in other AE3-20/TR01, AH05/TR01, and CDA0013/TR01. This result suggests that all the anti-CLDN6/CD3 bispecific antibodies showed relatively high specificity towards CLDN6, although 6PHU3/TR01 slightly binds to human CLDN9 expressing cells.

FIG. 1A and FIG. 1C show that T cell activation of all the anti-CLDN6/CD3 bispecific antibodies was lower in the presence of hCLDN6(Q156L)/BaF, compared with their T cell activation in the presence of hCLDN6/BaF, suggesting that all the anti-CLDN6/CD3 bispecific antibodies bind to epitopes that include the amino acid residue at position 156 in human CLDN6.

Example 2-3. Antigen Binding Specificity of the Anti-CLDN6/CD3 Bispecific Antibodies Towards CLDN Family Proteins FreeStyle™ 293-F cells transiently expressed human and mouse CLDN3, 4, 6, and 9 were generated as below. Expressing vector of human and mouse CLDNs (including CLDN6, CLDN9, CLDN3, and CLDN4) were established by inserting synthesized cDNA coding corresponding sequences into mammalian expression vector pCXND3 (WO2008/156083).

Each vector was introduced into FreeStyle™ 293-F cells (Invitrogen) using 293fectin (Invitrogen). Cells were cultured 2-4 days, and collected by centrifugation. Collected cells were immediately resuspended in 0.1% BSA containing D-PBS(-) in concentration of 3×10$^6$ cells/mL.

Evaluated Antibodies:
1) anti-CLDN6/CD3 bispecific antibodies: AE3-20/TR01, AH05/TR01, CDA0013/TR01, 6PHU3/TR01;
2) Bispecific antibody of Anti-keyhole limpet hemocyan (KLH) antibody (VH shown in SEQ ID NO: 68, VL shown in SEQ ID NO: 69) paired with human CD3 antibody (VH shown in SEQ ID NO: 70, VL shown in SEQ ID NO: 71) by Fab arm exchange: KLH/TR01 (as a negative control);
3) Commercially available anti-CLDN bivalent antibodies (purchased from R&D systems): mouse anti-human CLDN6 antibody (MAB3656), mouse anti-human CLDN3 antibody (MAB4620), mouse anti-human CLDN4 antibody (MAB4219).

Antibodies were mixed with FreeStyle™ 293-F cells transiently expressed human and mouse CLDN3, 4, 6, and 9 at final concentration of 10 micro g/mL. After 1 hour of incubation, cells were washed by 0.1% BSA containing D-PBS(-), and incubated in 5 micro g/mL of either Goat anti-Human IgG (H+L) Cross-Adsorbed Secondary Antibody, Alexa Fluor 647 (Invitrogen, A21445) or Goat anti-Mouse IgG (H+L) Highly Cross-Adsorbed Secondary Antibody, Alexa Fluor 647 (Invitrogen, A21236), for 1 hour. Cells were then washed with 0.1% BSA containing D-PBS (-), resuspended in 5 micro L of 0.1% BSA containing D-PBS(-), and analyzed by flow cytometer (iQue Screener, intellicyte).

As shown in FIGS. 2-1 and 2-2, strong binding towards human CLDN6 was observed in all the anti-CLDN6/CD3 bispecific antibodies. Binding to mouse CLDN6 was also observed in all the anti-CLDN6/CD3 bispecific antibodies, although they were weaker than that towards human CLDN6. All the anti-CLDN6/CD3 bispecific antibodies showed slight or no binding towards human CLDN9, human CLDN4, human CLDN3, mouse CLDN9, mouse CLDN4, or mouse CLDN3. Especially, CDA0013/TR01 showed the best specificity towards CLDN6.

Example 2-4. In Vivo Efficacy Analysis of the Anti-CLDN6/CD3 Bispecific Antibodies The in vivo anti-tumor efficacy of the anti-CLDN6/CD3 bispecific antibodies was evaluated using tumor bearing mice model. The human cancer cell lines expressing human CLDN6 (HuH-7 (Health Science Research Resources Bank), OV-90 (ATCC) or OVCAR-3 (ATCC)) was transplanted subcutaneously into NOD/ShiJic-scid mice, and human PBMC was injected into the mice (so-called T cell injection model). Tumor bearing mice were randomized to treatment groups to receive an administration of the antibody, or vehicle as a control.

More specifically, the following test was conducted in the efficacy test using HuH-7 or OV-90 or OVCAR-3 T cell injection model. Expansion of T cells was performed using human PBMC (AllCells) and T Cell Activation/Expansion Kit (Miltenyi Biotec). $1\times10^7$ cells of HuH-7, $5\times10^6$ cells of OV-90 or $1\times10^7$ cells of OVCAR-3 and Matrigel Basement Membrane Matrix (BD) were mixed and transplanted subcutaneously into the lateral region of the NOD/ShiJic-scid mice (CLEA Japan, Female, 6 to 7 weeks-old). The day of transplantation was defined as day 0. After randomization and grouping according to tumor size and body weight, anti-asialo GM1 antibody (FUJIFILM Wako Pure Chemical Corporation) was administered intraperitoneally at 0.2 mg/mouse. On the next day, the T cells were collected from the expansion culture, and used for implantation at $3\times10^7$ cells/mouse intraperitoneally. Approximately four hours after T cell transplantation, the antibodies were administered intravenously. The antibodies were administrated only once. The length (L) and width (W) of the tumor mass and body weight of each mouse were measured, and tumor volume (TV) was calculated as: TV=(L×W×W)/2.

FIG. 3 shows the in vivo anti-tumor efficacy of AE3-20/TR01, AH05/TR01, and 6PHU3/TR01 in OV-90 and HuH-7 T cell injection models. Infusion of these antibodies at 5 mg/kg retarded tumor growth strongly. Especially, in HuH-7 T cell injection model, AE3-20/TR01 showed the best efficacy compared to other two antibodies, AH05/TR01 and 6PHU3/TR01 (FIG. 3a).

Toxicity and pharmacokinetics (PK) analysis of the anti-CLDN6/CD3 bispecific antibodies was conducted using same mouse models. Although AE3-20/TR01, AH05/TR01, and 6PHU3/TR01 all showed anti-tumor efficacy in OV-90 and HuH-7 T-cell injection models, drastic body weight loss was observed in mice treated with AH05/TR01 and 6PHU3/TR01. No body weight change was observed in mice treated with AE3-20/TR01 (FIG. 4). In addition, the mice with body weight loss showed worsening general condition and yellow discoloration of the skin and plasma.

After euthanasia, plasma was collected and blood biochemical test was conducted. Plasma level of hepatotoxicity markers, including ALT, ALP, GGT, GLDH, TBIL, and TBA were determined (TBA-120FR, Canon medical system). In mice treated with AH05/TR01 and 6PHU3/TR01, liver parameters were significantly elevated (FIG. 5). These data indicated that AH05/TR01 and 6PHU3/TR01 cause hepatotoxicity in mice.

PK of anti-CLDN6/CD3 bispecific antibodies was evaluated as follows. Antibodies were injected intravenously into mice at a dose of 5 mg/kg. Blood was collected from three mice on day 3, 7, 13 after the antibody injection in HuH-7 T-cell injection model and on day 3, 6, 14 after the antibody injection in OV-90 T-cell injection model. The plasma samples in heparin was obtained by centrifuging at 10,000×g for 5 minutes at 4 degrees C. The concentration of the antibodies in mouse plasma was measured by ELISA as described below. Anti-human IgG antibody (Sigma) was dispensed onto a Nunc-ImmunoPlate MaxiSorp (Thermo Fisher) and kept for 1 hour at room temperature to prepare anti-human IgG immobilized plates. Sample antibodies in a concentrations of 8, 4, 2, 1, 0.5, 0.25 or 0.125 ng/mL were used for calibration, and mouse plasma samples were prepared by dilution with 400-fold or more for examination. Each sample was dispensed into the anti-human IgG immobilized plates, and kept at room temperature for 1 hour. Then, biotinylated anti-Fc specific antibody (CHUGAI) was added to react for 1 hour at room temperature. Streptavidin-PolyHRP80 (Stereospecific Detection Technologies) was added to react for 1 hour at room temperature, and chromogenic reaction was carried out using ABTS (Roche) as a substrate. Then, the absorbance at 405 nm (650 nm as reference) was measured by a microplate reader. The antibody concentration in mouse plasma was calculated from the absorbance of the calibration curve using the analytical software SOFTmax PRO (Molecular Devices).

The temporal change of plasma concentration of AE3-20/TR01, AH05/TR01, and 6PHU3/TR01 after intravenous administration is shown in FIG. 6. The half-life ($T_{1/2}$) of AE3-20/TR01, AH05/TR01, and 6PHU3/TR01 was approximately 3.44 to 4.79 days in the plasma of HuH-7 T-cell injection model and approximately 2.77 to 3.22 days in OV-90 T-cell injection model.

Most notably, plasma half-life of 6PHU3/TR01 was prolonged to 3.44 days in HuH-7 model and 2.77 days in OV-90 model, compared to those of bispecific $sc(Fv)_2$ 6PHU3 described in previous report (6). This prolongation is most likely to be due to antibody conversion from bispecific $sc(Fv)_2$ to IgG format. However, 6PHU3/TR01 led to hepatotoxicity in mice, as confirmed by the significant decrease in body weight and increase in liver markers after infusion (FIGS. 4 and 5). These findings suggest that prolongation of plasma half-life of anti-CLDN6/CD3 bispecific antibodies might led to liver toxicity.

In vivo anti-tumor efficacy and safety of AE3-20/TR01 and CDA0013/TR01 at a dose of 5 mg/kg was also evaluated using OVCAR-3 T cell injection mouse model. Experiment was conducted with same procedure as described above.

As shown in FIG. 7, treatment with AE3-20/TR01 led to significant tumor volume reduction, while treatment with CDA0013/TR01 showed moderate efficacy in OVCAR-3 bearing mice. After antibody treatment, drastic body weight loss was barely detectable as a whole, but obvious increases in liver toxicity markers were found in CDA0013/TR01 treatment group (FIG. 8). In fact, one out of five mice in CDA0013/TR01 treatment group showed weak body weight reduction.

PK of AE3-20/TR01 and CDA0013/TR01 were calculated using animals with intravenous injection at 5 mg/kg as follows. The plasma samples in heparin were prepared from blood collected from three animals on day 3, 7, 14 post injection, then subjected to measurement of the concentration of antibodies by ELISA as described previously in this Example.

As shown in FIG. 9, the PK feature of AE3-20/TR01 and CDA0013/TR01 was comparable. The plasma half-life ($T_{1/2}$) of AE3-20/TR01 and CDA0013/TR01 were 3.60 and 3.98 days and the area under the plasma concentration-time curve from zero to infinity ($AUC_{inf}$) was 138 and 161 day*micro g/mL, respectively.

According to the result of this Example, some anti-CLDN6/CD3 bispecific antibodies in IgG format tend to have a potential to cause liver injury, although all the antibodies showed relatively high specificity towards CLDN6 and similar pharmacokinetics profile. Among the tested anti-CLDN6/CD3 bispecific antibodies, AE3-20/TR01 was found to be the only anti-CLDN6/CD3 bispecific antibody which showed both efficacy and good safety profile in various tumor bearing mouse models.

Example 3. Humanization of CLDN6 Binding Variable Regions for Anti-CLDN6/CD3 Bispecific Antibody Although AE3-20/TR01 showed both efficacy and good safety profile in various tumor bearing mouse models, the CLDN6 binding variable regions of AE3-20/TR01 are mouse sequences, it is not applicable for administration of this antibody to patients due to its high immunogenicity. Humanization of the CLDN6 binding variable regions of AE3-20/TR01 was carried out. The CD3 binding variable regions of AE3-20/TR01 are humanized sequences.

Amino acid residues of the CLDN6 binding VH of AE3-20/TR01(AE3.20H, SEQ ID NO: 1) and the CLDN6-binding VL of AE3-20/TR01 (AE3.20L, SEQ ID NO: 2) are numbered according to Kabat (Kabat et al., Sequence of proteins of immunological interest, 5th Ed., Public Health Service, National Institutes of Health, Bethesda, MD (1991)).

49 kinds of VHs were designed by substituting the frameworks of AE3.20H with human germline frameworks (SEQ ID NO: 3, 4, 5, 6, 7, 8 or 9 as FR1, SEQ ID NO: 10 as FR2, SEQ ID NO: 11, 12, 13, 14, 15, 16 or 17 as FR3, SEQ ID NO: 18 as FR4). 16 kinds of VLs were designed by substituting the frameworks of AE3.20L with human germline frameworks (SEQ ID NO: 19, 20, 21 or 22 as FR1, SEQ ID NO: 23 as FR2, SEQ ID NO: 24, 25, 26, or 27 as FR3, SEQ ID NO: 28 as FR4). The polynucleotides encoding AE3.20H and the designed VHs were cloned into expression vectors containing polynucleotides encoding heavy chain constant region SG1 (the amino acid sequence is shown in SEQ ID NO: 80), respectively. The polynucleotides encoding AE3.20L and the designed VLs were cloned into expression vectors containing polynucleotides encoding light chain constant region SK1 (the amino acid sequence is shown in SEQ ID NO: 81), respectively. Heavy chains comprising AE3.20H and the designed VHs were transiently expressed with the light chain comprising AE3.20L respectively, and light chains comprising the designed VLs were transiently expressed with the heavy chain comprising AE3.20H respectively, in Expi 293 cells.

Binding of the antibodies comprising designed VH and AE3.20L and the antibodies comprising designed VL and AE3.20H to hCLDN6/BaF was determined by FCM analysis. Binding activities of each antibody is represented by the Mean Fluorescence Intensity values (MFI). Antibodies were incubated with hCLDN6/BaF for 30 minutes at 4 degrees C. and washed with HEPES-BSA washing buffer (Nacalai Tesque, Cat. L3P8406). Goat F(ab')$_2$ anti-Human IgG, Mouse ads-PE (Southern Biotech, Cat. 2043-09) secondary antibody was then added and incubated for 30 minutes in the dark at 4 degrees C. and subsequently washed. Data acquisition was performed using LSR Fortessa X-20 (BD Biosciences) and analyzed with FlowJo software (Tree Star).

Among the 49 kinds of designed VHs, only two kinds of VH (shown in Table 2) were able to improve the binding activity of the antibody towards human CLDN6, compared with the antibodies comprises AE3.20H. None of the 16 kinds of designed VLs showed contribute to the binding activity of the antibody towards human CLDN6 as much as AE3.20L. It seems to be difficult to humanize AE3.20L without compromising the CLDN6-binding activity of the antibody.

TABLE 2

| Name of VH | CDRs | SEQ ID NO: of | | | |
| | | FR1 | FR2 | FR3 | FR4 |
|---|---|---|---|---|---|
| 22H | Same with those of | 3 | 10 | 14 | 18 |
| 25H | AE3.20H | 6 | 10 | 14 | 18 |

To achieve enough binding activity towards human CLDN6, CLDN6-binding VLs were rationally designed (Human germline framework sequences which are similar to the corresponding framework of AE3.20L were selected, and introduction of back mutations in frameworks were also tried). The designed VLs (17L, 18L, 19L, and 20L) have same CDR sequences with AE3.20L, and the sequences of their frameworks are shown in Table 3. Back mutations were adopted in the frameworks of 18L, 19L and 20L, which are also shown in Table 3. Bivalent IgG antibodies comprising the VH 25H and VL selected from 17L, 18L, 19L and 20L were transiently expressed in Expi 293 cells. FIG. 10 shows the binding of various antibodies towards hCLDN6/BaF determined by FCM analysis. Binding activities of each antibody is represented by the MFI. The names on the horizontal axis in FIG. 10 show the VH and VL comprised in each antibody.

All the antibodies comprising designed VL (17L, 18L, 19L, and 20L) showed weaker binding activity towards human CLDN6 than the antibody comprises AE3.20L as VL, which also indicated the difficulty to humanize AE3.20L without compromising the CLDN6-binding activity. However, antibody comprises 20L, which harbors the G66R mutation, showed stronger binding activity to human CLDN6 compared with the antibody comprises 17L, which does not harbor the G66R mutation, suggesting that the substitution from Gly at amino acid position 66 to Arg in the light chain frameworks would help improving the antibody's binding activity to human CLDN6.

TABLE 3

| Name of VL | CDRs | SEQ ID NO: of FR1 | FR2 | FR3 | FR4 | Amino acid substitution compared with 17L (back mutation) |
|---|---|---|---|---|---|---|
| 17L | Same with | 19 | 23 | 24 | 29 | — |
| 18L | those of | 19 | 30 | 24 | 29 | K45Q |
| 19L | AE3.20L | 19 | 31 | 24 | 29 | A43S, K45Q |
| 20L |  | 19 | 23 | 32 | 29 | G66R |

Example 4. Affinity Maturation of Anti-CLDN6 Humanized Antibody

To improve the binding affinity of the humanized CLDN6 binding variable regions, exhaustive single or multiple mutations were introduced into the CDRs of AE3.20H and AE3.20L, and SEQ ID NO: 6 was used as heavy chain FR1, SEQ ID NO: 10 was used as heavy chain FR2, SEQ ID NO: 14 was used as heavy chain FR3, SEQ ID NO: 18 was used as heavy chain FR4, SEQ ID NO: 22 or 19 was used as light chain FR1, SEQ ID NO: 23 was used as light chain FR2, SEQ ID NO: 24 or 32 was used as light chain FR3, SEQ ID NO: 28 or 29 was used as light chain FR4, to make various antibody variants. The antibody variants were expressed Expi293 (Invitrogen) and purified by Protein A purification.

By checking CLDN6 binding activity of the antibody variants, it was suggested that the amino acid substitutions shown in Table 4 and Table 5 might be helpful for improving the binding activity towards human CLDN6.

TABLE 5

| VL name | Amino acids substitution in CDRs compared with AE3.20L | Frameworks | SEQ ID NO |
|---|---|---|---|
| 20L0072 | E27Y | Same with those of 20L | 42 |
| 20L0532 | E27Y, A50Y |  | 43 |

The VHs descried in Table 4 and the VLs described in Table 5, together with a variable regions shows binding activity towards human CD3 (VH SEQ ID NO: 70; VL SEQ ID NO: 71) were used to generate anti-CLDN6/CD3 bispecific antibodies using Fab arm exchange technique reported by Igawa et al. (WO 2016159213). The variable regions comprised in the anti-CLDN6/CD3 antibodies arm are shown in Table 6, and the generated bispecific antibodies contain a silent Fc with attenuated affinity for the Fc gamma receptor.

TABLE 6

| | CLDN6 binding VH | | CLDN6 binding VL | | CD3 binding VH | CD3 binding VL |
|---|---|---|---|---|---|---|
| Antibody name | SEQ ID NO | Name | SEQ ID NO | Name | | |
| 25H0021/20L0072//TR01 | 35 | 25H0021 | 42 | 20L0072 | SEQ ID NO: 70 | SEQ ID NO: 71 |
| 25H0024/20L0072//TR01 | 36 | 25H0024 | 42 | 20L0072 | | |
| 25H0042/20L0072//TR01 | 37 | 25H0042 | 42 | 20L0072 | | |
| 25H0176/20L0072//TR01 | 38 | 25H0176 | 42 | 20L0072 | | |
| 25H0322/20L0072//TR01 | 39 | 25H0322 | 42 | 20L0072 | | |
| 25H0562/20L0072//TR01 | 40 | 25H0562 | 42 | 20L0072 | | |
| 25H0581/20L0072//TR01 | 34 | 25H0581 | 42 | 20L0072 | | |
| 25H/20L0532//TR01 | 33 | 25H | 43 | 20L0532 | | |
| 25H0021/20L0532//TR01 | 35 | 25H0021 | 43 | 20L0532 | | |
| 25H0024/20L0532//TR01 | 36 | 25H0024 | 43 | 20L0532 | | |
| 25H0042/20L0532//TR01 | 37 | 25H0042 | 43 | 20L0532 | | |
| 25H0176/20L0532//TR01 | 38 | 25H0176 | 43 | 20L0532 | | |
| 25H0322/20L0532//TR01 | 39 | 25H0322 | 43 | 20L0532 | | |
| 25H0562/20L0532//TR01 | 40 | 25H0562 | 43 | 20L0532 | | |
| 25H0581/20L0532//TR01 | 34 | 25H0581 | 43 | 20L0532 | | |
| AE3-20/TR01 | 1 | AE3.20H | 2 | AE3.20L | | |

TABLE 4

| VH name | Amino acids substitution in CDRs compared with AE3.20H | Frameworks | SEQ ID NO |
|---|---|---|---|
| 25H0021 | Y32L | Same with those of 25H | 35 |
| 25H0024 | Y32V |  | 36 |
| 25H0042 | T33V |  | 37 |
| 25H0176 | G53K |  | 38 |
| 25H0322 | D61F |  | 39 |
| 25H0562 | Y102M |  | 40 |
| 25H0581 | Y32L, D61F |  | 34 |

FIG. 11 shows T cell activation activity of 10 nM of anti-CLDN6/CD3 bispecific antibodies as shown in Table 6 in the presence of hCLDN6/BaF, hCLDN3/BaF, hCLDN4/BaF, or hCLDN9/BaF determined by method as described in Reference Example 3. KLH/TR01 generated in Example 2-3 was used as a negative control.

Some of the bispecific antibodies, such as 25H0322/20L0072//TR01 and 25H0562/20L0072//TR01 showed lower T cell activation activity in the presence of hCLDN6/BaF compared with AE3-20/TR01.

Some of the bispecific antibodies, such as 25H0581/20L0072//TR01 and 25H0581/20L0532//TR01 showed higher T cell activation activity in the presence of hCLDN9/BaF and hCLDN4/BaF compared with AE3-20/TR01.

But several bispecific antibodies showed comparable similar T cell activation activity in the presence of hCLDN6/BaF without showing higher T cell activation in the presence of hCLDN3/BaF, hCLDN4/BaF, or hCLDN9/BaF compared with AE3-20/TR01.

ECM (extracellular matrix) is an extracellular constituent and resides at various sites in vivo. Therefore, an antibody strongly binds to ECM is known to have poorer kinetics (shorter half-life) in blood (WO2012093704 A1).

ECM binding of the bivalent IgG antibody comprising the VH and VL shown in Table 7 was evaluated. The ECM binding value (ECL reaction) of each antibody was divided by the ECM binding value of the antibody MRA (VH: SEQ ID NO: 66, VL: SEQ ID NO: 67) obtained in the same plate or at the same execution date, and the resulting value is shown in Table 7. As shown in Table 7, the ECM binding of the antibodies varies hugely.

TABLE 7

ECM binding results

| Antibody name | Luminescence | Luminescence ratio vs MRA | SEQ ID NO: of VH | VL | CH | CL |
|---|---|---|---|---|---|---|
| MRA (negative control) | 13043.5 | 1.00 | 66 | 67 | 80 | 81 |
| 25H0021/20L0072 | 32891.5 | 2.52 | 35 | 42 | | |
| 25H0024/20L0072 | 29640.5 | 2.27 | 36 | | | |
| 25H0042/20L0072 | 40377.5 | 3.10 | 37 | | | |
| 25H0176/20L0072 | 77022 | 5.91 | 38 | | | |
| 25H0322/20L0072 | 70573.5 | 5.41 | 39 | | | |
| 25H0562/20L0072 | 32630.5 | 2.50 | 40 | | | |

The results of the above-mentioned experiments indicated that it is very difficult to have all the preferable properties, including high binding activity towards CLDN6, high binding specificity towards CLDN6 (low binding activity towards CLDN3, CLDN4 and CLDN9), and low ECM binding at the same time. For example, although there are only few amino acid differences in the antibodies compared with each other, antibodies comprising 25H0322 or 25H0562 as VH showed poorer binding activity towards CLDN6 compared with those comprising AE3.20H as VH; antibodies comprising 25H0581 as VH showed poor binding specificity towards CLDN6; antibodies comprising 25H0176 or 25H0322 as VH were not most preferable variants from ECM binding perspective.

Considering the binding activity and specificity towards human CLDN6, together with ECM binding, the antibody comprises 25H or 25H0042 as VH, 20L0532 as VL was used for further engineering.

Example 5. Antibody Optimization

Bispecific antibodies made by Fab arm exchanging technology is not suitable for the purification and production process to provide the compound in a large scale. To improve the manufacturability of the bispecific antibody, further optimization was carried out as follows.

Example 5-1. Removal of Degradation Hotspot

To avoid chemical degradations such as cyclization, isomerization, cleavage, and methionine oxidation, in another word, to improve the stability of the antibody, some amino acid residues in corresponding sequence within the CDRs were substituted. Amino acid substitutions which were found to further improve the binding affinity and specificity of the CLDN6 binding variable regions were also introduced into the CDRs.

The name of the VH and amino acid substitutions compared with 25H0042 are shown in Table 8. The name of the VL and amino acid substitutions compared with 20L0532 are shown in Table 9. The VH descried in Table 8 and the VL described in Table 9, together with a variable regions shows binding activity towards human CD3 (VH SEQ ID NO: 70; VL SEQ ID NO: 71) were used to generate anti-CLDN6/CD3 bispecific antibodies using Fab arm exchange technique reported by Igawa et al. (WO2016159213). The variable regions comprised in the anti-CLDN6/CD3 antibodies arm are shown in Table 10, and the generated bispecific antibodies contain a silent Fc with attenuated affinity for the Fc gamma receptor.

TABLE 8

| VH Name | Amino acid substitutions in CDRs compared with 25H0042 | SEQ ID NO |
|---|---|---|
| 25H0671 | M34G, G54V, S62V, Y97F | 45 |

TABLE 9

| VL Name | Amino acid substitutions in CDRs compared with 20L0532 | SEQ ID NO |
|---|---|---|
| 20L0571 | S31L, Y50L, D56I | 46 |

TABLE 10

| Antibody name | CLDN6 binding VH | CLDN6 binding VL | CD3 binding VH | CD3 binding VL |
|---|---|---|---|---|
| 25H0671/20L0571//TR01 | 25H0671 | 20L0571 | SEQ ID NO: 70 | SEQ ID NO: 71 |
| AE3-20/TR01 | AE3.20H | AE3.20L | | |
| CS2201 | 25H | 20L0532 | | |

FIG. 12 showed T cell activation activity of 10 nM of anti-CLDN6/CD3 bispecific antibodies in the presence of hCLDN6/BaF, hCLDN3/BaF, hCLDN4/BaF or hCLDN9/BaF determined by method as described in Reference Example 3. 25H0671/20L0571//TR01 induced comparable T cell activation in the presence of hCLDN6/BaF compared with CS2201, without showing higher T cell activation in the presence of hCLDN3/BaF, hCLDN4/BaF or hCLDN9/BaF compared with CS2201.

Example 5-2. pI Engineering

In preparation of a bispecific antibody, when two types of Heavy chains and two type of Light chain are used for expression, theoretically ten types of Heavy chain and Light chain combinations are expressed. To enable easy purification of the bispecific antibody of interest by separating these ten types of antibodies, amino acid modifications were carried out to decrease the isoelectric point (pI) of the CLDN6 binding VH and VL.

To evaluate the pI reduction effect of various amino acid substitutions, Amino acid substitutions was introduced into the VH 25H0671 and the VL 20L0571, to reduce the number of positively charged amino acids (such as arginine and lysine) while increasing the negatively charged amino acids (such as aspartic acid and glutamic acid).

Table 11 shows the pI engineered VH variants, and Table 12 shows the pI engineered VL variants.

TABLE 11

| VH Name | Amino acid substitutions in FR compared with 25H0671 | SEQ ID NO |
|---|---|---|
| 57H0671 | R16D, Q43E, N73D | 47 |
| 65H0671 | R16G, A84D, Q105E | 50 |

TABLE 12

| VL Name | Amino acid substitutions in FR compared with 20L0571 | SEQ ID NO |
|---|---|---|
| 53L0571 | K45E, S60D | 53 |
| 54L0571 | K45E, S60D, L104 V, K107E | 54 |

Bivalent IgG antibodies that comprises VH selected from Table 11 and VL selected from Table 12 were used for calculation of theoretical pI. The produced bivalent IgG antibodies comprises same IgG constant regions. Theoretical pI of the antibodies were calculated using GENETYX-SV/RC Ver 14.0.0 (GENETYX CORPORATION) by a method similar to that described previously. The calculated theoretical pI values are shown in Table 13.

TABLE 13

| | Theoretical pI | | |
|---|---|---|---|
| Antibody name | VH | VL | Theoretical pI |
| 25H0671/20L0571_bivalent | 25H0671 | 20L0571 | 8.04 |
| 57H0671/20L0571_bivalent | 57H0671 | 20L0571 | 7.54 |
| 65H0671/20L0571_bivalent | 65H0671 | 20L0571 | 7.69 |
| 25H0671/53L0571_bivalent | 25H0671 | 53L0571 | 7.69 |
| 25H0671/54L0571_bivalent | 25H0671 | 54L0571 | 7.37 |
| 65H0671/53L0571_bivalent | 65H0671 | 53L0571 | 7.19 |
| 65H0671/54L0571_bivalent | 65H0671 | 54L0571 | 6.83 |

The CLDN6 binding variable regions descried in Table 14, together with a variable regions shows binding activity towards human CD3 (VH SEQ ID NO: 70; VL SEQ ID NO: 71) were used to generate anti-CLDN6/CD3 bispecific antibodies using Fab arm exchange technique reported by Igawa et al. (WO2016159213). The generated bispecific antibodies contain a silent Fc with attenuated affinity for the Fc gamma receptor.

TABLE 14

| Antibody name | CLDN6-binding VH | CLDN6-binding VL | CD3 binding VH | CD3 binding VL |
|---|---|---|---|---|
| AE3-20/TR01 | AE3.20H | AE3.20L | SEQ ID NO: 70 | SEQ ID NO: 71 |
| 57H0671/20L0571//TR01 | 57H0671 | 20L0571 | | |
| 65H0671/20L0571//TR01 | 65H0671 | 20L0571 | | |
| 25H0671/20L0571//TR01 | 25H0671 | 20L0571 | | |
| 25H0671/53L0571//TR01 | 25H0671 | 53L0571 | | |
| 25H0671/54L0571//TR01 | 25H0671 | 54L0571 | | |

FIG. 13 shows T cell activation activity of anti-CLDN6/CD3 bispecific antibodies with pI engineering in CLDN6-binding VH (57H0671/20L0571//TR01 and 65H0671/20L0571//TR01) in the presence of hCLDN6/BaF, hCLDN3/BaF, hCLDN4/BaF or hCLDN9/BaF determined by method as described in Reference Example 3.

According to the theoretical pI, T cell activation activity and the sequences of the frameworks, frameworks of 65H0671 were selected for further evaluation.

FIG. 14 shows T cell activation activity of anti-CLDN6/CD3 bispecific antibodies with pI engineering in CLDN6-binding VL (25H0671/53L0571//TR01 and 25H0671/54L0571//TR01) in the presence of hCLDN6/BaF, hCLDN3/BaF, hCLDN4/BaF or hCLDN9/BaF determined by method as described in Reference Example 3.

According to the theoretical pI and T cell activation activity, frameworks of 54L0571 was selected for further evaluation.

The CLDN6 binding variable regions descried in Table 15, together with a variable regions shows binding activity towards human CD3 (VH SEQ ID NO: 70; VL SEQ ID NO: 71) were used to generate anti-CLDN6/CD3 bispecific antibodies using Fab arm exchange technique reported by Igawa et al. (WO2016159213). The generated bispecific antibodies contain a silent Fc with attenuated affinity for the Fc gamma receptor.

TABLE 15

| Antibody name | CLDN6-binding VH | CLDN6-binding VL |
|---|---|---|
| 65H0671/54L0571//TR01 | 65H0671 | 54L0571 |
| 25H0671/20L0571//TR01 | 25H0671 | 20L0571 |

FIG. 15 shows T cell activation activity of anti-CLDN6/CD3 bispecific antibodies with pI engineering in both CLDN6-binding VH and CLDN6-binding VL in the presence of hCLDN6/BaF, hCLDN3/BaF, hCLDN4/BaF or hCLDN9/BaF determined by method as described in Reference Example 3. The result indicated that the binding activity and binding specificity towards human CLDN6 of 65H0671/54L0571//TR01 is comparable with that of 25H0671/20L0571//TR01.

The pI values of antibodies comprising the selected frameworks were also actually determined using the Maurice (ProteinSimple) with the cIEF cartridge (PS-MC02-C). The constant region in the antibodies were the same with those shown in Table 13. Sample load was done for 55 s. Subsequently, focusing was carried out at 1500 V for 1 min and 3000 V for 6 min. Fluorescent emission detection at 330 nm and 280 nm excitation in combination to the standard UV absorbance at 280 nm. Fluorescent exposure time were the 3 sec, 5 sec, 10 sec and 20 sec. For the anolyte, 80 mM phosphoric acid in 0.1% methyl cellulose, and for the catholyte, 100 mM sodium hydroxide in 0.1% methyl cellulose were used. Each sample solution contained constant amounts of 0.017 mg/ml sample, 5% Pharmalyte 3-10, 0.42% methyl cellulose, 3.6M urea, 10 mM Arg, 1% pI marker 4.05 and 1% pI marker 9.99. The associated software Compass for iCE (2.0.10) was used for data analysis.

TABLE 16

| Antibody name | PI |
|---|---|
| 25H0671/20L0571_bivalent | 9.12 |
| 65H0671/54L0571_bivalent | 7.49 |

As shown in the Table 16, measured pI of 65H0671/54L0571_bivalent was 7.49, which was lower than the pI of 25H0671/20L0571_bivalent, the antibody without any pI engineering amino acid modification.

Example 5-3. Control of Heavy Chain and Light Chain Pairing

In preparation of a bispecific antibody, when two types of Heavy chains and two type of Light chain are used for expression, theoretically ten types of Heavy chain and Light chain combinations are expressed. Since only one of these combinations is the bispecific antibody of interest, obtaining a bispecific antibody of interest requires purifying one antibody of interest from the mixture of 10 different antibodies, which is highly inefficient and difficult. As means to solve this problem, "Knob" and "Hole" modifications (KiH: Knobs into Hole) were introduced into the CH3 domain of IgG H chains so that IgG with two different H chains combined is preferentially secreted, and, to further efficiently obtain a molecule of interest, amino acid substitutions and combinations thereof in the variable regions and the CH1-CL domain interface for promoting desired H chain-L chain association (Referring WO2013065708).

The amino acid substitution Q39K was introduced into the CD3 binding VH shown in SEQ ID NO: 70, and the amino acid substitution Q38E was introduced into the CD3 binding VL shown in SEQ ID NO: 71. The sequences of the amino acid substituted CD3 binding VH and VL were shown in SEQ ID NO: 60 and SEQ ID NO: 61, respectively.

The amino acid substitution Q39E was introduced into the CLDN6 binding VH 65H0671, and the amino acid substitution Q38K was introduced into the CLDN6 binding VL 54L0571. The amino acid substituted CLDN6 binding VH and VL were named 65H0671Q39E (SEQ ID NO: 57) and 54L0571Q38K (SEQ ID NO: 58) respectively.

The CLDN6 binding VH 65H0671Q39E was linked to a first CH1 domain region shown in SEQ ID NO: 95, the CLDN6 binding VL 54L0571Q38K was linked to a first CL domain shown in SEQ ID NO: 59 to make a first light chain shown in SEQ ID NO: 96. The CD3 binding VH shown in SEQ ID NO: 60 was linked to a second CH1 domain shown in SEQ ID NO: 97, the CD3 binding VL shown in SEQ ID NO: 61 was linked to a second CL domain shown in SEQ ID NO: 62 to make a second light chain shown in SEQ ID NO: 98. The CH1 domains and CL domains also contains amino acid substitutions compared with natural occurring ones, which are: Glu (E) at position 147, 175 and 213 in the first CH1 domain; Lys (K) at position 123, 131, 160 and 180 in the first CL domain; Lys (K) at amino acid position 175 in the second CH1 domain; and Glu (E) at amino acid position 131, 160 and 180 in the second CL domain. The first CH1 domain was further linked to a first hinge-CH2-CH3 region to make a first heavy chain shown in SEQ ID NO: 99, the second CH1 domain was further linked to a second hinge-CH2-CH3 region to make a second heavy chain shown in SEQ ID NO: 100. As a result, the antibody CS2425 (first heavy chain SEQ ID NO: 99, first light chain SEQ ID NO: 96, second heavy chain SEQ ID NO: 100, second light chain SEQ ID NO: 98) was generated.

The charge heterogeneity of CS2425 was evaluated using the Maurice (ProteinSimple) with the cIEF cartridge (PS-MC02-C). Sample load was done for 55 s. Subsequently, focusing was carried out at 1500 V for 1 min and 3000 V for 6 min. The detection was UV absorbance at 280 nm. For the anolyte, 80 mM phosphoric acid in 0.1% methyl cellulose, and for the catholyte, 100 mM sodium hydroxide in 0.1% methyl cellulose were used. Each sample solution contained constant amounts of 0.085 mg/ml sample, 2% Pharmalyte 5-8, 2% Pharmalyte 8-10.5, 0.42% methyl cellulose, 3.6M urea, 10 mM Arg, 1% pI marker 5.85 and 1% pI marker 10.17. The associated software Compass for iCE (2.0.10) was used for data analysis.

FIG. 16(A) showed the charge heterogeneity of CS2425 (65H0671Q39E-SG1189v14k/54L0571Q38K-SK1018//TR01H(Q39K)-SG1191v14h/TR01L(Q38E)-SK1017) when the first heavy chain, the first light chain, the second heavy chain, and the second light chain made above were expressed together. The electropherogram suggested that both mutations had a good HH and HL control, because there were no other obvious peaks other than the main peak around pI 9.0.

Example 5-4. Anti-Tumor Efficacy and Safety Analysis of Anti-CLDN6/CD3 Bispecific Antibodies The in vivo anti-tumor efficacy of the anti-CLDN6/CD3 bispecific antibody CS2201 made in Example 5-1 was determined using OV-90 T cell injection model. AE3-20/TR01 was used as comparison. In mouse treated with bispecific antibodies at 0.1 mg/kg, CS2201 was more efficacious than AE3-20/TR01 against OV-90 T cell injection model (FIG. 17). On the other hand, CS2201 and AE3-20/TR01 showed comparable anti-tumor efficacy at 5 mg/kg (FIG. 18). With regard to hepatotoxicity of CS2201, no abnormality of hepatotoxic marker was observed from the result of blood test (FIG. 19). Furthermore, the PK feature of CS2201 and AE3-20/TR01 was found to be comparable (FIG. 20). The plasma half-life ($T_{1/2}$) of CS2201 and AE3-20/TR01 were 3.64 and 3.48 days in 0.1 mg/kg group, respectively. The area under the plasma concentration-time curve from zero to infinity (AUCinf) of CS2201 and AE3-20/TR01 were 1.83 and 2.35 day*micro g/mL in 0.1 mg/kg group, respectively.

Anti-tumor efficacy and toxicity of anti-CLDN6/CD3 bispecific antibody CS2425 were examined using OV-90 T-cell injection model. Mouse inoculated with OV-90 cells were treated with 0.1 mg/kg or 5 mg/kg of CS2425, and tumor volume and body weight were examined.

Significant tumor regression was observed in mouse given CS2425 at 0.1 mg/kg. In this treatment group, no toxic sign was noted based on the result of body weight change and general condition of mouse after antibody administration (FIG. 21A). However, mouse treated with CS2425 at 5 mg/kg showed significant body weight loss (FIG. 21B). Consistent with severe body weight change, blood markers of liver injury were drastically elevated in all animals received 5 mg/kg of CS2425 (FIG. 22).

Circulating levels of CS2425 were also calculated. The plasma samples prepared from three animals on day 4, 13 post injection for 0.1 mg/kg group and day 4, 6 post injection for 5 mg/kg group were used for PK analysis as described in EXAMPLE 2-4. FIG. 23 represents the time course of plasma concentration of CS2425 after administration.

Example 6: Re-Engineering of the CLDN6 Binding Variable Regions

Example 6-1: In Vitro Immunogenicity Studies Using Human PBMCs and Re-Choice of Heavy Chain and Light Chain Pairing Controlling Amino Acid Substitutions Bivalent IgG antibodies shown in Table 17 was generated. Antibody A was known to have low immunogenicity, and was used as negative control in the immunogenicity study. Anti-hA33 antibody, which was known to have high immunogenicity, was used as positive control in the immunogenicity study.

TABLE 17

| Antibody name | Heavy chain | Light chain |
|---|---|---|
| CS2419 | SEQ ID NO: 101 (comprising CLDN6 binding VH same with that of CS2425) | antibody-A light chain |
| CS2421 | antibody-A heavy chain | CLDN6 binding light chain of CS2425, shown in SEQ ID NO: 96 |

The immunogenic potential of the antibodies were evaluated by using as an indicator the proportion of IL-2-secreting CD4$^+$ T cells before active proliferation is exhibited as described in WO/2018/124005 (Kubo C. et al). Specifically, CD8$^-$ CD25$^{low}$ PBMCs were prepared from human PBMCs, and the cells were cultured for 67 hours in the presence of the antibodies. FIG. 24 shows the results of determining the proportions of IL-2-secreting cells in the cultured cell populations. As shown in FIG. 24, the frequency of positive donors for CS2419 was low compared to that for antibody-A. On the other hand, the frequency of positive donors for CS2421 was similar to that for anti-hA33 antibody. Therefore, using the proportion of IL-2-secreting CD4$^+$ T cells as the indicator, CS2419 was considered not having high immunogenic potential, but CS2421 recombined antibody having high immunogenic potential. From the results, as the CLDN6 binding light chain of CS2425, which is shown in SEQ ID NO: 96, was considered involving potential T-cell epitopes.

To identify a potential T-cell epitope from the CLDN6 binding light chain of CS2425, MHC associated peptide proteomics (MAPPs) was performed with CS2425, as described in US20050202009A1 (Kropshofer H. et al) and mAbs 2018; 10: 1168-81 (Sekiguchi N. et al). Monocytes were prepared from human PBMCs, and the cells were differentiated to dendritic cells (DCs). The DCs were pulsed with antibodies in the presence of LPS, and lysed in detergent TX-100. Peptide-MHC II complexes were obtained from lysed DCs using magnetic beads coupled with the anti-HLA-DR antibody in the immunoprecipitation process, and HLA-DR associated peptides eluted with 0.1% TFA were analyzed by LC/Orbitrap MS/MS technology. Heatmaps of MAPPs in a part of the light chain of CS2425 are shown in FIG. 25. As shown in FIG. 25, many peptides were identified as potential T-cell epitopes in a region (Sequence No. 167-184) of the CLDN6 binding light chain of CS2425, which contains Lys at amino acid position 180. As a result, this amino acid substitution at position 180 was considered a possibility to generate a potential T-cell epitope in the CLDN6 binding light chain of CS2425.

According to the results of immunogenicity analysis, the amino acid substitution T180K in the CL linked to CLDN6-binding VL caused high risk of immunogenicity, thus this mutation was not adopted to make the anti-CLDN6/CD3 bispecific antibody.

The CLDN6 binding VH 65H0671Q39E was linked to a first CH1 domain region shown in SEQ ID NO: 95, the CLDN6 binding VL 54L0571Q38K was linked to a first CL domain shown in SEQ ID NO: 63 to make a first light chain shown in SEQ ID NO: 102. The CD3 binding VH shown in SEQ ID NO: 60 was linked to a second CH1 domain shown in SEQ ID NO: 97, the CD3 binding VL shown in SEQ ID NO: 61 was linked to a second CL domain shown in SEQ ID NO: 62 to make a second light chain shown in SEQ ID NO: 98. The CH1 domains and CL domains also contains amino acid substitutions compared with natural occurring ones, which are: Glu (E) at position 147, 175 and 213 in the first CH1 domain; Lys (K) at position 123, 131 and 160 in the first CL domain; Lys (K) at amino acid position 175 in the second CH1 domain; and Glu (E) at amino acid position 131, 160 and 180 in the second CL domain. The first CH1 domain was further linked to a first hinge-CH2-CH3 region to make a first heavy chain shown in SEQ ID NO: 99, the second CH1 domain was further linked to a second hinge-CH2-CH3 region to make a second heavy chain shown in SEQ ID NO: 100. As a result, the antibody 65H0671Q39E-SG1189v14k/54L0571Q38K-SK1021//TR01H(Q39K)-SG1191v14h/TR01L(Q38E)-51(1017 (first heavy chain SEQ ID NO: 99, first light chain SEQ ID NO:102, second heavy chain SEQ ID NO: 100, second light chain SEQ ID NO:98) was generated.

The charge heterogeneity was evaluated using the Maurice (ProteinSimple) with the cIEF cartridge (PS-MC02-C). Sample load was done for 55 s. Subsequently, focusing was carried out at 1500 V for 1 min and 3000 V for 6 min. The detection was UV absorbance at 280 nm. For the anolyte, 80 mM phosphoric acid in 0.1% methyl cellulose, and for the catholyte, 100 mM sodium hydroxide in 0.1% methyl cellulose were used. Each sample solution contained constant amounts of 0.085 mg/ml sample, 2% Pharmalyte 5-8, 2% Pharmalyte 8-10.5, 0.42% methyl cellulose, 3.6M urea, 10 mM Arg, 1% pI marker 5.85 and 1% pI marker 10.17. The associated software Compass for iCE (2.0.10) was used for data analysis.

FIG. 16(B) showed the charge heterogeneity of resulted antibody when the first heavy chain, the first light chain, the second heavy chain, and the second light chain made above were expressed together. The electropherogram suggested that both mutations had a good HH and HL control, because there were no other obvious peaks other than the main peak around pI 9.0.

The bivalent IgG antibody shown in Table 18 was generated.

TABLE 18

| Antibody name | Heavy chain | Light chain |
|---|---|---|
| CS2652 | antibody-A heavy chain | 54L0571Q38K-SK1021 |

In the light chain of CS2652, the CLDN6 binding VL 54L0571Q38K was linked to a CL domain shown in SEQ ID NO: 63 to make the light chain shown in SEQ ID NO: 102.

The CL domain contains amino acid substitutions compared with natural occurring ones, which are: Lys (K) at position 123, 131 and 160.

The potential immunogenicity of the antibodies by using as an indicator the proportion of IL-2-secreting $CD4^+$ T cells. As shown in FIG. 26, the frequencies of positive donors for CS2652 was similar to that for antibody A. Therefore, this antibody was considered not to have high immunogenic potential.

Example 6-2: Generation of CLDN6 Binding Variable Region Variants

Although AE3-20/TR01 and CS2201 shows strong efficacy without any toxicities in mouse, CS2425 unexpectedly cause serious liver damage in mouse. We speculated that the modifications of amino acid sequence in the CLDN6 binding variable regions described in Example 5 might have an impact on the character of antibody, and subsequently caused toxicity. To confirm which modifications affect the antibody to cause liver toxicity, CLDN6 binding variable region variants which have less amino acid substitutions compared to that of CS2425 were constructed.

The constructed CLDN6 binding variable region variants, together with the variable regions shows binding activity towards human CD3 (VH SEQ ID NO: 70; VL SEQ ID NO: 71) were used to generate anti-CLDN6/CD3 bispecific antibodies using Fab arm exchange technique reported by Igawa et al. (WO 2016159213). The variable regions comprised in the anti-CLDN6/CD3 antibodies are shown in Table 19 and Table 20, and the generated bispecific antibodies shown in Table 21 contain a silent Fc with attenuated affinity for the Fc gamma receptor.

ECM binding of these antibodies was also evaluated by method as described in Example 4. As a results, all of these antibodies showed low ECM binding.

TABLE 19

| CLDN6 binding VH Name | Amino acid substitutions in CDRs compared with 25H | Amino acid substitutions in FRs compared with 25H | SEQ ID NO |
|---|---|---|---|
| 25H | — | — | 33 |
| 65H | None | R16G, A84D, Q105E | 84 |
| 65HQ39E | None | R16G, A84D, Q105E, Q39E | 85 |
| 25HQ39E | None | Q39E | 83 |
| 65H0671 | T33V, M34G, G54V, S62V, Y97F | R16G, A84D, Q105E | 50 |

TABLE 20

| CLDN6 binding VL Name | Amino acid substitutions in CDRs compared with 20L0532 | Amino acid substitutions in FRs compared with 20L0532 | SEQ ID NO |
|---|---|---|---|
| 20L0532 | — | — | 43 |
| 54Lo532 | None | K45E, S60D, L104V, K107E | 86 |
| 54L0532Q38K | None | K45E, S60D, L104V, K107E, Q38K | 87 |
| 20L0532Q38K | None | Q38K | 88 |
| 54L0571 | S3 IL, Y50L, D56I | K45E, S60D, L104V, K107E | 54 |

TABLE 21

| Antibody name | CLDN6 binding VH | CLDN6 binding VL | CD3 binding VH | CD3 binding VL | CH1 linked to CLDN6 binding VH | CL linked to CLDN6 binding VL | CH1 linked to CD3 binding VH | CL linked to CD3 binding VL |
|---|---|---|---|---|---|---|---|---|
| CS2884 | 65H | 54L0532 | 70 | 71 | 103 | 81 | 103 | 81 |
| CS2885 | 25H | 54L0532 | | | 103 | 81 | 103 | 81 |
| CS2886 | 65H | 20L0532 | | | 103 | 81 | 103 | 81 |
| CS2958 | 65HQ39E | 54L0532Q38K | | | 95 | 63 | 97 | 62 |
| CS2959 | 25HQ39E | 20L0532Q38K | | | 95 | 63 | 97 | 62 |
| CS2960 | 65H0671 | 54L0571 | | | 103 | 81 | 103 | 81 |

Example 6-3. Efficacy and Toxicology Evaluation of Anti-CLDN6/CD3 Bispecific Antibodies To evaluate the anti-tumor efficacy and safety of the generated anti-CLDN6/CD3 bispecific antibodies, in vivo mice studies were conducted by OV-90 T-cell injection model as follows. Mouse bearing OV-90 tumor were administered with CS2201, CS2425, CS2884, CS2885, CS2886, CS2958, CS2959 and CS2960 at 5 mg/kg, then tumor volume and body weight were calculated. Blood was also collected after treatment, then used to analyze the plasma level of liver injury markers.

FIG. 27 indicates the result of in vivo experiment using CS2884, CS2885, and CS2886 in addition to CS2201 and CS2425. As described in Table 21, these partially optimized anti-CLDN6/CD3 bispecific antibodies comprise the amino acid substitutions described in Example 5-2. As shown in FIG. 27, CS2884, CS2885, and CS2886 showed growth inhibitory effect against OV-90 tumor. There were no changes of body weight and of liver injury markers among mouse received these anti-CLDN6/CD3 bispecific antibodies except for fully optimized CS2425. This result indicates that the amino acid substitutions described in Example 5-2 was not the cause of liver injury (FIG. 28).

FIG. 29 indicates the result of in vivo experiment using CS2958, CS2959 and CS2960 in addition to CS2201 and CS2425. As described in Table 21, CS2958 comprises the amino acid substitutions described in Example 5-2 and Example 5-3, CS2959 only comprises the variable region amino acid substitutions described in Example 5-3, CS2960 comprises the amino acid substitutions described in Example 5-1 and Example 5-2. As shown in FIG. 29, these anti-CLDN6/CD3 bispecific antibodies reduced tumor growth, however, significant decrease of body weight was observed in CS2425 and CS2960 treatment groups. Consistent with body weight loss, significant elevation of liver toxicity markers were also found in CS2425 and CS2960 treatment groups (FIG. 30).

The result showing that CS2425 and CS2960 caused liver damage, suggested that the amino acid substitutions described in Example 5-1 was most likely to be the cause of toxicity.

As shown in FIG. 31, the plasma half-life ($T_{1/2}$) of CS2201, CS2958, CS2959, and CS2960 were 3.26, 3.77, 3.68 and 3.45 days, respectively. The area under the plasma concentration-time curve from zero to infinity (AUCinf) of CS2201, CS2958, CS2959 and CS2960 were 90.0, 134, 106 and 117 day*micro g/mL, respectively.

Example 6-4. Fc Optimization

To select Fc regions, several Fc variants were generated as shown in Table 22. Amino acid mutations that reduce the binding activity of the Fc region to Fc gamma receptors (FcgR silent mutations), deglycosylation mutation, and mutations to promote heavy chain hetero dimerization were introduced (as described in WO2006106905).

TABLE 22

| Fc name | FcgR silent mutation | Deglycosylation mutation | Stabilization mutation | Heavy chain Hetero | SEQ ID NO |
|---|---|---|---|---|---|
| SG1212 | L234A, L235A, A327G, A330S, P331S | N297A | S239K | K439E | 72 |
| SG1213 | L234A, L235A, A327G, A330S, P331S | N297A | S239K | E356K | 73 |
| SG1260 | L234A, L235A, A327G, A330S, P331S | N297A | | K439E | 74 |
| SG1261 | L234A, L235A, A327G, A330S, P331S | N297A | | E356K | 75 |
| SG1323 | L234A, L235A | N297A | S239K | K439E | 76 |
| SG1324 | L234A, L235A | N297A | S239K | E356K | 77 |
| SG1325 | L234A, L235A | N297A | | K439E | 78 |
| SG1326 | L234A, L235A | N297A | | E356K | 79 |

Example 6-5. Generation of CS2961, CS3346, CS3347 and CS3348

By using these Fc variants, four bispecific antibodies shown in Table 23 were constructed.

TABLE 23

| | Antibody name | | | |
|---|---|---|---|---|
| | CS2961 | CS3346 | CS3347 | CS3348 |
| CLDN6 binding VH | 65HQ39E | | | |
| 1st CH1 linked to the CLDN6 binding VH | SEQ ID NO: 95 | | | |
| Fc region linked to the 1st CH1 via hinge domain | SG1212 | SG1260 | SG1323 | SG1325 |
| CLDN6 binding heavy chain | SEQ ID NO: 104 | SEQ ID NO: 105 | SEQ ID NO: 106 | SEQ ID NO: 107 |
| CLDN6 binding VL | 54L0532Q38K | | | |
| 1st CL linked to the CLDN6 binding VL | SK1021 | SK1021 | SK1021 | SK1021 |
| CLDN6 binding light chain | SEQ ID NO: 112 | SEQ ID NO: 112 | SEQ ID NO: 112 | SEQ ID NO: 112 |
| CD3 binding VH | SEQ ID NO: 60 | | | |
| 2nd CH1 linked to the CD3 binding VH | SEQ ID NO: 97 | | | |
| Fc region linked to the 2nd CH1 via hinge domain | SG1213 | SG1261 | SG1324 | SG1326 |
| CD3 binding heavy chain | SEQ ID NO: 108 | SEQ ID NO: 109 | SEQ ID NO: 110 | SEQ ID NO: 111 |
| CD3 binding VL | SEQ ID NO: 61 | | | |
| 2nd CL linked to the CLDN6 binding VL | SK1017 | SK1017 | SK1017 | SK1017 |
| CD3 binding light chain | SEQ ID NO: 98 | SEQ ID NO: 98 | SEQ ID NO: 98 | SEQ ID NO: 98 |

Example 7. Characterization of CS2961, CS3346, CS3347 and CS3348

Example 7-1. T Cell Activation Activity of Anti-CLDN6/CD3 Bispecific Antibodies in Presence of CLDN Family Protein Expressing Cells FIG. 32 shows T cell activation activity of various concentrations of anti-CLDN6/CD3 bispecific antibodies (AE3-20/TR01, CS2201, 6PHU3/TR01, CS2425 and CS2961) in the presence of hCLDN6/BaF, hCLDN3/BaF, hCLDN4/BaF, hCLDN9/BaF, or hCLDN6(Q156L)/BaF determined by method as described in Reference Example 3. All our anti-CLDN6/CD3 bispecific antibodies induced T cell activation in the presence of hCLDN6/BaF. In addition, 10 nM of AE3-20/TR01 induced a bit higher T cell activation in the presence of hCLDN4/BaF and hCLDN6(Q156L)/BaF than the other anti-CLDN6/CD3 bispecific antibodies and 10 nM of 6PHU3/TR01 induced a bit higher T cell activation in the presence of hCLDN9/BaF.

FIG. 33 shows T cell activation activity of various concentrations of anti-CLDN6/CD3 bispecific antibodies such as CS2201, CS2961, CS3346, CS3347, and CS3348 in the presence of hCLDN6/BaF, hCLDN3/BaF, hCLDN4/BaF or hCLDN9/BaF determined by method as described in Reference Example 3. All our anti-CLDN6/CD3 bispecific antibodies induced T cell activation in the presence of hCLDN6/BaF and no T cell activation was observed by all our anti-CLDN6/CD3 bispecific antibodies in the presence of hCLDN3/BaF, hCLDN4/BaF and hCLDN9/BaF.

Example 7-2. Measurement of T-Cell-Dependent Cell Cytotoxicity of Anti-CLDN6/CD3 Bispecific Antibodies FIG. 34 shows the T-cell-dependent cell cytotoxicity of anti-CLDN6/CD3 bispecific antibodies (AE3-20/TR01, CS2201, 6PHU3/TR01, CS2425, CS2961, CS3346, CS3347, and CS3348) against OVCAR3 ovarian cancer cell line expressing CLDN6. Cell cytotoxicity was evaluated by LDH assay using human PBMC (StemCell). 20,000 target cells and 200,000 human PBMC (E/T=10) were seeded into each well of a 96-well U-bottom plate and incubated with various concentrations of antibody for 24 hours at 37 degrees C. and 5% $CO_2$. Target cell killing was measured by LDH cytotoxicity detection kit (Takara Bio). The cytotoxic activity (%) of each antibody was calculated using the following formula.

$$\text{Cytotoxic activity}(\%)=(A-B-C)\times 100/(D-C)$$

"A" represents the absorbance of wells treated with antibody and PBMC, "B" represents the average absorbance value of effector cells PBMC only, "C" represents the average absorbance value of untreated target cells only, and "D" represents the average values of wells lysed with Triton-X. Background absorbance have been accounted for and subtracted. All our anti-CLDN6/CD3 bispecific antibodies showed T-cell-dependent cell cytotoxicity against OVCAR3 cells.

Example 7-3. FACS Analysis of Specificity of CS2961 Against CLDN Family

Amino acid sequence are highly conserved among CLDN3, CLDN4, CLDN6 and CLDN9. Thus we examined CLDN6 binding specificity by FACS analysis. hCLDN6/BaF, hCLDN3/BaF, hCLDN4/BaF, and hCLDN9/BaF were incubated with CS2201, CS2961, AH05/TR01 and 6PHU3/TR01 at 15 micro g/ml. KLH/TR01 generated in Example 2-3 was used as a staining control. Binding of each antibody was detected with Alexa Fluor 488-conjugated anti human IgG (Invitrogen). Dead cells were separated by eFlour 780 (Invitrogen) staining.

As shown in FIGS. 35-1 and 35-2, all anti-CLDN6/CD3 bispecific antibodies showed strong binding to hCLDN6/BaF. Among the evaluated anti-CLDN6/CD3 bispecific antibodies, CS2961 showed the best specificity towards CLDN6.

Example 7-4. Stability

The stability of CS2961, CS3346, CS3347 and CS3348 was evaluated. Each of the antibodies were dialyzed against PBS, pH 7.4 and concentration were adjusted to 1 mg/mL upon recovery. The samples were stored at 5 degrees C. and 40 degrees C. for one week, and 40 degrees C. for two weeks. After storage, SEC analysis was conducted using SWXL G3000 column (TOSOH) with 50 mM NaPhosphate, 300 mM NaCl, pH 7.0 as running buffer. Detection was done by UV detector (280 nm). Chromatograms were analyzed using Empower 3 software (Waters).

The result shown in FIG. 36 indicated that all the antibodies shows good stability, which is surely far better than that of bispecific $sc(Fv)_2$ molecule.

Example 7-5. In Vivo Efficacy and Safety

To evaluate the anti-tumor efficacy and safety of CS2961, in vivo mice studies were conducted as follows. Mouse bearing OV-90 tumor were administered with purified CS2961 at 5 mg/kg, then tumor volume and body weight were calculated. Blood was also collected after treatment, then used to analyze the plasma level of liver injury markers.

FIG. 29 shows the result of in vivo experiment using CS2961. As shown in FIG. 29, CS2961 reduced tumor volume without decreasing the body weight of treated mice and increasing liver toxicity markers (FIG. 30).

As shown in FIG. 31, the plasma half-life ($T_{1/2}$) of CS2961 was 11.2 days, the area under the plasma concentration-time curve from zero to infinity (AUCinf) of CS2961 was 486 day*micro g/mL. These results indicated that CS2961 showed slower elimination rate compared to anti-CLDN6/CD3 bispecific antibodies generated by Fab arm exchanging technology.

CS2961 showed a potent anti-tumor activity against OV-90 tumor and good safety and PK profile in mouse. Furthermore, this antibody showed improved stability, better heterodimer formation which are preferable for large scale production. CS2961 is also easier to be purified because of the amino acid substitutions described in Example 5-2.

Example 7-6. Dose Dependent In Vivo Efficacy

In vivo potency of CS3348 were compared with AE3-20/TR01 using OV-90 T cell injection model as described in Example 2-4.

After tumor volume reached around 200 mm³ in the mice, animals were randomized and administered each bispecific antibodies or vehicle. FIG. 37 shows the tumor growth of mice treated with AE3-20/TR01, and FIG. 38 shows those with CS3348. In the experiment, the cancer cell OV-90 was transplanted into the mice at day 0, various dosage of AE3-20/TR01 was administered into the mice at day 14, and various dosage of CS3348 was administered into the mice at day 15. All the mice received one administration.

Significant efficacy against OV-90 tumors were seen in both AE3-20/TR01 and CS3348 in dose dependent manner without body weight loss at all dosage.

Of note, the tumor regression was observed in mice treated with 0.04 mg/kg of CS3348, while those was observed in mice treated with 1 mg/kg of AE3-20/TR01. In another word, the anti-tumor efficacy of CS3348 is likely to be about 25 times as strong as that of AE3-20/TR01.

Example 8. In Vivo Anti-Tumor Efficacy and Toxicity Study

The in vivo efficacy and toxicity of antibodies were evaluated using tumor bearing mice model. The human cancer cell lines OVCAR-3, NCI-H1435 or NUGC-3 which express human claudin-6 were transplanted subcutaneously into NOD/ShiJic-scid mice. Tumor bearing mice were randomized to treatment groups to receive vehicle control or Ab when tumor size reached approximately 200 mm$^3$ (called as T cell injection model).

That is, the following test was conducted in the efficacy test towards OVCAR-3, NCI-H1435 or NUGC-3 using T cell injection model. Expansion of T cells was performed using human PBMC (AllCells) and T Cell Activation/Expansion Kit (Miltenyi Biotec). 1×10$^7$ cells of cancer cells and Matrigel Basement Membrane Matrix (BD) were mixed and transplanted subcutaneously into the lateral region of the NOD/ShiJic-scid mice (CLEA Japan, Female, 6-7 weeks-old). The day of transplantation was defined as day 0. After randomization and grouping according to tumor size and body weight, anti-asialo GM1 antibody (FUJIFILM Wako Pure Chemical Corporation) was administered intraperitoneally at 0.2 mg/mouse. On the next day, the T cells which were obtained by the expansion culture were implanted intraperitoneally at 3×10$^7$ cells/mouse. Details of groups are shown in Table 24. Approximately four hours after T cell transplantation, CS3348 were administered intravenously. Administration of CS3348 was done only once. The length (L) and width (W) of the tumor mass and body weight were measured, and tumor volume (TV) was calculated as: TV=(L×W×W)/2.

As shown in FIGS. 40 to 42 (FIG. 40: OVCAR-3 bearing mice, FIG. 41: NCI-H1435 bearing mice, and FIG. 42: NUGC-3 bearing mice), CS3348 showed obvious anti-tumor activity against these 3 cancer cell lines as dose dependent manner without any toxicity including body weight loss.

TABLE 24

Details of study groups for in vivo anti-tumor efficacy evaluation

| Group | Antibody | Dosage |
|---|---|---|
| a. Study group in TK220001 (OVCAR-3 bearing mice) | | |
| 1 | vehicle | |
| 2 | CS3348 | 0.0008 mg/kg |
| 3 | CS3348 | 0.004 mg/kg |
| 4 | CS3348 | 0.02 mg/kg |
| 5 | CS3348 | 0.1 mg/kg |
| 6 | CS3348 | 0.5 mg/kg |
| 7 | CS3348 | 2.5 mg/kg |
| b. Study group in TK219005 (NCI-H1435 bearing mice) | | |
| 1 | vehicle | |
| 2 | CS3348 | 0.02 mg/kg |

TABLE 24-continued

Details of study groups for in vivo anti-tumor efficacy evaluation

| Group | Antibody | Dosage |
|---|---|---|
| 3 | CS3348 | 0.1 mg/kg |
| 4 | CS3348 | 0.5 mg/kg |
| c. Study group in TK220003 (NUGC-3 bearing mice) | | |
| 1 | vehicle | |
| 2 | CS3348 | 0.004 mg/kg |
| 3 | CS3348 | 0.02 mg/kg |
| 4 | CS3348 | 0.1 mg/kg |

Reference Example 1. Preparation of Antibody Expression Vector and Expression and Purification of Antibody Amino acid substitution or IgG conversion was carried out by a method generally known to those skilled in the art using PCR, or In fusion Advantage PCR cloning kit (Takara Bio Inc.), etc., to construct expression vectors. The obtained expression vectors were sequenced by a method generally known to those skilled in the art. The prepared plasmids were transiently transferred to FreeStyle 293 cells (ThermoFisher Scientific) or Expi293F cells (ThermoFisher Scientific) to express antibodies. Each antibody was purified from the obtained culture supernatant by a method generally known to those skilled in the art using rProtein A Sepharose™ Fast Flow (GE Healthcare Japan Corp.). In case of bispecific antibodies, ProteinL chromatography (Protenova) is necessary to remove homodimers (WO2018159615). As for the concentration of the purified antibody, the absorbance was measured at 280 nm using a spectrophotometer, and the antibody concentration was calculated by use of an extinction coefficient calculated from the obtained value by PACE (Protein Science 1995; 4: 2411-2423).

Reference Example 2. Generation of Claudin Expressing Cells

Ba/F3 cells expressing human CLDN6 (hCLDN6/BaF), Ba/F3 cells expressing human CLDN9 (hCLDN9/BaF), Ba/F3 cells expressing human CLDN3 (hCLDN3/BaF), Ba/F3 cells expressing human CLDN4 (hCLDN4/BaF), Ba/F3 cells expressing mouse CLDN6 (mCLDN6/BaF), Ba/F3 cells expressing mouse CLDN9 (mCLDN9/BaF), Ba/F3 cells expressing mouse CLDN3 (mCLDN3/BaF), and Ba/F3 cells expressing mouse CLDN4 (mCLDN4/BaF), were established by transfecting human CLDN6, human CLDN9, human CLDN3, human CLDN4, mouse CLDN6, mouse CLDN9, mouse CLDN3, and mouse CLDN4 expression vectors into mouse pro B cell line Ba/F3 respectively.

Claudin family proteins have two extracellular domains which are accessible to antibody. With regard to amino acid sequence similarity between the extracellular domains of human CLDN6 and human CLDN9, the first extracellular domain are almost the same, and there are only two different amino acids in the second extracellular domain (FIG. 39). The glutamine at position 156 of human Claudin 6 (position 156 in the sequence shown in SEQ ID NO: 125 or 126) was substituted to leucine to make a human CLDN6 mutant comprising the same amino acid as human Claudin 9 at position 156. This human CLDN6 mutant was named as hCLDN6(Q156L) (SEQ ID NO: 134). Ba/F3 transfectant stably express hCLDN6(Q156L) was generated using similar method described above. The established Ba/F3 transfectant was named hCLDN6(Q156L)/BaF.

FreeStyle™ 293-F transfectant cells transiently expressed human and mouse CLDN3, 4, 6, and 9 were generated by introducing expressing vector of human and mouse CLDNs (including CLDN6, CLDN9, CLDN3, and CLDN4) into FreeStyle™ 293-F cells (Invitrogen) using 293fectin (Invitrogen). The generated FreeStyle™ 293-F transfectant cells were named as hCLDN3/FS293, hCLDN4/FS293, hCLDN6/FS293, hCLDN9/FS293, mCLDN3/FS293, mCLDN4/FS293, mCLDN6/FS293, and mCLDN9/FS293, respectively.

Reference Example 3. T Cell Activation Activity Assay Using Jurkat Report Gene Assay T cell activation of the anti-CLDN6/CD3 bispecific antibodies in the presence of target cells was examined by T Cell Activation Bioassay using GloResponse™ NFAT-luc2 Jurkat cells (Promega). One kind of cells selected from the claudin expressing cells generated in Reference Example 2 and cancer cell lines were used as target cell in each assay.

Firstly, $2\times10^4$ of target cells were seeded on 96-wells flat bottom plate (Corning) at 25 micro L/well. Next $1\times10^5$ of Jurkat/NFAT-RE Reporter Cell Line are added in each well as effector cells, making the ratio of effector cell and target cells in each well to 5:1. Then 25 micro L of antibodies solutions with different concentrations (antibody concentration were determined assay by assay) were added to the wells, respectively. After overnight culture at 37 degrees C., 75 micro L of Bio-Glo reagent (Promega) was added to each well and the plate was incubated at room temperature for 10 minutes. Luminescence (RLU) arising from activating Jurkat cells in each well was measured by EnVision (PerkinElmer Japan) or GloMax (registered trademark) Explorer microplate reader. The luminescence ratio of each wells was calculated by comparing between the wells with and without antibody.

Although the foregoing inventions have been described in some detail by way of illustration and example for purposes of clarity of understanding, the descriptions and examples should not be construed as limiting the scope of the present disclosure. The disclosures of all patent and scientific literature cited herein are expressly incorporated in their entirety by reference.

INDUSTRIAL APPLICABILITY

The antigen-binding molecules of the present disclosure are useful in treating and/or preventing cancers, detecting the presence of CLDN6 in biological sample, and diagnosis of various cancers. One of the embodiment of the antigen-binding molecule is antigen-binding molecules that shows binding activity towards CLDN6 and T cell receptor complex that enable cancer treatment by having T cells close to CLDN6-expressing cells and using the cytotoxicity of T cells against CLDN6-expressing cancer cells.

The invention claimed is:

1. An antibody that comprises:
   a first antigen-binding site that has binding activity towards Claudin6 (CLDN6), and
   a second antigen-binding site that has binding activity towards CD3, wherein the first antigen-binding site comprises
   (a) a first heavy chain variable region comprising HVR-H1, HVR-H2, and HVR-H3 amino acid sequences shown in SEQ ID NOs: 113, 117, and 118, respectively; and a first light chain variable region comprising HVR-L1, HVR-L2, and HVR-L3 amino acid sequences shown in SEQ ID NOs: 119, 120, and 121, respectively;
   (b) a first heavy chain variable region comprising an amino acid sequence selected from SEQ ID NOs: 85, 1, 33, 84, and 83; and a first light chain variable region comprising an amino acid sequence selected from SEQ ID NOs: 87, 43, 86, and 88; or
   (c) a first heavy chain comprising an amino acid sequence selected from SEQ ID NOs: 104, 105, 106, and 107; and a first light chain comprising an amino acid sequence shown in SEQ ID NO: 112.

2. The antibody of claim 1, wherein the second antigen-binding site comprises a second heavy chain variable region and a second light chain variable region.

3. The antibody of claim 1, wherein the first heavy chain variable region is linked to a first CH1 domain shown in SEQ ID NO: 95 and the first light chain variable region is linked to a first CL domain shown in SEQ ID NO: 63.

4. The antibody of claim 2, wherein the antibody further comprises any one of the Fc region combinations selected from:
   (1) a first Fc region shown in SEQ ID NO: 72 and a second Fc region shown in SEQ ID NO: 73;
   (2) a first Fc region shown in SEQ ID NO: 74 and a second Fc region shown in SEQ ID NO: 75;
   (3) a first Fc region shown in SEQ ID NO: 76 and a second Fc region shown in SEQ ID NO: 77; and
   (4) a first Fc region shown in SEQ ID NO: 78 and a second Fc region shown in SEQ ID NO: 79.

5. The antibody of claim 4, wherein the first Fc region is in the same polypeptide chain with the first heavy chain variable region, and the second Fc region is in the same polypeptide chain with the second heavy chain variable region.

6. A pharmaceutical composition comprising the antibody of claim 1, and a pharmaceutically acceptable carrier.

7. The antibody of claim 1, wherein the first antigen-binding site is included in a single-chain Fv (scFv), Fv or Fab.

8. The antibody of claim 1, wherein the antibody further comprises an antibody Fc region.

9. The antibody of claim 1, wherein the antibody comprises a first heavy chain variable region comprising HVR-H1, HVR-H2, and HVR-H3 amino acid sequences shown in SEQ ID NOs: 113, 117, and 118, respectively; and a first light chain variable region comprising HVR-L1, HVR-L2, and HVR-L3 amino acid sequences shown in SEQ ID NOs: 119, 120, and 121, respectively.

10. The antibody of claim 1, wherein the antibody comprises a first heavy chain variable region comprising an amino acid sequence selected from SEQ ID NOs: 85, 1, 33, 84, and 83; and a first light chain variable region comprising an amino acid sequence selected from SEQ ID NOs: 87, 43, 86, and 88.

11. The antibody of claim 1, wherein the antibody comprises a first heavy chain comprising an amino acid sequence selected from SEQ ID NOs: 104, 105, 106, and 107; and a first light chain comprising an amino acid sequence shown in SEQ ID NO: 112.

12. A kit comprising the antibody of claim 1 and instructions for use.

* * * * *

SEQUENCE LISTING

```
<160> NUMBER OF SEQ ID NOS: 154

<210> SEQ ID NO 1
<211> LENGTH: 119
<212> TYPE: PRT
<213> ORGANISM: Mus musculus

<400> SEQUENCE: 1

Glu Val Lys Leu Val Glu Ser Gly Gly Gly Leu Val Lys Pro Gly Gly
1               5                   10                  15

Ser Leu Lys Leu Ser Cys Ala Ala Ser Gly Phe Thr Phe Asn Ser Tyr
            20                  25                  30

Thr Met Ser Trp Val Arg Gln Thr Pro Ala Lys Arg Leu Glu Trp Val
        35                  40                  45

Val Thr Ile Ser Ser Gly Gly Gly Arg Thr Tyr Tyr Pro Asp Ser Val
    50                  55                  60

Lys Gly Arg Phe Thr Ile Ser Arg Asp Asn Ala Arg Asn Thr Leu Tyr
65                  70                  75                  80

Leu Gln Met Ser Ser Leu Arg Ser Glu Asp Thr Ala Met Tyr Tyr Cys
                85                  90                  95

Ile Arg Gly Asp Tyr Arg Tyr Asp Gly Phe Ala Tyr Trp Gly Gln Gly
            100                 105                 110

Thr Leu Val Thr Val Ser Thr
        115

<210> SEQ ID NO 2
<211> LENGTH: 107
<212> TYPE: PRT
<213> ORGANISM: Mus musculus

<400> SEQUENCE: 2
```

-continued

Asp Ile Gln Met Thr Gln Ser Pro Ala Ser Leu Ser Ala Ser Val Gly
1               5                   10                  15

Glu Thr Val Thr Ile Thr Cys Arg Ala Ser Glu Asn Ile Asp Ser Tyr
            20                  25                  30

Leu Ala Trp Tyr Gln Gln Lys Gln Gly Lys Ser Pro Gln Leu Leu Val
        35                  40                  45

Tyr Ala Ser Thr Leu Leu Val Asp Gly Val Pro Ser Arg Phe Ser Gly
    50                  55                  60

Ser Arg Ser Gly Thr Gln Phe Ser Leu Lys Ile Asn Ser Leu Gln Ser
65                  70                  75                  80

Glu Asp Val Ala Arg Tyr Tyr Cys Gln His Tyr Tyr Ser Ile Pro Tyr
                85                  90                  95

Thr Phe Gly Ser Gly Thr Lys Leu Glu Ile Lys
            100                 105

<210> SEQ ID NO 3
<211> LENGTH: 30
<212> TYPE: PRT
<213> ORGANISM: Homo sapiens

<400> SEQUENCE: 3

Gln Val Gln Leu Val Gln Ser Gly Ala Glu Val Lys Lys Pro Gly Ser
1               5                   10                  15

Ser Val Lys Val Ser Cys Lys Ala Ser Gly Gly Thr Phe Ser
            20                  25                  30

<210> SEQ ID NO 4
<211> LENGTH: 30
<212> TYPE: PRT
<213> ORGANISM: Homo sapiens

<400> SEQUENCE: 4

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr
            20                  25                  30

<210> SEQ ID NO 5
<211> LENGTH: 30
<212> TYPE: PRT
<213> ORGANISM: Homo sapiens

<400> SEQUENCE: 5

Gln Val Thr Leu Arg Glu Ser Gly Pro Ala Leu Val Lys Pro Thr Gln
1               5                   10                  15

Thr Leu Thr Leu Thr Cys Thr Phe Ser Gly Phe Ser Leu Ser
            20                  25                  30

<210> SEQ ID NO 6
<211> LENGTH: 30
<212> TYPE: PRT
<213> ORGANISM: Homo sapiens

<400> SEQUENCE: 6

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser
            20                  25                  30

<210> SEQ ID NO 7

```
<211> LENGTH: 30
<212> TYPE: PRT
<213> ORGANISM: Homo sapiens

<400> SEQUENCE: 7

Gln Val Gln Leu Gln Glu Ser Gly Pro Gly Leu Val Lys Pro Ser Glu
1               5                   10                  15

Thr Leu Ser Leu Thr Cys Thr Val Ser Gly Gly Ser Ile Ser
            20                  25                  30

<210> SEQ ID NO 8
<211> LENGTH: 30
<212> TYPE: PRT
<213> ORGANISM: Homo sapiens

<400> SEQUENCE: 8

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr
            20                  25                  30

<210> SEQ ID NO 9
<211> LENGTH: 30
<212> TYPE: PRT
<213> ORGANISM: Homo sapiens

<400> SEQUENCE: 9

Gln Val Gln Leu Gln Gln Ser Gly Pro Gly Leu Val Lys Pro Ser Gln
1               5                   10                  15

Thr Leu Ser Leu Thr Cys Ala Ile Ser Gly Asp Ser Val Ser
            20                  25                  30

<210> SEQ ID NO 10
<211> LENGTH: 14
<212> TYPE: PRT
<213> ORGANISM: Homo sapiens

<400> SEQUENCE: 10

Trp Val Arg Gln Ala Pro Gly Gln Gly Leu Glu Trp Met Gly
1               5                   10

<210> SEQ ID NO 11
<211> LENGTH: 32
<212> TYPE: PRT
<213> ORGANISM: Homo sapiens

<400> SEQUENCE: 11

Arg Val Thr Ile Thr Ala Asp Glu Ser Thr Ser Thr Ala Tyr Met Glu
1               5                   10                  15

Leu Ser Ser Leu Arg Ser Glu Asp Thr Ala Val Tyr Tyr Cys Ala Arg
            20                  25                  30

<210> SEQ ID NO 12
<211> LENGTH: 32
<212> TYPE: PRT
<213> ORGANISM: Homo sapiens

<400> SEQUENCE: 12

Arg Val Thr Ile Thr Ala Asp Glu Ser Thr Ser Thr Ala Tyr Met Glu
1               5                   10                  15

Leu Ser Ser Leu Arg Ser Glu Asp Thr Ala Val Tyr Tyr Cys Ala Arg
            20                  25                  30
```

<210> SEQ ID NO 13
<211> LENGTH: 32
<212> TYPE: PRT
<213> ORGANISM: Homo sapiens

<400> SEQUENCE: 13

Arg Leu Thr Ile Ser Lys Asp Thr Ser Lys Asn Gln Val Val Leu Thr
1               5                   10                  15

Met Thr Asn Met Asp Pro Val Asp Thr Ala Thr Tyr Tyr Cys Ala Arg
            20                  25                  30

<210> SEQ ID NO 14
<211> LENGTH: 32
<212> TYPE: PRT
<213> ORGANISM: Homo sapiens

<400> SEQUENCE: 14

Arg Phe Thr Ile Ser Arg Asp Asn Ser Lys Asn Thr Leu Tyr Leu Gln
1               5                   10                  15

Met Asn Ser Leu Arg Ala Glu Asp Thr Ala Val Tyr Tyr Cys Ala Arg
            20                  25                  30

<210> SEQ ID NO 15
<211> LENGTH: 32
<212> TYPE: PRT
<213> ORGANISM: Homo sapiens

<400> SEQUENCE: 15

Arg Val Thr Ile Ser Val Asp Thr Ser Lys Asn Gln Phe Ser Leu Lys
1               5                   10                  15

Leu Ser Ser Val Thr Ala Ala Asp Thr Ala Val Tyr Tyr Cys Ala Arg
            20                  25                  30

<210> SEQ ID NO 16
<211> LENGTH: 32
<212> TYPE: PRT
<213> ORGANISM: Homo sapiens

<400> SEQUENCE: 16

Gln Val Thr Ile Ser Ala Asp Lys Ser Ile Ser Thr Ala Tyr Leu Gln
1               5                   10                  15

Trp Ser Ser Leu Lys Ala Ser Asp Thr Ala Met Tyr Tyr Cys Ala Arg
            20                  25                  30

<210> SEQ ID NO 17
<211> LENGTH: 32
<212> TYPE: PRT
<213> ORGANISM: Homo sapiens

<400> SEQUENCE: 17

Arg Ile Thr Ile Asn Pro Asp Thr Ser Lys Asn Gln Phe Ser Leu Gln
1               5                   10                  15

Leu Asn Ser Val Thr Pro Glu Asp Thr Ala Val Tyr Tyr Cys Ala Arg
            20                  25                  30

<210> SEQ ID NO 18
<211> LENGTH: 11
<212> TYPE: PRT
<213> ORGANISM: Homo sapiens

<400> SEQUENCE: 18

Trp Gly Gln Gly Thr Leu Val Thr Val Ser Ser

```
1               5                   10
```

<210> SEQ ID NO 19
<211> LENGTH: 23
<212> TYPE: PRT
<213> ORGANISM: Homo sapiens

<400> SEQUENCE: 19

```
Asp Ile Gln Met Thr Gln Ser Pro Ser Ser Leu Ser Ala Ser Val Gly
1               5                   10                  15

Asp Arg Val Thr Ile Thr Cys
            20
```

<210> SEQ ID NO 20
<211> LENGTH: 23
<212> TYPE: PRT
<213> ORGANISM: Homo sapiens

<400> SEQUENCE: 20

```
Asp Ile Val Met Thr Gln Ser Pro Leu Ser Leu Pro Val Thr Pro Gly
1               5                   10                  15

Glu Pro Ala Ser Ile Ser Cys
            20
```

<210> SEQ ID NO 21
<211> LENGTH: 23
<212> TYPE: PRT
<213> ORGANISM: Homo sapiens

<400> SEQUENCE: 21

```
Glu Ile Val Leu Thr Gln Ser Pro Ala Thr Leu Ser Leu Ser Pro Gly
1               5                   10                  15

Glu Arg Ala Thr Leu Ser Cys
            20
```

<210> SEQ ID NO 22
<211> LENGTH: 23
<212> TYPE: PRT
<213> ORGANISM: Homo sapiens

<400> SEQUENCE: 22

```
Asp Ile Val Met Thr Gln Ser Pro Asp Ser Leu Ala Val Ser Leu Gly
1               5                   10                  15

Glu Arg Ala Thr Ile Asn Cys
            20
```

<210> SEQ ID NO 23
<211> LENGTH: 15
<212> TYPE: PRT
<213> ORGANISM: Homo sapiens

<400> SEQUENCE: 23

```
Trp Tyr Gln Gln Lys Pro Gly Lys Ala Pro Lys Leu Leu Ile Tyr
1               5                   10                  15
```

<210> SEQ ID NO 24
<211> LENGTH: 32
<212> TYPE: PRT
<213> ORGANISM: Homo sapiens

<400> SEQUENCE: 24

```
Gly Val Pro Ser Arg Phe Ser Gly Ser Gly Ser Gly Thr Asp Phe Thr
1               5                   10                  15
```

Leu Thr Ile Ser Ser Leu Gln Pro Glu Asp Phe Ala Thr Tyr Tyr Cys
            20                  25                  30

<210> SEQ ID NO 25
<211> LENGTH: 32
<212> TYPE: PRT
<213> ORGANISM: Homo sapiens

<400> SEQUENCE: 25

Gly Val Pro Asp Arg Phe Ser Gly Ser Gly Ser Gly Thr Asp Phe Thr
1               5                   10                  15

Leu Lys Ile Ser Arg Val Glu Ala Glu Asp Val Gly Val Tyr Tyr Cys
            20                  25                  30

<210> SEQ ID NO 26
<211> LENGTH: 32
<212> TYPE: PRT
<213> ORGANISM: Homo sapiens

<400> SEQUENCE: 26

Gly Ile Pro Ala Arg Phe Ser Gly Ser Gly Ser Gly Thr Asp Phe Thr
1               5                   10                  15

Leu Thr Ile Ser Ser Leu Glu Pro Glu Asp Phe Ala Val Tyr Tyr Cys
            20                  25                  30

<210> SEQ ID NO 27
<211> LENGTH: 32
<212> TYPE: PRT
<213> ORGANISM: Homo sapiens

<400> SEQUENCE: 27

Gly Val Pro Asp Arg Phe Ser Gly Ser Gly Ser Gly Thr Asp Phe Thr
1               5                   10                  15

Leu Thr Ile Ser Ser Leu Gln Ala Glu Asp Val Ala Val Tyr Tyr Cys
            20                  25                  30

<210> SEQ ID NO 28
<211> LENGTH: 10
<212> TYPE: PRT
<213> ORGANISM: Homo sapiens

<400> SEQUENCE: 28

Phe Gly Gln Gly Thr Lys Val Glu Ile Lys
1               5                   10

<210> SEQ ID NO 29
<211> LENGTH: 10
<212> TYPE: PRT
<213> ORGANISM: Homo sapiens

<400> SEQUENCE: 29

Phe Gly Gln Gly Thr Lys Leu Glu Ile Lys
1               5                   10

<210> SEQ ID NO 30
<211> LENGTH: 15
<212> TYPE: PRT
<213> ORGANISM: Artificial sequence
<220> FEATURE:
<223> OTHER INFORMATION: an artificially synthesized sequence

<400> SEQUENCE: 30

Trp Tyr Gln Gln Lys Pro Gly Lys Ala Pro Gln Leu Leu Ile Tyr

-continued

<210> SEQ ID NO 31
<211> LENGTH: 15
<212> TYPE: PRT
<213> ORGANISM: Artificial sequence
<220> FEATURE:
<223> OTHER INFORMATION: an artificially synthesized sequence

<400> SEQUENCE: 31

Trp Tyr Gln Gln Lys Pro Gly Lys Ser Pro Gln Leu Leu Ile Tyr
1               5                   10                  15

<210> SEQ ID NO 32
<211> LENGTH: 32
<212> TYPE: PRT
<213> ORGANISM: Artificial sequence
<220> FEATURE:
<223> OTHER INFORMATION: an artificially synthesized sequence

<400> SEQUENCE: 32

Gly Val Pro Ser Arg Phe Ser Gly Ser Arg Ser Gly Thr Asp Phe Thr
1               5                   10                  15

Leu Thr Ile Ser Ser Leu Gln Pro Glu Asp Phe Ala Thr Tyr Tyr Cys
            20                  25                  30

<210> SEQ ID NO 33
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 33

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Thr Met Ser Trp Val Arg Gln Ala Pro Gly Gln Gly Leu Glu Trp Met
        35                  40                  45

Gly Thr Ile Ser Ser Gly Gly Gly Arg Thr Tyr Tyr Pro Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Asp Tyr Arg Tyr Asp Gly Phe Ala Tyr Trp Gly Gln Gly
            100                 105                 110

Thr Leu Val Thr Val Ser Ser
        115

<210> SEQ ID NO 34
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 34

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Leu

```
                    20                  25                  30
Thr Met Ser Trp Val Arg Gln Ala Pro Gly Gln Gly Leu Glu Trp Met
        35                  40                  45
Gly Thr Ile Ser Ser Gly Gly Arg Thr Tyr Tyr Pro Phe Ser Val
    50                  55                  60
Lys Gly Arg Phe Thr Ile Ser Arg Asp Asn Ser Lys Asn Thr Leu Tyr
65                  70                  75                  80
Leu Gln Met Asn Ser Leu Arg Ala Glu Asp Thr Ala Val Tyr Tyr Cys
                85                  90                  95
Ala Arg Gly Asp Tyr Arg Tyr Asp Gly Phe Ala Tyr Trp Gly Gln Gly
            100                 105                 110
Thr Leu Val Thr Val Ser Ser
        115

<210> SEQ ID NO 35
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 35

Gln Val Gln Leu Val Glu Ser Gly Gly Val Val Gln Pro Gly Arg
1               5                   10                  15
Ser Leu Arg Leu Ser Cys Ala Ala Ser Gly Phe Thr Phe Ser Ser Leu
                20                  25                  30
Thr Met Ser Trp Val Arg Gln Ala Pro Gly Gln Gly Leu Glu Trp Met
        35                  40                  45
Gly Thr Ile Ser Ser Gly Gly Arg Thr Tyr Tyr Pro Asp Ser Val
    50                  55                  60
Lys Gly Arg Phe Thr Ile Ser Arg Asp Asn Ser Lys Asn Thr Leu Tyr
65                  70                  75                  80
Leu Gln Met Asn Ser Leu Arg Ala Glu Asp Thr Ala Val Tyr Tyr Cys
                85                  90                  95
Ala Arg Gly Asp Tyr Arg Tyr Asp Gly Phe Ala Tyr Trp Gly Gln Gly
            100                 105                 110
Thr Leu Val Thr Val Ser Ser
        115

<210> SEQ ID NO 36
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 36

Gln Val Gln Leu Val Glu Ser Gly Gly Val Val Gln Pro Gly Arg
1               5                   10                  15
Ser Leu Arg Leu Ser Cys Ala Ala Ser Gly Phe Thr Phe Ser Ser Val
                20                  25                  30
Thr Met Ser Trp Val Arg Gln Ala Pro Gly Gln Gly Leu Glu Trp Met
        35                  40                  45
Gly Thr Ile Ser Ser Gly Gly Gly Arg Thr Tyr Tyr Pro Asp Ser Val
    50                  55                  60
Lys Gly Arg Phe Thr Ile Ser Arg Asp Asn Ser Lys Asn Thr Leu Tyr
65                  70                  75                  80
```

Leu Gln Met Asn Ser Leu Arg Ala Glu Asp Thr Ala Val Tyr Tyr Cys
                85                  90                  95

Ala Arg Gly Asp Tyr Arg Tyr Asp Gly Phe Ala Tyr Trp Gly Gln Gly
            100                 105                 110

Thr Leu Val Thr Val Ser Ser
        115

<210> SEQ ID NO 37
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 37

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Val Met Ser Trp Val Arg Gln Ala Pro Gly Gln Gly Leu Glu Trp Met
        35                  40                  45

Gly Thr Ile Ser Ser Gly Gly Arg Thr Tyr Tyr Pro Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Asp Tyr Arg Tyr Asp Gly Phe Ala Tyr Trp Gly Gln Gly
            100                 105                 110

Thr Leu Val Thr Val Ser Ser
        115

<210> SEQ ID NO 38
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 38

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Thr Met Ser Trp Val Arg Gln Ala Pro Gly Gln Gly Leu Glu Trp Met
        35                  40                  45

Gly Thr Ile Ser Ser Lys Gly Gly Arg Thr Tyr Tyr Pro Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Asp Tyr Arg Tyr Asp Gly Phe Ala Tyr Trp Gly Gln Gly
            100                 105                 110

Thr Leu Val Thr Val Ser Ser
        115

<210> SEQ ID NO 39

<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 39

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Thr Met Ser Trp Val Arg Gln Ala Pro Gly Gln Gly Leu Glu Trp Met
        35                  40                  45

Gly Thr Ile Ser Ser Gly Gly Arg Thr Tyr Tyr Pro Phe Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Asp Tyr Arg Tyr Asp Gly Phe Ala Tyr Trp Gly Gln Gly
            100                 105                 110

Thr Leu Val Thr Val Ser Ser
        115

<210> SEQ ID NO 40
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 40

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Thr Met Ser Trp Val Arg Gln Ala Pro Gly Gln Gly Leu Glu Trp Met
        35                  40                  45

Gly Thr Ile Ser Ser Gly Gly Arg Thr Tyr Tyr Pro Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Asp Tyr Arg Tyr Asp Gly Phe Ala Met Trp Gly Gln Gly
            100                 105                 110

Thr Leu Val Thr Val Ser Ser
        115

<210> SEQ ID NO 41
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 41

Asp Ile Val Met Thr Gln Ser Pro Asp Ser Leu Ala Val Ser Leu Gly
1               5                   10                  15

```
Glu Arg Ala Thr Ile Asn Cys Arg Ala Ser Tyr Asn Ile Asp Ser Tyr
            20                  25                  30

Leu Ala Trp Tyr Gln Gln Lys Pro Gly Lys Ala Pro Lys Leu Leu Ile
        35                  40                  45

Tyr Ala Ser Thr Leu Leu Val Asp Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln His Tyr Tyr Ser Ile Pro Tyr
                85                  90                  95

Thr Phe Gly Gln Gly Thr Lys Val Glu Ile Lys
            100                 105

<210> SEQ ID NO 42
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 42

Asp Ile Gln Met Thr Gln Ser Pro Ser Ser Leu Ser Ala Ser Val Gly
1               5                   10                  15

Asp Arg Val Thr Ile Thr Cys Arg Ala Ser Tyr Asn Ile Asp Ser Tyr
            20                  25                  30

Leu Ala Trp Tyr Gln Gln Lys Pro Gly Lys Ala Pro Lys Leu Leu Ile
        35                  40                  45

Tyr Ala Ser Thr Leu Leu Val Asp Gly Val Pro Ser Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln His Tyr Tyr Ser Ile Pro Tyr
                85                  90                  95

Thr Phe Gly Gln Gly Thr Lys Leu Glu Ile Lys
            100                 105

<210> SEQ ID NO 43
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 43

Asp Ile Gln Met Thr Gln Ser Pro Ser Ser Leu Ser Ala Ser Val Gly
1               5                   10                  15

Asp Arg Val Thr Ile Thr Cys Arg Ala Ser Tyr Asn Ile Asp Ser Tyr
            20                  25                  30

Leu Ala Trp Tyr Gln Gln Lys Pro Gly Lys Ala Pro Lys Leu Leu Ile
        35                  40                  45

Tyr Tyr Ser Thr Leu Leu Val Asp Gly Val Pro Ser Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln His Tyr Tyr Ser Ile Pro Tyr
                85                  90                  95

Thr Phe Gly Gln Gly Thr Lys Leu Glu Ile Lys
            100                 105
```

<210> SEQ ID NO 44
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 44

Gln Val Gln Leu Val Glu Ser Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Val Gly Ser Trp Val Arg Gln Ala Pro Gly Gln Gly Leu Glu Trp Met
        35                  40                  45

Gly Thr Ile Ser Ser Gly Val Gly Arg Thr Tyr Tyr Pro Asp Val Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Asp Tyr Arg Tyr Asp Gly Phe Ala Tyr Trp Gly Gln Gly
            100                 105                 110

Thr Leu Val Thr Val Ser Ser
        115

<210> SEQ ID NO 45
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 45

Gln Val Gln Leu Val Glu Ser Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Val Gly Ser Trp Val Arg Gln Ala Pro Gly Gln Gly Leu Glu Trp Met
        35                  40                  45

Gly Thr Ile Ser Ser Gly Val Gly Arg Thr Tyr Tyr Pro Asp Val Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Asp Phe Arg Tyr Asp Gly Phe Ala Tyr Trp Gly Gln Gly
            100                 105                 110

Thr Leu Val Thr Val Ser Ser
        115

<210> SEQ ID NO 46
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 46

Asp Ile Gln Met Thr Gln Ser Pro Ser Ser Leu Ser Ala Ser Val Gly
1               5                   10                  15

Asp Arg Val Thr Ile Thr Cys Arg Ala Ser Tyr Asn Ile Asp Leu Tyr
            20                  25                  30

Leu Ala Trp Tyr Gln Gln Lys Pro Gly Lys Ala Pro Lys Leu Leu Ile
        35                  40                  45

Tyr Leu Ser Thr Leu Leu Val Ile Gly Val Pro Ser Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln His Tyr Tyr Ser Ile Pro Tyr
                85                  90                  95

Thr Phe Gly Gln Gly Thr Lys Leu Glu Ile Lys
            100                 105

<210> SEQ ID NO 47
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 47

Gln Val Gln Leu Val Glu Ser Gly Gly Val Val Gln Pro Gly Asp
1               5                   10                  15

Ser Leu Arg Leu Ser Cys Ala Ala Ser Gly Phe Thr Phe Ser Ser Tyr
            20                  25                  30

Val Gly Ser Trp Val Arg Gln Ala Pro Gly Glu Gly Leu Glu Trp Met
        35                  40                  45

Gly Thr Ile Ser Ser Gly Val Gly Arg Thr Tyr Tyr Pro Asp Val Val
    50                  55                  60

Lys Gly Arg Phe Thr Ile Ser Arg Asp Asp Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Asp Phe Arg Tyr Asp Gly Phe Ala Tyr Trp Gly Gln Gly
            100                 105                 110

Thr Leu Val Thr Val Ser Ser
        115

<210> SEQ ID NO 48
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 48

Gln Val Gln Leu Val Glu Ser Gly Gly Val Val Gln Pro Gly Asp
1               5                   10                  15

Ser Leu Arg Leu Ser Cys Ala Ala Ser Gly Phe Thr Phe Ser Ser Tyr
            20                  25                  30

Val Gly Ser Trp Val Arg Gln Ala Pro Gly Glu Gly Leu Glu Trp Met
        35                  40                  45

Gly Thr Ile Ser Ser Gly Val Gly Arg Thr Tyr Tyr Pro Asp Val Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Tyr Cys
                85                  90                  95

Ala Arg Gly Asp Phe Arg Tyr Asp Gly Phe Ala Tyr Trp Gly Gln Gly
            100                 105                 110

Thr Leu Val Thr Val Ser Ser
        115

<210> SEQ ID NO 49
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 49

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Ser Tyr
            20                  25                  30

Val Gly Ser Trp Val Arg Gln Ala Pro Gly Gln Gly Leu Glu Trp Met
        35                  40                  45

Gly Thr Ile Ser Ser Gly Val Gly Arg Thr Tyr Tyr Pro Asp Val Val
    50                  55                  60

Lys Gly Arg Phe Thr Ile Ser Arg Asp Asn Ser Thr Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Asp Phe Arg Tyr Asp Gly Phe Ala Tyr Trp Gly Glu Gly
            100                 105                 110

Thr Leu Val Thr Val Ser Ser
        115

<210> SEQ ID NO 50
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 50

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Ser Tyr
            20                  25                  30

Val Gly Ser Trp Val Arg Gln Ala Pro Gly Gln Gly Leu Glu Trp Met
        35                  40                  45

Gly Thr Ile Ser Ser Gly Val Gly Arg Thr Tyr Tyr Pro Asp Val Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Tyr Cys
                85                  90                  95

Ala Arg Gly Asp Phe Arg Tyr Asp Gly Phe Ala Tyr Trp Gly Glu Gly
            100                 105                 110

Thr Leu Val Thr Val Ser Ser
        115

```
<210> SEQ ID NO 51
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 51

Asp Ile Gln Met Thr Gln Ser Pro Ser Ser Leu Ser Ala Ser Val Gly
1               5                   10                  15

Asp Arg Val Thr Ile Thr Cys Arg Ala Ser Tyr Asn Ile Asp Leu Tyr
            20                  25                  30

Leu Ala Trp Tyr Gln Gln Lys Pro Gly Lys Ala Pro Glu Leu Leu Ile
        35                  40                  45

Tyr Leu Ser Thr Leu Leu Val Ile Gly Val Pro Asp Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln His Tyr Tyr Ser Ile Pro Tyr
                85                  90                  95

Thr Phe Gly Gln Gly Thr Lys Leu Glu Ile Glu
            100                 105

<210> SEQ ID NO 52
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 52

Asp Ile Gln Met Thr Gln Ser Pro Ser Ser Leu Ser Ala Ser Val Gly
1               5                   10                  15

Asp Arg Val Thr Ile Thr Cys Arg Ala Ser Tyr Asn Ile Asp Leu Tyr
            20                  25                  30

Leu Ala Trp Tyr Gln Gln Lys Pro Gly Lys Ala Pro Lys Leu Leu Ile
        35                  40                  45

Tyr Leu Ser Thr Leu Leu Val Ile Gly Val Pro Ser Arg Phe Ser Gly
    50                  55                  60

Ser Arg Ser Gly Thr Asp Phe Thr Leu Thr Ile Ser Ser Leu Glu Pro
65                  70                  75                  80

Glu Asp Phe Ala Val Tyr Tyr Cys Gln His Tyr Tyr Ser Ile Pro Tyr
                85                  90                  95

Thr Phe Gly Gln Gly Thr Lys Leu Glu Ile Glu
            100                 105

<210> SEQ ID NO 53
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 53

Asp Ile Gln Met Thr Gln Ser Pro Ser Ser Leu Ser Ala Ser Val Gly
1               5                   10                  15

Asp Arg Val Thr Ile Thr Cys Arg Ala Ser Tyr Asn Ile Asp Leu Tyr
            20                  25                  30

Leu Ala Trp Tyr Gln Gln Lys Pro Gly Lys Ala Pro Glu Leu Leu Ile
        35                  40                  45
```

Tyr Leu Ser Thr Leu Leu Val Ile Gly Val Pro Asp Arg Phe Ser Gly
            50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln His Tyr Tyr Ser Ile Pro Tyr
                85                  90                  95

Thr Phe Gly Gln Gly Thr Lys Leu Glu Ile Lys
            100                 105

<210> SEQ ID NO 54
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 54

Asp Ile Gln Met Thr Gln Ser Pro Ser Ser Leu Ser Ala Ser Val Gly
1               5                   10                  15

Asp Arg Val Thr Ile Thr Cys Arg Ala Ser Tyr Asn Ile Asp Leu Tyr
            20                  25                  30

Leu Ala Trp Tyr Gln Gln Lys Pro Gly Lys Ala Pro Glu Leu Leu Ile
            35                  40                  45

Tyr Leu Ser Thr Leu Leu Val Ile Gly Val Pro Asp Arg Phe Ser Gly
            50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln His Tyr Tyr Ser Ile Pro Tyr
                85                  90                  95

Thr Phe Gly Gln Gly Thr Lys Val Glu Ile Glu
            100                 105

<210> SEQ ID NO 55
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 55

Gln Val Gln Leu Val Glu Ser Gly Gly Gly Val Val Gln Pro Gly Asp
1               5                   10                  15

Ser Leu Arg Leu Ser Cys Ala Ala Ser Gly Phe Thr Phe Ser Ser Tyr
            20                  25                  30

Val Gly Ser Trp Val Arg Gln Ala Pro Gly Glu Gly Leu Glu Trp Met
            35                  40                  45

Gly Thr Ile Ser Ser Gly Val Gly Arg Thr Tyr Tyr Pro Asp Val Val
            50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Tyr Cys
                85                  90                  95

Ala Arg Gly Asp Tyr Arg Tyr Asp Gly Phe Ala Tyr Trp Gly Gln Gly
            100                 105                 110

Thr Leu Val Thr Val Ser Ser
            115

-continued

```
<210> SEQ ID NO 56
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 56
```

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Ser Tyr
            20                  25                  30

Val Gly Ser Trp Val Arg Gln Ala Pro Gly Gln Gly Leu Glu Trp Met
        35                  40                  45

Gly Thr Ile Ser Ser Gly Val Gly Arg Thr Tyr Tyr Pro Asp Val Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Tyr Cys
                85                  90                  95

Ala Arg Gly Asp Tyr Arg Tyr Asp Gly Phe Ala Tyr Trp Gly Glu Gly
            100                 105                 110

Thr Leu Val Thr Val Ser Ser
        115

```
<210> SEQ ID NO 57
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 57
```

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Ser Tyr
            20                  25                  30

Val Gly Ser Trp Val Arg Glu Ala Pro Gly Gln Gly Leu Glu Trp Met
        35                  40                  45

Gly Thr Ile Ser Ser Gly Val Gly Arg Thr Tyr Tyr Pro Asp Val Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Tyr Cys
                85                  90                  95

Ala Arg Gly Asp Phe Arg Tyr Asp Gly Phe Ala Tyr Trp Gly Glu Gly
            100                 105                 110

Thr Leu Val Thr Val Ser Ser
        115

```
<210> SEQ ID NO 58
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 58
```

Asp Ile Gln Met Thr Gln Ser Pro Ser Ser Leu Ser Ala Ser Val Gly
1               5                   10                  15

```
Asp Arg Val Thr Ile Thr Cys Arg Ala Ser Tyr Asn Ile Asp Leu Tyr
            20                  25                  30

Leu Ala Trp Tyr Gln Lys Pro Gly Lys Ala Pro Glu Leu Leu Ile
        35                  40                  45

Tyr Leu Ser Thr Leu Leu Val Ile Gly Val Pro Asp Arg Phe Ser Gly
50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln His Tyr Tyr Ser Ile Pro Tyr
                85                  90                  95

Thr Phe Gly Gln Gly Thr Lys Val Glu Ile Glu
                100                 105
```

<210> SEQ ID NO 59
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 59

```
Arg Thr Val Ala Ala Pro Ser Val Phe Ile Phe Pro Pro Ser Asp Lys
1               5                   10                  15

Gln Leu Lys Ser Gly Thr Ala Lys Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Lys Glu Ser Val Thr Glu Gln Asp Ser Lys Asp Ser
50                  55                  60

Thr Tyr Ser Leu Ser Ser Thr Leu Lys Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
                100                 105
```

<210> SEQ ID NO 60
<211> LENGTH: 122
<212> TYPE: PRT
<213> ORGANISM: Artificial sequence
<220> FEATURE:
<223> OTHER INFORMATION: an artificially synthesized sequence

<400> SEQUENCE: 60

```
Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Asn Ala
            20                  25                  30

Trp Met His Trp Val Arg Lys Ala Pro Gly Lys Gly Leu Glu Trp Val
        35                  40                  45

Ala Gln Ile Lys Asp Lys Ser Gln Asn Tyr Ala Thr Tyr Val Ala Glu
        50                  55                  60

Ser Val Lys Gly Arg Phe Thr Ile Ser Arg Ala Asp Ser Lys Asn Ser
65                  70                  75                  80

Ile Tyr Leu Gln Met Asn Ser Leu Lys Thr Glu Asp Thr Ala Val Tyr
                85                  90                  95

Tyr Cys Arg Tyr Val His Tyr Ala Ala Gly Tyr Gly Val Asp Ile Trp
```

```
                    100                 105                 110

Gly Gln Gly Thr Thr Val Thr Val Ser Ser
            115                 120

<210> SEQ ID NO 61
<211> LENGTH: 112
<212> TYPE: PRT
<213> ORGANISM: Artificial sequence
<220> FEATURE:
<223> OTHER INFORMATION: an artificially synthesized sequence

<400> SEQUENCE: 61

Asp Ile Val Met Thr Gln Ser Pro Leu Ser Leu Pro Val Thr Pro Gly
1               5                   10                  15

Glu Pro Ala Ser Ile Ser Cys Arg Ser Ser Gln Pro Leu Val His Ser
            20                  25                  30

Asn Arg Asn Thr Tyr Leu His Trp Tyr Gln Glu Lys Pro Gly Gln Ala
        35                  40                  45

Pro Arg Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Gln Gly
                85                  90                  95

Thr Gln Val Pro Tyr Thr Phe Gly Gln Gly Thr Lys Leu Glu Ile Lys
            100                 105                 110

<210> SEQ ID NO 62
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 62

Arg Thr Val Ala Ala Pro Ser Val Phe Ile Phe Pro Pro Ser Asp Glu
1               5                   10                  15

Gln Leu Lys Ser Gly Thr Ala Glu Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Glu Glu Ser Val Thr Glu Gln Asp Ser Lys Asp Ser
    50                  55                  60

Thr Tyr Ser Leu Ser Ser Thr Leu Glu Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 63
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 63

Arg Thr Val Ala Ala Pro Ser Val Phe Ile Phe Pro Pro Ser Asp Lys
1               5                   10                  15
```

Gln Leu Lys Ser Gly Thr Ala Lys Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Lys Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 64
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 64

Gln Val Gln Leu Val Glu Ser Gly Gly Gly Val Val Gln Pro Gly Asp
1               5                   10                  15

Ser Leu Arg Leu Ser Cys Ala Ala Ser Gly Phe Thr Phe Ser Ser Tyr
            20                  25                  30

Val Gly Ser Trp Val Arg Glu Ala Pro Gly Glu Gly Leu Glu Trp Met
        35                  40                  45

Gly Thr Ile Ser Ser Gly Val Gly Arg Thr Tyr Tyr Pro Asp Val Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Tyr Cys
                85                  90                  95

Ala Arg Gly Asp Phe Arg Tyr Asp Gly Phe Ala Tyr Trp Gly Gln Gly
            100                 105                 110

Thr Leu Val Thr Val Ser Ser
        115

<210> SEQ ID NO 65
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 65

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Ser Tyr
            20                  25                  30

Val Gly Ser Trp Val Arg Glu Ala Pro Gly Gln Gly Leu Glu Trp Met
        35                  40                  45

Gly Thr Ile Ser Ser Gly Val Gly Arg Thr Tyr Tyr Pro Asp Val Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Tyr Cys

```
                85                  90                  95
Ala Arg Gly Asp Tyr Arg Tyr Asp Gly Phe Ala Tyr Trp Gly Glu Gly
            100                 105                 110

Thr Leu Val Thr Val Ser Ser
        115

<210> SEQ ID NO 66
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 66

Gln Val Gln Leu Gln Glu Ser Gly Pro Gly Leu Val Arg Pro Ser Gln
1               5                   10                  15

Thr Leu Ser Leu Thr Cys Thr Val Ser Gly Tyr Ser Ile Thr Ser Asp
            20                  25                  30

His Ala Trp Ser Trp Val Arg Gln Pro Pro Gly Arg Gly Leu Glu Trp
        35                  40                  45

Ile Gly Tyr Ile Ser Tyr Ser Gly Ile Thr Thr Tyr Asn Pro Ser Leu
    50                  55                  60

Lys Ser Arg Val Thr Met Leu Arg Asp Thr Ser Lys Asn Gln Phe Ser
65                  70                  75                  80

Leu Arg Leu Ser Ser Val Thr Ala Ala Asp Thr Ala Val Tyr Tyr Cys
                85                  90                  95

Ala Arg Ser Leu Ala Arg Thr Thr Ala Met Asp Tyr Trp Gly Gln Gly
            100                 105                 110

Ser Leu Val Thr Val Ser Ser
        115

<210> SEQ ID NO 67
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 67

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Ser Ser Tyr
            20                  25                  30

Leu Asn Trp Tyr Gln Gln Lys Pro Gly Lys Ala Pro Lys Leu Leu Ile
        35                  40                  45

Tyr Tyr Thr Ser Arg Leu His Ser Gly Val Pro Ser Arg Phe Ser Gly
    50                  55                  60

Ser Gly Ser Gly Thr Asp Phe Thr Phe Thr Ile Ser Ser Leu Gln Pro
65                  70                  75                  80

Glu Asp Ile Ala Thr Tyr Tyr Cys Gln Gln Gly Asn Thr Leu Pro Tyr
                85                  90                  95

Thr Phe Gly Gln Gly Thr Lys Val Glu Ile Lys
            100                 105

<210> SEQ ID NO 68
<211> LENGTH: 116
<212> TYPE: PRT
<213> ORGANISM: Artificial sequence
<220> FEATURE:
```

<223> OTHER INFORMATION: an artificially synthesized sequence

<400> SEQUENCE: 68

Gln Val Gln Leu Gln Gln Ser Gly Pro Gln Leu Val Arg Pro Gly Ala
1               5                   10                  15

Ser Val Lys Ile Ser Cys Lys Ala Ser Gly Tyr Ser Phe Thr Ser Tyr
            20                  25                  30

Trp Met His Trp Val Asn Gln Arg Pro Gly Gln Gly Leu Glu Trp Ile
        35                  40                  45

Gly Met Ile Asp Pro Ser Tyr Ser Glu Thr Arg Leu Asn Gln Lys Phe
    50                  55                  60

Lys Asp Lys Ala Thr Leu Thr Val Asp Lys Ser Ser Thr Ala Tyr
65                  70                  75                  80

Met Gln Leu Ser Ser Pro Thr Ser Glu Asp Ser Ala Val Tyr Tyr Cys
            85                  90                  95

Ala Leu Tyr Gly Asn Tyr Phe Asp Tyr Trp Gly Gln Gly Thr Thr Leu
            100                 105                 110

Thr Val Ser Ser
            115

<210> SEQ ID NO 69
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 69

Asp Ile Gln Met Thr Gln Ser Ser Ser Phe Ser Val Ser Leu Gly
1               5                   10                  15

Asp Arg Val Thr Ile Thr Cys Lys Ala Ser Glu Asp Ile Tyr Asn Arg
            20                  25                  30

Leu Ala Trp Tyr Gln Gln Lys Pro Gly Asn Ala Pro Arg Leu Leu Ile
        35                  40                  45

Ser Gly Ala Thr Ser Leu Glu Thr Gly Val Pro Ser Arg Phe Ser Gly
    50                  55                  60

Ser Gly Ser Gly Lys Asp Tyr Thr Leu Ser Ile Thr Ser Leu Gln Thr
65                  70                  75                  80

Glu Asp Val Ala Thr Tyr Tyr Cys Gln Gln Tyr Trp Ser Thr Pro Tyr
            85                  90                  95

Thr Phe Gly Gly Gly Thr Lys Leu Glu Val Lys
            100                 105

<210> SEQ ID NO 70
<211> LENGTH: 122
<212> TYPE: PRT
<213> ORGANISM: Artificial sequence
<220> FEATURE:
<223> OTHER INFORMATION: an artificially synthesized sequence

<400> SEQUENCE: 70

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Asn Ala
            20                  25                  30

Trp Met His Trp Val Arg Gln Ala Pro Gly Lys Gly Leu Glu Trp Val
        35                  40                  45

Ala Gln Ile Lys Asp Lys Ser Gln Asn Tyr Ala Thr Tyr Val Ala Glu

```
                    50                  55                  60
Ser Val Lys Gly Arg Phe Thr Ile Ser Arg Ala Asp Ser Lys Asn Ser
 65                  70                  75                  80

Ile Tyr Leu Gln Met Asn Ser Leu Lys Thr Glu Asp Thr Ala Val Tyr
                     85                  90                  95

Tyr Cys Arg Tyr Val His Tyr Ala Ala Gly Tyr Gly Val Asp Ile Trp
                    100                 105                 110

Gly Gln Gly Thr Thr Val Thr Val Ser Ser
                115                 120

<210> SEQ ID NO 71
<211> LENGTH: 112
<212> TYPE: PRT
<213> ORGANISM: Artificial sequence
<220> FEATURE:
<223> OTHER INFORMATION: an artificially synthesized sequence

<400> SEQUENCE: 71

Asp Ile Val Met Thr Gln Ser Pro Leu Ser Leu Pro Val Thr Pro Gly
 1               5                  10                  15

Glu Pro Ala Ser Ile Ser Cys Arg Ser Ser Gln Pro Leu Val His Ser
                20                  25                  30

Asn Arg Asn Thr Tyr Leu His Trp Tyr Gln Gln Lys Pro Gly Gln Ala
            35                  40                  45

Pro Arg Leu Leu Ile Tyr Lys Val Ser Asn Arg Phe Ser Gly Val Pro
        50                  55                  60

Asp Arg Phe Ser Gly Ser Gly Ser Gly Thr Asp Phe Thr Leu Lys Ile
 65                  70                  75                  80

Ser Arg Val Glu Ala Glu Asp Val Gly Val Tyr Tyr Cys Gln Gly Gln
                 85                  90                  95

Thr Gln Val Pro Tyr Thr Phe Gly Gln Gly Thr Lys Leu Glu Ile Lys
                100                 105                 110

<210> SEQ ID NO 72
<211> LENGTH: 328
<212> TYPE: PRT
<213> ORGANISM: Artificial sequence
<220> FEATURE:
<223> OTHER INFORMATION: an artificially synthesized sequence

<400> SEQUENCE: 72

Ala Ser Thr Lys Gly Pro Ser Val Phe Pro Leu Ala Pro Ser Ser Lys
 1               5                  10                  15

Ser Thr Ser Gly Gly Thr Ala Ala Leu Gly Cys Leu Val Glu Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Glu Ser Ser Gly Leu Tyr Ser
        50                  55                  60

Leu Ser Ser Val Val Thr Val Pro Ser Ser Ser Leu Gly Thr Gln Thr
 65                  70                  75                  80

Tyr Ile Cys Asn Val Asn His Lys Pro Ser Asn Thr Lys Val Asp Glu
                 85                  90                  95

Arg Val Glu Pro Lys Ser Cys Asp Lys Thr His Thr Cys Pro Pro Cys
                100                 105                 110

Pro Ala Pro Glu Ala Ala Gly Gly Pro Lys Val Phe Leu Phe Pro Pro
            115                 120                 125
```

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Ala Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Gly Leu Pro Ser Ser Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
                260                 265                 270

Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
        290                 295                 300

Val Phe Ser Cys Ser Val Met His Glu Ala Leu His Asn His Tyr Thr
305                 310                 315                 320

Gln Glu Ser Leu Ser Leu Ser Pro
                325

<210> SEQ ID NO 73
<211> LENGTH: 328
<212> TYPE: PRT
<213> ORGANISM: Artificial sequence
<220> FEATURE:
<223> OTHER INFORMATION: an artificially synthesized sequence

<400> SEQUENCE: 73

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Lys Ser Ser Gly Leu Tyr Ser
        50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Ala Ala Gly Gly Pro Lys Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

```
Tyr Val Asp Gly Val Glu Val His Asn Ala Lys Thr Lys Pro Arg Glu
                165                 170                 175

Glu Gln Tyr Ala Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Gly Leu Pro Ser Ser Ile Glu Lys Thr Ile Ser Lys Ala Lys Gly
    210                 215                 220

Gln Pro Arg Glu Pro Gln Val Tyr Thr Leu Pro Pro Ser Arg Lys Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro
                325
```

<210> SEQ ID NO 74
<211> LENGTH: 328
<212> TYPE: PRT
<213> ORGANISM: Artificial sequence
<220> FEATURE:
<223> OTHER INFORMATION: an artificially synthesized sequence

<400> SEQUENCE: 74

```
Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Glu Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Glu Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Glu
                85                  90                  95

Arg Val Glu Pro Lys Ser Cys Asp Lys Thr His Thr Cys Pro Pro Cys
            100                 105                 110

Pro Ala Pro Glu Ala Ala Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Ala Ser Thr Tyr Arg Val Val Ser Val Leu Thr Val Leu
            180                 185                 190
```

His Gln Asp Trp Leu Asn Gly Lys Glu Tyr Lys Cys Lys Val Ser Asn
            195                 200                 205

Lys Gly Leu Pro Ser Ser Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Ser Asn Gly Gln Pro Glu Asn
            260                 265                 270

Asn Tyr Lys Thr Thr Pro Pro Val Leu Asp Ser Asp Gly Ser Phe Phe
    275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Glu Ser Leu Ser Leu Ser Pro
                325

<210> SEQ ID NO 75
<211> LENGTH: 328
<212> TYPE: PRT
<213> ORGANISM: Artificial sequence
<220> FEATURE:
<223> OTHER INFORMATION: an artificially synthesized sequence

<400> SEQUENCE: 75

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Lys Ser Ser Gly Leu Tyr Ser
    50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Ala Ala Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Ala Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Gly Leu Pro Ser Ser Ile Glu Lys Thr Ile Ser Lys Ala Lys Gly
    210                 215                 220

```
Gln Pro Arg Glu Pro Gln Val Tyr Thr Leu Pro Ser Arg Lys Glu
225                 230                 235                 240

Met Thr Lys Asn Gln Val Ser Leu Thr Cys Leu Val Lys Gly Phe Tyr
            245                 250                 255

Pro Ser Asp Ile Ala Val Glu Trp Glu Ser Asn Gly Gln Pro Glu Asn
        260                 265                 270

Asn Tyr Lys Thr Thr Pro Pro Val Leu Asp Ser Asp Gly Ser Phe Phe
    275                 280                 285

Leu Tyr Ser Lys Leu Thr Val Asp Lys Ser Arg Trp Gln Gln Gly Asn
290                 295                 300

Val Phe Ser Cys Ser Val Met His Glu Ala Leu His Asn His Tyr Thr
305                 310                 315                 320

Gln Lys Ser Leu Ser Leu Ser Pro
                325

<210> SEQ ID NO 76
<211> LENGTH: 328
<212> TYPE: PRT
<213> ORGANISM: Artificial sequence
<220> FEATURE:
<223> OTHER INFORMATION: an artificially synthesized sequence

<400> SEQUENCE: 76

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Glu Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Glu Ser Ser Gly Leu Tyr Ser
    50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Glu
                85                  90                  95

Arg Val Glu Pro Lys Ser Cys Asp Lys Thr His Thr Cys Pro Pro Cys
            100                 105                 110

Pro Ala Pro Glu Ala Ala Gly Gly Pro Lys Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Ala Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255
```

```
Pro Ser Asp Ile Ala Val Glu Trp Glu Ser Asn Gly Gln Pro Glu Asn
                260                 265                 270

Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
290                 295                 300

Val Phe Ser Cys Ser Val Met His Glu Ala Leu His Asn His Tyr Thr
305                 310                 315                 320

Gln Glu Ser Leu Ser Leu Ser Pro
                325

<210> SEQ ID NO 77
<211> LENGTH: 328
<212> TYPE: PRT
<213> ORGANISM: Artificial sequence
<220> FEATURE:
<223> OTHER INFORMATION: an artificially synthesized sequence

<400> SEQUENCE: 77

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Lys Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Ala Ala Gly Gly Pro Lys Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Ala Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Lys Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285
```

```
Leu Tyr Ser Lys Leu Thr Val Asp Lys Ser Arg Trp Gln Gln Gly Asn
            290                 295                 300

Val Phe Ser Cys Ser Val Met His Glu Ala Leu His Asn His Tyr Thr
305                 310                 315                 320

Gln Lys Ser Leu Ser Leu Ser Pro
                325

<210> SEQ ID NO 78
<211> LENGTH: 328
<212> TYPE: PRT
<213> ORGANISM: Artificial sequence
<220> FEATURE:
<223> OTHER INFORMATION: an artificially synthesized sequence

<400> SEQUENCE: 78

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Glu Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Glu Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Glu
                85                  90                  95

Arg Val Glu Pro Lys Ser Cys Asp Lys Thr His Thr Cys Pro Pro Cys
            100                 105                 110

Pro Ala Pro Glu Ala Ala Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Ala Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320
```

Gln Glu Ser Leu Ser Leu Ser Pro
                325

<210> SEQ ID NO 79
<211> LENGTH: 328
<212> TYPE: PRT
<213> ORGANISM: Artificial sequence
<220> FEATURE:
<223> OTHER INFORMATION: an artificially synthesized sequence

<400> SEQUENCE: 79

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Lys Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Ala Ala Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Ala Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Lys Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro
                325

<210> SEQ ID NO 80
<211> LENGTH: 328

```
<212> TYPE: PRT
<213> ORGANISM: Artificial sequence
<220> FEATURE:
<223> OTHER INFORMATION: an artificially synthesized sequence

<400> SEQUENCE: 80

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro
                325

<210> SEQ ID NO 81
<211> LENGTH: 107
<212> TYPE: PRT
<213> ORGANISM: Homo sapiens

<400> SEQUENCE: 81

Arg Thr Val Ala Ala Pro Ser Val Phe Ile Phe Pro Pro Ser Asp Glu
```

```
               1               5                  10                 15
Gln Leu Lys Ser Gly Thr Ala Ser Val Val Cys Leu Leu Asn Asn Phe
               20                 25                 30
Tyr Pro Arg Glu Ala Lys Val Gln Trp Lys Val Asp Asn Ala Leu Gln
               35                 40                 45
Ser Gly Asn Ser Gln Glu Ser Val Thr Glu Gln Asp Ser Lys Asp Ser
               50                 55                 60
Thr Tyr Ser Leu Ser Ser Thr Leu Thr Leu Ser Lys Ala Asp Tyr Glu
65                 70                 75                 80
Lys His Lys Val Tyr Ala Cys Glu Val Thr His Gln Gly Leu Ser Ser
                   85                 90                 95
Pro Val Thr Lys Ser Phe Asn Arg Gly Glu Cys
                  100                105

<210> SEQ ID NO 82
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 82

Asp Ile Val Met Thr Gln Ser Pro Asp Ser Leu Ala Val Ser Leu Gly
1               5                  10                 15
Glu Arg Ala Thr Ile Asn Cys Arg Ala Ser Glu Asn Ile Asp Ser Tyr
                20                 25                 30
Leu Ala Trp Tyr Gln Gln Lys Pro Gly Lys Ala Pro Lys Leu Leu Ile
                35                 40                 45
Tyr Ala Ser Thr Leu Leu Val Asp Gly Val Pro Ser Arg Phe Ser Gly
                50                 55                 60
Ser Gly Ser Gly Thr Asp Phe Thr Leu Thr Ile Ser Ser Leu Gln Pro
65                 70                 75                 80
Glu Asp Phe Ala Thr Tyr Tyr Cys Gln His Tyr Tyr Ser Ile Pro Tyr
                   85                 90                 95
Thr Phe Gly Gln Gly Thr Lys Val Glu Ile Lys
                  100                105

<210> SEQ ID NO 83
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 83

Gln Val Gln Leu Val Glu Ser Gly Gly Gly Val Val Gln Pro Gly Arg
1               5                  10                 15
Ser Leu Arg Leu Ser Cys Ala Ala Ser Gly Phe Thr Phe Ser Ser Tyr
                20                 25                 30
Thr Met Ser Trp Val Arg Glu Ala Pro Gly Gln Gly Leu Glu Trp Met
                35                 40                 45
Gly Thr Ile Ser Ser Gly Gly Gly Arg Thr Tyr Tyr Pro Asp Ser Val
                50                 55                 60
Lys Gly Arg Phe Thr Ile Ser Arg Asp Asn Ser Lys Asn Thr Leu Tyr
65                 70                 75                 80
Leu Gln Met Asn Ser Leu Arg Ala Glu Asp Thr Ala Val Tyr Tyr Cys
                   85                 90                 95
```

-continued

Ala Arg Gly Asp Tyr Arg Tyr Asp Gly Phe Ala Tyr Trp Gly Gln Gly
            100                 105                 110

Thr Leu Val Thr Val Ser Ser
        115

<210> SEQ ID NO 84
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 84

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Ser Tyr
            20                  25                  30

Thr Met Ser Trp Val Arg Gln Ala Pro Gly Gln Gly Leu Glu Trp Met
        35                  40                  45

Gly Thr Ile Ser Ser Gly Gly Arg Thr Tyr Tyr Pro Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Tyr Cys
            85                  90                  95

Ala Arg Gly Asp Tyr Arg Tyr Asp Gly Phe Ala Tyr Trp Gly Glu Gly
            100                 105                 110

Thr Leu Val Thr Val Ser Ser
        115

<210> SEQ ID NO 85
<211> LENGTH: 119
<212> TYPE: PRT
<213> ORGANISM: Artificial sequence
<220> FEATURE:
<223> OTHER INFORMATION: an artificially synthesized sequence

<400> SEQUENCE: 85

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Ser Tyr
            20                  25                  30

Thr Met Ser Trp Val Arg Glu Ala Pro Gly Gln Gly Leu Glu Trp Met
        35                  40                  45

Gly Thr Ile Ser Ser Gly Gly Arg Thr Tyr Tyr Pro Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Tyr Cys
            85                  90                  95

Ala Arg Gly Asp Tyr Arg Tyr Asp Gly Phe Ala Tyr Trp Gly Glu Gly
            100                 105                 110

Thr Leu Val Thr Val Ser Ser
        115

<210> SEQ ID NO 86
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 86

Asp Ile Gln Met Thr Gln Ser Pro Ser Ser Leu Ser Ala Ser Val Gly
1               5                   10                  15

Asp Arg Val Thr Ile Thr Cys Arg Ala Ser Tyr Asn Ile Asp Ser Tyr
            20                  25                  30

Leu Ala Trp Tyr Gln Gln Lys Pro Gly Lys Ala Pro Glu Leu Leu Ile
        35                  40                  45

Tyr Tyr Ser Thr Leu Leu Val Asp Gly Val Pro Asp Arg Phe Ser Gly
50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln His Tyr Tyr Ser Ile Pro Tyr
                85                  90                  95

Thr Phe Gly Gln Gly Thr Lys Val Glu Ile Glu
            100                 105

<210> SEQ ID NO 87
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 87

Asp Ile Gln Met Thr Gln Ser Pro Ser Ser Leu Ser Ala Ser Val Gly
1               5                   10                  15

Asp Arg Val Thr Ile Thr Cys Arg Ala Ser Tyr Asn Ile Asp Ser Tyr
            20                  25                  30

Leu Ala Trp Tyr Gln Lys Lys Pro Gly Lys Ala Pro Glu Leu Leu Ile
        35                  40                  45

Tyr Tyr Ser Thr Leu Leu Val Asp Gly Val Pro Asp Arg Phe Ser Gly
50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln His Tyr Tyr Ser Ile Pro Tyr
                85                  90                  95

Thr Phe Gly Gln Gly Thr Lys Val Glu Ile Glu
            100                 105

<210> SEQ ID NO 88
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 88

Asp Ile Gln Met Thr Gln Ser Pro Ser Ser Leu Ser Ala Ser Val Gly
1               5                   10                  15

Asp Arg Val Thr Ile Thr Cys Arg Ala Ser Tyr Asn Ile Asp Ser Tyr
            20                  25                  30

Leu Ala Trp Tyr Gln Lys Lys Pro Gly Lys Ala Pro Lys Leu Leu Ile
        35                  40                  45

Tyr Tyr Ser Thr Leu Leu Val Asp Gly Val Pro Ser Arg Phe Ser Gly
50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln His Tyr Tyr Ser Ile Pro Tyr
                85                  90                  95

Thr Phe Gly Gln Gly Thr Lys Leu Glu Ile Lys
            100                 105

<210> SEQ ID NO 89
<211> LENGTH: 121
<212> TYPE: PRT
<213> ORGANISM: Mus musculus

<400> SEQUENCE: 89

Glu Val Gln Val Glu Gln Ser Gly Pro Glu Leu Val Lys Pro Gly Ala
1               5                   10                  15

Ser Val Lys Ile Ser Cys Lys Thr Ser Gly Tyr Thr Phe Thr Glu Tyr
                20                  25                  30

Thr Met His Trp Val Lys Gln Ser His Gly Lys Ser Leu Glu Trp Ile
            35                  40                  45

Gly Gly Ile Asn Pro Asn Asn Gly Asn Thr Arg Tyr Asn Gln Lys Phe
        50                  55                  60

Lys Gly Lys Ala Thr Leu Thr Val Asp Lys Ser Ser Ser Thr Ala Tyr
65                  70                  75                  80

Met Glu Leu Arg Thr Leu Thr Ser Glu Asp Ser Ala Val Tyr Tyr Cys
                85                  90                  95

Ala Arg Cys Gly Asp Phe Asp Leu Phe Phe Phe Ala Tyr Trp Gly
                100                 105                 110

Gln Gly Thr Leu Val Thr Val Ser Ala
            115                 120

<210> SEQ ID NO 90
<211> LENGTH: 107
<212> TYPE: PRT
<213> ORGANISM: Mus musculus

<400> SEQUENCE: 90

Asp Ile Val Met Thr Gln Ser Gln Lys Phe Met Ser Thr Ser Val Gly
1               5                   10                  15

Asp Arg Val Ser Val Thr Cys Lys Ala Ser Gln Asn Val Gly Ser Asn
                20                  25                  30

Val Ala Trp Tyr Gln Gln Lys Pro Gly Gln Ser Pro Glu Gly Leu Ile
            35                  40                  45

Ser Ser Ala Ser Ser Arg Phe Ser Gly Val Pro Asp Arg Phe Thr Gly
        50                  55                  60

Ser Gly Ser Gly Thr Asp Phe Thr Leu Thr Ile Thr Asn Val Gln Ser
65                  70                  75                  80

Glu Asp Leu Ala Glu Tyr Phe Cys Gln Gln Tyr Asn Ser Tyr Pro Phe
                85                  90                  95

Thr Phe Gly Ser Gly Thr Glu Leu Glu Ile Lys
            100                 105

<210> SEQ ID NO 91
<211> LENGTH: 123
<212> TYPE: PRT
<213> ORGANISM: Leporinae trouessart

<400> SEQUENCE: 91

Gln Ser Leu Glu Glu Ser Gly Gly Arg Leu Val Thr Pro Gly Thr Pro

```
1               5                   10                  15
Leu Thr Leu Thr Cys Thr Val Ser Gly Ile Asp Leu Asn Asn Tyr Gly
                20                  25                  30

Val Gly Trp Val Arg Gln Pro Pro Gly Lys Gly Leu Glu Trp Ile Gly
        35                  40                  45

Tyr Ile Asn Ala Leu Gly Ser Ala Tyr Tyr Ala Ser Trp Ala Lys Gly
        50                  55                  60

Arg Phe Thr Ile Ser Arg Thr Ser Thr Thr Val Asp Leu Lys Ile Thr
65                  70                  75                  80

Ser Pro Thr Thr Glu Asp Thr Ala Thr Tyr Phe Cys Ala Arg Val Arg
                85                  90                  95

Tyr Leu Tyr Ile Gly Gly Gly Tyr Trp Ile Asp Arg Leu Asp Leu
                100                 105                 110

Trp Gly Gln Gly Thr Leu Val Thr Val Ser Ser
            115                 120
```

<210> SEQ ID NO 92
<211> LENGTH: 110
<212> TYPE: PRT
<213> ORGANISM: Leporinae trouessart

<400> SEQUENCE: 92

```
Asp Val Val Met Thr Gln Thr Pro Ala Ser Val Glu Ala Ala Val Gly
1               5                   10                  15

Asp Thr Val Thr Ile Lys Cys Gln Ala Ser Gln Ser Ile Ser Ser Cys
                20                  25                  30

Leu Ser Trp Tyr Gln Gln Lys Pro Gly Gln Pro Pro Lys Leu Leu Ile
        35                  40                  45

Tyr Tyr Ala Ser Thr Leu Ala Ser Gly Val Pro Ser Arg Phe Ser Gly
        50                  55                  60

Ser Gly Ser Gly Thr Glu Phe Thr Leu Thr Ile Ser Gly Leu Gln Cys
65                  70                  75                  80

Asp Asp Ala Ala Thr Tyr Tyr Cys Leu Gly Val Val Ser Tyr Val Ser
                85                  90                  95

Ala Asp Gly Gly Phe Gly Gly Gly Thr Glu Val Val Val Lys
                100                 105                 110
```

<210> SEQ ID NO 93
<211> LENGTH: 117
<212> TYPE: PRT
<213> ORGANISM: Artificial sequence
<220> FEATURE:
<223> OTHER INFORMATION: an artificially synthesized sequence

<400> SEQUENCE: 93

```
Glu Val Gln Leu Gln Gln Ser Gly Pro Glu Leu Val Lys Pro Gly Ala
1               5                   10                  15

Ser Met Lys Ile Ser Cys Lys Ala Ser Gly Tyr Ser Phe Thr Gly Tyr
                20                  25                  30

Thr Met Asn Trp Val Lys Gln Ser His Gly Lys Asn Leu Glu Trp Ile
        35                  40                  45

Gly Leu Ile Asn Pro Tyr Asn Gly Gly Thr Ile Tyr Asn Gln Lys Phe
        50                  55                  60

Lys Gly Lys Ala Thr Leu Thr Val Asp Lys Ser Ser Ser Thr Ala Tyr
65                  70                  75                  80

Met Glu Leu Leu Ser Leu Thr Ser Glu Asp Ser Ala Val Tyr Tyr Cys
                85                  90                  95
```

```
Ala Arg Asp Tyr Gly Phe Val Leu Asp Tyr Trp Gly Gln Gly Thr Thr
            100                 105                 110

Leu Thr Val Ser Ser
        115

<210> SEQ ID NO 94
<211> LENGTH: 107
<212> TYPE: PRT
<213> ORGANISM: Artificial sequence
<220> FEATURE:
<223> OTHER INFORMATION: an artificially synthesized sequence

<400> SEQUENCE: 94

Asp Ile Val Leu Thr Gln Ser Pro Ser Ile Met Ser Val Ser Pro Gly
1               5                   10                  15

Glu Lys Val Thr Ile Thr Cys Ser Ala Ser Ser Ser Val Ser Tyr Met
            20                  25                  30

His Trp Phe Gln Gln Lys Pro Gly Thr Ser Pro Lys Leu Cys Ile Tyr
        35                  40                  45

Ser Thr Ser Asn Leu Ala Ser Gly Val Pro Ala Arg Phe Ser Gly Arg
    50                  55                  60

Gly Ser Gly Thr Ser Tyr Ser Leu Thr Ile Ser Arg Val Ala Ala Glu
65                  70                  75                  80

Asp Ala Ala Thr Tyr Tyr Cys Gln Gln Arg Ser Asn Tyr Pro Pro Trp
                85                  90                  95

Thr Phe Gly Gly Gly Thr Lys Leu Glu Ile Lys
            100                 105

<210> SEQ ID NO 95
<211> LENGTH: 98
<212> TYPE: PRT
<213> ORGANISM: Artificial sequence
<220> FEATURE:
<223> OTHER INFORMATION: an artificially synthesized sequence

<400> SEQUENCE: 95

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Glu Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Glu Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Glu
                85                  90                  95

Arg Val

<210> SEQ ID NO 96
<211> LENGTH: 214
<212> TYPE: PRT
<213> ORGANISM: Artificial sequence
<220> FEATURE:
<223> OTHER INFORMATION: an artificially synthesized sequence

<400> SEQUENCE: 96

Asp Ile Gln Met Thr Gln Ser Pro Ser Ser Leu Ser Ala Ser Val Gly
```

-continued

```
1               5                   10                  15

Asp Arg Val Thr Ile Thr Cys Arg Ala Ser Tyr Asn Ile Asp Leu Tyr
                20                  25                  30

Leu Ala Trp Tyr Gln Lys Pro Gly Lys Ala Pro Glu Leu Leu Ile
            35                  40                  45

Tyr Leu Ser Thr Leu Leu Val Ile Gly Val Pro Asp Arg Phe Ser Gly
        50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln His Tyr Tyr Ser Ile Pro Tyr
                85                  90                  95

Thr Phe Gly Gln Gly Thr Lys Val Glu Ile Glu Arg Thr Val Ala Ala
                100                 105                 110

Pro Ser Val Phe Ile Phe Pro Pro Ser Asp Lys Gln Leu Lys Ser Gly
            115                 120                 125

Thr Ala Lys Val Val Cys Leu Leu Asn Asn Phe Tyr Pro Arg Glu Ala
        130                 135                 140

Lys Val Gln Trp Lys Val Asp Asn Ala Leu Gln Ser Gly Asn Ser Lys
145                 150                 155                 160

Glu Ser Val Thr Glu Gln Asp Ser Lys Asp Ser Thr Tyr Ser Leu Ser
                165                 170                 175

Ser Thr Leu Lys Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
            210
```

<210> SEQ ID NO 97
<211> LENGTH: 98
<212> TYPE: PRT
<213> ORGANISM: Artificial sequence
<220> FEATURE:
<223> OTHER INFORMATION: an artificially synthesized sequence

<400> SEQUENCE: 97

```
Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Lys Ser Ser Gly Leu Tyr Ser
        50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val
```

<210> SEQ ID NO 98
<211> LENGTH: 219
<212> TYPE: PRT
<213> ORGANISM: Artificial sequence
<220> FEATURE:
<223> OTHER INFORMATION: an artificially synthesized sequence -continued

<400> SEQUENCE: 98

Asp Ile Val Met Thr Gln Ser Pro Leu Ser Leu Pro Val Thr Pro Gly
1               5                   10                  15

Glu Pro Ala Ser Ile Ser Cys Arg Ser Ser Gln Pro Leu Val His Ser
            20                  25                  30

Asn Arg Asn Thr Tyr Leu His Trp Tyr Gln Lys Pro Gly Gln Ala
        35                  40                  45

Pro Arg Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Gly Gln Gly
                85                  90                  95

Thr Gln Val Pro Tyr Thr Phe Gly Gln Gly Thr Lys Leu Glu Ile Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Glu Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Glu Glu Ser Val Thr Glu Gln Asp Ser Lys Asp Ser
                165                 170                 175

Thr Tyr Ser Leu Ser Ser Thr Leu Glu Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
    210                 215

<210> SEQ ID NO 99
<211> LENGTH: 447
<212> TYPE: PRT
<213> ORGANISM: Artificial sequence
<220> FEATURE:
<223> OTHER INFORMATION: an artificially synthesized sequence

<400> SEQUENCE: 99

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Ser Tyr
            20                  25                  30

Val Gly Ser Trp Val Arg Glu Ala Pro Gly Gln Gly Leu Glu Trp Met
        35                  40                  45

Gly Thr Ile Ser Ser Gly Val Gly Arg Thr Tyr Tyr Pro Asp Val Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Tyr Cys
                85                  90                  95

Ala Arg Gly Asp Phe Arg Tyr Asp Gly Phe Ala Tyr Trp Gly Glu Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu

```
            130                 135                 140
Gly Cys Leu Val Glu Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Glu Ser Ser Gly Leu Tyr Ser Leu Ser Ser Val Val Thr Val Pro Ser
                180                 185                 190

Ser Ser Leu Gly Thr Gln Thr Tyr Ile Cys Asn Val Asn His Lys Pro
                195                 200                 205

Ser Asn Thr Lys Val Asp Glu Arg Val Glu Pro Lys Ser Cys Asp Lys
            210                 215                 220

Thr His Thr Cys Pro Pro Cys Pro Ala Pro Glu Leu Arg Arg Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
                260                 265                 270

Pro Glu Val Lys Phe Asn Trp Tyr Val Asp Gly Val Glu Val His Asn
                275                 280                 285

Ala Lys Thr Lys Pro Arg Glu Glu Gln Tyr Ala Ser Thr Tyr Arg Val
            290                 295                 300

Val Ser Val Leu Thr Val Leu His Gln Asp Trp Leu Asn Gly Lys Glu
305                 310                 315                 320

Tyr Lys Cys Lys Val Ser Asn Lys Gly Leu Pro Ser Ser Ile Glu Lys
                325                 330                 335

Thr Ile Ser Lys Ala Lys Gly Gln Pro Arg Glu Pro Gln Val Cys Thr
                340                 345                 350

Leu Pro Pro Ser Arg Glu Glu Met Thr Lys Asn Gln Val Ser Leu Trp
                355                 360                 365

Cys Leu Val Lys Gly Phe Tyr Pro Ser Asp Ile Ala Val Glu Trp Glu
                370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
                420                 425                 430

Ala Leu His Asn His Tyr Thr Gln Lys Ser Leu Ser Leu Ser Pro
                435                 440                 445

<210> SEQ ID NO 100
<211> LENGTH: 450
<212> TYPE: PRT
<213> ORGANISM: Artificial sequence
<220> FEATURE:
<223> OTHER INFORMATION: an artificially synthesized sequence

<400> SEQUENCE: 100

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Asn Ala
                20                  25                  30

Trp Met His Trp Val Arg Lys Ala Pro Gly Lys Gly Leu Glu Trp Val
                35                  40                  45

Ala Gln Ile Lys Asp Lys Ser Gln Asn Tyr Ala Thr Tyr Val Ala Glu
```

```
            50                  55                  60
Ser Val Lys Gly Arg Phe Thr Ile Ser Arg Ala Asp Ser Lys Asn Ser
 65                  70                  75                  80

Ile Tyr Leu Gln Met Asn Ser Leu Lys Thr Glu Asp Thr Ala Val Tyr
                     85                  90                  95

Tyr Cys Arg Tyr Val His Tyr Ala Ala Gly Tyr Gly Val Asp Ile Trp
                100                 105                 110

Gly Gln Gly Thr Thr Val Thr Val Ser Ser Ala Ser Thr Lys Gly Pro
                115                 120                 125

Ser Val Phe Pro Leu Ala Pro Ser Ser Lys Ser Thr Ser Gly Gly Thr
130                 135                 140

Ala Ala Leu Gly Cys Leu Val Lys Asp Tyr Phe Pro Glu Pro Val Thr
145                 150                 155                 160

Val Ser Trp Asn Ser Gly Ala Leu Thr Ser Gly Val His Thr Phe Pro
                165                 170                 175

Ala Val Leu Lys Ser Ser Gly Leu Tyr Ser Leu Ser Ser Val Val Thr
                180                 185                 190

Val Pro Ser Ser Ser Leu Gly Thr Gln Thr Tyr Ile Cys Asn Val Asn
                195                 200                 205

His Lys Pro Ser Asn Thr Lys Val Asp Lys Arg Val Glu Pro Lys Ser
                210                 215                 220

Cys Asp Lys Thr His Thr Cys Pro Pro Cys Pro Ala Pro Glu Leu Arg
225                 230                 235                 240

Arg Gly Pro Ser Val Phe Leu Phe Pro Pro Lys Pro Lys Asp Thr Leu
                245                 250                 255

Met Ile Ser Arg Thr Pro Glu Val Thr Cys Val Val Val Asp Val Ser
                260                 265                 270

His Glu Asp Pro Glu Val Lys Phe Asn Trp Tyr Val Asp Gly Val Glu
                275                 280                 285

Val His Asn Ala Lys Thr Lys Pro Arg Glu Glu Gln Tyr Ala Ser Thr
                290                 295                 300

Tyr Arg Val Val Ser Val Leu Thr Val Leu His Gln Asp Trp Leu Asn
305                 310                 315                 320

Gly Lys Glu Tyr Lys Cys Lys Val Ser Asn Lys Gly Leu Pro Ser Ser
                325                 330                 335

Ile Glu Lys Thr Ile Ser Lys Ala Lys Gly Gln Pro Arg Glu Pro Gln
                340                 345                 350

Val Tyr Thr Leu Pro Pro Ser Arg Cys Glu Met Thr Lys Asn Gln Val
                355                 360                 365

Ser Leu Ser Cys Ala Val Lys Gly Phe Tyr Pro Ser Asp Ile Ala Val
370                 375                 380

Glu Trp Glu Ser Asn Gly Gln Pro Glu Asn Asn Tyr Lys Thr Thr Pro
385                 390                 395                 400

Pro Val Leu Asp Ser Asp Gly Ser Phe Phe Leu Val Ser Lys Leu Thr
                405                 410                 415

Val Asp Lys Ser Arg Trp Gln Gln Gly Asn Val Phe Ser Cys Ser Val
                420                 425                 430

Met His Glu Ala Leu His Asn His Tyr Thr Gln Lys Ser Leu Ser Leu
                435                 440                 445

Ser Pro
450

<210> SEQ ID NO 101
```

<211> LENGTH: 447
<212> TYPE: PRT
<213> ORGANISM: Artificial sequence
<220> FEATURE:
<223> OTHER INFORMATION: an artificially synthesized sequence

<400> SEQUENCE: 101

Gln Val Gln Leu Val Glu Ser Gly Gly Val Val Gln Pro Gly Gly
1               5                   10                  15

Ser Leu Arg Leu Ser Cys Ala Ala Ser Gly Phe Thr Phe Ser Ser Tyr
            20                  25                  30

Val Gly Ser Trp Val Arg Glu Ala Pro Gly Gln Gly Leu Glu Trp Met
        35                  40                  45

Gly Thr Ile Ser Ser Gly Val Gly Arg Thr Tyr Tyr Pro Asp Val Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Tyr Cys
                85                  90                  95

Ala Arg Gly Asp Phe Arg Tyr Asp Gly Phe Ala Tyr Trp Gly Glu Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Glu Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Glu Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Glu Arg Val Glu Pro Lys Ser Cys Asp Lys
    210                 215                 220

Thr His Thr Cys Pro Pro Cys Pro Ala Pro Glu Leu Arg Arg Gly Pro
225                 230                 235                 240

Lys Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Ala Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Gly Leu Pro Ser Ser Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Leu Val Lys Gly Phe Tyr Pro Ser Asp Ile Ala Val Glu Trp Glu
370                 375                 380

Ser Asn Gly Gln Pro Glu Asn Tyr Lys Thr Thr Pro Pro Val Leu
385                 390                 395                 400

Asp Ser Asp Gly Ser Phe Phe Leu Tyr Ser Lys Leu Thr Val Asp Lys
            405                 410                 415

Ser Arg Trp Gln Glu Gly Asn Val Phe Ser Cys Ser Val Met His Glu
            420                 425                 430

Ala Leu His Asn His Tyr Thr Gln Glu Ser Leu Ser Leu Ser Pro
            435                 440                 445

<210> SEQ ID NO 102
<211> LENGTH: 214
<212> TYPE: PRT
<213> ORGANISM: Artificial sequence
<220> FEATURE:
<223> OTHER INFORMATION: an artificially synthesized sequence

<400> SEQUENCE: 102

Asp Ile Gln Met Thr Gln Ser Pro Ser Ser Leu Ser Ala Ser Val Gly
1               5                   10                  15

Asp Arg Val Thr Ile Thr Cys Arg Ala Ser Tyr Asn Ile Asp Leu Tyr
            20                  25                  30

Leu Ala Trp Tyr Gln Lys Lys Pro Gly Lys Ala Pro Glu Leu Leu Ile
        35                  40                  45

Tyr Leu Ser Thr Leu Leu Val Ile Gly Val Pro Asp Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln His Tyr Tyr Ser Ile Pro Tyr
                85                  90                  95

Thr Phe Gly Gln Gly Thr Lys Val Glu Ile Glu Arg Thr Val Ala Ala
            100                 105                 110

Pro Ser Val Phe Ile Phe Pro Pro Ser Asp Lys Gln Leu Lys Ser Gly
        115                 120                 125

Thr Ala Lys Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Lys
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 103
<211> LENGTH: 98
<212> TYPE: PRT
<213> ORGANISM: Artificial sequence
<220> FEATURE:
<223> OTHER INFORMATION: an artificially synthesized sequence

<400> SEQUENCE: 103

Ala Ser Thr Lys Gly Pro Ser Val Phe Pro Leu Ala Pro Ser Ser Arg
1               5                   10                  15

Ser Thr Ser Glu Ser Thr Ala Ala Leu Gly Cys Leu Val Lys Asp Tyr

```
                 20                  25                  30

Phe Pro Glu Pro Val Thr Val Ser Trp Asn Ser Gly Ala Leu Thr Ser
             35                  40                  45

Gly Val His Thr Phe Pro Ala Val Leu Gln Ser Ser Gly Leu Tyr Ser
         50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                 85                  90                  95

Arg Val

<210> SEQ ID NO 104
<211> LENGTH: 447
<212> TYPE: PRT
<213> ORGANISM: Artificial sequence
<220> FEATURE:
<223> OTHER INFORMATION: an artificially synthesized sequence

<400> SEQUENCE: 104

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Ser Tyr
            20                  25                  30

Thr Met Ser Trp Val Arg Glu Ala Pro Gly Gln Gly Leu Glu Trp Met
         35                  40                  45

Gly Thr Ile Ser Ser Gly Gly Arg Thr Tyr Tyr Pro Asp Ser Val
     50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Tyr Cys
                85                  90                  95

Ala Arg Gly Asp Tyr Arg Tyr Asp Gly Phe Ala Tyr Trp Gly Glu Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Glu Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Glu Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Glu Arg Val Glu Pro Lys Ser Cys Asp Lys
    210                 215                 220

Thr His Thr Cys Pro Pro Cys Pro Ala Pro Glu Ala Ala Gly Gly Pro
225                 230                 235                 240

Lys Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285
```

Ala Lys Thr Lys Pro Arg Glu Glu Gln Tyr Ala Ser Thr Tyr Arg Val
290                 295                 300

Val Ser Val Leu Thr Val Leu His Gln Asp Trp Leu Asn Gly Lys Glu
305                 310                 315                 320

Tyr Lys Cys Lys Val Ser Asn Lys Gly Leu Pro Ser Ser Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Glu Ser Leu Ser Leu Ser Pro
        435                 440                 445

<210> SEQ ID NO 105
<211> LENGTH: 447
<212> TYPE: PRT
<213> ORGANISM: Artificial sequence
<220> FEATURE:
<223> OTHER INFORMATION: an artificially synthesized sequence

<400> SEQUENCE: 105

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Ser Tyr
            20                  25                  30

Thr Met Ser Trp Val Arg Glu Ala Pro Gly Gln Gly Leu Glu Trp Met
        35                  40                  45

Gly Thr Ile Ser Ser Gly Gly Gly Arg Thr Tyr Tyr Pro Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Asp Glu Asp Thr Ala Val Tyr Tyr Cys
                85                  90                  95

Ala Arg Gly Asp Tyr Arg Tyr Asp Gly Phe Ala Tyr Trp Gly Glu Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Glu Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Glu Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

-continued

```
Ser Asn Thr Lys Val Asp Glu Arg Val Glu Pro Lys Ser Cys Asp Lys
        210                 215                 220
Thr His Thr Cys Pro Pro Cys Pro Ala Pro Glu Ala Ala Gly Gly Pro
225                 230                 235                 240
Ser Val Phe Leu Phe Pro Pro Lys Pro Lys Asp Thr Leu Met Ile Ser
                245                 250                 255
Arg Thr Pro Glu Val Thr Cys Val Val Val Asp Val Ser His Glu Asp
                260                 265                 270
Pro Glu Val Lys Phe Asn Trp Tyr Val Asp Gly Val Glu Val His Asn
            275                 280                 285
Ala Lys Thr Lys Pro Arg Glu Glu Gln Tyr Ala Ser Thr Tyr Arg Val
        290                 295                 300
Val Ser Val Leu Thr Val Leu His Gln Asp Trp Leu Asn Gly Lys Glu
305                 310                 315                 320
Tyr Lys Cys Lys Val Ser Asn Lys Gly Leu Pro Ser Ser Ile Glu Lys
                325                 330                 335
Thr Ile Ser Lys Ala Lys Gly Gln Pro Arg Glu Pro Gln Val Tyr Thr
                340                 345                 350
Leu Pro Pro Ser Arg Glu Glu Met Thr Lys Asn Gln Val Ser Leu Thr
            355                 360                 365
Cys Leu Val Lys Gly Phe Tyr Pro Ser Asp Ile Ala Val Glu Trp Glu
370                 375                 380
Ser Asn Gly Gln Pro Glu Asn Asn Tyr Lys Thr Thr Pro Pro Val Leu
385                 390                 395                 400
Asp Ser Asp Gly Ser Phe Phe Leu Tyr Ser Lys Leu Thr Val Asp Lys
                405                 410                 415
Ser Arg Trp Gln Gln Gly Asn Val Phe Ser Cys Ser Val Met His Glu
            420                 425                 430
Ala Leu His Asn His Tyr Thr Gln Glu Ser Leu Ser Leu Ser Pro
        435                 440                 445

<210> SEQ ID NO 106
<211> LENGTH: 447
<212> TYPE: PRT
<213> ORGANISM: Artificial sequence
<220> FEATURE:
<223> OTHER INFORMATION: an artificially synthesized sequence

<400> SEQUENCE: 106

Gln Val Gln Leu Val Glu Ser Gly Gly Gly Val Val Gln Pro Gly Gly
1               5                   10                  15
Ser Leu Arg Leu Ser Cys Ala Ala Ser Gly Phe Thr Phe Ser Ser Tyr
            20                  25                  30
Thr Met Ser Trp Val Arg Glu Ala Pro Gly Gln Gly Leu Glu Trp Met
        35                  40                  45
Gly Thr Ile Ser Ser Gly Gly Gly Arg Thr Tyr Tyr Pro Asp Ser Val
    50                  55                  60
Lys Gly Arg Phe Thr Ile Ser Arg Asp Asn Ser Lys Asn Thr Leu Tyr
65                  70                  75                  80
Leu Gln Met Asn Ser Leu Arg Asp Glu Asp Thr Ala Val Tyr Tyr Cys
                85                  90                  95
Ala Arg Gly Asp Tyr Arg Tyr Asp Gly Phe Ala Tyr Trp Gly Glu Gly
            100                 105                 110
Thr Leu Val Thr Val Ser Ser Ala Ser Thr Lys Gly Pro Ser Val Phe
        115                 120                 125
```

Pro Leu Ala Pro Ser Ser Lys Ser Thr Ser Gly Gly Thr Ala Ala Leu
            130                 135                 140

Gly Cys Leu Val Glu Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Glu Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Glu Arg Val Glu Pro Lys Ser Cys Asp Lys
    210                 215                 220

Thr His Thr Cys Pro Pro Cys Pro Ala Pro Glu Ala Ala Gly Gly Pro
225                 230                 235                 240

Lys Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Ala Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Leu Val Lys Gly Phe Tyr Pro Ser Asp Ile Ala Val Glu Trp Glu
370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Glu Ser Leu Ser Leu Ser Pro
        435                 440                 445

<210> SEQ ID NO 107
<211> LENGTH: 447
<212> TYPE: PRT
<213> ORGANISM: Artificial sequence
<220> FEATURE:
<223> OTHER INFORMATION: an artificially synthesized sequence

<400> SEQUENCE: 107

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Ser Tyr
            20                  25                  30

Thr Met Ser Trp Val Arg Glu Ala Pro Gly Gln Gly Leu Glu Trp Met
        35                  40                  45

Gly Thr Ile Ser Ser Gly Gly Arg Thr Tyr Tyr Pro Asp Ser Val
            50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Asp Glu Asp Thr Ala Val Tyr Tyr Cys
                 85                  90                  95

Ala Arg Gly Asp Tyr Arg Tyr Asp Gly Phe Ala Tyr Trp Gly Glu Gly
            100                 105                 110

Thr Leu Val Thr Val Ser Ser Ala Ser Thr Lys Gly Pro Ser Val Phe
            115                 120                 125

Pro Leu Ala Pro Ser Ser Lys Ser Thr Ser Gly Gly Thr Ala Ala Leu
130                 135                 140

Gly Cys Leu Val Glu Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Glu Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Glu Arg Val Glu Pro Lys Ser Cys Asp Lys
210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Ala Ser Thr Tyr Arg Val
290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Leu Val Lys Gly Phe Tyr Pro Ser Asp Ile Ala Val Glu Trp Glu
370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Glu Ser Leu Ser Leu Ser Pro
        435                 440                 445

<210> SEQ ID NO 108
<211> LENGTH: 450

<212> TYPE: PRT
<213> ORGANISM: Artificial sequence
<220> FEATURE:
<223> OTHER INFORMATION: an artificially synthesized sequence

<400> SEQUENCE: 108

```
Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Asn Ala
            20                  25                  30

Trp Met His Trp Val Arg Lys Ala Pro Gly Lys Gly Leu Glu Trp Val
        35                  40                  45

Ala Gln Ile Lys Asp Lys Ser Gln Asn Tyr Ala Thr Tyr Val Ala Glu
    50                  55                  60

Ser Val Lys Gly Arg Phe Thr Ile Ser Arg Ala Asp Ser Lys Asn Ser
65                  70                  75                  80

Ile Tyr Leu Gln Met Asn Ser Leu Lys Thr Glu Asp Thr Ala Val Tyr
                85                  90                  95

Tyr Cys Arg Tyr Val His Tyr Ala Ala Gly Tyr Gly Val Asp Ile Trp
            100                 105                 110

Gly Gln Gly Thr Thr Val Thr Val Ser Ser Ala Ser Thr Lys Gly Pro
        115                 120                 125

Ser Val Phe Pro Leu Ala Pro Ser Ser Lys Ser Thr Ser Gly Gly Thr
    130                 135                 140

Ala Ala Leu Gly Cys Leu Val Lys Asp Tyr Phe Pro Glu Pro Val Thr
145                 150                 155                 160

Val Ser Trp Asn Ser Gly Ala Leu Thr Ser Gly Val His Thr Phe Pro
                165                 170                 175

Ala Val Leu Lys Ser Ser Gly Leu Tyr Ser Leu Ser Ser Val Val Thr
            180                 185                 190

Val Pro Ser Ser Ser Leu Gly Thr Gln Thr Tyr Ile Cys Asn Val Asn
        195                 200                 205

His Lys Pro Ser Asn Thr Lys Val Asp Lys Arg Val Glu Pro Lys Ser
    210                 215                 220

Cys Asp Lys Thr His Thr Cys Pro Pro Cys Pro Ala Pro Glu Ala Ala
225                 230                 235                 240

Gly Gly Pro Lys Val Phe Leu Phe Pro Pro Lys Pro Lys Asp Thr Leu
                245                 250                 255

Met Ile Ser Arg Thr Pro Glu Val Thr Cys Val Val Val Asp Val Ser
            260                 265                 270

His Glu Asp Pro Glu Val Lys Phe Asn Trp Tyr Val Asp Gly Val Glu
        275                 280                 285

Val His Asn Ala Lys Thr Lys Pro Arg Glu Glu Gln Tyr Ala Ser Thr
    290                 295                 300

Tyr Arg Val Val Ser Val Leu Thr Val Leu His Gln Asp Trp Leu Asn
305                 310                 315                 320

Gly Lys Glu Tyr Lys Cys Lys Val Ser Asn Lys Gly Leu Pro Ser Ser
                325                 330                 335

Ile Glu Lys Thr Ile Ser Lys Ala Lys Gly Gln Pro Arg Glu Pro Gln
            340                 345                 350

Val Tyr Thr Leu Pro Pro Ser Arg Lys Glu Met Thr Lys Asn Gln Val
        355                 360                 365

Ser Leu Thr Cys Leu Val Lys Gly Phe Tyr Pro Ser Asp Ile Ala Val
    370                 375                 380
```

```
Glu Trp Glu Ser Asn Gly Gln Pro Glu Asn Asn Tyr Lys Thr Thr Pro
385                 390                 395                 400

Pro Val Leu Asp Ser Asp Gly Ser Phe Phe Leu Tyr Ser Lys Leu Thr
            405                 410                 415

Val Asp Lys Ser Arg Trp Gln Gln Gly Asn Val Phe Ser Cys Ser Val
            420                 425                 430

Met His Glu Ala Leu His Asn His Tyr Thr Gln Lys Ser Leu Ser Leu
            435                 440                 445

Ser Pro
    450

<210> SEQ ID NO 109
<211> LENGTH: 450
<212> TYPE: PRT
<213> ORGANISM: Artificial sequence
<220> FEATURE:
<223> OTHER INFORMATION: an artificially synthesized sequence

<400> SEQUENCE: 109

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Asn Ala
            20                  25                  30

Trp Met His Trp Val Arg Lys Ala Pro Gly Lys Gly Leu Glu Trp Val
            35                  40                  45

Ala Gln Ile Lys Asp Lys Ser Gln Asn Tyr Ala Thr Tyr Val Ala Glu
        50                  55                  60

Ser Val Lys Gly Arg Phe Thr Ile Ser Arg Ala Asp Ser Lys Asn Ser
65                  70                  75                  80

Ile Tyr Leu Gln Met Asn Ser Leu Lys Thr Glu Asp Thr Ala Val Tyr
            85                  90                  95

Tyr Cys Arg Tyr Val His Tyr Ala Ala Gly Tyr Gly Val Asp Ile Trp
            100                 105                 110

Gly Gln Gly Thr Thr Val Thr Val Ser Ser Ala Ser Thr Lys Gly Pro
            115                 120                 125

Ser Val Phe Pro Leu Ala Pro Ser Ser Lys Ser Thr Ser Gly Gly Thr
        130                 135                 140

Ala Ala Leu Gly Cys Leu Val Lys Asp Tyr Phe Pro Glu Pro Val Thr
145                 150                 155                 160

Val Ser Trp Asn Ser Gly Ala Leu Thr Ser Gly Val His Thr Phe Pro
            165                 170                 175

Ala Val Leu Lys Ser Ser Gly Leu Tyr Ser Leu Ser Ser Val Val Thr
            180                 185                 190

Val Pro Ser Ser Ser Leu Gly Thr Gln Thr Tyr Ile Cys Asn Val Asn
            195                 200                 205

His Lys Pro Ser Asn Thr Lys Val Asp Lys Arg Val Glu Pro Lys Ser
        210                 215                 220

Cys Asp Lys Thr His Thr Cys Pro Pro Cys Pro Ala Pro Glu Ala Ala
225                 230                 235                 240

Gly Gly Pro Ser Val Phe Leu Phe Pro Pro Lys Pro Lys Asp Thr Leu
            245                 250                 255

Met Ile Ser Arg Thr Pro Glu Val Thr Cys Val Val Val Asp Val Ser
            260                 265                 270

His Glu Asp Pro Glu Val Lys Phe Asn Trp Tyr Val Asp Gly Val Glu
            275                 280                 285
```

```
Val His Asn Ala Lys Thr Lys Pro Arg Glu Glu Gln Tyr Ala Ser Thr
290                 295                 300

Tyr Arg Val Val Ser Val Leu Thr Val Leu His Gln Asp Trp Leu Asn
305                 310                 315                 320

Gly Lys Glu Tyr Lys Cys Lys Val Ser Asn Lys Gly Leu Pro Ser Ser
                325                 330                 335

Ile Glu Lys Thr Ile Ser Lys Ala Lys Gly Gln Pro Arg Glu Pro Gln
                340                 345                 350

Val Tyr Thr Leu Pro Pro Ser Arg Lys Glu Met Thr Lys Asn Gln Val
                355                 360                 365

Ser Leu Thr Cys Leu Val Lys Gly Phe Tyr Pro Ser Asp Ile Ala Val
370                 375                 380

Glu Trp Glu Ser Asn Gly Gln Pro Glu Asn Asn Tyr Lys Thr Thr Pro
385                 390                 395                 400

Pro Val Leu Asp Ser Asp Gly Ser Phe Phe Leu Tyr Ser Lys Leu Thr
                405                 410                 415

Val Asp Lys Ser Arg Trp Gln Gln Gly Asn Val Phe Ser Cys Ser Val
                420                 425                 430

Met His Glu Ala Leu His Asn His Tyr Thr Gln Lys Ser Leu Ser Leu
                435                 440                 445

Ser Pro
450

<210> SEQ ID NO 110
<211> LENGTH: 450
<212> TYPE: PRT
<213> ORGANISM: Artificial sequence
<220> FEATURE:
<223> OTHER INFORMATION: an artificially synthesized sequence

<400> SEQUENCE: 110

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Asn Ala
                20                  25                  30

Trp Met His Trp Val Arg Lys Ala Pro Gly Lys Gly Leu Glu Trp Val
            35                  40                  45

Ala Gln Ile Lys Asp Lys Ser Gln Asn Tyr Ala Thr Tyr Val Ala Glu
50                  55                  60

Ser Val Lys Gly Arg Phe Thr Ile Ser Arg Ala Asp Ser Lys Asn Ser
65                  70                  75                  80

Ile Tyr Leu Gln Met Asn Ser Leu Lys Thr Glu Asp Thr Ala Val Tyr
                85                  90                  95

Tyr Cys Arg Tyr Val His Tyr Ala Ala Gly Tyr Gly Val Asp Ile Trp
            100                 105                 110

Gly Gln Gly Thr Thr Val Thr Val Ser Ser Ala Ser Thr Lys Gly Pro
        115                 120                 125

Ser Val Phe Pro Leu Ala Pro Ser Ser Lys Ser Thr Ser Gly Gly Thr
    130                 135                 140

Ala Ala Leu Gly Cys Leu Val Lys Asp Tyr Phe Pro Glu Pro Val Thr
145                 150                 155                 160

Val Ser Trp Asn Ser Gly Ala Leu Thr Ser Gly Val His Thr Phe Pro
                165                 170                 175

Ala Val Leu Lys Ser Ser Gly Leu Tyr Ser Leu Ser Ser Val Val Thr
            180                 185                 190
```

Val Pro Ser Ser Leu Gly Thr Gln Thr Tyr Ile Cys Asn Val Asn
        195                 200                 205

His Lys Pro Ser Asn Thr Lys Val Asp Lys Arg Val Glu Pro Lys Ser
    210                 215                 220

Cys Asp Lys Thr His Thr Cys Pro Pro Cys Pro Ala Pro Glu Ala Ala
225                 230                 235                 240

Gly Gly Pro Lys Val Phe Leu Phe Pro Pro Lys Pro Lys Asp Thr Leu
                245                 250                 255

Met Ile Ser Arg Thr Pro Glu Val Thr Cys Val Val Val Asp Val Ser
            260                 265                 270

His Glu Asp Pro Glu Val Lys Phe Asn Trp Tyr Val Asp Gly Val Glu
        275                 280                 285

Val His Asn Ala Lys Thr Lys Pro Arg Glu Glu Gln Tyr Ala Ser Thr
    290                 295                 300

Tyr Arg Val Val Ser Val Leu Thr Val Leu His Gln Asp Trp Leu Asn
305                 310                 315                 320

Gly Lys Glu Tyr Lys Cys Lys Val Ser Asn Lys Ala Leu Pro Ala Pro
                325                 330                 335

Ile Glu Lys Thr Ile Ser Lys Ala Lys Gly Gln Pro Arg Glu Pro Gln
            340                 345                 350

Val Tyr Thr Leu Pro Pro Ser Arg Lys Glu Met Thr Lys Asn Gln Val
        355                 360                 365

Ser Leu Thr Cys Leu Val Lys Gly Phe Tyr Pro Ser Asp Ile Ala Val
    370                 375                 380

Glu Trp Glu Ser Asn Gly Gln Pro Glu Asn Asn Tyr Lys Thr Thr Pro
385                 390                 395                 400

Pro Val Leu Asp Ser Asp Gly Ser Phe Phe Leu Tyr Ser Lys Leu Thr
                405                 410                 415

Val Asp Lys Ser Arg Trp Gln Gln Gly Asn Val Phe Ser Cys Ser Val
            420                 425                 430

Met His Glu Ala Leu His Asn His Tyr Thr Gln Lys Ser Leu Ser Leu
        435                 440                 445

Ser Pro
    450

<210> SEQ ID NO 111
<211> LENGTH: 450
<212> TYPE: PRT
<213> ORGANISM: Artificial sequence
<220> FEATURE:
<223> OTHER INFORMATION: an artificially synthesized sequence

<400> SEQUENCE: 111

Gln Val Gln Leu Val Glu Ser Gly Gly Gly Val Val Gln Pro Gly Gly
1               5                   10                  15

Ser Leu Arg Leu Ser Cys Ala Ala Ser Gly Phe Thr Phe Ser Asn Ala
            20                  25                  30

Trp Met His Trp Val Arg Lys Ala Pro Gly Lys Gly Leu Glu Trp Val
        35                  40                  45

Ala Gln Ile Lys Asp Lys Ser Gln Asn Tyr Ala Thr Tyr Val Ala Glu
    50                  55                  60

Ser Val Lys Gly Arg Phe Thr Ile Ser Arg Ala Asp Ser Lys Asn Ser
65                  70                  75                  80

Ile Tyr Leu Gln Met Asn Ser Leu Lys Thr Glu Asp Thr Ala Val Tyr
                85                  90                  95

```
Tyr Cys Arg Tyr Val His Tyr Ala Ala Gly Tyr Gly Val Asp Ile Trp
                100                 105                 110
Gly Gln Gly Thr Thr Val Thr Val Ser Ser Ala Ser Thr Lys Gly Pro
            115                 120                 125
Ser Val Phe Pro Leu Ala Pro Ser Ser Lys Ser Thr Ser Gly Gly Thr
        130                 135                 140
Ala Ala Leu Gly Cys Leu Val Lys Asp Tyr Phe Pro Glu Pro Val Thr
145                 150                 155                 160
Val Ser Trp Asn Ser Gly Ala Leu Thr Ser Gly Val His Thr Phe Pro
                165                 170                 175
Ala Val Leu Lys Ser Ser Gly Leu Tyr Ser Leu Ser Ser Val Val Thr
            180                 185                 190
Val Pro Ser Ser Leu Gly Thr Gln Thr Tyr Ile Cys Asn Val Asn
        195                 200                 205
His Lys Pro Ser Asn Thr Lys Val Asp Lys Arg Val Glu Pro Lys Ser
210                 215                 220
Cys Asp Lys Thr His Thr Cys Pro Pro Cys Pro Ala Pro Glu Ala Ala
225                 230                 235                 240
Gly Gly Pro Ser Val Phe Leu Phe Pro Pro Lys Pro Lys Asp Thr Leu
                245                 250                 255
Met Ile Ser Arg Thr Pro Glu Val Thr Cys Val Val Val Asp Val Ser
            260                 265                 270
His Glu Asp Pro Glu Val Lys Phe Asn Trp Tyr Val Asp Gly Val Glu
        275                 280                 285
Val His Asn Ala Lys Thr Lys Pro Arg Glu Glu Gln Tyr Ala Ser Thr
290                 295                 300
Tyr Arg Val Val Ser Val Leu Thr Val Leu His Gln Asp Trp Leu Asn
305                 310                 315                 320
Gly Lys Glu Tyr Lys Cys Lys Val Ser Asn Lys Ala Leu Pro Ala Pro
                325                 330                 335
Ile Glu Lys Thr Ile Ser Lys Ala Lys Gly Gln Pro Arg Glu Pro Gln
            340                 345                 350
Val Tyr Thr Leu Pro Pro Ser Arg Lys Glu Met Thr Lys Asn Gln Val
        355                 360                 365
Ser Leu Thr Cys Leu Val Lys Gly Phe Tyr Pro Ser Asp Ile Ala Val
370                 375                 380
Glu Trp Glu Ser Asn Gly Gln Pro Glu Asn Asn Tyr Lys Thr Thr Pro
385                 390                 395                 400
Pro Val Leu Asp Ser Asp Gly Ser Phe Phe Leu Tyr Ser Lys Leu Thr
                405                 410                 415
Val Asp Lys Ser Arg Trp Gln Gln Gly Asn Val Phe Ser Cys Ser Val
            420                 425                 430
Met His Glu Ala Leu His Asn His Tyr Thr Gln Lys Ser Leu Ser Leu
        435                 440                 445
Ser Pro
    450

<210> SEQ ID NO 112
<211> LENGTH: 214
<212> TYPE: PRT
<213> ORGANISM: Artificial sequence
<220> FEATURE:
<223> OTHER INFORMATION: an artificially synthesized sequence

<400> SEQUENCE: 112
```

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Tyr Asn Ile Asp Ser Tyr
            20                  25                  30

Leu Ala Trp Tyr Gln Lys Lys Pro Gly Lys Ala Pro Glu Leu Leu Ile
        35                  40                  45

Tyr Tyr Ser Thr Leu Leu Val Asp Gly Val Pro Asp Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln His Tyr Tyr Ser Ile Pro Tyr
                85                  90                  95

Thr Phe Gly Gln Gly Thr Lys Val Glu Ile Glu Arg Thr Val Ala Ala
            100                 105                 110

Pro Ser Val Phe Ile Phe Pro Pro Ser Asp Lys Gln Leu Lys Ser Gly
        115                 120                 125

Thr Ala Lys Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Lys
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 113
<211> LENGTH: 5
<212> TYPE: PRT
<213> ORGANISM: Artificial sequence
<220> FEATURE:
<223> OTHER INFORMATION: an artificially synthesized sequence

<400> SEQUENCE: 113

Ser Tyr Thr Met Ser
1               5

<210> SEQ ID NO 114
<211> LENGTH: 16
<212> TYPE: PRT
<213> ORGANISM: Artificial sequence
<220> FEATURE:
<223> OTHER INFORMATION: an artificially synthesized sequence

<400> SEQUENCE: 114

Arg Ser Ser Gln Pro Leu Val His Ser Asn Arg Asn Thr Tyr Leu His
1               5                   10                  15

<210> SEQ ID NO 115
<211> LENGTH: 7
<212> TYPE: PRT
<213> ORGANISM: Artificial sequence
<220> FEATURE:
<223> OTHER INFORMATION: an artificially synthesized sequence

<400> SEQUENCE: 115

Lys Val Ser Asn Arg Phe Ser
```

```
<210> SEQ ID NO 116
<211> LENGTH: 9
<212> TYPE: PRT
<213> ORGANISM: Artificial sequence
<220> FEATURE:
<223> OTHER INFORMATION: an artificially synthesized sequence

<400> SEQUENCE: 116

Gly Gln Gly Thr Gln Val Pro Tyr Thr
1               5

<210> SEQ ID NO 117
<211> LENGTH: 17
<212> TYPE: PRT
<213> ORGANISM: Artificial sequence
<220> FEATURE:
<223> OTHER INFORMATION: an artificially synthesized sequence

<400> SEQUENCE: 117

Thr Ile Ser Ser Gly Gly Gly Arg Thr Tyr Tyr Pro Asp Ser Val Lys
1               5                   10                  15

Gly

<210> SEQ ID NO 118
<211> LENGTH: 10
<212> TYPE: PRT
<213> ORGANISM: Artificial sequence
<220> FEATURE:
<223> OTHER INFORMATION: an artificially synthesized sequence

<400> SEQUENCE: 118

Gly Asp Tyr Arg Tyr Asp Gly Phe Ala Tyr
1               5                   10

<210> SEQ ID NO 119
<211> LENGTH: 11
<212> TYPE: PRT
<213> ORGANISM: Artificial sequence
<220> FEATURE:
<223> OTHER INFORMATION: an artificially synthesized sequence

<400> SEQUENCE: 119

Arg Ala Ser Tyr Asn Ile Asp Ser Tyr Leu Ala
1               5                   10

<210> SEQ ID NO 120
<211> LENGTH: 7
<212> TYPE: PRT
<213> ORGANISM: Artificial sequence
<220> FEATURE:
<223> OTHER INFORMATION: an artificially synthesized sequence

<400> SEQUENCE: 120

Tyr Ser Thr Leu Leu Val Asp
1               5

<210> SEQ ID NO 121
<211> LENGTH: 9
<212> TYPE: PRT
<213> ORGANISM: Artificial sequence
<220> FEATURE:
<223> OTHER INFORMATION: an artificially synthesized sequence

<400> SEQUENCE: 121
```

```
Gln His Tyr Tyr Ser Ile Pro Tyr Thr
1               5
```

```
<210> SEQ ID NO 122
<211> LENGTH: 5
<212> TYPE: PRT
<213> ORGANISM: Artificial sequence
<220> FEATURE:
<223> OTHER INFORMATION: an artificially synthesized sequence

<400> SEQUENCE: 122

Asn Ala Trp Met His
1               5
```

```
<210> SEQ ID NO 123
<211> LENGTH: 19
<212> TYPE: PRT
<213> ORGANISM: Artificial sequence
<220> FEATURE:
<223> OTHER INFORMATION: an artificially synthesized sequence

<400> SEQUENCE: 123

Gln Ile Lys Asp Lys Ser Gln Asn Tyr Ala Thr Tyr Val Ala Glu Ser
1               5                   10                  15

Val Lys Gly
```

```
<210> SEQ ID NO 124
<211> LENGTH: 11
<212> TYPE: PRT
<213> ORGANISM: Artificial sequence
<220> FEATURE:
<223> OTHER INFORMATION: an artificially synthesized sequence

<400> SEQUENCE: 124

Val His Tyr Ala Ala Gly Tyr Gly Val Asp Ile
1               5                   10
```

```
<210> SEQ ID NO 125
<211> LENGTH: 220
<212> TYPE: PRT
<213> ORGANISM: Homo sapiens

<400> SEQUENCE: 125

Met Ala Ser Ala Gly Met Gln Ile Leu Gly Val Val Leu Thr Leu Leu
1               5                   10                  15

Gly Trp Val Asn Gly Leu Val Ser Cys Ala Leu Pro Met Trp Lys Val
                20                  25                  30

Thr Ala Phe Ile Gly Asn Ser Ile Val Val Ala Gln Val Val Trp Glu
            35                  40                  45

Gly Leu Trp Met Ser Cys Val Val Gln Ser Thr Gly Gln Met Gln Cys
        50                  55                  60

Lys Val Tyr Asp Ser Leu Leu Ala Leu Pro Gln Asp Leu Gln Ala Ala
65                  70                  75                  80

Arg Ala Leu Cys Val Ile Ala Leu Leu Val Ala Leu Phe Gly Leu Leu
                85                  90                  95

Val Tyr Leu Ala Gly Ala Lys Cys Thr Thr Cys Val Glu Glu Lys Asp
            100                 105                 110

Ser Lys Ala Arg Leu Val Leu Thr Ser Gly Ile Val Phe Val Ile Ser
        115                 120                 125

Gly Val Leu Thr Leu Ile Pro Val Cys Trp Thr Ala His Ala Val Ile
    130                 135                 140
```

```
Arg Asp Phe Tyr Asn Pro Leu Val Ala Glu Ala Gln Lys Arg Glu Leu
145                 150                 155                 160

Gly Ala Ser Leu Tyr Leu Gly Trp Ala Ala Ser Gly Leu Leu Leu Leu
                165                 170                 175

Gly Gly Gly Leu Leu Cys Cys Thr Cys Pro Ser Gly Ser Gln Gly
            180                 185                 190

Pro Ser His Tyr Met Ala Arg Tyr Ser Thr Ser Ala Pro Ala Ile Ser
                195                 200                 205

Arg Gly Pro Ser Glu Tyr Pro Thr Lys Asn Tyr Val
            210                 215                 220

<210> SEQ ID NO 126
<211> LENGTH: 220
<212> TYPE: PRT
<213> ORGANISM: Homo sapiens

<400> SEQUENCE: 126

Met Ala Ser Ala Gly Met Gln Ile Leu Gly Val Val Leu Thr Leu Leu
1               5                   10                  15

Gly Trp Val Asn Gly Leu Val Ser Cys Ala Leu Pro Met Trp Lys Val
                20                  25                  30

Thr Ala Phe Ile Gly Asn Ser Ile Val Val Ala Gln Val Val Trp Glu
            35                  40                  45

Gly Leu Trp Met Ser Cys Val Val Gln Ser Thr Gly Gln Met Gln Cys
50                  55                  60

Lys Val Tyr Asp Ser Leu Leu Ala Leu Pro Gln Asp Leu Gln Ala Ala
65                  70                  75                  80

Arg Ala Leu Cys Val Ile Ala Leu Leu Val Ala Leu Phe Gly Leu Leu
                85                  90                  95

Val Tyr Leu Ala Gly Ala Lys Cys Thr Thr Cys Val Glu Glu Lys Asp
            100                 105                 110

Ser Lys Ala Arg Leu Val Leu Thr Ser Gly Ile Val Phe Val Ile Ser
            115                 120                 125

Gly Val Leu Thr Leu Ile Pro Val Cys Trp Thr Ala His Ala Ile Ile
        130                 135                 140

Arg Asp Phe Tyr Asn Pro Leu Val Ala Glu Ala Gln Lys Arg Glu Leu
145                 150                 155                 160

Gly Ala Ser Leu Tyr Leu Gly Trp Ala Ala Ser Gly Leu Leu Leu Leu
                165                 170                 175

Gly Gly Gly Leu Leu Cys Cys Thr Cys Pro Ser Gly Ser Gln Gly
            180                 185                 190

Pro Ser His Tyr Met Ala Arg Tyr Ser Thr Ser Ala Pro Ala Ile Ser
                195                 200                 205

Arg Gly Pro Ser Glu Tyr Pro Thr Lys Asn Tyr Val
            210                 215                 220

<210> SEQ ID NO 127
<211> LENGTH: 217
<212> TYPE: PRT
<213> ORGANISM: Homo sapiens

<400> SEQUENCE: 127

Met Ala Ser Thr Gly Leu Glu Leu Leu Gly Met Thr Leu Ala Val Leu
1               5                   10                  15

Gly Trp Leu Gly Thr Leu Val Ser Cys Ala Leu Pro Leu Trp Lys Val
                20                  25                  30
```

```
Thr Ala Phe Ile Gly Asn Ser Ile Val Val Ala Gln Val Val Trp Glu
             35                  40                  45
Gly Leu Trp Met Ser Cys Val Val Gln Ser Thr Gly Gln Met Gln Cys
 50                  55                  60
Lys Val Tyr Asp Ser Leu Leu Ala Leu Pro Gln Asp Leu Gln Ala Ala
 65                  70                  75                  80
Arg Ala Leu Cys Val Ile Ala Leu Leu Leu Ala Leu Leu Gly Leu Leu
                 85                  90                  95
Val Ala Ile Thr Gly Ala Gln Cys Thr Thr Cys Val Glu Asp Glu Gly
                100                 105                 110
Ala Lys Ala Arg Ile Val Leu Thr Ala Gly Val Ile Leu Leu Leu Ala
                115                 120                 125
Gly Ile Leu Val Leu Ile Pro Val Cys Trp Thr Ala His Ala Ile Ile
            130                 135                 140
Gln Asp Phe Tyr Asn Pro Leu Val Ala Glu Ala Leu Lys Arg Glu Leu
145                 150                 155                 160
Gly Ala Ser Leu Tyr Leu Gly Trp Ala Ala Ala Leu Leu Met Leu
                165                 170                 175
Gly Gly Gly Leu Leu Cys Cys Thr Cys Pro Pro Gln Val Glu Arg
            180                 185                 190
Pro Arg Gly Pro Arg Leu Gly Tyr Ser Ile Pro Ser Arg Ser Gly Ala
                195                 200                 205
Ser Gly Leu Asp Lys Arg Asp Tyr Val
            210                 215

<210> SEQ ID NO 128
<211> LENGTH: 220
<212> TYPE: PRT
<213> ORGANISM: Homo sapiens

<400> SEQUENCE: 128

Met Ser Met Gly Leu Glu Ile Thr Gly Thr Ala Leu Ala Val Leu Gly
  1               5                  10                  15
Trp Leu Gly Thr Ile Val Cys Cys Ala Leu Pro Met Trp Arg Val Ser
                 20                  25                  30
Ala Phe Ile Gly Ser Asn Ile Thr Ser Gln Asn Ile Trp Glu Gly
             35                  40                  45
Leu Trp Met Asn Cys Val Val Gln Ser Thr Gly Gln Met Gln Cys Lys
 50                  55                  60
Val Tyr Asp Ser Leu Leu Ala Leu Pro Gln Asp Leu Gln Ala Ala Arg
 65                  70                  75                  80
Ala Leu Ile Val Val Ala Ile Leu Leu Ala Ala Phe Gly Leu Leu Val
                 85                  90                  95
Ala Leu Val Gly Ala Gln Cys Thr Asn Cys Val Gln Asp Thr Ala
                100                 105                 110
Lys Ala Lys Ile Thr Ile Val Ala Gly Val Leu Phe Leu Leu Ala Ala
            115                 120                 125
Leu Leu Thr Leu Val Pro Val Ser Trp Ser Ala Asn Thr Ile Ile Arg
            130                 135                 140
Asp Phe Tyr Asn Pro Val Val Pro Glu Ala Gln Lys Arg Glu Met Gly
145                 150                 155                 160
Ala Gly Leu Tyr Val Gly Trp Ala Ala Ala Leu Gln Leu Leu Gly
                165                 170                 175
Gly Ala Leu Leu Cys Cys Ser Cys Pro Pro Arg Glu Lys Lys Tyr Thr
            180                 185                 190
```

Ala Thr Lys Val Val Tyr Ser Ala Pro Arg Ser Thr Gly Pro Gly Ala
        195                 200                 205

Ser Leu Gly Thr Gly Tyr Asp Arg Lys Asp Tyr Val
        210                 215                 220

<210> SEQ ID NO 129
<211> LENGTH: 209
<212> TYPE: PRT
<213> ORGANISM: Homo sapiens

<400> SEQUENCE: 129

Met Ala Ser Met Gly Leu Gln Val Met Gly Ile Ala Leu Ala Val Leu
1               5                   10                  15

Gly Trp Leu Ala Val Met Leu Cys Cys Ala Leu Pro Met Trp Arg Val
            20                  25                  30

Thr Ala Phe Ile Gly Ser Asn Ile Val Thr Ser Gln Thr Ile Trp Glu
        35                  40                  45

Gly Leu Trp Met Asn Cys Val Val Gln Ser Thr Gly Gln Met Gln Cys
    50                  55                  60

Lys Val Tyr Asp Ser Leu Leu Ala Leu Pro Gln Asp Leu Gln Ala Ala
65                  70                  75                  80

Arg Ala Leu Val Ile Ile Ser Ile Ile Val Ala Ala Leu Gly Val Leu
                85                  90                  95

Leu Ser Val Val Gly Gly Lys Cys Thr Asn Cys Leu Glu Asp Glu Ser
            100                 105                 110

Ala Lys Ala Lys Thr Met Ile Val Ala Gly Val Val Phe Leu Leu Ala
        115                 120                 125

Gly Leu Met Val Ile Val Pro Val Ser Trp Thr Ala His Asn Ile Ile
    130                 135                 140

Gln Asp Phe Tyr Asn Pro Leu Val Ala Ser Gly Gln Lys Arg Glu Met
145                 150                 155                 160

Gly Ala Ser Leu Tyr Val Gly Trp Ala Ala Ser Gly Leu Leu Leu Leu
                165                 170                 175

Gly Gly Gly Leu Leu Cys Cys Asn Cys Pro Pro Arg Thr Asp Lys Pro
            180                 185                 190

Tyr Ser Ala Lys Tyr Ser Ala Ala Arg Ser Ala Ala Ser Asn Tyr
        195                 200                 205

Val

<210> SEQ ID NO 130
<211> LENGTH: 219
<212> TYPE: PRT
<213> ORGANISM: Mus musculus

<400> SEQUENCE: 130

Met Ala Ser Thr Gly Leu Gln Ile Leu Gly Ile Val Leu Thr Leu Leu
1               5                   10                  15

Gly Trp Val Asn Ala Leu Val Ser Cys Ala Leu Pro Met Trp Lys Val
            20                  25                  30

Thr Ala Phe Ile Gly Asn Ser Ile Val Val Ala Gln Met Val Trp Glu
        35                  40                  45

Gly Leu Trp Met Ser Cys Val Val Gln Ser Thr Gly Gln Met Gln Cys
    50                  55                  60

Lys Val Tyr Asp Ser Leu Leu Ala Leu Pro Gln Asp Leu Gln Ala Ala
65                  70                  75                  80

-continued

```
Arg Ala Leu Cys Val Thr Leu Leu Ile Val Leu Leu Gly Leu Leu
                85                  90                  95

Val Tyr Leu Ala Gly Ala Lys Cys Thr Thr Cys Val Glu Asp Arg Asn
            100                 105                 110

Ser Lys Ser Arg Leu Val Leu Ile Ser Gly Ile Ile Phe Val Ile Ser
            115                 120                 125

Gly Val Leu Thr Leu Ile Pro Val Cys Trp Thr Ala His Ser Ile Ile
        130                 135                 140

Gln Asp Phe Tyr Asn Pro Leu Val Ala Asp Ala Gln Lys Arg Glu Leu
145                 150                 155                 160

Gly Ala Ser Leu Tyr Leu Gly Trp Ala Ala Ser Gly Leu Leu Leu
                165                 170                 175

Gly Gly Gly Leu Leu Cys Cys Ala Cys Ser Ser Gly Gly Thr Gln Gly
            180                 185                 190

Pro Arg His Tyr Met Ala Cys Tyr Ser Thr Ser Val Pro His Ser Arg
            195                 200                 205

Gly Pro Pro Glu Tyr Pro Thr Lys Asn Tyr Val
        210                 215
```

<210> SEQ ID NO 131
<211> LENGTH: 217
<212> TYPE: PRT
<213> ORGANISM: Mus musculus

<400> SEQUENCE: 131

```
Met Ala Ser Thr Gly Leu Glu Leu Leu Gly Met Thr Leu Ala Val Leu
1               5                   10                  15

Gly Trp Leu Gly Thr Leu Val Ser Cys Ala Leu Pro Leu Trp Lys Val
            20                  25                  30

Thr Ala Phe Ile Gly Asn Ser Ile Val Val Ala Gln Val Val Trp Glu
        35                  40                  45

Gly Leu Trp Met Ser Cys Val Val Gln Ser Thr Gly Gln Met Gln Cys
    50                  55                  60

Lys Val Tyr Asp Ser Leu Leu Ala Leu Pro Gln Asp Leu Gln Ala Ala
65                  70                  75                  80

Arg Ala Leu Cys Val Val Ala Leu Leu Leu Ala Leu Leu Gly Leu Leu
                85                  90                  95

Val Ala Ile Thr Gly Ala Gln Cys Thr Thr Cys Val Glu Asp Glu Gly
            100                 105                 110

Ala Lys Ala Arg Ile Val Leu Thr Ala Gly Val Leu Leu Leu Leu Ser
            115                 120                 125

Gly Ile Leu Val Leu Ile Pro Val Cys Trp Thr Ala His Ala Ile Ile
        130                 135                 140

Gln Asp Phe Tyr Asn Pro Leu Val Ala Glu Ala Leu Lys Arg Glu Leu
145                 150                 155                 160

Gly Ala Ser Leu Tyr Leu Gly Trp Ala Ala Ala Leu Leu Met Leu
                165                 170                 175

Gly Gly Gly Leu Leu Cys Cys Thr Cys Pro Pro Ser His Phe Glu Arg
            180                 185                 190

Pro Arg Gly Pro Arg Leu Gly Tyr Ser Ile Pro Ser Arg Ser Gly Ala
            195                 200                 205

Ser Gly Leu Asp Lys Arg Asp Tyr Val
        210                 215
```

<210> SEQ ID NO 132

<211> LENGTH: 219
<212> TYPE: PRT
<213> ORGANISM: Mus musculus

<400> SEQUENCE: 132

```
Met Ser Met Gly Leu Glu Ile Thr Gly Thr Ser Leu Ala Val Leu Gly
1               5                   10                  15

Trp Leu Cys Thr Ile Val Cys Cys Ala Leu Pro Met Trp Arg Val Ser
            20                  25                  30

Ala Phe Ile Gly Ser Ser Ile Thr Ala Gln Ile Thr Trp Glu Gly
        35                  40                  45

Leu Trp Met Asn Cys Val Val Gln Ser Thr Gly Gln Met Gln Cys Lys
    50                  55                  60

Met Tyr Asp Ser Leu Leu Ala Leu Pro Gln Asp Leu Gln Ala Ala Arg
65                  70                  75                  80

Ala Leu Ile Val Val Ser Ile Leu Leu Ala Ala Phe Gly Leu Leu Val
                85                  90                  95

Ala Leu Val Gly Ala Gln Cys Thr Asn Cys Val Gln Asp Glu Thr Ala
            100                 105                 110

Lys Ala Lys Ile Thr Ile Val Ala Gly Val Leu Phe Leu Leu Ala Ala
        115                 120                 125

Leu Leu Thr Leu Val Pro Val Ser Trp Ser Ala Asn Thr Ile Ile Arg
    130                 135                 140

Asp Phe Tyr Asn Pro Leu Val Pro Glu Ala Gln Lys Arg Glu Met Gly
145                 150                 155                 160

Ala Gly Leu Tyr Val Gly Trp Ala Ala Ala Leu Gln Leu Leu Gly
                165                 170                 175

Gly Ala Leu Leu Cys Cys Ser Cys Pro Pro Arg Asp Lys Tyr Ala Pro
            180                 185                 190

Thr Lys Ile Leu Tyr Ser Ala Pro Arg Ser Thr Gly Pro Gly Thr Gly
        195                 200                 205

Thr Gly Thr Ala Tyr Asp Arg Lys Asp Tyr Val
    210                 215
```

<210> SEQ ID NO 133
<211> LENGTH: 210
<212> TYPE: PRT
<213> ORGANISM: Mus musculus

<400> SEQUENCE: 133

```
Met Ala Ser Met Gly Leu Gln Val Leu Gly Ile Ser Leu Ala Val Leu
1               5                   10                  15

Gly Trp Leu Gly Ile Ile Leu Ser Cys Ala Leu Pro Met Trp Arg Val
            20                  25                  30

Thr Ala Phe Ile Gly Ser Asn Ile Val Thr Ala Gln Thr Ser Trp Glu
        35                  40                  45

Gly Leu Trp Met Asn Cys Val Val Gln Ser Thr Gly Gln Met Gln Cys
    50                  55                  60

Lys Met Tyr Asp Ser Met Leu Ala Leu Pro Gln Asp Leu Gln Ala Ala
65                  70                  75                  80

Arg Ala Leu Met Val Ile Ser Ile Ile Val Gly Ala Leu Gly Met Leu
                85                  90                  95

Leu Ser Val Val Gly Gly Lys Cys Thr Asn Cys Met Glu Asp Glu Thr
            100                 105                 110

Val Lys Ala Lys Ile Met Ile Thr Ala Gly Ala Val Phe Ile Val Ala
        115                 120                 125
```

```
Ser Met Leu Ile Met Val Pro Val Ser Trp Thr Ala His Asn Val Ile
    130                 135                 140

Arg Asp Phe Tyr Asn Pro Met Val Ala Ser Gly Gln Lys Arg Glu Met
145                 150                 155                 160

Gly Ala Ser Leu Tyr Val Gly Trp Ala Ala Ser Gly Leu Leu Leu Leu
                165                 170                 175

Gly Gly Gly Leu Leu Cys Cys Ser Cys Pro Arg Ser Asn Asp Lys
                180                 185                 190

Pro Tyr Ser Ala Lys Tyr Ser Ala Ala Arg Ser Val Pro Ala Ser Asn
                195                 200                 205

Tyr Val
    210

<210> SEQ ID NO 134
<211> LENGTH: 220
<212> TYPE: PRT
<213> ORGANISM: Artificial sequence
<220> FEATURE:
<223> OTHER INFORMATION: an artificially synthesized sequence

<400> SEQUENCE: 134

Met Ala Ser Ala Gly Met Gln Ile Leu Gly Val Val Leu Thr Leu Leu
1               5                   10                  15

Gly Trp Val Asn Gly Leu Val Ser Cys Ala Leu Pro Met Trp Lys Val
                20                  25                  30

Thr Ala Phe Ile Gly Asn Ser Ile Val Val Ala Gln Val Val Trp Glu
                35                  40                  45

Gly Leu Trp Met Ser Cys Val Val Gln Ser Thr Gly Gln Met Gln Cys
    50                  55                  60

Lys Val Tyr Asp Ser Leu Leu Ala Leu Pro Gln Asp Leu Gln Ala Ala
65                  70                  75                  80

Arg Ala Leu Cys Val Ile Ala Leu Leu Val Ala Leu Phe Gly Leu Leu
                85                  90                  95

Val Tyr Leu Ala Gly Ala Lys Cys Thr Thr Cys Val Glu Glu Lys Asp
                100                 105                 110

Ser Lys Ala Arg Leu Val Leu Thr Ser Gly Ile Val Phe Val Ile Ser
                115                 120                 125

Gly Val Leu Thr Leu Ile Pro Val Cys Trp Thr Ala His Ala Ile Ile
    130                 135                 140

Arg Asp Phe Tyr Asn Pro Leu Val Ala Glu Ala Leu Lys Arg Glu Leu
145                 150                 155                 160

Gly Ala Ser Leu Tyr Leu Gly Trp Ala Ala Ser Gly Leu Leu Leu Leu
                165                 170                 175

Gly Gly Gly Leu Leu Cys Cys Thr Cys Pro Ser Gly Gly Ser Gln Gly
                180                 185                 190

Pro Ser His Tyr Met Ala Arg Tyr Ser Thr Ser Ala Pro Ala Ile Ser
                195                 200                 205

Arg Gly Pro Ser Glu Tyr Pro Thr Lys Asn Tyr Val
    210                 215                 220

<210> SEQ ID NO 135
<211> LENGTH: 141
<212> TYPE: PRT
<213> ORGANISM: Homo sapiens

<400> SEQUENCE: 135
```

```
Asp Ile Gln Asn Pro Asp Pro Ala Val Tyr Gln Leu Arg Asp Ser Lys
1               5                   10                  15

Ser Ser Asp Lys Ser Val Cys Leu Phe Thr Asp Phe Ser Gln Thr
            20                  25                  30

Asn Val Ser Gln Ser Lys Asp Ser Asp Val Tyr Ile Thr Asp Lys Thr
            35                  40                  45

Val Leu Asp Met Arg Ser Met Asp Phe Lys Ser Asn Ser Ala Val Ala
        50                  55                  60

Trp Ser Asn Lys Ser Asp Phe Ala Cys Ala Asn Ala Phe Asn Asn Ser
65                  70                  75                  80

Ile Ile Pro Glu Asp Thr Phe Phe Pro Ser Pro Glu Ser Ser Cys Asp
                85                  90                  95

Val Lys Leu Val Glu Lys Ser Phe Glu Thr Asp Thr Asn Leu Asn Phe
            100                 105                 110

Gln Asn Leu Ser Val Ile Gly Phe Arg Ile Leu Leu Lys Val Ala
            115                 120                 125

Gly Phe Asn Leu Leu Met Thr Leu Arg Leu Trp Ser Ser
        130                 135                 140
```

<210> SEQ ID NO 136
<211> LENGTH: 179
<212> TYPE: PRT
<213> ORGANISM: Homo sapiens

<400> SEQUENCE: 136

```
Glu Asp Leu Lys Asn Val Phe Pro Pro Glu Val Ala Val Phe Glu Pro
1               5                   10                  15

Ser Glu Ala Glu Ile Ser His Thr Gln Lys Ala Thr Leu Val Cys Leu
            20                  25                  30

Ala Thr Gly Phe Tyr Pro Asp His Val Glu Leu Ser Trp Trp Val Asn
            35                  40                  45

Gly Lys Glu Val His Ser Gly Val Ser Thr Asp Pro Gln Pro Leu Lys
        50                  55                  60

Glu Gln Pro Ala Leu Asn Asp Ser Arg Tyr Cys Leu Ser Ser Arg Leu
65                  70                  75                  80

Arg Val Ser Ala Thr Phe Trp Gln Asn Pro Arg Asn His Phe Arg Cys
                85                  90                  95

Gln Val Gln Phe Tyr Gly Leu Ser Glu Asn Asp Glu Trp Thr Gln Asp
            100                 105                 110

Arg Ala Lys Pro Val Thr Gln Ile Val Ser Ala Glu Ala Trp Gly Arg
            115                 120                 125

Ala Asp Cys Gly Phe Thr Ser Glu Ser Tyr Gln Gln Gly Val Leu Ser
        130                 135                 140

Ala Thr Ile Leu Tyr Glu Ile Leu Leu Gly Lys Ala Thr Leu Tyr Ala
145                 150                 155                 160

Val Leu Val Ser Ala Leu Val Leu Met Ala Met Val Lys Arg Lys Asp
                165                 170                 175

Ser Arg Gly
```

<210> SEQ ID NO 137
<211> LENGTH: 173
<212> TYPE: PRT
<213> ORGANISM: Homo sapiens

<400> SEQUENCE: 137

Asp Lys Gln Leu Asp Ala Asp Val Ser Pro Lys Pro Thr Ile Phe Leu

```
            1               5                  10                 15
        Pro Ser Ile Ala Glu Thr Lys Leu Gln Lys Ala Gly Thr Tyr Leu Cys
                        20                 25                 30

Leu Leu Glu Lys Phe Phe Pro Asp Val Ile Lys Ile His Trp Gln Glu
                        35                 40                 45

Lys Lys Ser Asn Thr Ile Leu Gly Ser Gln Glu Gly Asn Thr Met Lys
                        50                 55                 60

Thr Asn Asp Thr Tyr Met Lys Phe Ser Trp Leu Thr Val Pro Glu Lys
         65                 70                 75                 80

Ser Leu Asp Lys Glu His Arg Cys Ile Val Arg His Glu Asn Asn Lys
                        85                 90                 95

Asn Gly Val Asp Gln Glu Ile Ile Phe Pro Pro Ile Lys Thr Asp Val
                        100                105                110

Ile Thr Met Asp Pro Lys Asp Asn Cys Ser Lys Asp Ala Asn Asp Thr
                        115                120                125

Leu Leu Leu Gln Leu Thr Asn Thr Ser Ala Tyr Tyr Met Tyr Leu Leu
                        130                135                140

Leu Leu Leu Lys Ser Val Val Tyr Phe Ala Ile Ile Thr Cys Cys Leu
        145                150                155                160

Leu Arg Arg Thr Ala Phe Cys Cys Asn Gly Glu Lys Ser
                        165                170
```

<210> SEQ ID NO 138
<211> LENGTH: 204
<212> TYPE: PRT
<213> ORGANISM: Homo sapiens

<400> SEQUENCE: 138

```
        Lys Gln Leu Asp Ala Asp Val Ser Pro Lys Pro Thr Ile Phe Leu Pro
        1               5                  10                 15

Ser Ile Ala Glu Thr Lys Leu Gln Lys Ala Gly Thr Tyr Leu Cys Leu
                        20                 25                 30

Leu Glu Lys Phe Phe Pro Asp Ile Ile Lys Ile His Trp Gln Glu Lys
                        35                 40                 45

Lys Ser Asn Thr Ile Leu Gly Ser Gln Glu Gly Asn Thr Met Lys Thr
                        50                 55                 60

Asn Asp Thr Tyr Met Lys Phe Ser Trp Leu Thr Val Pro Glu Glu Ser
         65                 70                 75                 80

Leu Asp Lys Glu His Arg Cys Ile Val Arg His Glu Asn Asn Lys Asn
                        85                 90                 95

Gly Ile Asp Gln Glu Ile Ile Phe Pro Pro Ile Lys Thr Asp Val Thr
                        100                105                110

Thr Val Asp Pro Lys Asp Ser Tyr Ser Lys Asp Ala Asn Asp Val Thr
                        115                120                125

Thr Val Asp Pro Lys Tyr Asn Tyr Ser Lys Asp Ala Asn Asp Val Ile
                        130                135                140

Thr Met Asp Pro Lys Asp Asn Trp Ser Lys Asp Ala Asn Asp Thr Leu
        145                150                155                160

Leu Leu Gln Leu Thr Asn Thr Ser Ala Tyr Tyr Met Tyr Leu Leu Leu
                        165                170                175

Leu Leu Lys Ser Val Val Tyr Phe Ala Ile Ile Thr Cys Cys Leu Leu
                        180                185                190

Gly Arg Thr Ala Phe Cys Cys Asn Gly Glu Lys Ser
                        195                200
```

```
<210> SEQ ID NO 139
<211> LENGTH: 177
<212> TYPE: PRT
<213> ORGANISM: Homo sapiens

<400> SEQUENCE: 139

Pro Ser Tyr Thr Gly Gly Tyr Ala Asp Lys Leu Ile Phe Gly Lys Gly
 1               5                  10                  15

Thr Arg Val Thr Val Glu Pro Arg Ser Gln Pro His Thr Lys Pro Ser
                20                  25                  30

Val Phe Val Met Lys Asn Gly Thr Asn Val Ala Cys Leu Val Lys Glu
            35                  40                  45

Phe Tyr Pro Lys Asp Ile Arg Ile Asn Leu Val Ser Ser Lys Lys Ile
        50                  55                  60

Thr Glu Phe Asp Pro Ala Ile Val Ile Ser Pro Ser Gly Lys Tyr Asn
 65                 70                  75                  80

Ala Val Lys Leu Gly Lys Tyr Glu Asp Ser Asn Ser Val Thr Cys Ser
                85                  90                  95

Val Gln His Asp Asn Lys Thr Val His Ser Thr Asp Phe Glu Val Lys
            100                 105                 110

Thr Asp Ser Thr Asp His Val Lys Pro Lys Glu Thr Glu Asn Thr Lys
        115                 120                 125

Gln Pro Ser Lys Ser Cys His Lys Pro Lys Ala Ile Val His Thr Glu
130                 135                 140

Lys Val Asn Met Met Ser Leu Thr Val Leu Gly Leu Arg Met Leu Phe
145                 150                 155                 160

Ala Lys Thr Val Ala Val Asn Phe Leu Leu Thr Ala Lys Leu Phe Phe
                165                 170                 175

Leu

<210> SEQ ID NO 140
<211> LENGTH: 182
<212> TYPE: PRT
<213> ORGANISM: Homo sapiens

<400> SEQUENCE: 140

Met Glu Gln Gly Lys Gly Leu Ala Val Leu Ile Leu Ala Ile Ile Leu
 1               5                  10                  15

Leu Gln Gly Thr Leu Ala Gln Ser Ile Lys Gly Asn His Leu Val Lys
                20                  25                  30

Val Tyr Asp Tyr Gln Glu Asp Gly Ser Val Leu Leu Thr Cys Asp Ala
            35                  40                  45

Glu Ala Lys Asn Ile Thr Trp Phe Lys Asp Gly Lys Met Ile Gly Phe
        50                  55                  60

Leu Thr Glu Asp Lys Lys Lys Trp Asn Leu Gly Ser Asn Ala Lys Asp
 65                 70                  75                  80

Pro Arg Gly Met Tyr Gln Cys Lys Gly Ser Gln Asn Lys Ser Lys Pro
                85                  90                  95

Leu Gln Val Tyr Tyr Arg Met Cys Gln Asn Cys Ile Glu Leu Asn Ala
            100                 105                 110

Ala Thr Ile Ser Gly Phe Leu Phe Ala Glu Ile Val Ser Ile Phe Val
        115                 120                 125

Leu Ala Val Gly Val Tyr Phe Ile Ala Gly Gln Asp Gly Val Arg Gln
130                 135                 140

Ser Arg Ala Ser Asp Lys Gln Thr Leu Leu Pro Asn Asp Gln Leu Tyr
```

145             150             155             160

Gln Pro Leu Lys Asp Arg Glu Asp Gln Tyr Ser His Leu Gln Gly
                165             170             175

Asn Gln Leu Arg Arg Asn
            180

<210> SEQ ID NO 141
<211> LENGTH: 171
<212> TYPE: PRT
<213> ORGANISM: Homo sapiens

<400> SEQUENCE: 141

Met Glu His Ser Thr Phe Leu Ser Gly Leu Val Leu Ala Thr Leu Leu
1               5                   10                  15

Ser Gln Val Ser Pro Phe Lys Ile Pro Ile Glu Glu Leu Glu Asp Arg
            20                  25                  30

Val Phe Val Asn Cys Asn Thr Ser Ile Thr Trp Val Glu Gly Thr Val
        35                  40                  45

Gly Thr Leu Leu Ser Asp Ile Thr Arg Leu Asp Leu Gly Lys Arg Ile
    50                  55                  60

Leu Asp Pro Arg Gly Ile Tyr Arg Cys Asn Gly Thr Asp Ile Tyr Lys
65                  70                  75                  80

Asp Lys Glu Ser Thr Val Gln Val His Tyr Arg Met Cys Gln Ser Cys
                85                  90                  95

Val Glu Leu Asp Pro Ala Thr Val Ala Gly Ile Ile Val Thr Asp Val
            100                 105                 110

Ile Ala Thr Leu Leu Leu Ala Leu Gly Val Phe Cys Phe Ala Gly His
        115                 120                 125

Glu Thr Gly Arg Leu Ser Gly Ala Ala Asp Thr Gln Ala Leu Leu Arg
    130                 135                 140

Asn Asp Gln Val Tyr Gln Pro Leu Arg Asp Arg Asp Asp Ala Gln Tyr
145                 150                 155                 160

Ser His Leu Gly Gly Asn Trp Ala Arg Asn Lys
                165                 170

<210> SEQ ID NO 142
<211> LENGTH: 207
<212> TYPE: PRT
<213> ORGANISM: Homo sapiens

<400> SEQUENCE: 142

Met Gln Ser Gly Thr His Trp Arg Val Leu Gly Leu Cys Leu Leu Ser
1               5                   10                  15

Val Gly Val Trp Gly Gln Asp Gly Asn Glu Glu Met Gly Gly Ile Thr
            20                  25                  30

Gln Thr Pro Tyr Lys Val Ser Ile Ser Gly Thr Thr Val Ile Leu Thr
        35                  40                  45

Cys Pro Gln Tyr Pro Gly Ser Glu Ile Leu Trp Gln His Asn Asp Lys
    50                  55                  60

Asn Ile Gly Gly Asp Glu Asp Lys Asn Ile Gly Ser Asp Glu Asp
65                  70                  75                  80

His Leu Ser Leu Lys Glu Phe Ser Glu Leu Glu Gln Ser Gly Tyr Tyr
                85                  90                  95

Val Cys Tyr Pro Arg Gly Ser Lys Pro Glu Asp Ala Asn Phe Tyr Leu
            100                 105                 110

Tyr Leu Arg Ala Arg Val Cys Glu Asn Cys Met Glu Met Asp Val Met

```
            115                 120                 125
Ser Val Ala Thr Ile Val Ile Val Asp Ile Cys Ile Thr Gly Gly Leu
    130                 135                 140

Leu Leu Leu Val Tyr Tyr Trp Ser Lys Asn Arg Lys Ala Lys Ala Lys
145                 150                 155                 160

Pro Val Thr Arg Gly Ala Gly Ala Gly Arg Gln Arg Gly Gln Asn
                165                 170                 175

Lys Glu Arg Pro Pro Val Pro Asn Pro Asp Tyr Glu Pro Ile Arg
            180                 185                 190

Lys Gly Gln Arg Asp Leu Tyr Ser Gly Leu Asn Gln Arg Arg Ile
        195                 200                 205

<210> SEQ ID NO 143
<211> LENGTH: 330
<212> TYPE: PRT
<213> ORGANISM: Homo sapiens

<400> SEQUENCE: 143

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285
```

```
Leu Tyr Ser Lys Leu Thr Val Asp Lys Ser Arg Trp Gln Gln Gly Asn
            290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 144
<211> LENGTH: 326
<212> TYPE: PRT
<213> ORGANISM: Homo sapiens

<400> SEQUENCE: 144

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Asn Phe Gly Thr Gln Thr
65                  70                  75                  80

Tyr Thr Cys Asn Val Asp His Lys Pro Ser Asn Thr Lys Val Asp Lys
                85                  90                  95

Thr Val Glu Arg Lys Cys Cys Val Glu Cys Pro Pro Cys Pro Ala Pro
            100                 105                 110

Pro Val Ala Gly Pro Ser Val Phe Leu Phe Pro Pro Lys Pro Lys Asp
        115                 120                 125

Thr Leu Met Ile Ser Arg Thr Pro Glu Val Thr Cys Val Val Val Asp
130                 135                 140

Val Ser His Glu Asp Pro Glu Val Gln Phe Asn Trp Tyr Val Asp Gly
145                 150                 155                 160

Val Glu Val His Asn Ala Lys Thr Lys Pro Arg Glu Glu Gln Phe Asn
                165                 170                 175

Ser Thr Phe Arg Val Val Ser Val Leu Thr Val Val His Gln Asp Trp
            180                 185                 190

Leu Asn Gly Lys Glu Tyr Lys Cys Lys Val Ser Asn Lys Gly Leu Pro
        195                 200                 205

Ala Pro Ile Glu Lys Thr Ile Ser Lys Thr Lys Gly Gln Pro Arg Glu
210                 215                 220

Pro Gln Val Tyr Thr Leu Pro Pro Ser Arg Glu Glu Met Thr Lys Asn
225                 230                 235                 240

Gln Val Ser Leu Thr Cys Leu Val Lys Gly Phe Tyr Pro Ser Asp Ile
                245                 250                 255

Ala Val Glu Trp Glu Ser Asn Gly Gln Pro Glu Asn Asn Tyr Lys Thr
            260                 265                 270

Thr Pro Pro Met Leu Asp Ser Asp Gly Ser Phe Phe Leu Tyr Ser Lys
        275                 280                 285

Leu Thr Val Asp Lys Ser Arg Trp Gln Gln Gly Asn Val Phe Ser Cys
290                 295                 300

Ser Val Met His Glu Ala Leu His Asn His Tyr Thr Gln Lys Ser Leu
305                 310                 315                 320

Ser Leu Ser Pro Gly Lys
                325
```

```
<210> SEQ ID NO 145
<211> LENGTH: 377
<212> TYPE: PRT
<213> ORGANISM: Homo sapiens

<400> SEQUENCE: 145

Ala Ser Thr Lys Gly Pro Ser Val Phe Pro Leu Ala Pro Cys Ser Arg
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Thr Cys Asn Val Asn His Lys Pro Ser Asn Thr Lys Val Asp Lys
                85                  90                  95

Arg Val Glu Leu Lys Thr Pro Leu Gly Asp Thr Thr His Thr Cys Pro
            100                 105                 110

Arg Cys Pro Glu Pro Lys Ser Cys Asp Thr Pro Pro Pro Cys Pro Arg
        115                 120                 125

Cys Pro Glu Pro Lys Ser Cys Asp Thr Pro Pro Pro Cys Pro Arg Cys
    130                 135                 140

Pro Glu Pro Lys Ser Cys Asp Thr Pro Pro Pro Cys Pro Arg Cys Pro
145                 150                 155                 160

Ala Pro Glu Leu Leu Gly Gly Pro Ser Val Phe Leu Phe Pro Pro Lys
                165                 170                 175

Pro Lys Asp Thr Leu Met Ile Ser Arg Thr Pro Glu Val Thr Cys Val
            180                 185                 190

Val Val Asp Val Ser His Glu Asp Pro Glu Val Gln Phe Lys Trp Tyr
        195                 200                 205

Val Asp Gly Val Glu Val His Asn Ala Lys Thr Lys Pro Arg Glu Glu
    210                 215                 220

Gln Tyr Asn Ser Thr Phe Arg Val Val Ser Val Leu Thr Val Leu His
225                 230                 235                 240

Gln Asp Trp Leu Asn Gly Lys Glu Tyr Lys Cys Lys Val Ser Asn Lys
                245                 250                 255

Ala Leu Pro Ala Pro Ile Glu Lys Thr Ile Ser Lys Thr Lys Gly Gln
            260                 265                 270

Pro Arg Glu Pro Gln Val Tyr Thr Leu Pro Pro Ser Arg Glu Glu Met
        275                 280                 285

Thr Lys Asn Gln Val Ser Leu Thr Cys Leu Val Lys Gly Phe Tyr Pro
    290                 295                 300

Ser Asp Ile Ala Val Glu Trp Glu Ser Ser Gly Gln Pro Glu Asn Asn
305                 310                 315                 320

Tyr Asn Thr Thr Pro Pro Met Leu Asp Ser Asp Gly Ser Phe Phe Leu
                325                 330                 335

Tyr Ser Lys Leu Thr Val Asp Lys Ser Arg Trp Gln Gln Gly Asn Ile
            340                 345                 350

Phe Ser Cys Ser Val Met His Glu Ala Leu His Asn Arg Phe Thr Gln
        355                 360                 365

Lys Ser Leu Ser Leu Ser Pro Gly Lys
```

```
                      370                 375

<210> SEQ ID NO 146
<211> LENGTH: 327
<212> TYPE: PRT
<213> ORGANISM: Homo sapiens

<400> SEQUENCE: 146

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Ser Cys Pro Ala Pro
            100                 105                 110

Glu Phe Leu Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
    130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
    210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
    290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 147
<211> LENGTH: 4
<212> TYPE: PRT
<213> ORGANISM: Artificial sequence
<220> FEATURE:
```

<223> OTHER INFORMATION: an artificially synthesized sequence

<400> SEQUENCE: 147

Gly Gly Gly Ser
1

<210> SEQ ID NO 148
<211> LENGTH: 4
<212> TYPE: PRT
<213> ORGANISM: Artificial sequence
<220> FEATURE:
<223> OTHER INFORMATION: an artificially synthesized sequence

<400> SEQUENCE: 148

Ser Gly Gly Gly
1

<210> SEQ ID NO 149
<211> LENGTH: 5
<212> TYPE: PRT
<213> ORGANISM: Artificial sequence
<220> FEATURE:
<223> OTHER INFORMATION: an artificially synthesized sequence

<400> SEQUENCE: 149

Gly Gly Gly Gly Ser
1               5

<210> SEQ ID NO 150
<211> LENGTH: 5
<212> TYPE: PRT
<213> ORGANISM: Artificial sequence
<220> FEATURE:
<223> OTHER INFORMATION: an artificially synthesized sequence

<400> SEQUENCE: 150

Ser Gly Gly Gly Gly
1               5

<210> SEQ ID NO 151
<211> LENGTH: 6
<212> TYPE: PRT
<213> ORGANISM: Artificial sequence
<220> FEATURE:
<223> OTHER INFORMATION: an artificially synthesized sequence

<400> SEQUENCE: 151

Gly Gly Gly Gly Gly Ser
1               5

<210> SEQ ID NO 152
<211> LENGTH: 6
<212> TYPE: PRT
<213> ORGANISM: Artificial sequence
<220> FEATURE:
<223> OTHER INFORMATION: an artificially synthesized sequence

<400> SEQUENCE: 152

Ser Gly Gly Gly Gly Gly
1               5

<210> SEQ ID NO 153
<211> LENGTH: 7
<212> TYPE: PRT
<213> ORGANISM: Artificial sequence
<220> FEATURE:
<223> OTHER INFORMATION: an artificially synthesized sequence

```
<400> SEQUENCE: 153

Gly Gly Gly Gly Gly Ser
1               5

<210> SEQ ID NO 154
<211> LENGTH: 7
<212> TYPE: PRT
<213> ORGANISM: Artificial sequence
<220> FEATURE:
<223> OTHER INFORMATION: an artificially synthesized sequence

<400> SEQUENCE: 154

Ser Gly Gly Gly Gly Gly Gly
1               5
```